US012262066B2

(12) United States Patent
Meardi et al.

(10) Patent No.: US 12,262,066 B2
(45) Date of Patent: Mar. 25, 2025

(54) LOW COMPLEXITY ENHANCEMENT VIDEO CODING

(71) Applicant: V-NOVA INTERNATIONAL LIMITED, London (GB)

(72) Inventors: Guido Meardi, London (GB); Simone Ferrara, London (GB); Lorenzo Ciccarelli, London (GB); Ivan Damnjanovic, London (GB); Richard Clucas, London (GB); Sam Littlewood, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 17/439,227

(22) PCT Filed: Mar. 18, 2020

(86) PCT No.: PCT/GB2020/050695

§ 371 (c)(1),
(2) Date: Sep. 14, 2021

(87) PCT Pub. No.: WO2020/188273

PCT Pub. Date: Sep. 24, 2020

(65) Prior Publication Data

US 2022/0400270 A1 Dec. 15, 2022

Related U.S. Application Data

(60) Provisional application No. 62/984,261, filed on Mar. 2, 2020.

(30) Foreign Application Priority Data

Mar. 20, 2019 (GB) .................................... 1903844
Mar. 23, 2019 (GB) .................................... 1904014

(Continued)

(51) Int. Cl.
*H04N 19/00* (2014.01)
*H04N 19/107* (2014.01)
(Continued)

(52) U.S. Cl.
CPC .......... *H04N 19/93* (2014.11); *H04N 19/107* (2014.11); *H04N 19/124* (2014.11);
(Continued)

(58) Field of Classification Search
CPC .... H04N 19/93; H04N 19/107; H04N 19/124; H04N 19/176; H04N 19/18;
(Continued)

(56) References Cited

U.S. PATENT DOCUMENTS 5,790,839 A * 8/1998 Luk ........................ G11C 5/025 713/300
5,901,304 A * 5/1999 Hwang .................... G11C 7/22 365/230.06

(Continued)

FOREIGN PATENT DOCUMENTS

EP 2090108 5/2013
EP 3668101 6/2020

(Continued)

OTHER PUBLICATIONS

International Search Report and Written Opinion for PCT/GB2020/050695 dated Jun. 19, 2020.

(Continued)

*Primary Examiner* — Frank F Huang
(74) *Attorney, Agent, or Firm* — Workman Nydegger

(57) ABSTRACT

Examples of a low complexity enhancement video coding are described. Encoding and decoding methods are described, as well as corresponding encoders and decoders. The enhancement coding may operate on top of a base layer, which may provide base encoding and decoding. Spatial (Continued)

scaling may be applied across different layers. Only the base layer encodes full video, which may be at a lower resolution. The enhancement coding instead operates on computed sets of residuals. The sets of residuals are computed for a plurality of layers, which may represent different levels of scaling in one or more dimensions. A number of encoding and decoding components or tools are described, which may involve the application of transformations, quantization, entropy encoding and temporal buffering. At an example decoder, an encoded base stream and one or more encoded enhancement streams may be independently decoded and combined to reconstruct an original video.

8 Claims, 57 Drawing Sheets

(30) Foreign Application Priority Data

| | | |
|---|---|---|
| Mar. 29, 2019 | (GB) | 1904492 |
| Apr. 15, 2019 | (GB) | 1905325 |
| Jul. 5, 2019 | (GB) | 1909701 |
| Jul. 6, 2019 | (GB) | 1909724 |
| Jul. 11, 2019 | (GB) | 1909997 |
| Jul. 25, 2019 | (GB) | 1910674 |
| Aug. 9, 2019 | (GB) | 1911467 |
| Aug. 13, 2019 | (GB) | 1911546 |
| Oct. 2, 2019 | (GB) | 1914215 |
| Oct. 6, 2019 | (GB) | 1914414 |
| Oct. 10, 2019 | (GB) | 1914634 |
| Oct. 25, 2019 | (GB) | 1915553 |
| Nov. 5, 2019 | (GB) | 1916090 |
| Dec. 10, 2019 | (GB) | 1918099 |
| Jan. 12, 2020 | (GB) | 2000430 |
| Jan. 13, 2020 | (GB) | 2000483 |
| Jan. 15, 2020 | (GB) | 2000600 |
| Jan. 16, 2020 | (GB) | 2000668 |
| Jan. 31, 2020 | (GB) | 2001408 |

(51) Int. Cl.

| | |
|---|---|
| ***H04N 19/124*** | (2014.01) |
| ***H04N 19/176*** | (2014.01) |
| ***H04N 19/18*** | (2014.01) |
| ***H04N 19/186*** | (2014.01) |
| ***H04N 19/33*** | (2014.01) |
| ***H04N 19/42*** | (2014.01) |
| ***H04N 19/48*** | (2014.01) |
| ***H04N 19/60*** | (2014.01) |
| ***H04N 19/70*** | (2014.01) |
| ***H04N 19/91*** | (2014.01) |
| ***H04N 19/93*** | (2014.01) |

(52) U.S. Cl.
CPC ........... *H04N 19/176* (2014.11); *H04N 19/18* (2014.11); *H04N 19/186* (2014.11); *H04N 19/33* (2014.11); *H04N 19/42* (2014.11); *H04N 19/48* (2014.11); *H04N 19/60* (2014.11); *H04N 19/70* (2014.11); *H04N 19/91* (2014.11)

(58) Field of Classification Search
CPC ...... H04N 19/186; H04N 19/33; H04N 19/42; H04N 19/48; H04N 19/60; H04N 19/70; H04N 19/91; H04N 19/503; H04N 19/136; H04N 19/46
See application file for complete search history.

(56) References Cited

U.S. PATENT DOCUMENTS 6,072,834 A * 6/2000 Kim ........ H04N 19/51 382/250
6,097,756 A * 8/2000 Han ........ H04N 19/543 375/240
6,580,754 B1 * 6/2003 Wan ........ H04N 19/33 375/E7.079
6,728,317 B1 * 4/2004 Demos ........ H04N 19/36 348/E7.015
6,765,962 B1 * 7/2004 Lee ........ H04N 19/124 375/240.03
6,771,703 B1 * 8/2004 Oguz ........ H04N 19/59 375/240.03
6,826,232 B2 * 11/2004 Chen ........ H04N 19/14 375/240.18
7,016,412 B1 * 3/2006 van Zon ........ H04N 19/156 375/240.1
7,095,782 B1 * 8/2006 Cohen ........ H04N 21/2404 375/E7.02
7,245,662 B2 * 7/2007 Piche ........ H04N 19/46 382/250
7,263,124 B2 * 8/2007 Peng ........ H04N 19/34 375/240.03
7,369,610 B2 * 5/2008 Xu ........ H04N 21/234327 375/E7.091
7,391,807 B2 * 6/2008 Lin ........ H04N 19/40 375/240.03
7,477,688 B1 * 1/2009 Zhang ........ H04N 19/40 375/240
7,627,034 B2 * 12/2009 Park ........ H04N 19/46 375/240.08
7,697,608 B2 * 4/2010 Lee ........ H04N 19/14 375/240.03
7,729,421 B2 * 6/2010 Campisano ........ H04N 19/577 375/240.01
8,040,952 B2 * 10/2011 Park ........ H04N 21/4347 375/240.01
8,189,659 B2 * 5/2012 Han ........ H04N 21/43637 375/240.02
8,494,042 B2 * 7/2013 Park ........ H04N 19/513 375/240
8,964,854 B2 2/2015 Tu
2003/0067637 A1 4/2003 Hannuksela
2004/0042549 A1 3/2004 Huang et al.
2005/0259729 A1 11/2005 Sun
2007/0064791 A1 * 3/2007 Okada ........ H04N 19/63 375/E7.125
2007/0064937 A1 3/2007 Van Leest
2007/0160126 A1 7/2007 Van Der Meer
2008/0304566 A1 12/2008 Yoon et al.
2009/0028245 A1 * 1/2009 Vieron ........ H04N 19/109 375/E7.123
2009/0110054 A1 4/2009 Kim
2010/0135393 A1 6/2010 Ying et al.
2011/0243231 A1 * 10/2011 Li ........ H04N 19/187 375/E7.256
2011/0261888 A1 10/2011 Cammas et al.
2011/0268175 A1 * 11/2011 Tan ........ H04N 19/895 375/E7.026
2012/0183076 A1 7/2012 Boyce
2013/0028324 A1 * 1/2013 Chang ........ H04N 19/433 375/E7.125
2013/0044813 A1 2/2013 Boon
2013/0272406 A1 10/2013 Yu
2013/0297466 A1 11/2013 Rossato
2013/0322524 A1 12/2013 Jang et al.
2014/0092970 A1 * 4/2014 Misra ........ H04N 19/52 375/240.16
2014/0219346 A1 8/2014 Ugur
2014/0301464 A1 10/2014 Wu
2014/0321555 A1 10/2014 Rossato
2015/0195578 A1 7/2015 Chen
2016/0156917 A1 6/2016 Ugur

(56) References Cited

U.S. PATENT DOCUMENTS

| | | | |
|---|---|---|---|
| 2017/0127085 | A1 | 5/2017 | Sun |
| 2017/0256033 | A1 | 9/2017 | Tuzel et al. |
| 2019/0082184 | A1 | 3/2019 | Hannuksela |

FOREIGN PATENT DOCUMENTS

| | | |
|---|---|---|
| GB | 2509702 | 7/2014 |
| GB | 2516424 | 1/2015 |
| GB | 2552353 | 1/2018 |
| GB | 2553556 | 3/2018 |
| JP | H11289542 | 10/1999 |
| JP | 2002369220 | 12/2002 |
| JP | 2014132759 | 7/2014 |
| WO | 2003-036979 | 5/2003 |
| WO | WO 2013/011495 | 1/2013 |
| WO | WO 2015/161260 | 10/2015 |
| WO | WO2017/140945 | 8/2017 |
| WO | WO 2018/065663 | 4/2018 |

OTHER PUBLICATIONS

"Description of video coding technology proposal by V-Nova for Low Complexity Video Coding Enhancements", 126. MPEG Meeting; Mar. 25, 2019-Mar. 29, 2019; Geneva; Motion Picture Expert Group or ISO/IEC JTC1/SC29/WG11, No. m47215, Mar. 24, 2019, XP030211099, retrieved from the internet: URL: http:/phenix.int-evry.fr/mpeg/doc_end_user/documents/126?Geneva/wg11/m47215-v4-m47215-v4.zip, V-Nova Description of proposal.pptx [retrieved on Mar. 24, 2019].

Search & Examination for GB2312636.0 dated Sep. 28, 2023.

International Preliminary Report on Patentability received for PCT Patent Application No. PCT/GB2020/050695, dated Sep. 30, 2021, 11 pages.

International Search Report and Written Opinion received for PCT Patent Application No. PCT/GB2020/050695, mailed on Jun. 19, 2020, 13 pages.

GB2312555.2 Search Report dated Nov. 2, 2023.

GB2312591.7 Combined search and examination report dated Sep. 28, 2023.

GB2312591.7 Examination report Oct. 20, 2023.

GB2312596.6 Combined search and examination report Sep. 22, 2023.

GB2312582.6 Combined search and examination report Sep. 21, 2023.

GB2312666.7 Search Report Sep. 6, 2023.

GB2312674.1 Combined search and examination report dated Oct. 11, 2023.

GB2312644.4 Combined search and examination report dated Sep. 20, 2023.

GB2312670.9 Search & Exam report dated Sep. 12, 2023.

GB2312675.8 Search & Exam report dated Sep. 12, 2023.

GB2312647.7 Search and Examination Report dated Sep. 7, 2023.

GB2312674.1 Search and Examination Report dated Oct. 10, 2023.

GB2312680.8 Search Report dated Oct. 5, 2023.

* cited by examiner

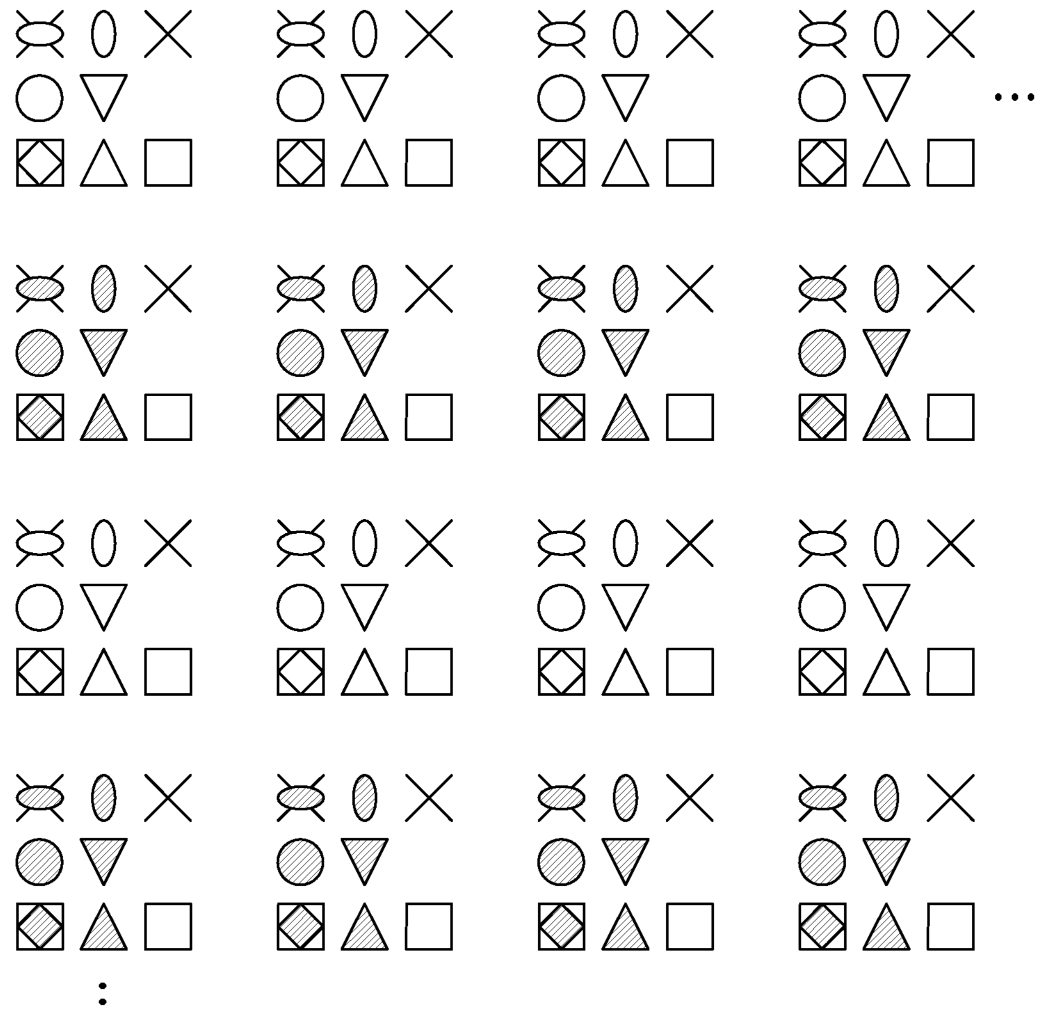

Interpretation of symbols:

Luma sample position indications:

=Luma sample top field =Luma sample botton field

Chroma sample position indications,
where hatched fill indicates a bottom field sample type
and no fill indicates a top field sample type:

=Chroma sample type 2 =Chroma sample type 3

=Chroma sample type 0 =Chroma sample type 1

=Chroma sample type 4 =Chroma sample type 5

*FIG. 30*

LOW COMPLEXITY ENHANCEMENT VIDEO CODING

RELATED CASES

The present application is a 371 US Nationalization of PCT International Patent Application No. PCT/GB2020/050695, filed Mar. 18, 2020, which claims priority to U.S. Provisional Application No. 62/984,261, filed Mar. 2, 2020, which claims priority to UK Patent Application No(s):

1903844.7 filed Mar. 20, 2019
1904014.6 filed Mar. 23, 2019
1904492.4 filed Mar. 29, 2019
1905325.5 filed Apr. 15, 2019
1909701.3 filed Jul. 5, 2019
1909724.5 filed Jul. 6, 2019
1909997.7 filed Jul. 11, 2019
1910674.9 filed Jul. 25, 2019
1911467.7 filed Aug. 9, 2019
1911546.8 filed Aug. 13, 2019
1914215.7 filed Oct. 2, 2019
1914414.6 filed Oct. 6, 2019
1914634.9 filed Oct. 10, 2019
1915553.0 filed Oct. 25, 2019
1916090.2 filed Nov. 5, 2019
1918099.1 filed Dec. 10, 2019
2000430.5 filed Jan. 12, 2020
2000483.4 filed Jan. 13, 2020
2000600.3 filed Jan. 15, 2020
2000668.0 filed Jan. 16, 2020
2001408.0 filed Jan. 31, 2020

The entire disclosures of the aforementioned applications are incorporated herein by reference.

TECHNICAL FIELD

The present invention relates to a video coding technology. In particular, the present invention relates to methods and systems for encoding and decoding video data. In certain examples, the methods and systems may be used to generate a compressed representation for streaming and/or storage.

BACKGROUND

Typical comparative video codecs operate using a single-layer, block-based approach, whereby an original signal is processed using a number of coding tools in order to produce an encoded signal which can then be reconstructed by a corresponding decoding process. For simplicity, coding and decoding algorithms or processes are often referred to as "codecs"; the term "codec" being used to cover one or more of encoding and decoding processes that are designed according to a common framework. Such typical codecs include, but are not limited, to MPEG-2, AVC/H.264, HEVC/H.265, VP8, VP9, AV1. There are also other codecs that are currently under development by international standards organizations, such as MPEG/ISO/ITU as well as industry consortia such as Alliance for Open Media (AoM).

In recent years, adaptations to the single-layer, block-based approach have been suggested. For example, there exists a class of codecs that operate using a multi-layer, block-based approach. These codecs are often known as "scalable" codecs within the video coding industry. They typically replicate operations performed by a single-layer, block-based approach over a number of layers, where a set of layers are obtained by down-sampling an original signal.

In certain cases, efficiencies in the single-layer, block-based approach may be achieved by re-using information from a lower layer to encode (and decode) an upper layer. These scalable codecs are meant to provide scalability features to operators, in the sense that they need to guarantee that the quality of the scaled-down decoded signal (e.g., the lower resolution signal) satisfies the quality requirements for existing services, as well as ensuring that the quality of the non-scaled decoded signal (e.g., higher resolution signal) is comparable with that produced by a corresponding single-layer codec.

An example of a "scalable" codec is Scalable Video Coding—SVC (see for example "The Scalable Video Coding Extension of the H.264/AVC Standard", H. Schwarz and M. Wien, IEEE Signal Processing Magazine, March 2008, which is incorporated herein by reference). SVC is the scalable version of the Advanced Video Coding standard—AVC (AVC also being known as H.264). In SVC, each scalable layer is processed using the same AVC-based single-layer process, and upper layers receive information from lower layers (e.g., interlayer predictions including residual information and motion information) which is used in the encoding of the upper layer to reduce encoded information at the upper layer. Conversely, in order to decode, an SVC decoder needs to receive various overhead information as well as decode the lower layer in order to be able to decode the upper layer.

Another example of a scalable codec is the Scalable Extension of the High Efficiency Video Coding Standard (HEVC)—SHVC (see for example "Overview of SHVC: Scalable Extensions of the High Efficiency Video Coding Standard", J. Boyce, Y. Ye, J. Chen and A. Ramasubramonian, IEEE Trans. On Circuits and Systems for Video Technology, Vol. 26, No. 1, January 2016, which is incorporated by reference herein). Similar to SVC, SHVC also uses the same HEVC-based process for each scalable layer, but it allows for the lower layer to use either AVC or HEVC. In SHVC, the upper layer also receives information from the lower layer (e.g., inter layer processing including motion information and/or the up-sampled lower layer as an additional reference picture for the upper layer coding) in the encoding of the upper layer to reduce encoded information at the upper layer. Again, similarly to SVC, an SHVC decoder needs to receive various overhead information as well as decode the lower layer in order to be able to decode the upper layer.

Both SVC and SHVC may be used to encode data in multiple streams at different levels of quality. For example, SVC and SHVC may be used to encode e.g. a SD (standard definition) and an HD (high definition) stream or an HD and a UHD (ultra-high-definition) stream. The base stream (at the lowest level of quality) is typically encoded so that the quality of the base stream is the same as if the base stream were encoded as a single stream, separately from any higher-level streams. Both SVC and SHVC may be thought of primarily as a set of parallel copies of a common encoder and decoder structure, where the outputs of these parallel copies are respectively multiplexed and demultiplexed.

In more detail, within an example SVC encoding, a UHD stream (e.g. a series of images) may be down-sampled to generate an HD stream. The UHD stream and the HD stream are then each encoded separately using an AVC encoder. Although this example describes a two-layer encoder (for encoding two streams: a UHD stream and an HD stream), an SVC encoder may have n layers (where n>2), where each layer operates as an independent AVC encoder.

As per standard AVC encoding, an AVC encoder of each SVC layer encodes each pixel block of image data using either inter-frame prediction (in which a different frame is used to estimate values for a current frame) or intra-frame prediction (in which other blocks within a frame are used to estimate values for a given block of that same frame). These blocks of pixels are typically referred to as "macroblocks". Inter-frame prediction involves performing motion compensation, which involves determining the motion between a pixel block of a previous frame and the corresponding pixel block for the current frame. Both inter- and intra-frame prediction within a layer involves calculating so-called "residuals". These "residuals" are the difference between a pixel block of the data stream of a given layer and a corresponding pixel block within the same layer determined using either inter-frame prediction or intra-frame prediction. As such, these "residuals" are the difference between a current pixel block in the layer and either: 1) a prediction of the current pixel block based on one or more pixel blocks that are not the current pixel block within the frame (e.g. typically neighbouring pixel blocks within the same layer); or 2) a prediction of the current pixel block within the layer based on information from other frames within the layer (e.g. using motion vectors).

In SVC, despite the implementation as a set of parallel AVC encoders, some efficiencies may be gained by re-using information obtained for a lower quality stream (such as an HD stream) for the encoding of a higher quality stream (such as an UHD stream). This re-using of information involves what is referred to as "inter-layer signalling". It should be noted that this is to be distinguished from the "inter-frame" and "intra-frame" prediction, the latter being "within layer" coding approaches. For example, without inter-layer signalling, the total bandwidth, $BW_{Tot}$, for an SVC stream may be expressed as $BW_{Tot}=BW_{HD}+BW_{UHD}$, where $BW_{HD}$ is the bandwidth associated with sending the encoded HD stream separately and $BW_{UHD}$ is the bandwidth associated sending the encoded UHD stream separately (assuming no sharing of information between the different streams). However, by using inter-layer signalling, the bandwidth for the UHD stream $BW_{UHD}$ can be reduced compared to that if the UHD stream is sent separately from the HD stream. Typically, by using inter-layer signalling, the total bandwidth can be reduced so that $BW_{Tot}\approx 1.4\ BW_{UHD}$.

In SVC, inter-layer signalling may comprise one of three types of information: interlayer intra-prediction (in which an up-sampled pixel block from the HD stream is used in intra-prediction for the UHD stream), interlayer residual prediction (which involves calculating a residual between the residuals calculated for the HD stream after up-sampling and the residuals calculated for the UHD stream for a given pixel block), and interlayer motion compensation (which involves using motion compensation parameters determined for the HD stream to perform motion compensation for the UHD stream).

Similar to SVC being a scalable extension of AVC, SHVC is a scalable extension of HEVC. AVC involves dividing a frame into macroblocks (usually 16×16 pixels in size). A given macroblock can be predicted either from other macroblocks within the frame (intra-frame prediction) or from macroblock(s) of a previous frame (inter-frame prediction). The analogous structure to macroblocks for HEVC is a coding tree unit (CTU), which can be larger than macroblocks (e.g. up to 64×64 pixels in size), and which are further divided into coding units (CUs). HEVC offers some improvements over AVC, including improved motion vector determination, motion compensation and intra-frame prediction, that may allow for improved data compression when compared to AVC. However, the "scalable" aspect of HEVC is very similar to the "scalable" aspect of AVC; namely that both use the idea of parallel encoding streams, whereby some efficiencies may be gained via inter-layer information exchange. For example, SHVC also offers inter-layer signalling that includes interlayer intra-prediction, interlayer residual prediction, and interlayer motion compensation. Like SVC, different levels of quality, e.g. HD and UHD are encoded by parallel layers and then combined in a stream for decoding.

Despite the availability of SVC and SHVC, the take up of scalable codecs has been below expectations. One reason for this is the complexity of these schemes and the modest bandwidth savings. Within the field of video delivery, many leading industry experts believed that the current available solutions do not address the challenges of delivering video in the twenty-first century. These industry experts include a large range of entities from vendors to traditional broadcasters, and from satellite providers to over-the-top (OTT) service providers such as social media companies.

In general, video service providers need to work with complex ecosystems. The selection of video codecs are often based on many various factors, including maximum compatibility with their existing ecosystems and costs of deploying the technology (e.g. both resource and monetary costs). Once a selection is made, it is difficult to change codecs without further massive investments in the form of equipment and time. Currently, it is difficult to upgrade an ecosystem without needing to replace it completely. Further, the resource cost and complexity of delivering an increasing number of services, sometimes using decentralised infrastructures such as so-called "cloud" configurations, are becoming a key concern for service operators, small and big alike. This is compounded by the rise in low-resource battery-powered edge devices (e.g. nodes in the so-called Internet of Things). All these factors need to be balanced with a need to reduce resource usage, e.g. to become more environmentally friendly, and a need to scale, e.g. to increase the number of users and provided services.

There is also a problem that many comparative codecs were developed in a time where large-scale commodity hardware was unavailable. This is not the case today. Large-scale data centres provide cheap generic data processing hardware. This is at odds with traditional video coding solutions that require bespoke hardware to operate efficiently.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings.

FIG. 30 shows example locations of chroma samples for top and bottom fields of an example frame.

DETAILED DESCRIPTION

Introduction

Figure 1:
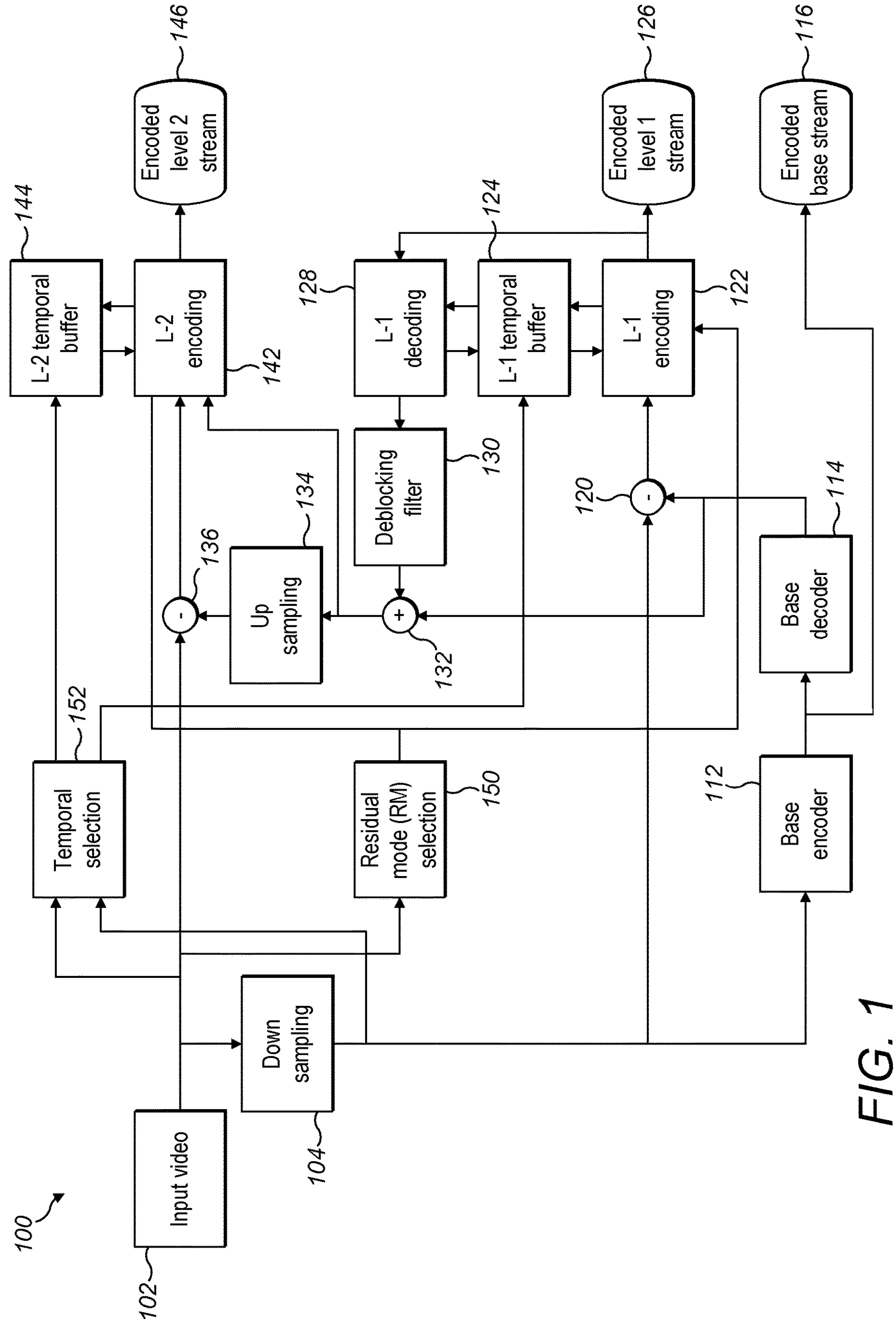
FIG. 1 is a schematic illustration of an encoder according to a first example.

Certain examples described herein relate to a framework for a new video coding technology that is flexible, adaptable, highly efficient and computationally inexpensive coding. It combines a selectable a base codec (e.g. AVC, HEVC, or any other present or future codec) with at least two enhancement levels of coded data. The framework offers an approach that is low complexity yet provides for flexible enhancement of video data.

Certain examples described herein build on a new multi-layer approach that has been developed. Details of this approach are described, for example, in U.S. Pat. Nos. 8,977,065, 8,948,248, 8,711,943, 9,129,411, 8,531,321, 9,510,018, 9,300,980, and 9,626,772 and PCT applications Nos. PCT/EP2013/059833, PCT/EP2013/059847, PCT/EP2013/059880, PCT/EP2013/059853, PCT/EP2013/059885, PCT/EP2013/059886, and PCT/IB2014/060716, which are all included herein by reference. This new multi-layer approach uses a hierarchy of layers wherein each layer may relate to a different level of quality, such as a different video resolution.

Examples of a low complexity enhancement video coding are described. Encoding and decoding methods are described, as well as corresponding encoders and decoders. The enhancement coding may operate on top of a base layer, which may provide base encoding and decoding. Spatial scaling may be applied across different layers. Only the base layer encodes full video, which may be at a lower resolution. The enhancement coding instead operates on computed sets of residuals. The sets of residuals are computed for a plurality of layers, which may represent different levels of scaling in one or more dimensions. A number of encoding and decoding components or tools are described, which may involve the application of transformations, quantization, entropy encoding and temporal buffering. At an example decoder, an encoded base stream and one or more encoded enhancement streams may be independently decoded and combined to reconstruct an original video.

The general structure of an example encoding scheme presented herein uses a down-sampled source signal encoded with a base codec, adds a first level of correction data to the decoded output of the base codec to generate a corrected picture, and then adds a further level of enhancement data to an up-sampled version of the corrected picture.

An encoded stream as described herein may be considered to comprise a base stream and an enhancement stream. The enhancement stream may have multiple layers (e.g. two are described in examples). The base stream may be decodable by a hardware decoder while the enhancement stream may be suitable for software processing implementation with suitable power consumption.

Certain examples described herein have a structure that provides a plurality of degrees of freedom, which in turn allows great flexibility and adaptability to many situations. This means that the coding format is suitable for many use cases including OTT transmission, live streaming, live UHD broadcast, and so on.

Although the decoded output of the base codec is not intended for viewing, it is a fully decoded video at a lower resolution, making the output compatible with existing decoders and, where considered suitable, also usable as a lower resolution output.

In the following description, certain example architectures for video encoding and decoding are described. These architectures use a small number of simple coding tools to reduce complexity. When combined synergistically, they can provide visual quality improvements when compared with a full resolution picture encoded with the base codec whilst at the same time generating flexibility in the way they can be used.

The present described examples provide a solution to the recent desire to use less and less power and, contributes to reducing the computational cost of encoding and decoding whilst increasing performance. The present described examples may operate as a software layer on top of existing infrastructures and deliver desired performances. The present examples provide a solution that is compatible with existing (and future) video streaming and delivery ecosystems whilst delivering video coding at a lower computational cost than it would be otherwise possible with a tout-court upgrade. Combining the coding efficiency of the latest codecs with the processing power reductions of the described examples may improve a technical case for the adoption of next-generation codecs.

Certain examples described herein operate upon residuals. Residuals may be computed by comparing two images or video signals. In one case, residuals are computed by comparing frames from an input video stream with frames of a reconstructed video stream. In the case of the level 1 enhancement stream as described herein the residuals may be computed by comparing a down-sampled input video stream with a first video stream that has been encoded by a base encoder and then decoded by a base decoder (e.g. the first video stream simulates decoding and reconstruction of the down-sampled input video stream at a decoder). In the case of the level 2 enhancement stream as described herein the residuals may be computed by comparing the input video stream (e.g. at a level of quality or resolution higher than the down-sampled or base video stream) with a second video stream that is reconstructed from an up-sampled version of the first video stream plus a set of decoded level 1 residuals (e.g. the second video stream simulates decoding both a base stream and the level 1 enhancement stream, reconstructing a video stream at a lower or down-sampled level of quality, then up-sampling this reconstructed video stream). This is, for example, shown in FIGS. 1 to 5C.

In certain examples, residuals may thus be considered to be errors or differences at a particular level of quality or resolution. In described examples, there are two levels of quality or resolutions and thus two sets of residuals (levels 1 and 2). Each set of residuals described herein models a different form of error or difference. The level 1 residuals, for example, typically correct for the characteristics of the base encoder, e.g. correct artefacts that are introduced by the base encoder as part of the encoding process. In contrast, the level 2 residuals, for example, typically correct complex effects introduced by the shifting in the levels of quality and differences introduced by the level 1 correction (e.g. artefacts generated over a wider spatial scale, such as areas of 4 or 16 pixels, by the level 1 encoding pipeline). This means it is not obvious that operations performed on one set of residuals will necessarily provide the same effect for another set of residuals, e.g. each set of residuals may have different statistical patterns and sets of correlations.

Figure 3A:
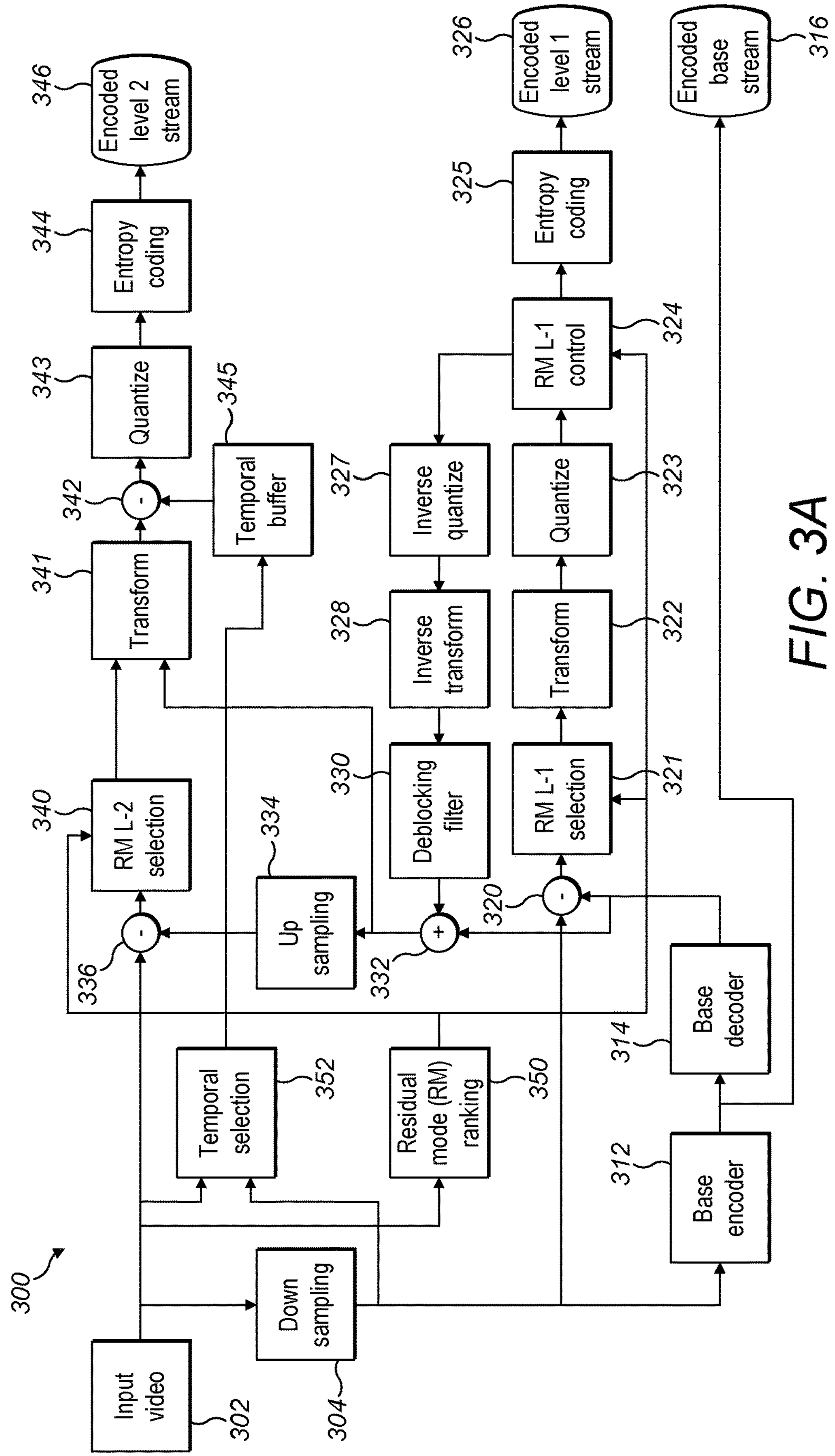
FIG. 3A is a schematic illustration of an encoder according to a first variation of a second example.
Figure 3B:
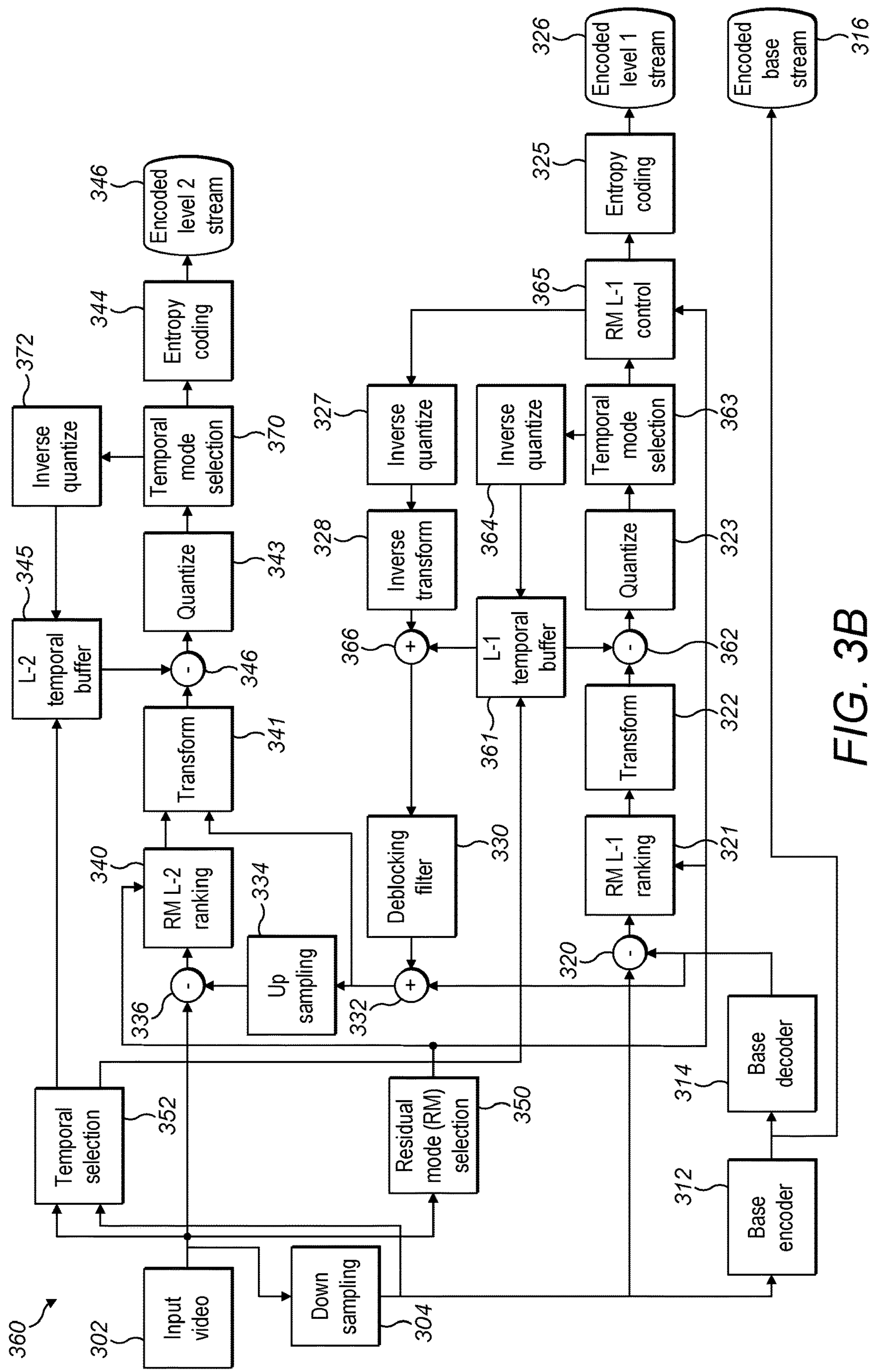
FIG. 3B is a schematic illustration of an encoder according to a second variation of the second example.

In the examples described herein residuals are encoded by an encoding pipeline. This may include transformation, quantization and entropy encoding operations. It may also include residual ranking, weighting and filtering, and temporal processing. These pipelines are shown in FIGS. 1 and 3A and 3B. Residuals are then transmitted to a decoder, e.g. as level 1 and level 2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of the present residuals, including transformed residuals in the form of coefficients, differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described herein, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). This moves in a different direction from comparative video coding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected. In the present examples, a different transform is used (Hadamard) to encode the correction data and the residuals than comparative approaches. For example, the transforms presented herein may be much more efficient than transforming larger blocks of data using a Discrete Cosine Transform (DCT), which is the transform used in SVC/SHVC.

Certain examples described herein also consider the temporal characteristics of residuals, e.g. as well as spatial characteristics. For example, in residual images details like "edges" and "dots" that may be observed in residual "images" show little temporal correlation. This is because "edges" in residual images often don't translate or rotate like edges as perceived in a normal video stream. For example, within residual images, "edges" may actually change shape over time, e.g. a head turning may be captured within multiple residual image "edges" but may not move in a standard manner (as the "edge" reflects complex differences that depend on factors such as lighting, scale factors, encoding factors etc.). These temporal aspects of residual images, e.g. residual "video" comprising sequential residual "frames" or "pictures" typically differ from the temporal aspects of conventional images, e.g. normal video frames (e.g. in the Y, U or V planes). Hence, it is not obvious how to apply conventional encoding approaches to residual images; indeed, it has been found that motion compensation approaches from comparative video encoding schemes and standards cannot encode residual data (e.g. in a useful manner).

An AVC layer within SVC may involve calculating data that are referred to in that comparative standard as "residuals". However, these comparative "residuals" are the difference between a pixel block of the data stream of that layer and a corresponding pixel block determined using either inter-frame prediction or intra-frame prediction. These comparative "residuals" are, however, very different from residuals encoded in the present examples. In SVC, the "residuals" are the difference between a pixel block of a frame and a predicted pixel block for the frame (predicted using either inter-frame prediction or intra-frame prediction). In contrast, the present examples involve calculating residuals as a difference between a coding block and a reconstructed coding block (e.g. which has undergone down-sampling and subsequent up-sampling, and has been corrected for encoding/decoding errors).

Furthermore, many comparative video encoding approaches attempt to provide temporal prediction and motion-compensation as default to conventional video data. These "built-in" approaches may not only fail when applied to sequential residual images, they may take up unnecessary processing resources (e.g. these resources may be used while actually corrupting the video encoding). It may also generate unnecessary bits that take up an assigned bit rate. It is not obvious from conventional approaches how to address these problems.

Certain examples described herein, e.g. as described in the "Temporal Aspects" section and elsewhere, provide an efficient way of predicting temporal features within residual images. Certain examples use zero-motion vector prediction to efficiently predict temporal aspects and movement within residuals. These may be seen to predict movement for relatively static features (e.g. apply the second temporal mode—inter prediction—to residual features that persist over time) and then use the first temporal mode (e.g. intra prediction) for everything else. Hence, certain examples described herein do not attempt to waste scare resources and bit rate predicting transient uncorrelated temporal features in residual "video".

Certain examples described herein allow for legacy, existing and future codecs to be enhanced. The examples may thus leverage the capabilities of these codes as part of a base layer and provide improvements in the form of an enhancement layer.

Certain examples described herein are low complexity. They enable a base codec to be enhanced with low computational complexity and/or in a manner that enables widespread parallelisation. If down-sampling is used prior to the base codec (e.g. an application of spatial scalability), then a video signal at the original input resolution may be provided with a reduced computational complexity as compared to using the base codec at the original input resolution. This allows wide adoption of ultra-high-resolution video. For example, by a combination of processing an input video at a lower resolution with a single-layer existing codec and using a simple and small set of highly specialised tools to add details to an up-sampled version of the processed video, many advantages may be realised.

Certain examples described herein implement a number of modular yet specialised video coding tools. The tools that make up the enhancement layer (including two levels of enhancement at two different points) are designed for a particular type of data: residual data. Residual data as described herein results from a comparison of an original data signal and a reconstructed data signal. The reconstructed data signal is generated in a manner that differs from comparative video coding schemes. For example, the reconstructed data signal relates to a particular small spatial portion of an input video frame—a coding unit. A set of coding units for a frame may be processed in parallel as the residual data is not generated using other coding units for the frame or other coding units for other frames, as opposed to inter- and intra-prediction in comparative video coding technologies. Although temporal processing may be applied, this is applied at the coding unit level, using previous data for a current coding unit. There is no interdependency between coding units.

Certain specialised video coding tools described herein are specifically adapted for sparse residual data processing. Due to the differing method of generation, residual data as used herein has different properties to that of comparative video coding technologies. As shown in the Figures, certain examples described herein provide an enhancement layer that processes one or two layers of residual data. The residual data is produced by taking differences between a reference video frame (e.g., a source video) and a base-decoded version of the video (e.g. with or without up-sampling depending on the layer). The resulting residual data is sparse information, typically edges, dots and details which are then processed using small transforms which are designed to deal with sparse information. These small transforms may be scale invariant, e.g. have integer values within the range of $\{-1,1\}$.

Certain examples described herein allow efficient use of existing codecs. For example, a base encoder is typically applied at a lower resolution (e.g. than an original input signal). A base decoder is then used to decode the output of the base encoder at the lower resolution and the resultant decoded signal is used to generate the decoded data. Because of this, the base codec operates on a smaller number of pixels, thus allowing the codec to operate at a higher level of quality (e.g. a smaller quantization step size) and use its own internal coding tools in a more efficient manner. It may also consume less power.

Certain examples described herein provide a resilient and adaptive coding process. For example, the configuration of the enhancement layer allows the overall coding process to be resilient to the typical coding artefacts introduced by traditional Discrete Cosine Transform (DCT) block-based codecs that may be used in the base layer. The first enhancement layer (level 1 residuals) enables the correction of artefacts introduced by the base codec, whereas the second enhancement layer (level 2 residuals) enables the addition of details and sharpness to a corrected up-sampled version of the signal. The level of correction may be adjusted by controlling a bit-rate up to a version that provides maximum fidelity and lossless encoding. Typically, the worse the base reconstruction, the more the first enhancement layer may contribute to a correction (e.g. in the form of encoded residual data output by that layer). Conversely, the better the base reconstruction, the more bit-rate can be allocated to the second enhancement layer (level 2 residuals) to sharpen the video and add fine details.

Certain examples described herein provide for agnostic base layer enhancement. For example, the examples may be used to enhance any base codec, from existing codecs such as MPEG-2, VP8, AVC, HEVC, VP9, AV1, etc. to future codecs including those under development such as EVC and VVC. This is possible because the enhancement layer operates on a decoded version of the base codec, and therefore it can be used on any format as it does not require any information on how the base layer has been encoded and/or decoded.

As described below, certain examples described herein allow for parallelization of enhancement layer encoding. For example, the enhancement layer does not implement any form of inter (i.e. between) block prediction. The image is processed applying small (2×2 or 4×4) independent transform kernels over the layers of residual data. Since no prediction is made between blocks, each 2×2 or 4×4 block can be processed independently and in a parallel manner. Moreover, each layer is processed separately, thus allowing decoding of the blocks and decoding of the layers to be done in a massively parallel manner.

With the presently described examples, errors introduced by the encoding/decoding process and the down-sampling/up-sampling process may be corrected for separately, to regenerate the original video on the decoder side. The encoded residuals and the encoded correction data are thus smaller in size than the input video itself and can therefore be sent to the decoder more efficiently than the input video (and hence more efficiently than a comparative UHD stream of the SVC and SHVC approaches).

In further comparison with SVC and SHVC, certain described examples involve sending encoded residuals and correction data to a decoder, without sending an encoded UHD stream itself. In contrast, in SVC and SHVC, both the HD and UHD images are encoded as separate video streams and sent to the decoder. The presently described examples may allow for a significantly reduction in the overall bit rate for sending the encoded data to the decoder, e.g. so that $BW_{Tot} \approx 0.7\ BW_{UHD}$. In these cases, the total bandwidth for sending both an HD stream and a UHD stream may be less than the bandwidth required by comparative standards to send just the UHD stream.

The presently described examples further allow coding units or blocks to be processed in parallel rather than sequentially. This is because the presently described examples do not apply intra-prediction; there is very limited spatial correlation between the spatial coefficients of different blocks, whereas SVC/SHVC provides for intra-prediction. This is more efficient than the comparative approaches of SVC/SHVC, which involve processing blocks sequentially (e.g. as the UHD stream relies on the predictions from various pixels of the HD stream).

The enhancement coding described in examples herein may be considered an enhancement codec that encodes and decodes streams of residual data. This differs from comparative SVC and SHVC implementations where encoders receive video data as input at each spatial resolution level and decoders output video data at each spatial resolution level. As such, the comparative SVC and SHVC may be seen as the parallel implementation of a set of codecs, where each codec has a video-in/video-out coding structure. The enhancement codecs described herein on the other hand receive residual data and also output residual data at each spatial resolution level. For example, in SVC and SHVC the outputs of each spatial resolution level are not summed to generate an output video—this would not make sense.

It should be noted that in examples references to levels 1 and 2 are to be taken as an arbitrary labelling of enhancement sub-layers. These may alternatively be referred to be different names (e.g. with a reversed numbering system with levels 1 and 2 being respectively labelled as level 1 and level 0, with the "level 0" base layer below being level 2).

Definitions and Terms

In certain examples described herein the following terms are used.

"access unit"—this refers to a set of Network Abstraction Layer (NAL) units that are associated with each other according to a specified classification rule. They may be consecutive in decoding order and contain a coded picture (i.e. frame) of video (in certain cases exactly one).

"base layer"—this is a layer pertaining to a coded base picture, where the "base" refers to a codec that receives processed input video data. It may pertain to a portion of a bitstream that relates to the base.

"bitstream"—this is sequence of bits, which may be supplied in the form of a NAL unit stream or a byte stream. It may form a representation of coded pictures and associated data forming one or more coded video sequences (CVSs).

"block"—an M×N (M-column by N-row) array of samples, or an M×N array of transform coefficients. The term "coding unit" or "coding block" is also used to refer to an M×N array of samples. These terms may be used to refer to sets of picture elements (e.g. values for pixels of a particular colour channel), sets of residual elements, sets of values that represent processed residual elements and/or sets of encoded values. The term "coding unit" is sometimes used to refer to a coding block of luma samples or a coding block of chroma samples of a picture that has three sample arrays, or a coding block of samples of a monochrome picture or a picture that is coded using three separate colour planes and syntax structures used to code the samples.

"byte"—a sequence of 8 bits, within which, when written or read as a sequence of bit values, the left-most and right-most bits represent the most and least significant bits, respectively.

"byte-aligned"—a position in a bitstream is byte-aligned when the position is an integer multiple of 8 bits from the position of the first bit in the bitstream, and a bit or byte or syntax element is said to be byte-aligned when the position at which it appears in a bitstream is byte-aligned.

"byte stream"—this may be used to refer to an encapsulation of a NAL unit stream containing start code prefixes and NAL units.

"chroma"—this is used as an adjective to specify that a sample array or single sample is representing a colour signal. This may be one of the two colour difference signals related to the primary colours, e.g. as represented by the symbols Cb and Cr. It may also be used to refer to channels within a set of colour channels that provide information on the colouring of a picture. The term chroma is used rather than the term chrominance in order to avoid the implication of the use of linear light transfer characteristics that is often associated with the term chrominance.

"chunk"—this is used to refer to an entropy encoded portion of data containing a quantized transform coefficient belonging to a coefficient group.

"coded picture"—this is used to refer to a set of coding units that represent a coded representation of a picture.

"coded base picture"—this may refer to a coded representation of a picture encoded using a base encoding process that is separate (and often differs from) an enhancement encoding process.

"coded representation"—a data element as represented in its coded form

"coefficient group (CG)"—is used to refer to a syntactical structure containing encoded data related to a specific set of transform coefficients (i.e. a set of transformed residual values).

"component" or "colour component"—this is used to refer to an array or single sample from one of a set of colour component arrays. The colour components may comprise one luma and two chroma components and/or red, green, blue (RGB) components. The colour components may not have a one-to-one sampling frequency, e.g. the components may compose a picture in 4:2:0, 4:2:2, or 4:4:4 colour format. Certain examples described herein may also refer to just a single monochrome (e.g. luma or grayscale) picture, where there is a single array or a single sample of the array that composes a picture in monochrome format.

"data block"—this is used to refer to a syntax structure containing bytes corresponding to a type of data.

"decoded base picture"—this is used to refer to a decoded picture derived by decoding a coded base picture.

"decoded picture"—a decoded picture may be derived by decoding a coded picture. A decoded picture may be either a decoded frame, or a decoded field. A decoded field may be either a decoded top field or a decoded bottom field.

"decoded picture buffer (DPB)"— this is used to refer to a buffer holding decoded pictures for reference or output reordering.

"decoder"—equipment or a device that embodies a decoding process.

"decoding order"—this may refer to an order in which syntax elements are processed by the decoding process.

"decoding process"—this is used to refer to a process that reads a bitstream and derives decoded pictures from it.

"emulation prevention byte"—this is used in certain examples to refer to a byte equal to 0x03 that may be present within a NAL unit. Emulation prevention bytes may be used to ensure that no sequence of consecutive byte-aligned bytes in the NAL unit contains a start code prefix.

"encoder"—equipment or a device that embodies a encoding process.

"encoding process"—this is used to refer to a process that produces a bitstream (i.e. an encoded bitstream).

"enhancement layer"—this is a layer pertaining to a coded enhancement data, where the enhancement data is used to enhance the "base layer" (sometimes referred to as the "base"). It may pertain to a portion of a bitstream that comprises planes of residual data. The singular term is used to refer to encoding and/or decoding processes that are distinguished from the "base" encoding and/or decoding processes.

"enhancement sub-layer"—in certain examples, the enhancement layer comprises multiple sub-layers. For example, the first and second levels described below are "enhancement sub-layers" that are seen as layers of the enhancement layer.

"field"—this term is used in certain examples to refer to an assembly of alternate rows of a frame. A frame is composed of two fields, a top field and a bottom field. The term field may be used in the context of interlaced video frames.

"video frame"—in certain examples a video frame may comprise a frame composed of an array of luma samples in monochrome format or an array of luma samples and two corresponding arrays of chroma samples. The luma and chroma samples may be supplied in 4:2:0, 4:2:2, and 4:4:4 colour formats (amongst others). A frame may consist of two fields, a top field and a bottom field (e.g. these terms may be used in the context of interlaced video).

"group of pictures (GOP)"—this term is used to refer to a collection of successive coded base pictures starting with an intra picture. The coded base pictures may provide the reference ordering for enhancement data for those pictures.

"instantaneous decoding refresh (IDR) picture"—this is used to refer to a picture for which an NAL unit contains a global configuration data block.

"inverse transform"—this is used to refer to part of the decoding process by which a set of transform coefficients are converted into residuals.

"layer"—this term is used in certain examples to refer to one of a set of syntactical structures in a non-branching hierarchical relationship, e.g. as used when referring to the "base" and "enhancement" layers, or the two (sub-) "layers" of the enhancement layer.

"luma"—this term is used as an adjective to specify a sample array or single sample that represents a lightness or monochrome signal, e.g. as related to the primary colours. Luma samples may be represented by the symbol or subscript Y or L. The term "luma" is used rather than the term luminance in order to avoid the implication of the use of linear light transfer characteristics that is often associated with the term luminance. The symbol L is sometimes used instead of the symbol Y to avoid confusion with the symbol y as used for vertical location.

"network abstraction layer (NAL) unit (NALU)"—this is a syntax structure containing an indication of the type of data to follow and bytes containing that data in the form of a raw byte sequence payload (RBSP—see definition below).

"network abstraction layer (NAL) unit stream"—a sequence of NAL units.

"output order"—this is used in certain examples to refer to an order in which the decoded pictures are output from the decoded picture buffer (for the decoded pictures that are to be output from the decoded picture buffer).

"partitioning"—this term is used in certain examples to refer to the division of a set into subsets. It may be used to refer to cases where each element of the set is in exactly one of the subsets.

"plane"—this term is used to refer to a collection of data related to a colour component. For example, a plane may comprise a Y (luma) or Cx (chroma) plane. In certain cases, a monochrome video may have only one colour component and so a picture or frame may comprise one or more planes.

"picture"—this is used as a collective term for a field or a frame. In certain cases, the terms frame and picture are used interchangeably.

"random access"—this is used in certain examples to refer to an act of starting the decoding process for a bitstream at a point other than the beginning of the stream.

"raw byte sequence payload (RBSP)"—the RBSP is a syntax structure containing an integer number of bytes that is encapsulated in a NAL unit. An RBSP is either empty or has the form of a string of data bits containing syntax elements followed by an RBSP stop bit and followed by zero or more subsequent bits equal to 0. The RBSP may be interspersed as necessary with emulation prevention bytes.

"raw byte sequence payload (RBSP) stop bit"—this is a bit that may be set to 1 and included within a raw byte sequence payload (RBSP) after a string of data bits. The location of the end of the string of data bits within an RBSP may be identified by searching from the end of the RBSP for the RBSP stop bit, which is the last non-zero bit in the RBSP.

"reserved"—this term may refer to values of syntax elements that are not used in the bitstreams described herein but are reserved for future use or extensions. The term "reserved zeros" may refer to reserved bit values that are set to zero in examples.

"residual"—this term is defined in further examples below. It generally refers to a difference between a reconstructed version of a sample or data element and a reference of that same sample or data element.

"residual plane"—this term is used to refer to a collection of residuals, e.g. that are organised in a plane structure that is analogous to a colour component plane. A residual plane may comprise a plurality of residuals (i.e. residual picture elements) that may be array elements with a value (e.g. an integer value).

"run length encoding"—this is a method for encoding a sequence of values in which consecutive occurrences of the same value are represented as a single value together with its number of occurrences.

"source"—this term is used in certain examples to describe the video material or some of its attributes before encoding.

"start code prefix"—this is used to refer to a unique sequence of three bytes equal to 0x000001 embedded in the byte stream as a prefix to each NAL unit. The location of a start code prefix may be used by a decoder to identify the beginning of a new NAL unit and the end of a previous NAL unit. Emulation of start code prefixes may be prevented within NAL units by the inclusion of emulation prevention bytes.

"string of data bits (SODB)"—this term refers to a sequence of some number of bits representing syntax elements present within a raw byte sequence payload prior to the raw byte sequence payload stop bit. Within an SODB, the left-most bit is considered to be the first and most significant bit, and the right-most bit is considered to be the last and least significant bit.

"syntax element"—this term may be used to refer to an element of data represented in the bitstream.

"syntax structure"—this term may be used to refer to zero or more syntax elements present together in the bitstream in a specified order.

"tile"—this term is used in certain examples to refer to a rectangular region of blocks or coding units within a particular picture, e.g. it may refer to an area of a frame that contains a plurality of coding units where the size of the coding unit is set based on an applied transform.

"transform coefficient" (or just "coefficient")— this term is used to refer to a value that is produced when a transformation is applied to a residual or data derived from a residual (e.g. a processed residual). It may be a scalar quantity, that is considered to be in a transformed domain. In one case, an M by N coding unit may be flattened into an M*N one-dimensional array. In this case, a transformation may comprise a multiplication of the one-dimensional array with an M by N transformation matrix. In this case, an output may comprise another (flattened) M*N one-dimensional array. In this output, each element may relate to a different "coefficient", e.g. for a 2×2 coding unit there may be 4 different types of coefficient. As such, the term "coefficient" may also be associated with a particular index in an inverse transform part of the decoding process, e.g. a particular index in the aforementioned one-dimensional array that represented transformed residuals.

"video coding layer (VCL) NAL unit"—this is a collective term for NAL units that have reserved values of NalUnitType and that are classified as VCL NAL units in certain examples.

As well as the terms above, the following abbreviations are sometimes used:

CG—Coefficient Group; CPB—Coded Picture Buffer; CPBB—Coded Picture Buffer of the Base; CPBL—Coded Picture Buffer of the Enhancement; CU—Coding Unit; CVS—Coded Video Sequence; DPB—Decoded Picture Buffer; DPBB—Decoded Picture Buffer of the Base; DUT—Decoder Under Test; HBD—Hypothetical Base Decoder; HD—Hypothetical Demuxer; HRD—Hypothetical Reference Decoder; HSS—Hypothetical Stream Scheduler; I—Intra; IDR—Instantaneous Decoding Refresh; LSB—Least Significant Bit; MSB—Most Significant Bit; NAL—Network Abstraction Layer; P—Predictive; RBSP—Raw Byte Sequence Payload; RGB—red, green blue (may also be used as GBR—green, blue, red—i.e. reordered RGB; RLE—Run length encoding; SEI—Supplemental Enhancement Information; SODB—String of data bits; SPS—Sequence Parameter Set; and VCL—Video Coding Layer.

EXAMPLE ENCODERS AND DECODERS

First Example Encoder—General Architecture

FIG. 1 shows a first example encoder 100. The illustrated components may also be implemented as steps of a corresponding encoding process.

In the encoder 100, an input full resolution video 102 is received and is processed to generate various encoded streams. At a down-sampling component 104, the input video 102 is down-sampled. An output of the down-sampling component 104 is received by a base codec that comprises a base encoder 102 and a base decoder 104. A first encoded stream (encoded base stream) 116 is produced by feeding the base codec (e.g., AVC, HEVC, or any other codec) with a down-sampled version of the input video 102. At a first subtraction component 120, a first set of residuals is obtained by taking the difference between a reconstructed base codec video as output by the base decoder 104 and the down-sampled version of the input video (i.e. as output by the down-sampling component 104). A level 1 encoding component 122 is applied to the first set of residuals that are output by the first subtraction component 120 to produce a second encoded stream (encoded level 1 stream) 126.

In the example of FIG. 1, the level 1 encoding component 122 operates with an optional level 1 temporal buffer 124. This may be used to apply temporal processing as described later below. Following a first level of encoding by the level 1 encoding component 122, the first encoded stream 126 may be decoded by a level 1 decoding component 128. A deblocking filter 130 may be applied to the output of the level 1 decoding component 128. In FIG. 1, an output of the deblocking filter 130 is added to the output of the base decoder 114 (i.e. is added to the reconstructed base codec video) by a summation component 132 to generate a corrected version of the reconstructed base coded video. The output of the summation component 132 is then up-sampled by an up-sampling component 134 to produce an up-sampled version of a corrected version of the reconstructed base coded video.

At a second subtraction component 136, a difference between the up-sampled version of a corrected version of the reconstructed base coded video (i.e. the output of the up-sampling component 134) and the input video 102 is taken. This produces a second set of residuals. The second set of residuals as output by the second subtraction component 136 is passed to a level 2 encoding component 142. The level 2 encoding component 142 produces a third encoded stream (encoded level 2 stream) 146 by encoding the second set of residuals. The level 2 encoding component 142 may operate together with a level 2 temporal buffer 144 to apply temporal processing. One or more of the level 1 encoding component 122 and the level 2 encoding component 142 may apply residual selection as described below. This is shown as being controlled by a residual mode selection component 150. The residual mode selection component 150 may receive the input video 102 and apply residual mode selection based on an analysis of the input video 102. Similarly, the level 1 temporal buffer 124 and the level 2 temporal buffer 144 may operate under the control of a temporal selection component 152. The temporal selection component 152 may receive one or more of the input video 102 and the output of the down-sampling component 104 to select a temporal mode. This is explained in more detail in later examples.

First Example Decoder—General Architecture

Figure 2:
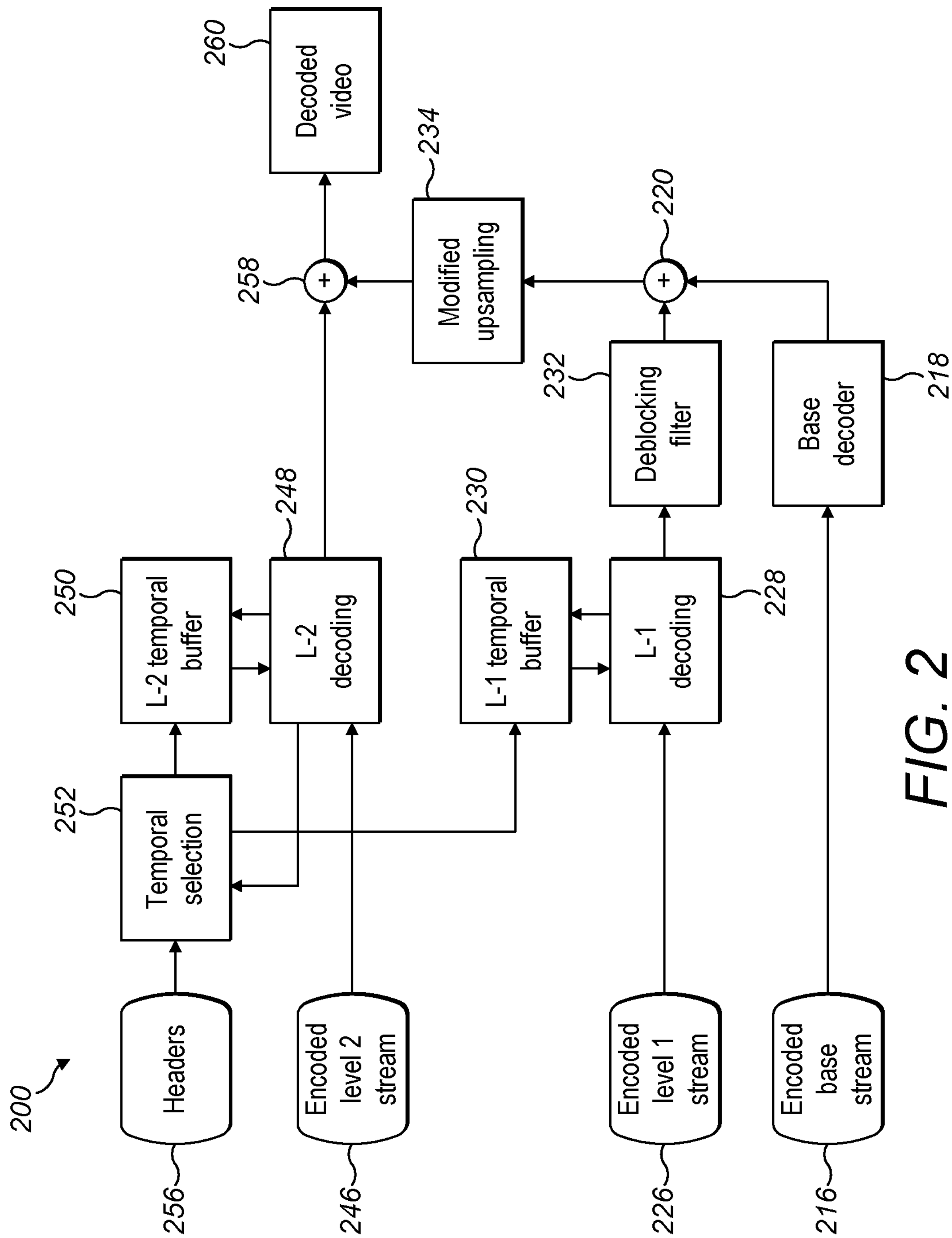
FIG. 2 is a schematic illustration of a decoder according to a first example.

FIG. 2 shows a first example decoder 200. The illustrated components may also be implemented as steps of a corresponding decoding process. The decoder 200 receives three encoded streams: encoded base stream 216, encoded level 1 stream 226 and encoded level 2 stream 246. These three encoded streams correspond to the three streams generated by the encoder 100 of FIG. 1. In the example of FIG. 2, the three encoded streams are received together with headers 256 containing further decoding information.

The encoded base stream 216 is decoded by a base decoder 218 corresponding to the base codec used in the encoder 100 (e.g. corresponding to base decoder 114 in FIG. 1). At a first summation component 220, the output of the base decoder 218 is combined with a decoded first set of residuals that are obtained from the encoded level 1 stream 226. In particular, a level 1 decoding component 228 receives the encoded level 1 stream 226 and decodes the stream to produce the decoded first set of residuals. The level 1 decoding component 228 may use a level 1 temporal buffer 230 to decode the encoded level 1 stream 226. In the example of FIG. 2, the output of the level 1 decoding component 228 is passed to a deblocking filter 232. The level 1 decoding component 228 may be similar to the level 1 decoding component 128 used by the encoder 100 in FIG. 1. The deblocking filter 232 may also be similar to the deblocking filter 130 used by the encoder 100. In FIG. 2, the output of the deblocking filter 232 forms the decoded first set of residuals that are combined with the output of the base decoder 218 by the first summation component 220. The output of the first summation component 220 may be seen as a corrected level 1 reconstruction, where the decoded first set of residuals correct an output of the base decoder 218 at a first resolution.

At an up-sampling component 234, the combined video is up-sampled. The up-sampling component 234 may implement a form of modified up-sampling as described with respect to later examples. The output of the up-sampling component 234 is further combined with a decoded second set of residuals that are obtained from the encoded level 2 stream 246. In particular, a level 2 decoding component 248 receives the encoded level 2 stream 246 and decodes the stream to produce the decoded second set of residuals. The decoded second set of residuals, as output by the level 2 decoding component 248 are combined with the output of the up-sampling component 234 by summation component 258 to produce a decoded video 260. The decoded video 260 comprises a decoded representation of the input video 102 in FIG. 1. The level 2 decoding component 248 may also use a level 2 temporal buffer 250 to apply temporal processing. One or more of the level 1 temporal buffer 230 and the level 2 temporal buffer 250 may operate under the control of a temporal selection component 252. The temporal selection component 252 is shown receiving data from headers 256. This data may comprise data to implement temporal processing at one or more of the level 1 temporal buffer 230 and the level 2 temporal buffer 250. The data may indicate a temporal mode that is applied by the temporal selection component 252 as described with reference to later examples.

Second Example Encoder—Encoding Sub-Processing and Temporal Prediction

FIGS. 3A and 3B show different variations of a second example encoder 300, 360. The second example encoder 300, 360 may comprise an implementation of the first example encoder 100 of FIG. 1. In the examples of FIGS. 3A and 3B, the encoding steps of the stream are expanded in more detail to provide an example of how the steps may be performed. FIG. 3A illustrates a first variation with temporal prediction provided only in the second level of the enhancement process, i.e. with respect to the level 2 encoding. FIG. 3B illustrates a second variation with temporal prediction performed in processes of both levels of enhancement (i.e. levels 1 and 2).

In FIG. 3A, an encoded base stream 316 is substantially created by a process as explained with respect to FIG. 1 above. That is, an input video 302 is down-sampled (i.e. a down-sampling operation is applied by a down-sampling component 304 to the input video 102 to generate a down-sampled input video. The down-sampled video is then encoded using a base codec, in particular by a base encoder 312 of the base codec. An encoding operation applied by the base encoder 312 to the down-sampled input video generates an encoded base stream 316. The base codec may also be referred to as a first codec, as it may differ from a second codec that is used to produce the enhancement streams (i.e. the encoded level 1 stream 326 and the encoded level 2 stream 346). Preferably the first or base codec is a codec suitable for hardware decoding. As per FIG. 1, an output of the base encoder 312 (i.e. the encoded base stream 316) is received by a base decoder 314 (e.g. that forms part of, or provides a decoding operation for, the base codec) that outputs a decoded version of the encoded base stream. The operations performed by the base encoder 312 and the base decoder 314 may be referred to as the base layer or base level. The base layer or level may be implemented separately from an enhancement or second layer or level, and the enhancement layer or level instructs and/or controls the base layer or level (e.g. the base encoder 312 and the base decoder 314).

As noted with respect to FIG. 1, the enhancement layer or level may comprise two levels that produce two corresponding streams. In this context, a first level of enhancement (described herein as "level 1") provides for a set of correction data which can be combined with a decoded version of the base stream to generate a corrected picture. This first enhancement stream is illustrated in FIGS. 1 and 3 as the encoded level 1 stream 326.

To generate the encoded level 1 stream, the encoded base stream is decoded, i.e. an output of the base decoder 314 provides a decoded base stream. As in FIG. 1, at a first subtraction component, a difference between the decoded base stream and the down-sampled input video (i.e. the output of the down-sampling component 304) is then created (i.e. a subtraction operation is applied to the down-sampled input video and the decoded base stream to generate a first set of residuals). Here the term "residuals" is used in the same manner as that known in the art, that is, the error between a reference frame and a desired frame. Here the reference frame is the decoded base stream and the desired frame is the down-sampled input video. Thus, the residuals used in the first enhancement level can be considered as a corrected video as they 'correct' the decoded base stream to the down-sampled input video that was used in the base encoding operation.

In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data. The signal may be an image or video. In these examples, the set of residuals corresponds to an image or frame of the video, with each residual being associated with a pixel of the signal, the pixel being the signal element.

It should be noted that the "residuals" described herein are, however, very different from "residuals" that are generated in comparative technologies such as SVC and SHVC. In SVC, the term "residuals" is used to refer to a difference between a pixel block of a frame and a predicted pixel block for the frame, where the predicted pixel block is predicted using either inter-frame prediction or intra-frame prediction. In contrast, the present examples involve calculating residuals as a difference between a coding unit and a reconstructed coding unit, e.g. a coding unit of elements that has undergone down-sampling and subsequent up-sampling, and has been corrected for encoding/decoding errors. In the described examples, the base codec (i.e. the base encoder 312 and the base decoder 314) may comprise a different codec from the enhancement codec, e.g. the base and enhancement streams are generated by different sets of processing steps. In one case, the base encoder 312 may comprise an AVC or HEVC encoder and thus internally generates residual data that is used to generate the encoded base stream 316. However, the processes that are used by the AVC or HEVC encoder differ from those that are used to generate the encoded level 1 and level 2 streams 326, 346.

Returning to FIGS. 3A and 3B, an output of the subtraction component 320, i.e. a difference that corresponds to a first set of residuals, is then encoded to generate the encoded level 1 stream 326 (i.e. an encoding operation is applied to the first set of residuals to generate a first enhancement stream). In the example implementations of FIGS. 3A and 3B, the encoding operation comprises several sub-operations, each of which is optional and preferred and provides particular benefits. In FIGS. 3A and 3B, a series of components are shown that implement these sub-operations and these may be considered to implement the level 1 and level 2 encoding 122 and 142 as shown in FIG. 1. In FIGS. 3A and 3B, the sub-operations, in general, include a residuals ranking mode step, a transform step, a quantization step and an entropy encoding step.

For the level 1 encoding, a level 1 residuals selection or ranking component 321 receives an output of the first subtraction component 320. The level 1 residuals selection or ranking component 321 is shown as being controlled by a residual mode ranking or selection component 350 (e.g. in a similar manner to the configuration of FIG. 1). In FIG. 3A, ranking is performed by the residual mode ranking component 350 and applied by the level 1 selection component 321, the latter selecting or filtering the first set of residuals based on a ranking performed by the residual mode ranking component 350 (e.g. based on an analysis of the input video 102 or other data). In FIG. 3B this arrangement is reversed, such that a general residual mode selection control is performed by a residual mode selection component 350 but ranking is performed at each enhancement level (e.g. as opposed to ranking based on the input video 102). In the example of FIG. 3B, the ranking may be performed by the level 1 residual mode ranking component 321 based on an analysis of the first set of residuals as output by the first subtraction component 320.

In general, the second example encoder 300, 360 identifies if the residuals ranking mode is selected. This may be performed by the residual mode ranking or selection component 350. If a residuals ranking mode is selected, then this may be indicated by the residual mode ranking or selection component 350 to the level 1 residuals selection or ranking component 321 to perform a residuals ranking step. The residuals ranking operation may be performed on the first step of residuals to generate a ranked set of residuals. The ranked set of residuals may be filtered so that not all residuals are encoded into the first enhancement stream 326 (or correction stream). Residual selection may comprise selecting a subset of received residuals to pass through for further encoding. Although the present examples describe a "ranking" operation, this may be seen as a general filtering operation that is performed on the first set of residuals (e.g. the output of the first subtraction component 320), i.e. the level 1 residuals selection or ranking component 321 is an implementation of a general filtering component that may modify the first set of residuals. Filtering may be seen as setting certain residual values to zero, i.e. such that an input residual value is filtered out and does not form part of the encoded level 1 stream 326.

In FIGS. 3A and 3B, an output of the level 1 residuals selection or ranking component 321 is then received by a level 1 transform component 322. The level 1 transform component 322 applies a transform to the first set of residuals, or the ranked or filtered first set of residuals, to generate a transformed set of residuals. The transform operation may be applied to the first set of residuals or the filtered first set of residuals depending on whether or not ranking mode is selected to generate a transformed set of residuals. A level 1 quantize component 323 is then applied to an output of the level 1 transform component 322 (i.e. the transformed set of residuals) to generate a set of quantized residuals. Entropy encoding is applied by a level 1 entropy encoding component 325 that applies an entropy encoding operation to the quantized set of residuals (or data derived from this set) to generate the first level of enhancement stream, i.e. the encoded level 1 stream 326. Hence, in the level 1 layer a first set of residuals are transformed, quantized and entropy encoded to produce the encoded level 1 stream 326. Further details of possible implementations of the transformation, quantization and entropy encoding are described with respect to later examples. Preferably, the entropy encoding operation may be a Huffman encoding operation or a run-length encoding operation or both. Optionally a control operation may be applied to the quantized set of residuals so as to correct for the effects of the ranking operation. This may be applied by the level 1 residual mode control component 324, which may operate under the control of the residual mode ranking or selection component 350.

As noted above, the enhancement stream may comprise a first level of enhancement and a second level of enhancement (i.e. levels 1 and 2). The first level of enhancement may be considered to be a corrected stream. The second level of enhancement may be considered to be a further level of enhancement that converts the corrected stream to the original input video. The further or second level of enhancement is created by encoding a further or second set of residuals which are the difference between an up-sampled version of a reconstructed level 1 video as output by the summation component 332 and the input video 302. Up-sampling is performed by an up-sampling component 334. The second set of residuals result from a subtraction applied by a second subtraction component 336, which takes the input video 302 and the output of the up-sampling component 334 as inputs.

In FIGS. 3A and 3B, the first set of residuals are encoded by a level 1 encoding process. This process, in the example of FIGS. 3A and 3B, comprises the level 1 transform component 322 and the level 1 quantize component 323. Before up-sampling, the encoded first set of residuals are decoded using an inverse quantize component 327 and an inverse transform component 328. These components act to simulate (level 1) decoding components that may be implemented at a decoder. As such, the quantized (or controlled) set of residuals that are derived from the application of the level 1 transform component 322 and the level 1 quantize component 323 are inversely quantized and inversely transformed before a de-blocking filter 330 is applied to generate a decoded first set of residuals (i.e. an inverse quantization operation is applied to the quantized first set of residuals to generate a de-quantized first set of residuals; an inverse transform operation is applied to the de-quantized first set of residuals to generate a de-transformed first set of residuals; and, a de-blocking filter operation is applied to the de-transformed first set of residuals to generate a decoded first set of residuals). The de-blocking filter 330 is optional depending on the transform applied and may comprise applying a weighted mask to each block of the de-transformed first set of residuals.

At the summation component 332, the decoded base stream as output by the base decoder 314 is combined with the decoded first set of residuals as received from the deblocking filter 330 (i.e. a summing operation is performed on the decoded base stream and the decoded first set of residuals to generate a re-created first stream). As illustrated in FIGS. 3A and B, that combination is then up-sampled by the up-sampling component 334 (i.e. an up-sampling operation is applied to the re-created first stream to generate an up-sampled re-created stream). The up-sampled stream is then compared to the input video at the second summation component 336, which creates the second set of residuals (i.e. a difference operation is applied to the up-sampled re-created stream to generate a further set of residuals). The second set of residuals are then encoded as the encoded level 2 enhancement stream 346 (i.e. an encoding operation is then applied to the further or second set of residuals to generate an encoded further or second enhancement stream).

As with the encoded level 1 stream, the encoding applied to the second set (level 2) residuals may comprise several operations. FIG. 3A shows a level 2 residuals selection component 340, a level 2 transform component 341, a level 2 quantize component 343 and a level 2 entropy encoding component 345. FIG. 3B shows a similar set of components but in this variation the level 2 residuals selection component 340 is implemented as a level 2 residuals ranking component 340, which is under control of the residual mode selection component 350. As discussed above, ranking and selection may be performed based on one or more of the input video 102 and the individual first and second sets of residuals. In FIG. 3A, a level 2 temporal buffer 345 is also provided, the contents of which are subtracted from the output of the level 2 transform component 341 by third subtraction component 342. In other examples, the third subtraction component 342 may be located in other positions, including after the level 2 quantize component 343. As such the level 2 encoding shown in FIGS. 3A and 3B has steps of ranking, temporal prediction, transform, quantization and entropy encoding. In particular, the second example encoder 200 may identify if a residuals ranking mode is selected. This may be performed by one or more of the residual ranking or selection component 350 and the individual level 2 selection and ranking components 340. If a residuals ranking or filtering mode is selected the residuals ranking step may be performed by one or more of the residual ranking or selection component 350 and the individual level 2 selection and ranking components 340 (i.e. a residuals ranking operation may be performed on the second set of residuals to generate a second ranked set of residuals). The second ranked set of residuals may be filtered so that not all residuals are encoded into the second enhancement stream (i.e. the encoded level 2 stream 346). The second set of residuals or the second ranked set of residuals are subsequently transformed by the level 2 transform component 341 (i.e. a transform operation is performed on the second ranked set of residuals to generate a second transformed set of residuals). As illustrated by the coupling between the output of the summation component 332 and the level 2 transform component 341, the transform operation may utilise a predicted coefficient or predicted average derived from the re-created first stream, prior to up-sampling. Other examples of this predicted average computation are described with reference to other examples; further information may be found elsewhere in this document. In level 2, the transformed residuals (either temporally predicted or otherwise) are then quantized and entropy encoded in the manner described elsewhere (i.e. a quantization operation is applied to the transformed set of residuals to generate a second set of quantized residuals; and, an entropy encoding operation is applied to the quantized second set of residuals to generate the second level of enhancement stream).

FIG. 3A shows a variation of the second example encoder 200 where temporal prediction is performed as part of the level 2 encoding process. Temporal prediction is performed using the temporal selection component 352 and the level 2 temporal buffer 345. The temporal selection component 352 may determine a temporal processing mode as described in more detail below and control the use of the level 2 temporal buffer 345 accordingly. For example, if no temporal processing is to be performed the temporal selection component 352 may indicate that the contents of the level 2 temporal buffer 345 are to be set to 0.

FIG. 3B shows a variation of the second example encoder 200 where temporal prediction is performed as part of both the level 1 and the level 2 encoding process. In FIG. 3B, a level 1 temporal buffer 361 is provided in addition to the level 2 temporal buffer 345. Although not shown, further variations where temporal processing is performed at level 1 but not level 2 are also possible.

When temporal prediction is selected, the second example encoder 200 may further modify the coefficients (i.e. the transformed residuals output by a transform component) by subtracting a corresponding set of coefficients derived from an appropriate temporal buffer. The corresponding set of coefficients may comprise a set of coefficients for a same spatial area (e.g. a same coding unit as located within a frame) that are derived from a previous frame (e.g. coefficients for the same area for a previous frame). The subtraction may be applied by a subtraction component such as the third subtractions components 346 and 362 (for respective levels 2 and 1). This temporal prediction step will be further described with respect to later examples. In summary, when temporal prediction is applied, the encoded coefficients correspond to a difference between the frame and an other frame of the stream. The other frame may be an earlier or later frame (or block in the frame) in the stream. Thus, instead of encoding the residuals between the up-sampled re-created stream and the input video, the encoding process may encode the difference between a transformed frame in the stream and the transformed residuals of the frame. Thus, the entropy may be reduced. Temporal prediction may be applied selectively for groups of coding units (referred to herein as "tiles") based on control information and the application of temporal prediction at a decoder may be applied by sending additional control information along with the encoded streams (e.g. within headers or as a further surface as described with reference to later examples).

As shown in FIGS. 3A and 3B, when temporal prediction is active, each transformed coefficient may be:

$$\Delta = F_{current} - F_{buffer}$$

where the temporal buffer may store data associated with a previous frame. Temporal prediction may be performed for one colour plane or for multiple colour planes. In general, the subtraction may be applied as an element wise subtraction for a "frame" of video where the elements of the frame represent transformed coefficients, where the transform is applied with respect to a particular n by n coding unit size (e.g. 2×2 or 4×4). The difference that results from the temporal prediction (e.g. the delta above may be stored in the buffer for use for a subsequent frame. Hence, in effect, the residual that results to the temporal prediction is a coefficient residual with respect to the buffer. Although FIGS. 3A and 3B show temporal prediction being performed after the transform operation, it may also be performed after the quantize operation. This may avoid the need to apply the level 2 inverse quantization component 372 and/or the level 1 inverse quantize component 364.

Thus, as illustrated in FIGS. 3A and 3B and described above, the output of the second example encoder 200 after performing an encoding process is an encoded base stream 316 and one or more enhancement streams which preferably comprise an encoded level 1 stream 326 for a first level of enhancement and an encoded level 2 stream 346 for a further or second level of enhancement.

Third Example Encoder and Second Example Decoder—Predicted Residuals

Figure 4:
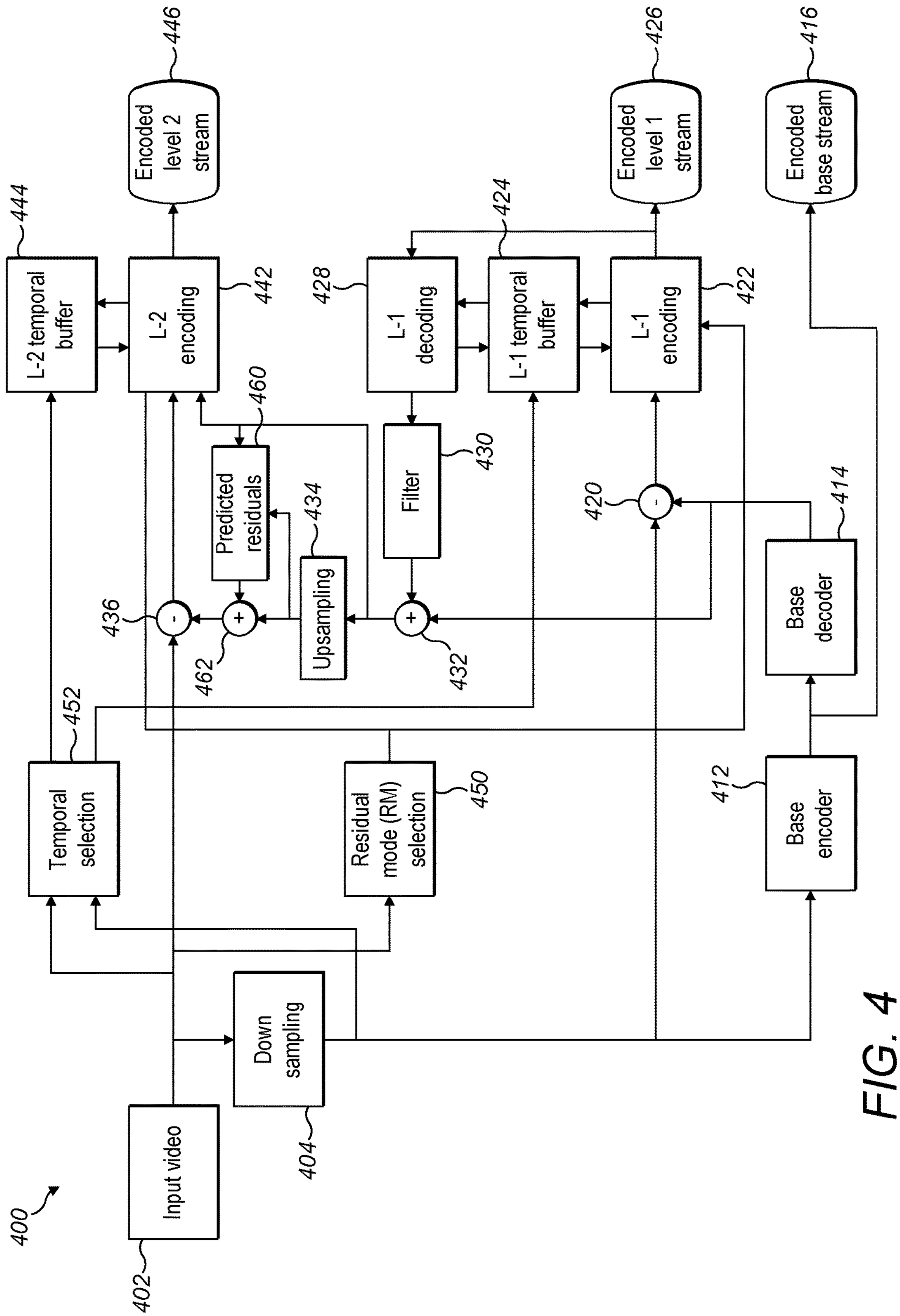
FIG. 4 is a schematic illustration of an encoder according to a third example.

FIG. 4 shows a third example encoder 400 that is a variation of the first example encoder 100 of FIG. 1. Corresponding reference numerals are used to refer to corresponding features from FIG. 1 (i.e. where feature lxx relates to feature 4*xx* in FIG. 4). The example of FIG. 4 shows in more detail how predicted residuals, e.g. a predicted average, may be applied as part of an up-sampling operation. Also, in FIG. 4, the deblocking filter 130 is replaced by a more general configurable filter 430.

In FIG. 4, a predicted residuals component 460 receives an input at a level 1 spatial resolution in the form of an output of a first summation component 432. This input comprises at least a portion of the reconstructed video at level 1 that is output by the first summation component 432. The predicted residuals component 460 also receives an input at a level 2 spatial resolution from the up-sampling component 434. The inputs may comprise a lower resolution element that is used to generate a plurality of higher resolution elements (e.g. a pixel that is then up-sampled to generate 4 pixels in a 2×2 block). The predicted residuals component 460 is configured to compute a modifier for the output of the up-sampling component 434 that is added to said output via a second summation component 462. The modifier may be computed to apply the predicted average processing that is described in detail in later examples. In particular, where an average delta is determined (e.g. a difference between a computed average coefficient and an average that is predicted from a lower level), the components of FIG. 4 may be used to restore the average component outside of the level 2 encoding process 442. The output of the second summation component 462 is then used as the up-sampled input to the second subtraction component 436.

Figure 5A:
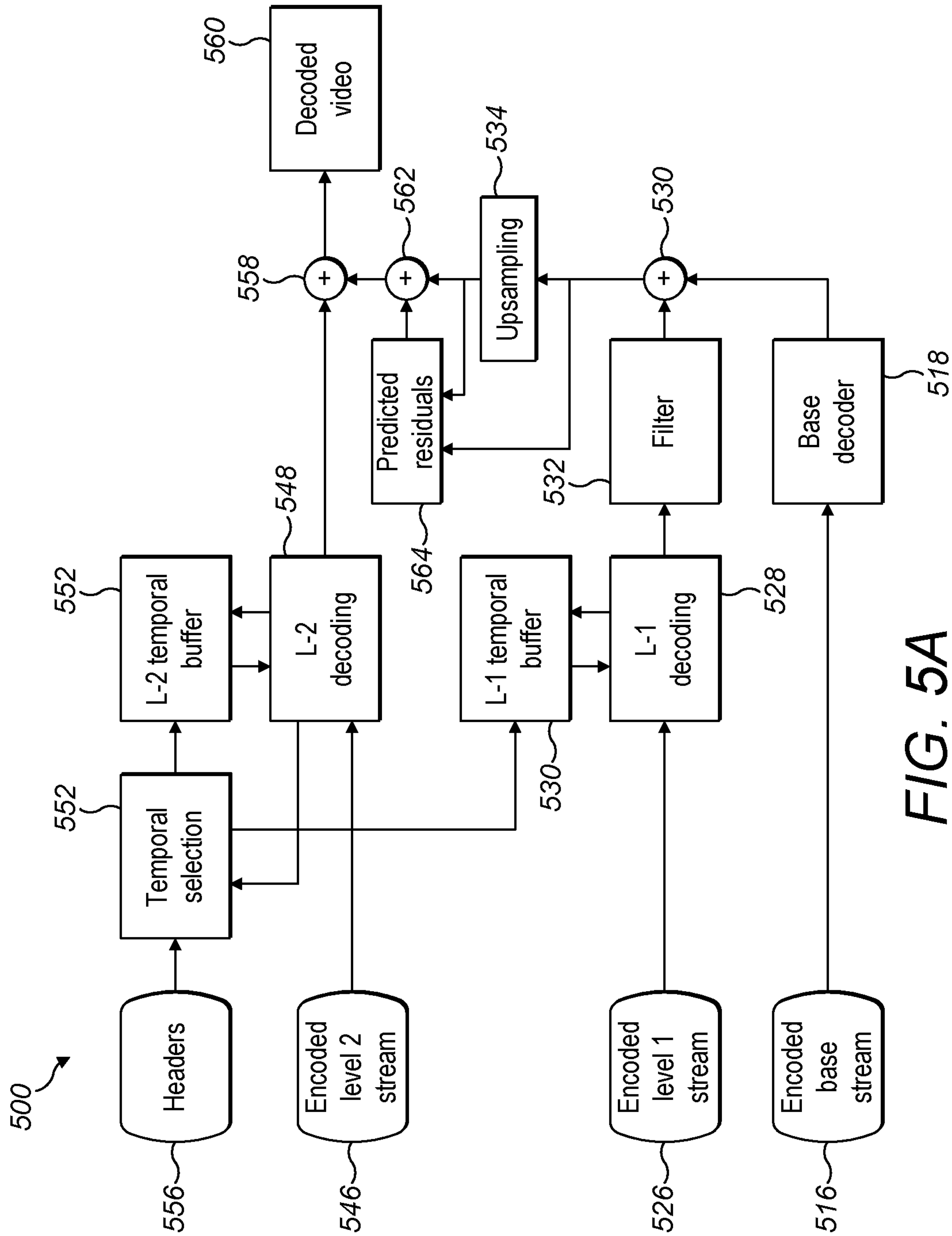
FIG. 5A is a schematic illustration of a decoder according to a second example.

FIG. 5A shows how a predicted residuals operation may be applied at a second example decoder 500. Like FIG. 4, the second example decoder 500 may be considered is a variation of the first example decoder 200 of FIG. 2. Corresponding reference numerals are used to refer to corresponding features from FIG. 2 (i.e. where feature 2*xx* relates to feature 5*xx* in FIG. 5). The example of FIG. 5A shows in more detail how predicted residuals, e.g. a predicted average, may be applied at the decoder as part of an up-sampling operation. Also, in FIG. 5A, the deblocking filter 232 is replaced by a more general configurable filter 532. It should be noted that the predicted residuals processing may be applied asymmetrically at the encoder and the decoder, e.g. the encoder need not be configured according to FIG. 4 to allow decoding as set out in FIG. 5A. For example, the encoder may applied a predicted average computation as described in U.S. Pat. No. 9,509,990, which is incorporated herein by reference.

The configuration of the second example decoder 500 is similar to the third example encoder 400 of FIG. 4. A predicted residuals component 564 receives a first input from a first summation component 530, which represents a level 1 frame, and a second input from the up-sampling component 534, which represents an up-sampled version of the level 1 frame. The inputs may be received as a lower level element and a set of corresponding higher level elements. The predicted residuals component 564 uses the inputs to compute a modifier that is added to the output of the up-sampling component 534 by the second summation component 562. The modifier may correct for use of a predicted average, e.g. as described in U.S. Pat. No. 9,509,990 or computed by the third example encoder 400. The modified up-sampled output is then received by a third summation component 558 that performs the level 2 correction or enhancement as per previous examples.

The use of one or more of the predicted residuals components 460 and 564 may implement the "modified up-sampling" of other examples, where the modifier computed by the components and applied by respective summation components performs the "modification". These examples may provide for faster computation of predicted averages as the modifier is added in reconstructed video space as opposed to requiring conversion to coefficient space that represents transformed residuals (e.g. the modifier is applied to pixels of reconstructed video rather than applied in the A, H, V and D coefficient space of the transformed residuals).

Third Example Decoder—Sub-Operations and Temporal Prediction

Figure 5B:
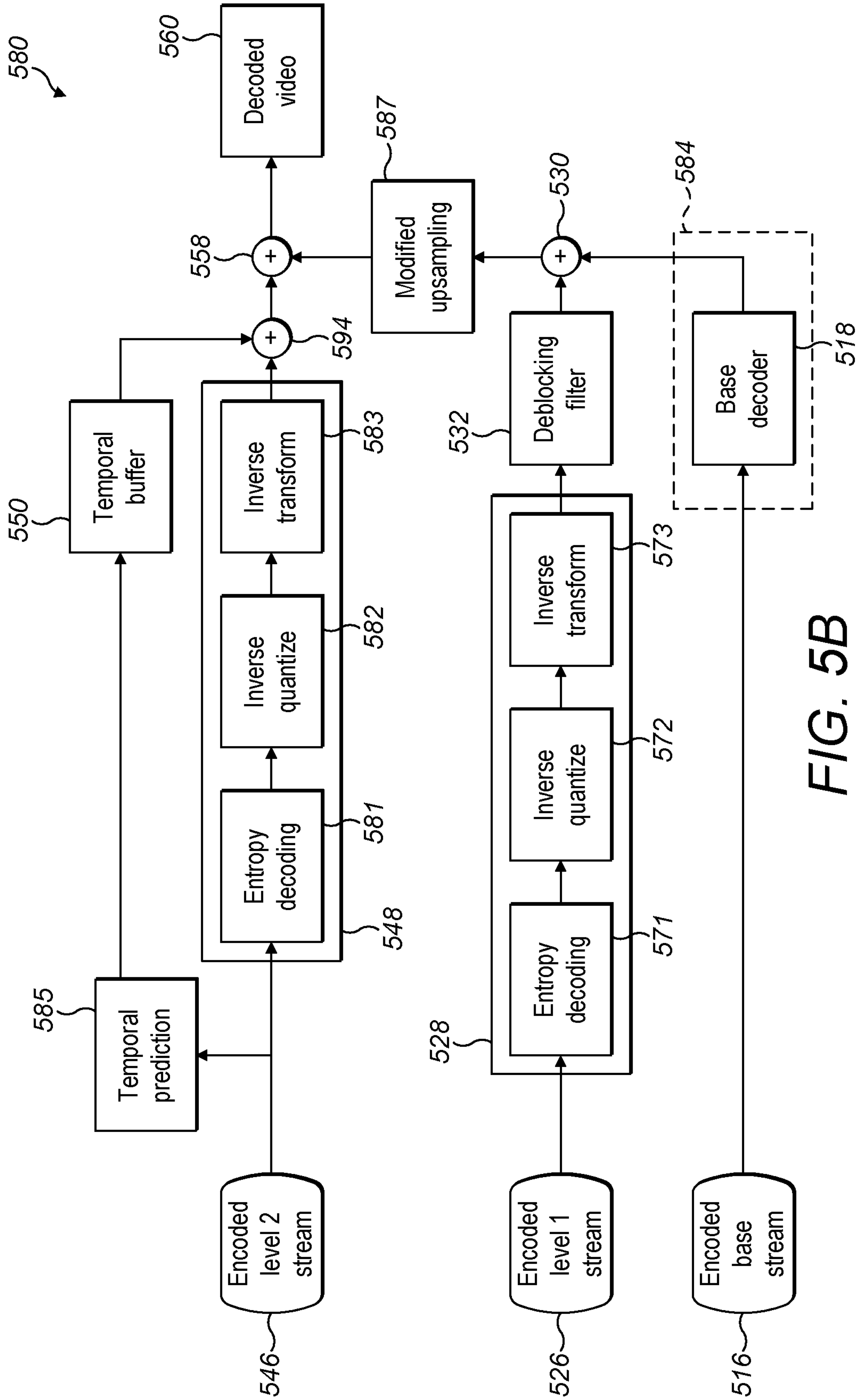
FIG. 5B is a schematic illustration of a first variation of a decoder according to a third example.
Figure 5C:
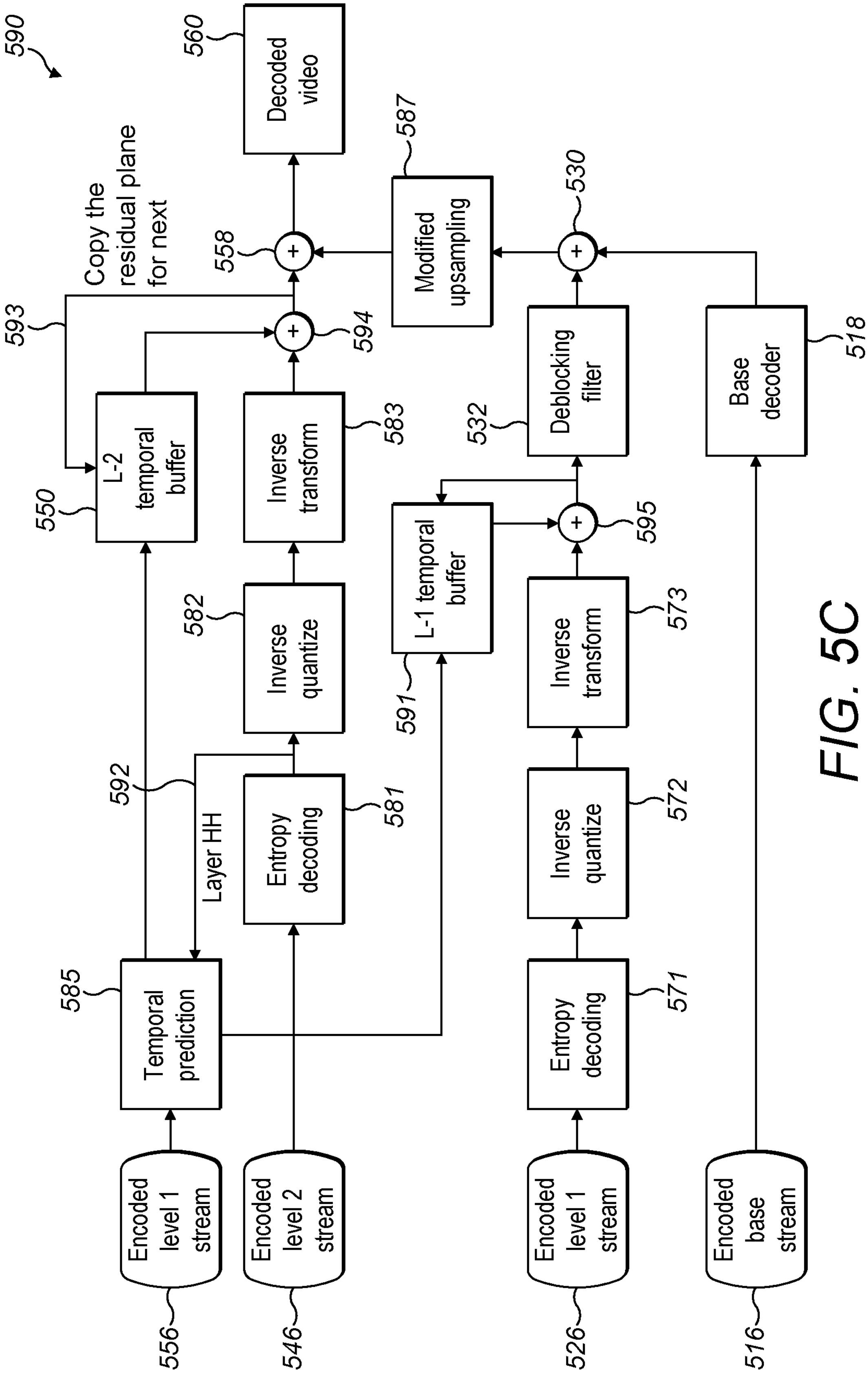
FIG. 5C is a schematic illustration of a second variation of the decoder according to the third example.

FIGS. 5B and 5C illustrate respective variations of a third example decoder 580, 590. The variations of the third example decoder 580, 590 may be respective implemented to correspond to the variations of the third example encoder 300, 360 shown in FIGS. 3A and 3B. The third example decoder 580, 590 may be seen as an implementation of one or more of the first and second example encoders 200, 400 from FIGS. 2 and 4. As before, similar reference numerals are used where possible to refer to features that correspond to features in earlier examples.

FIGS. 5B and 5C show implementation examples of the decoding process described briefly above and illustrated in FIG. 2. As is clearly identifiable, the decoding steps and components are expanded in more detail to provide an example of how decoding may be performed at each level. As with FIGS. 3A and 3B, FIG. 5B illustrates a variation where temporal prediction is used only for the second level (i.e. level 2) and FIG. 5C illustrates a variation where temporal prediction is used in both levels (i.e. levels 1 and 2). As before, further variations are envisaged (e.g. level 1 but not level 2), where the form of the configuration may be controlled using signalling information.

As shown in the examples of FIGS. 5A and 5C, in the decoding process, the decoder may parse headers 556 configure the decoder based on those headers. The headers may comprise one or more of global configuration data, picture (i.e. frame) configuration data, and assorted data blocks (e.g. relating to elements or groups of elements within a picture). In order to re-create the input video (e.g. the input video 102, 302 or 402 in previous examples), an example decoder such as the third example decoder may decode each of the encoded base stream 516, the first enhancement or encoded level 1 stream 526 and the second enhancement or encoded level 2 stream 546. The frames of the stream may be synchronised and then combined to derive the decoded video 560.

As shown in FIG. 5B, the level 1 decoding component 528 may comprise a level 1 entropy decoding component 571, a level 1 inverse quantize component 572, and a level 1 inverse transform component 573. These may comprise decoding versions of the respective level 1 encoding components 325, 323 and 322 in FIGS. 3A and 3B. The level 2 decoding component 548 may comprise a level 2 entropy decoding component 581, a level 2 inverse quantize component 582, and a level 2 inverse transform component 583. These may comprise decoding versions of the respective level 2 encoding components 344, 343 and 341 in FIGS. 3A and 3B. In each decoding process, the enhancement streams may undergo the steps of entropy decoding, inverse quantization and inverse transform using the aforementioned components or operations to re-create a set of residuals.

In particular, in FIG. 5B, an encoded base stream 516 is decoded by a base decoder 518 that is implemented as part of a base codec 584. It should be noted that the base and enhancement streams are typically encoded and decoded using different codecs, wherein the enhancement codec operates on residuals (i.e. may implement the level 1 and level 2 encoding and decoding components) and the base codec operates on video at a level 1 resolution. The video at the level 1 resolution may represent a lower resolution than the base codec normally operates at (e.g. a down-sampled signal in two dimensions may be a quarter of the size), which allows the base codec to operate at a high speed. This also marks a difference from SVC wherein each layer applies a common codec (AVC) and operates on video data rather than residual data. Even in SHVC, all spatial layers are configured to operate on a video in/video out manner where each video out represents a different playable video. In the present examples, the enhancement streams do not represent playable video in the conventional sense—the output of the level 1 and level 2 decoding components 528 and 548 (e.g. as received by the first summation component 530 and the second summation component 558) are "residual videos", i.e. consecutive frames of residuals for multiple colour planes rather than the colour planes themselves. This then allows a much greater bit rate saving as compared to SVC and SHVC, as the enhancement streams will often be 0 (as a quantized difference is often 0), where 0 values may be efficiently compressed using run-length coding. It is also to be noted that in the present examples, each coding unit of n by n elements (e.g. 2×2 or 4×4 blocks of pixels that may be flattened into one-dimensional arrays) does not depend on predictions that involve other coding units within the frame as per standard intra-processing in SVC and SHVC. As such, the encoding and decoding components in the enhancement streams may be applied in parallel to different coding units (e.g. different areas of a frame may be effectively processed in parallel), as unlike SVC and SHVC there is no need to wait for a decoded result of another coding unit to compute a subsequent coding unit. This means the enhancement codec may be implemented extremely efficiently on parallel processors such as common graphic processing units in computing devices (including mobile computing devices). This parallelism is not possible with the high complexity processing of SVC and SHVC.

Returning to FIG. 5B, as in previous examples an optional filter such as deblocking filter 532 may be applied to the output of the level 1 decoding component 528 to remove blocking or other artefacts and the output of the filter is received by the first summation component 530 where it is added to the output of the base codec (i.e. the decoded base stream). Note that the output of the base codec may resemble a low resolution video as decoded by a conventional codec but the level 1 decoding output is a (filtered) first set of residuals. This is different from SVC and SHVC where this form of summation makes no sense, as each layer outputs a full video at a respective spatial resolution.

As in FIG. 2, a modified up-sampling component 587 receives a corrected reconstruction of the video at level 1 that is output by the first summation component 530 and up-samples this to generate an up-sampled reconstruction. The modified up-sampling component 587 may apply the modified up-sampling illustrated in FIG. 4. In other examples, the up-sampling may not be modified, e.g. if a predicted average is not being used or is being applied in the manner described in U.S. Pat. No. 9,509,990.

In FIG. 5B, temporal prediction is applied during the level 2 decoding. In the example of FIG. 5B, the temporal prediction is controlled by temporal prediction component 585. In this variation, control information for the temporal prediction is extracted from the encoded level 2 stream 546, as indicated by the arrow from the stream to the temporal prediction component 585. In other implementations, such as those shown in FIGS. 5A and 5C, control information for the temporal prediction may be sent separately from the encoded level 2 stream 546, e.g. in the headers 556. The temporal prediction component 585 controls the use of level 2 temporal buffer 550, e.g. may determine a temporal mode and control temporal refresh as described with reference to later examples. The contents of the temporal buffer 550 may be updated based on data for a previous frame of residuals. When the temporal buffer 550 is applied, the contents of the buffer are added to the second set of residuals. In FIG. 5B, the contents of the temporal buffer 550 are added to the output of the level 2 decoding component 548 at a third summation component 594. In other examples, the contents of the temporal buffer may represent any set of intermediate decoding data and as such the third summation component 586 may be moved appropriated to apply the contents of the buffer at an appropriate stage (e.g. if the temporal buffer is applied at the dequantized coefficient stage, the third summation component 586 may be located before the inverse transform component 583). The temporal-corrected second set of residuals are then combined with the output of the up-sampling component 587 by the second summation component 558 to generate decoded video 560. The decoded video is at a level 2 spatial resolution, which may be higher than a level 1 spatial resolution. The second set of residuals apply a correction to the (viewable) up-sampled reconstructed video, where the correction adds back in fine detail and improves the sharpness of lines and features.

FIG. 5C shows a variation 590 of the third example decoder. In this case, temporal prediction control data is received by a temporal prediction component 585 from headers 556. The temporal prediction component 585 controls both the level 1 and level 2 temporal prediction, but in other examples separate control components may be provided for both levels if desired. FIG. 5C shows how the reconstructed second set of residuals that are input to the second summation component 558 may be fed back to be stored in the level 2 temporal buffer for a next frame (the feedback is omitted from FIG. 5B for clarity). A level 1 temporal buffer 591 is also shown that operates in a similar manner to the level 2 temporal buffer 550 described above and the feedback loop for the buffer is shown in this Figure. The contents of the level 1 temporal buffer 591 are added into the level 1 residual processing pipeline via a fourth summation component 595. Again, the position of this fourth summation component 595 may vary along the level 1 residual processing pipeline depending on where the temporal prediction is applied (e.g. if it is applied in transformed coefficient space, it may be located before the level 1 inverse transform component 573.

FIG. 5C shows two ways in which temporal control information may be signalled to the decoder. A first way is via headers 556 as described above. A second way, which may be used as an alternative or additional signalling pathway is via data encoded within the residuals themselves. FIG. 5C shows a case whereby data 592 may be encoded into an HH transformed coefficient and so may be extracted following entropy decoding by the entropy decoding component 581. This data may be extracted from the level 2 residual processing pipeline and passed to the temporal prediction component 585.

In general, the enhancement encoding and/or decoding components described herein are low complexity (e.g. as compared to schemes such as SVC and SHVC) and may be implemented in a flexible modular manner. Additional filtering and other components may be inserted into the processing pipelines as determined by required implementations. The level 1 and level 2 components may be implemented as copies or different versions of common operations, which further reduces complexity. The base codec may be operated as a separate modular black-box, and so different codecs may be used depending on the implementation.

The data processing pipelines described herein may be implemented as a series of nested loops over the dimensions of the data. Subtractions and additions may be performed at a plane level (e.g. for each of a set of colour planes for a frame) or using multi-dimensional arrays (e.g. X by Y by C arrays where C is a number of colour channels such as YUV or RGB). In certain cases, the components may be configured to operate on n by n coding units (e.g. 2×2 or 4×4), and as such may be applied on parallel on the coding units for a frame. For example, a colour plane of a frame of input video may be decomposed into a plurality of coding units that cover the area of the frame. This may create multiple small one- or two-dimension arrays (e.g. 2×2 or 4×1 arrays or 4×4 or 16×1 arrays), where the components are applied to these arrays. As such, reference to a set of residuals may include a reference to a set of small one- or two-dimension arrays where each array comprises integer element values of a configured bit depth.

Each enhancement stream or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Further Description of Processing Components

It was noted above how a set of processing components or tools may be applied to each of the enhancement streams (or the input video) throughout encoding and/or decoding. These processing components may be applied as modular components. They may be implemented in computer program code, i.e. as executed by one or more processors, and/or configured as dedicated hardware circuitry, e.g. as separate or combined Field Programmable Gate Arrays (FPGAs) or Application Specific Integrated Circuits (ASICs). The computer program code may comprise firmware for an embedded device or part of a codec that is used by an operating system to provide video rendering services. The following provides a brief summary each of the tools and their functionality within the overall process as illustrated in FIGS. 1 to 5C.

Down-sampling: The down-sampling process is applied by a down-sampling component in the examples (e.g. 104, 304 and 404). The down-sampling process is applied to the input video to produce a down-sampled video to be encoded by a base codec. The down-sampling can be done either in both vertical and horizontal directions, or alternatively only in the horizontal direction. A down-sampling component may further be described as a down-scaler.

Level-1 (L-1) encoding: The input to this component, which is shown as 122 in FIG. 1 comprises the first set of residuals obtained by taking the difference between the decoded output of the base codec and the down-sampled video. The first set of residuals are then transformed, quantized and encoded as further described below.

Transform: In certain examples, there are two types of transforms that could be used in by the transform components (e.g. transform components 122, 322, and/or 341). The transform may be a directional decomposition. The transform may act to decorrelate the residual values in a coding unit (e.g. a small n by n block of elements). A transform may be applied as a matrix transformation, e.g. a matrix multiplication applied to a flattened array representing the coding unit.

In one case, the two types of transformation may correspond to two different sizes of transformation kernel. The size of the coding unit may thus be set based on the size of the transformation kernel. A first transform has a 2×2 kernel which is applied to a 2×2 block of residuals. The resulting coefficients are as follows:

$$\begin{pmatrix} C_{00} \\ C_{01} \\ C_{10} \\ C_{11} \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} R_{00} \\ R_{01} \\ R_{10} \\ R_{11} \end{pmatrix}$$

A second transform has a 4×4 kernel which is applied to a 4×4 block of residuals. The resulting coefficients are as follows:

$$\begin{pmatrix} C_{00} \\ C_{01} \\ C_{02} \\ C_{03} \\ C_{10} \\ C_{11} \\ C_{12} \\ C_{13} \\ C_{20} \\ C_{21} \\ C_{22} \\ C_{23} \\ C_{30} \\ C_{31} \\ C_{32} \\ C_{33} \end{pmatrix} =$$

$$\begin{pmatrix}
1 & 1 & 1 & 1 & 1 & 1 & 1 & 1 & 1 & 1 & 1 & 1 & 1 & 1 & 1 & 1 \\
1 & 1 & -1 & -1 & 1 & 1 & -1 & -1 & 1 & 1 & -1 & -1 & 1 & 1 & -1 & -1 \\
1 & -1 & 1 & -1 & 1 & -1 & 1 & -1 & 1 & -1 & 1 & -1 & 1 & -1 & 1 & -1 \\
1 & -1 & -1 & 1 & 1 & -1 & -1 & 1 & 1 & -1 & -1 & 1 & 1 & -1 & -1 & 1 \\
1 & 1 & 1 & 1 & 1 & 1 & 1 & 1 & -1 & -1 & -1 & -1 & -1 & -1 & -1 & -1 \\
1 & 1 & -1 & -1 & 1 & 1 & -1 & -1 & -1 & -1 & 1 & 1 & -1 & -1 & 1 & 1 \\
1 & -1 & 1 & -1 & 1 & -1 & 1 & -1 & -1 & 1 & -1 & 1 & -1 & 1 & -1 & 1 \\
1 & -1 & -1 & 1 & 1 & -1 & -1 & 1 & -1 & 1 & 1 & -1 & -1 & 1 & 1 & -1 \\
1 & 1 & 1 & 1 & -1 & -1 & -1 & -1 & 1 & 1 & 1 & 1 & -1 & -1 & -1 & -1 \\
1 & 1 & -1 & -1 & -1 & -1 & 1 & 1 & 1 & 1 & -1 & -1 & -1 & -1 & 1 & 1 \\
1 & -1 & 1 & -1 & -1 & 1 & -1 & 1 & 1 & -1 & 1 & -1 & -1 & 1 & -1 & 1 \\
1 & -1 & -1 & 1 & -1 & 1 & 1 & -1 & 1 & -1 & -1 & 1 & -1 & 1 & 1 & -1 \\
1 & 1 & 1 & 1 & -1 & -1 & -1 & -1 & 1 & 1 & 1 & 1 & -1 & -1 & -1 & -1 \\
1 & 1 & -1 & -1 & -1 & -1 & 1 & 1 & -1 & -1 & 1 & 1 & 1 & 1 & -1 & -1 \\
1 & -1 & 1 & -1 & -1 & 1 & -1 & 1 & -1 & 1 & -1 & 1 & 1 & -1 & 1 & -1 \\
1 & -1 & -1 & 1 & -1 & 1 & 1 & -1 & -1 & 1 & 1 & -1 & 1 & -1 & -1 & 1
\end{pmatrix}$$

$$\begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix}$$

These transformation matrices may comprise integer values in the range

{−1, 1} or {−1, 0, 1}. This may simplify computations and allow for fast hardware implementations using addition and subtraction. The transformation matrices may comprise Hadamard matrices that have advantageous properties, such as orthogonal rows and being self-inverse (i.e. the inverse transformation is the same as the forward transformation). If a Hadamard matrix is used an inverse transformation may be referred to as a transformation as the same matrix may be used for both forward and inverse transformations.

In certain cases, the transformation may include the application of a predicted residuals computation (i.e. the use of a predicted average as described in more detail with reference to later examples).

Quantization: A set of transformed residuals (referred to herein as "coefficients") are quantized using a quantize component such as components 323 or 343). An inverse quantize component, such as components 327, 364, 372, 572 and 582 may reconstruct a version of a value pre-quantization by multiplying the quantized value by a defined quantization factor. The coefficients may be quantized using a linear quantizer. The linear quantizer may use a dead zone of variable size. The linear quantizer may use a dead zone of different size vs. the quantization step and a non-centred dequantization offset. These variations are described in more detail with reference to later examples.

Entropy coding: A set of quantized coefficients may be encoded using an entropy coder such as components 325 or 344. There are two schemes of entropy coding. In a first scheme, the quantized coefficients are encoded using a Run-Length-Encoder (RLE). In a second scheme, the quantized coefficients are first encoded using RLE, then the encoded output is processed using a Huffman Encoder.

Residual mode (RM) selection: If a residual (filtering) mode (RM) has been selected, the first set of residuals (i.e. level 1) may be further ranked and selected in order to determine which residuals should be transformed, quantized and encoded. Residual filtering may be performed by one or more of the components 321 or 340, e.g. under control of a control component such as 150 or 350. Filtering of residuals may be performed anywhere in the residual processing pipelines but preferably it is preformed prior to entropy encoding.

Temporal selection mode: If a temporal selection mode is selected, e.g. by a component such as 152 or 352, the encoder may modify the coefficients (i.e. the transformed residuals or data derived from these) by subtracting the corresponding coefficients derived from a temporal buffer, such as 345 or 361. This may implement temporal prediction as described below. The decoder may then modify the coefficients by adding the corresponding coefficients derived from a temporal buffer, such as one of components 230, 250, 530, 550 or 591.

Level-1 (L-1) decoding: This is shown as components 228 and 528. The input to this tool comprises the encoded level 1 stream 226 or 526 (i.e. L-1 encoded residuals), which are passed through an entropy decoder (such as 571), a de-quantizer (such as 572) and an inverse transform module (such as 573). The operations performed by these modules are the inverse operations performed by the modules described above. If the temporal selection mode has been selected, the residuals may be in part predicted from co-located residuals from a temporal buffer.

Deblocking and residual filters: In certain cases, if a 4×4 transform is used, the decoded residuals may be fed to a filter module or deblocking filter such as 130, 232, 330 or 535. The deblocking operates on each block of inversely transformed residuals by applying a mask whose weights can be specified. The general structure of the mask is as follows:

$$\begin{matrix} \alpha & \beta & \beta & \alpha \\ \beta & 1 & 1 & \beta \\ \beta & 1 & 1 & \beta \\ \alpha & \beta & \beta & \alpha \end{matrix}$$

-continued where 0≤α≤1 and 0≤β≤1. The weights may be specified within control signalling associated with the bitstream or may be retrieved from a local memory.

Up-sampling: The combination of the decoded (and filtered or deblocked, if applicable) first set of (L-1) residuals and base decoded video is up-sampled in order to generate an up-sampled reconstructed video. The up-sampling may be performed as described with respect to up-sampling components 134, 234, 334, 434, 534 or 587. Examples of possible up-sampling operations are described in more details below. The up-sampling method may be selectable and signalled in the bytestream. It should be noted that in examples herein, the term "bytestream" or an alternative term such as stream, bitstream or NALU stream may be used as appropriate.

Level-2 (L-2) encoding: This is represented as components 142, 442 and 548. The input to this encoding operation comprises the second set of (L-2) residuals obtained by taking the difference between the up-sampled reconstructed video and the input video. The second set of (L-2) residuals are then transformed, quantized and encoded as further described herein. The transform, quantization and encoding are performed in the same manner as described in relation to L-1 encoding. If a residual filtering mode has been selected, the second set of residuals are further ranked and selected in order to determine which residuals should be transformed and encoded.

Predicted coefficient (or predicted average) mode: If the predicted coefficient mode is selected, the encoder may modify the transformed coefficient C00, which is also referred to herein as A, i.e. an average value (which may be Ax for a 4×4 transform as described in more detail below). If the 2×2 transform is used, C00 may be modified by subtracting the value of the up-sampled residual which the transformed block of residuals is predicted from. If the 4×4 transform is used, C00 may be modified by subtracting the average value of the four up-sampled residuals which the transformed block of residuals is predicted from. The predicted coefficient mode may be implemented at the decoder using the modified up-sampling as described herein.

Level-2 (L-2) decoding: This is shown as components 248 and 548. The input to this decoding comprises the encoded second set of (L-2) residuals. The decoding process of the second set of residuals involves an entropy decoder (e.g. 581), a de-quantizer (e.g. 582) and an inverse transform module (e.g. 583). The operations performed by these components are the inverse operations performed by the encoding components as described above. If the temporal selection mode has been selected, the residuals may be in part predicted from co-located residuals from a temporal buffer.

Modified up-sampling: The modified up-sampling process comprises two steps, the second depending on a signalling received by the decoder. In a first step, the combination of the decoded (and deblocked, if applicable) first set of (L-1) residuals and base decoded video (L-1 reconstructed video) is up-sampled to generate an up-sampled reconstructed video. If the predicted coefficient mode has been selected, then a second step is implemented. In particular, the value of the element in the L-1 reconstructed value from which a 2×2 block in the up-sampled reconstructed video was derived is added to said 2×2 block in the up-sampled reconstructed video. In general, the modified up-sampling may be based on the up-sampled reconstructed video and on the pre-up-sampling reconstructed lower resolution video as described with reference to FIG. 4.

Dithering: In certain examples, a last stage of dithering may be selectively applied to the decoded video 260 or 560 in FIGS. 2 and 5A to 5C. Dithering may comprise the application of small levels of noise to the decoded video. Dithering may be applied by adding random or pseudo-random numbers within a defined range to the decoded video. The defined range may be configured based on local and/or signalled parameters. The defined range may be based on a defined minimum and maximum value, and/or a defined scaling factor (e.g. for an output of a random number generator within a specific range). Dithering may reduce the visual appearance of quantization artefacts as is known in the art.

Example of 4×4 Residual Coding Unit and Tiles

Figure 6A:
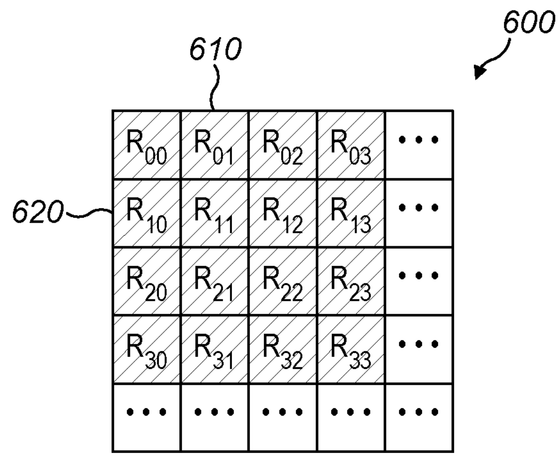
FIG. 6A is a schematic illustration showing an example 4 by 4 coding unit of residuals.

FIG. 6A shows an example 600 of a set of residuals 610 arranged in a 4×4 coding unit 620. There are thus 16 residual elements. The coding unit 620 may comprise an N by N array R of residuals with elements R[x][y]. For a 2×2 coding unit, there may be 4 residual elements. The transform may be applied to coding units as shown.

Figure 6B:
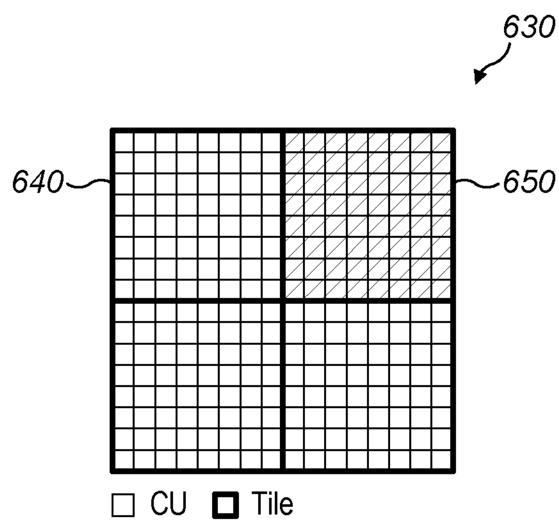
FIG. 6B is a schematic illustration showing how coding units may be arranged in tiles.

FIG. 6B shows how a plurality of coding units 640 may be arranged into a set of tiles 650. The set of tiles may collectively cover the complete area of a picture or frame. In the example, of FIG. 6B, a tile is made up of an 8×8 array of coding units. If the coding units are 4×4, this means that each tile has 32×32 elements; if the coding units are 2×2, this means that each tile has 16×16 elements.

Example Picture Formats

Figure 7C:
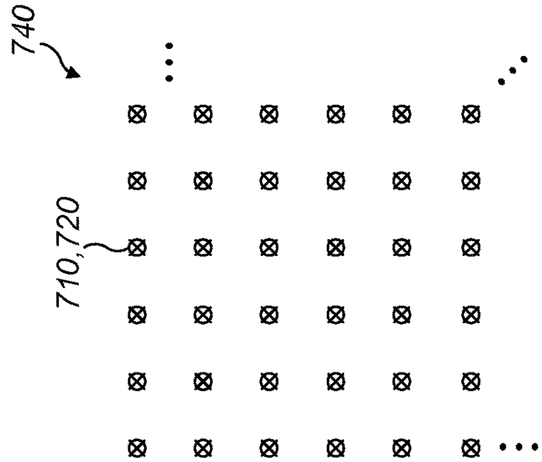
FIGS. 7A to 7C are schematic illustrations showing possible colour plane arrangements.
Figure 7B:
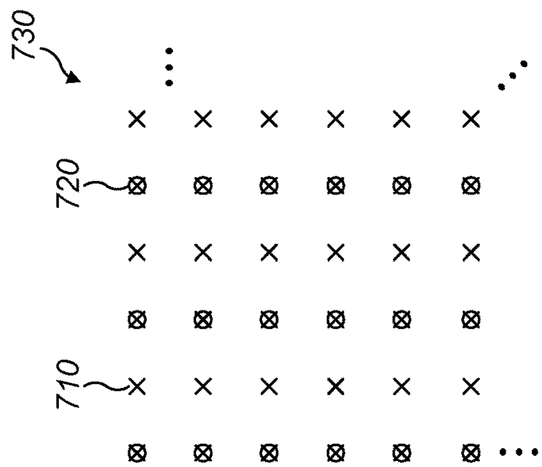
Figure 7A:
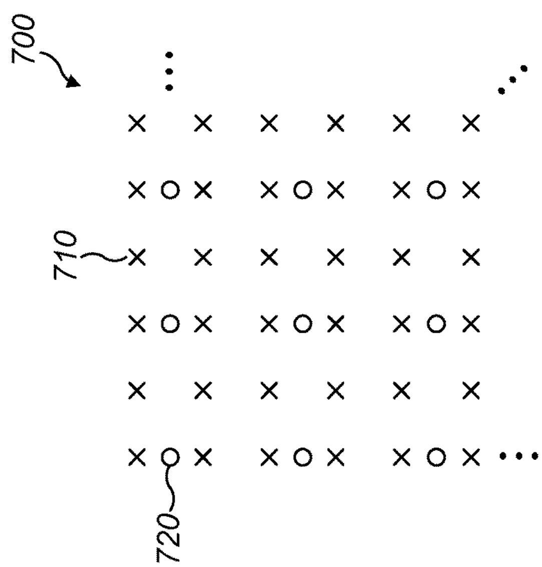

FIGS. 7A to 7C show a number of ways in which colour components may be organised to form a picture or frame within a video. In examples, frames of an input video 102, 302, 402 may be referred to as source pictures and a decoded output video 260, 560 may be referred to as decoded pictures. The encoding process as implemented by the encoder may general a bitstream as described in examples herein that is transmitted to, and received by, the decoding process as implemented by a decoder. The bitstream may comprise a combined bitstream that is generated from at least the encoded base stream, the encoded level 1 stream, the encoded level 2 stream and the headers (e.g. as described in examples herein). A video source that is represented by the bitstream may thus be seen as a sequence of pictures in decoding order.

In certain examples, the source and decoded pictures are each comprised of one or more sample arrays. These arrays may comprise: luma only (monochrome) components (e.g. Y); luma and two chroma components (e.g. YCbCr or YCgCo); Green, blue, and red components (e.g. GBR or RGB); or other arrays representing other unspecified monochrome or tri-stimulus colour samplings (for example, YZX, also known as XYZ). Certain examples described herein are presented with reference to luma and chroma arrays (e.g. Y, Cb and Cr arrays); however, those skilled in the art will understand that these examples may be suitably configured to operate with any known or future colour representation method.

In certain examples, a chroma format sampling structure may be specified through chroma_sampling_type (e.g. this may be signalled to the decoder). Different sampling formats may have different relations between the different colour components. For example: in 4:2:0 sampling, each of the two chroma arrays has half the height and half the width of the luma array; in 4:2:2 sampling, each of the two chroma arrays has the same height and half the width of the luma array; and in 4:4:4 sampling, each of the two chroma arrays has the same height and width as the luma array. In monochrome sampling there is only one sample array, which is nominally considered the luma array. The number of bits necessary for the representation of each of the samples in the luma and chroma arrays in a video sequence may be in the range of 8 to 16, inclusive, and the number of bits used in the luma array may differ from the number of bits used in the chroma arrays.

FIGS. 7A to 7C show different sampling types that may be represented by different values of the variable chroma_sampling_type. When the value of chroma_sampling_type is equal to 0, the nominal vertical and horizontal relative locations of luma samples 710 and chroma samples 720 in pictures are shown in FIG. 7A. When the value of chroma_sampling_type is equal to 1, the chroma samples 720 are co-sited with the corresponding luma samples 710 and the nominal locations in a picture are as shown in FIG. 7B. When the value of chroma_sampling_type is equal to 2, all array samples 710, 720 are co-sited for all cases of pictures and the nominal locations in a picture are as shown in FIG. 7C. In these cases, the variables SubWidthC and SubHeightC may indicate how the chroma samples are shifted:

| chroma_ sampling_type | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

Example Bitstream Processing

Figure 8:
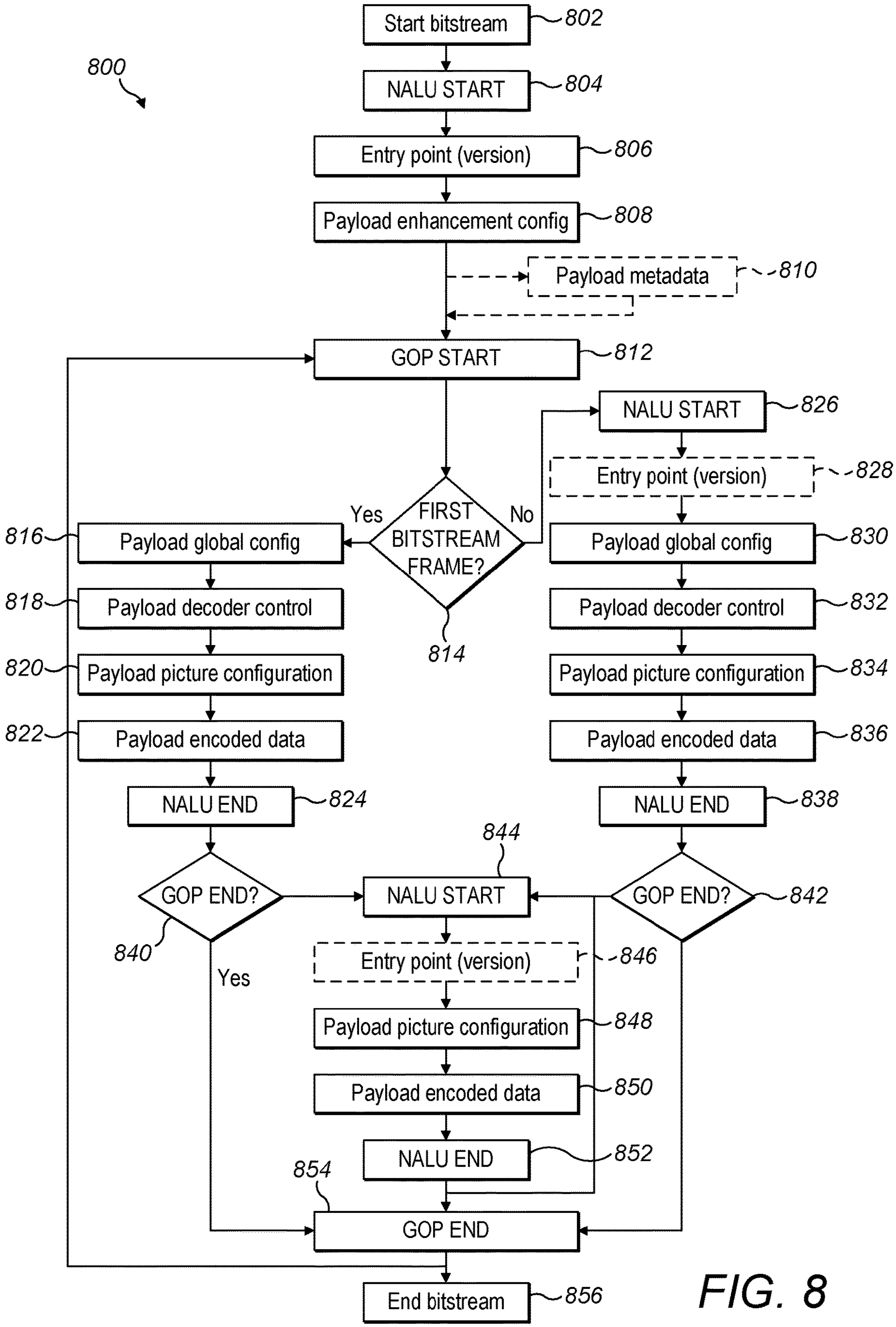
FIG. 8 is a flow chart shows a method of configuring a bit stream.

FIG. 8 shows an example method 800 that may be used to process a bitstream that has been encoded using the example encoders or encoding processes described herein. The method 800 may be implemented by an example decoder, such as 200 or 500 in FIGS. 2 and 5. The method 800 shows an example flow which facilitates separation of an enhancement bitstream.

At block 802, the method 800 comprises receiving an input bitstream 802. At block 804, a NALU start is identified within the received bitstream. This then allows identification of an entry point at block 806. The entry point may indicate which version of a decoding process should be used to decode the bitstream. Next, at block 808, a payload enhancement configuration is determined. The payload enhancement configuration may indicate certain parameters of the payload. The payload enhancement configuration may be signalled once per stream. Optionally, the payload enhancement configuration may be signalled multiple per group of pictures or for each NALU. The payload enhancement configuration may be used to extract payload metadata at block 810.

At block 812, a start of a group of pictures (GOP) is identified. Although the term group of pictures is used it will be understood that this term is used to refer to a corresponding structure to that of the base stream but not to define a particular structure on the enhancement stream. That is, enhancement streams may not have a GOP structure in the strict sense and strict compliance with GOP structures of the art is not required. If payload metadata is included, it may be included after the payload enhancement configuration and before the set of groups of pictures. Payload metadata may for example include HDR information. Following block 812, a GOP may be retrieved. At block 814, if the NALU relates to a first bitstream frame, the method may further comprise retrieving a payload global configuration at block 816. The payload global configuration may indicate parameters of the decoding process, for example, the payload global configuration may indicate if a predicted residual mode or temporal prediction mode was enabled in the encoder (and should be enabled at the decoder), thus the payload global configuration may indicate if a mode should be used in the decoding method. The payload global configuration may be retrieved once for each GOP. At block 818, the method 800 may further comprise retrieving a set of payload decoder control parameters which indicate to the decoder parameters to be enabled during decoding, such as dithering or up-sampling parameters. The payload decoder control parameters may be retrieved for each GOP. At block 820, the method 800 comprises retrieving a payload picture configuration from the bitstream. The payload picture configuration may comprise parameters relating to each picture or frame, for example, quantization parameters such as a step width. The payload picture configuration may be retrieved once for each NALU (that is, once for each picture or frame). At block 822, the method 800 may then further comprise retrieving a payload of encoded data which may comprise encoded data of each frame. The payload of encoded data may be signalled once for each NALU (that is, once for each picture or frame). The payload of encoded data may comprise a surface, plane or layer of data which may be separated into chunks as described with reference to FIG. 9A, as well as the examples of FIGS. 21A and 21B. After the payload of encoded data is retrieved, the NALU may end at block 824.

If the GOP also ends, the method may continue to retrieve a new NALU for a new GOP. If the NALU is not the first bitstream frame (as the case here), then the NALU may then, optionally, retrieve an entry point (i.e. an indication of a software version to be used for decoding). The method may then retrieve a payload global configuration, payload decoder control parameters and payload picture configuration. The method may then retrieve a payload of encoded data. The NALU will then end.

If at block 814, the NALU does not relate to a first bitstream frame, then blocks 828 to 838 may be performed. Optional block 828 may be similar to block 806. Blocks 830 to 838 may be performed in a similar manner to blocks 816 to 824.

At blocks 840 and 842, after each NALU has ended, if the GOP has not ended, the method 800 may comprise retrieving a new NALU from the stream at block 844. For each second and subsequent NALU of each GOP, the method 800 may optionally retrieve an entry point indication at block 846, in a similar manner to blocks 806 and 828. The method 800 may then comprise retrieving payload picture configuration parameters at block 848 and a payload of encoded data for the NALU at block 850. Blocks 848 to 852 may thus be performed in a similar manner to blocks 820 to 824 and blocks 834 to 838. The payload encoded data may comprise tile data.

As above, if the NALU is not the last NALU for the GOP, the method may comprise retrieving a further NALU (e.g. looping around to block 844). If the NALU is the last NALU in the GOP, the method 800 may proceed to block 854. If there are further GOPs, the method may loop around to block 812 and comprise retrieving a further GOP and performing blocks 814 onwards as previously described. Once all GOPs have been retrieved the bitstream ends at block 856.

Example Form of Encoded Payload Data

Figure 9A:
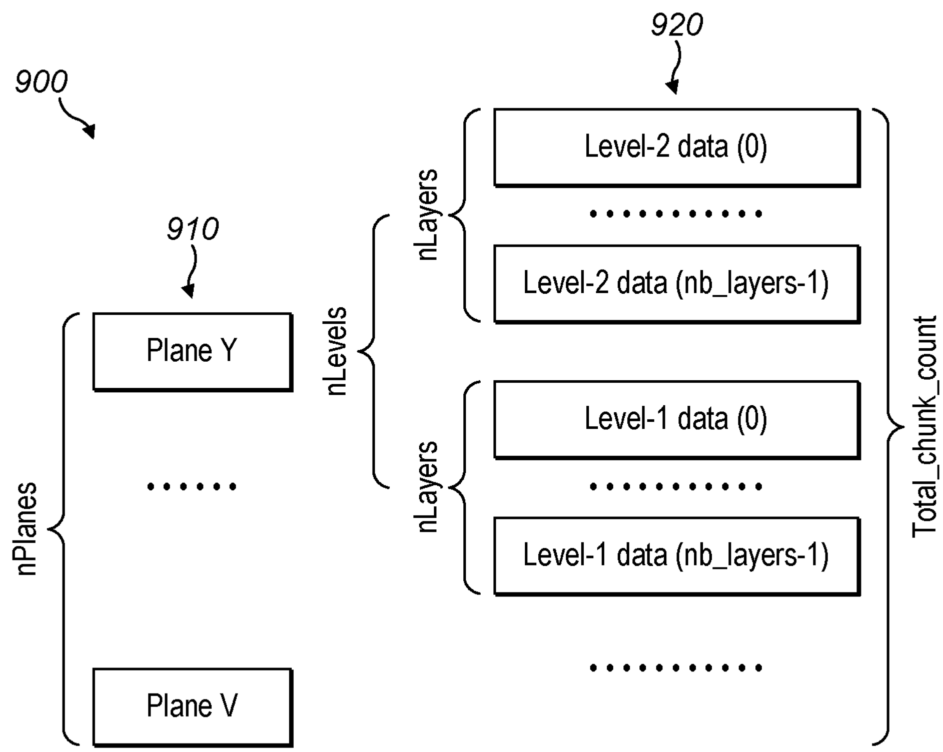
FIG. 9A is a schematic illustration showing how a colour plane may be decomposed into a plurality of layers.

FIG. 9A shows how encoded data 900 within an encoded bitstream may be separated into chunks. More particularly, FIG. 9A shows an example data structure for a bitstream generated by an enhancement encoder (e.g. level 1 and level 2 encoded data). A plurality of planes 910 are shown (of number nPlanes). Each plane relates to a particular colour component. In FIG. 9A, an example with YUV colour planes is shown (e.g. where a frame of input video has three colour channels, i.e. three values for every pixel). In the examples, the planes are encoded separately.

The data for each plane is further organised into a number of levels (nLevels). In FIG. 9A there are two levels, relating to each of enhancement levels 1 and 2. The data for each level is then further organised as a number of layers (nLayers). These layers are separate from the base and enhancement layers; in this case, they refer to data for each of the coefficient groups that result from the transform. For example, an 2×2 transform results in four different coefficients that are then quantized and entropy encoded and an 4×4 transform results in sixteen different coefficients that are then likewise quantized and entropy encoded. In these cases, there are thus respectively 4 and 16 layers, where each layer represents the data associated with each different coefficient. In cases, where the coefficients are referred to as A, H, V and D coefficients then the layers may be seen as A, H, V and D layers. In certain examples, these "layers" are also referred to as "surfaces", as they may be viewed as a "frame" of coefficients in a similar manner to a set of two-dimensional arrays for a set of colour components.

The data for the set of layers may be considered as "chunks". As such each payload may be seen as ordered hierarchically into chunks. That is, each payload is grouped into planes, then within each plane each level is grouped into layers and each layer comprises a set of chunks for that layer. A level represents each level of enhancement (first or further) and layer represents a set of transform coefficients. In any decoding process, the method may comprise retrieving chunks for two level of enhancement for each plane. The method may comprise retrieving 4 or 16 layers for each level, depending on size of transform that is used. Thus, each payload is ordered into a set of chunks for all layers in each level and then the set of chunks for all layers in the next level of the plane. Then the payload comprises the set of chunks for the layers of the first level of the next plane and so on.

As such, in the encoding and decoding methods described herein, the pictures of a video may be partitioned, e.g. into a hierarchical structure with a specified organisation. Each picture may be composed of three different planes, organized in a hierarchical structure. A decoding process may seek to obtain a set of decoded base picture planes and a set of residuals planes. A decoded base picture corresponds to the decoded output of a base decoder. The base decoder may be a known or legacy decoder, and as such the bitstream syntax and decoding process for the base decoder may be determined based on the base decoder that is used. In contrast, the residuals planes are new to the enhancement layer and may be partitioned as described herein. A "residual plane" may comprise a set of residuals associated with a particular colour component. For example, although the planes 910 are shown as relating to YUV planes of an input video, it should be noted the data 920 does not comprise YUV values, e.g. as for a comparative coding technology. Rather, the data 920 comprises encoded residuals that were derived from data from each of the YUV planes.

In certain examples, a residuals plane may be divided into coding units whose size depends on the size of the transform used. For example, a coding unit may have a dimension of 2×2 if a 2×2 directional decomposition transform is used or a dimension of 4×4 if a 4×4 directional decomposition transform is used. The decoding process may comprise outputting one or more set of residuals surfaces, that is one or more sets of collections of residuals. For example, these may be output by the level 1 decoding component 228 and the level 2 decoding component 248 in FIG. 2. A first set of residual surfaces may provide a first level of enhancement. A second set of residual surfaces may be a further level of enhancement. Each set of residual surfaces may combine, individually or collectively, with a reconstructed picture derived from a base decoder, e.g. as illustrated in the example decoder 200 of FIG. 2.

Example Up-Sampling Approaches

FIGS. 9B to 9J and the description below relate to possible up-sampling approaches that may be used when implementing the up-sampling components as described in examples herein, e.g. up-sampling components 134, 234, 334, 434, 534 or 587 in FIGS. 1 to 5C.

Figure 9B:
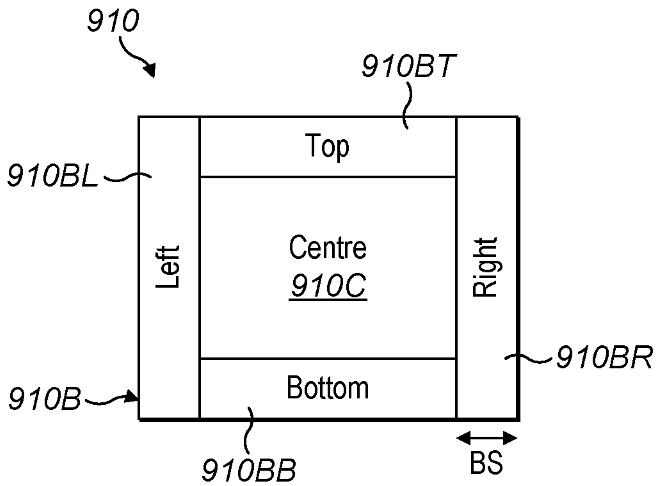
FIGS. 9B to 9J are schematic illustrations showing various methods of up-sampling.
Figure 9C:
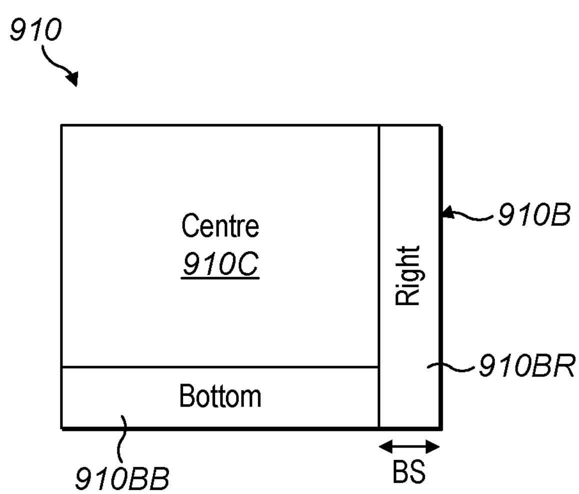

FIGS. 9B and 9C show two examples of how a frame to be up-sampled may be divided. Reference to a frame may be taken as reference to one or more planes of data, e.g. in YUV format. Each frame to be up-sampled, called a source frame 910, is divided into two major parts, namely a centre area 910C, and a border area 910B. FIG. 9B shows an example arrangement for bilinear and bicubic up-sampling methods. In FIG. 9B, the border area 910B consists of four segments, namely top segment 910BT, left segment 910BL, right segment 910BR, and bottom segment 910BB. FIG. 9C shows an example arrangement for a nearest up-sampling method. In FIG. 9C, the border area 910B consists of 2 segments; right segment 910BR and bottom segment 910BB. In both examples, the segments may be defined by a border-size parameter (BS), e.g. which sets a width of the segment (i.e. a length that the segment extends into the source frame from an edge of the frame). The border-size may be set to be 2 pixels for bilinear and bicubic up-sampling methods or 1 pixel for the nearest method.

In use, determining whether a source frame pixel is located within a particular segment may be performed based on a set of defined pixel indices (e.g. in x and y directions). Performing differential up-sampling based on whether a source frame pixel is within a centre area 910C or a border area 910B may help avoid border effects that may be introduced due to the discontinuity at the source frame edges.

Nearest Up-Sampling

FIG. 9C provides an overview of how a frame is up-sampled using a nearest up-sampling method. In FIG. 9C, a source frame 920 is up-sampled to become destination frame 922. The nearest up-sampling method up-samples by copying a current source pixel 928 onto a 2×2 destination grid 924 of destination pixels, e.g. as indicated by arrows 925. Centre and edge pixels are respectively shown as 926 and 927. The destination pixel positions are calculated by doubling the index of the source pixel 928 on both axes and progressively adding +1 to each axis to extend the range to cover 4 pixels as shown on the right-hand side of FIG. 9C. For example, the value of source pixel 928 with index location (x=6, y=6) is copied to destination grid 924 comprising pixels with index locations (12, 12) (13, 12) (12, 13) and (13, 13). Each pixel in the destination grid 924 takes the value of the source pixel 928.

The nearest method of up-sampling provides enables fast implementations that may be preferable for embedded devices with limited processor resources. However, the nearest method has a disadvantage that blocking, or "pixilation", artefacts may need to be corrected by the level 2 residuals (e.g. that result in more non-zero residual values that require more bits for transmission following entropy encoding). In certain examples described below, bilinear and bicubic up-sampling may result in a set of level 2 residuals that can be more efficiently encoded, e.g. that require fewer bits following quantization and entropy encoding. For example, bilinear and bicubic up-sampling may generate an up-sampled output that more accurately matches the input signal, leading to smaller level 2 residual values.

Bilinear Up-Sampling

Figure 9D:
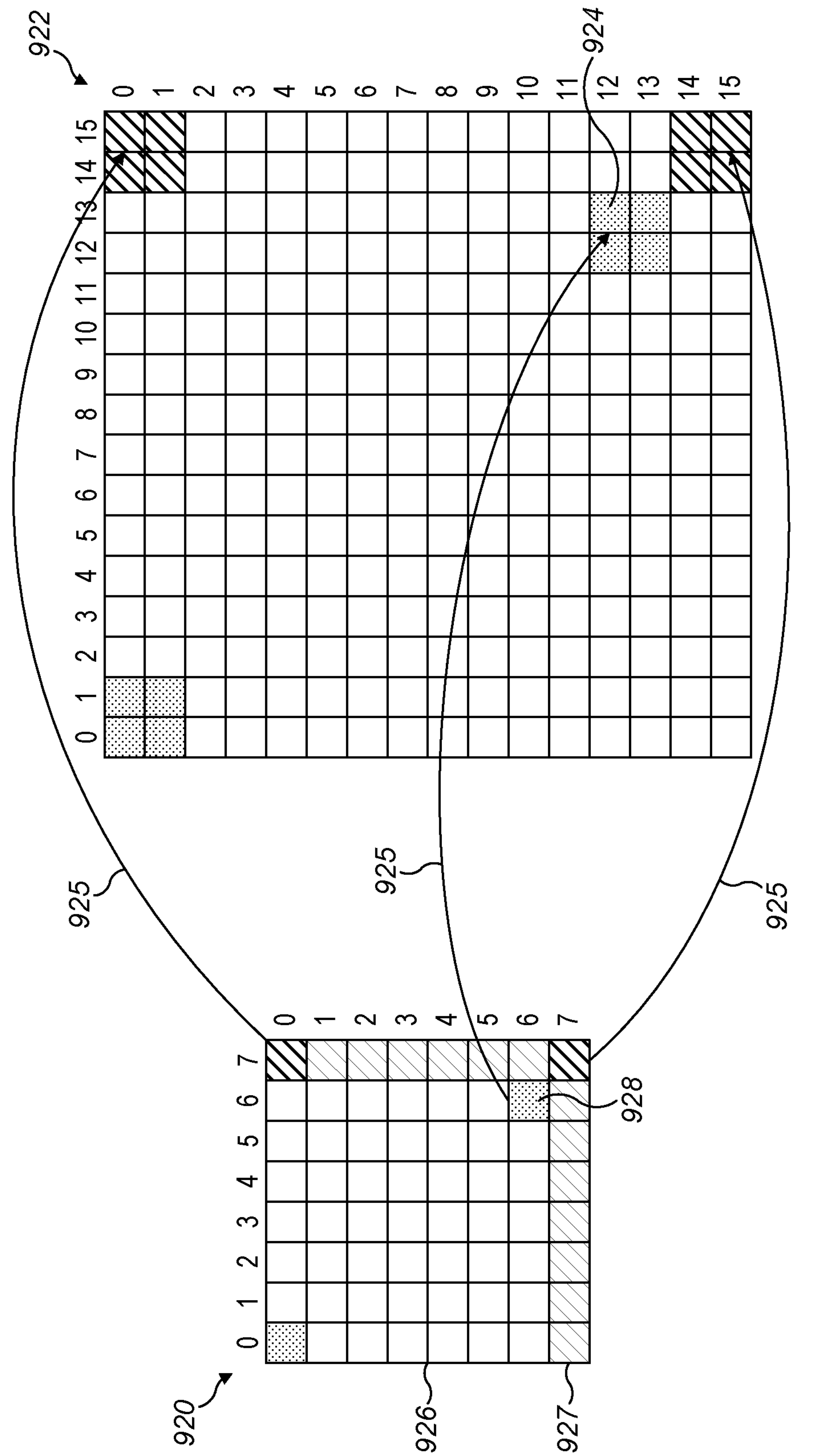
Figure 9E:
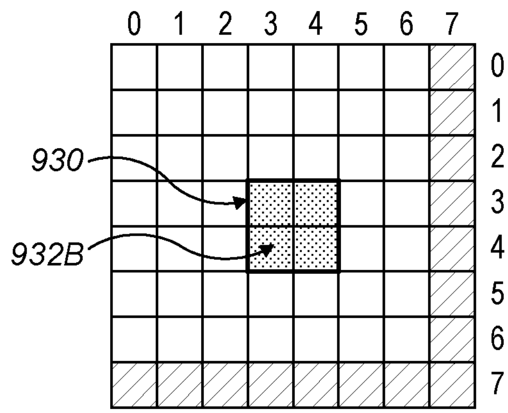
Figure 9F:
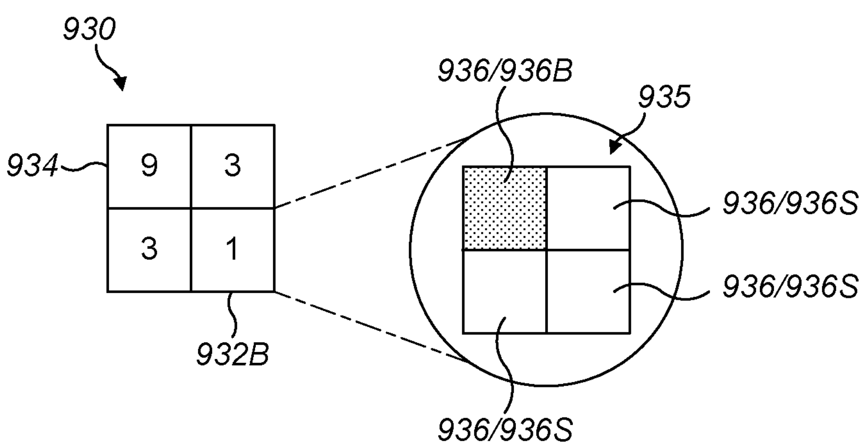
Figure 9G:
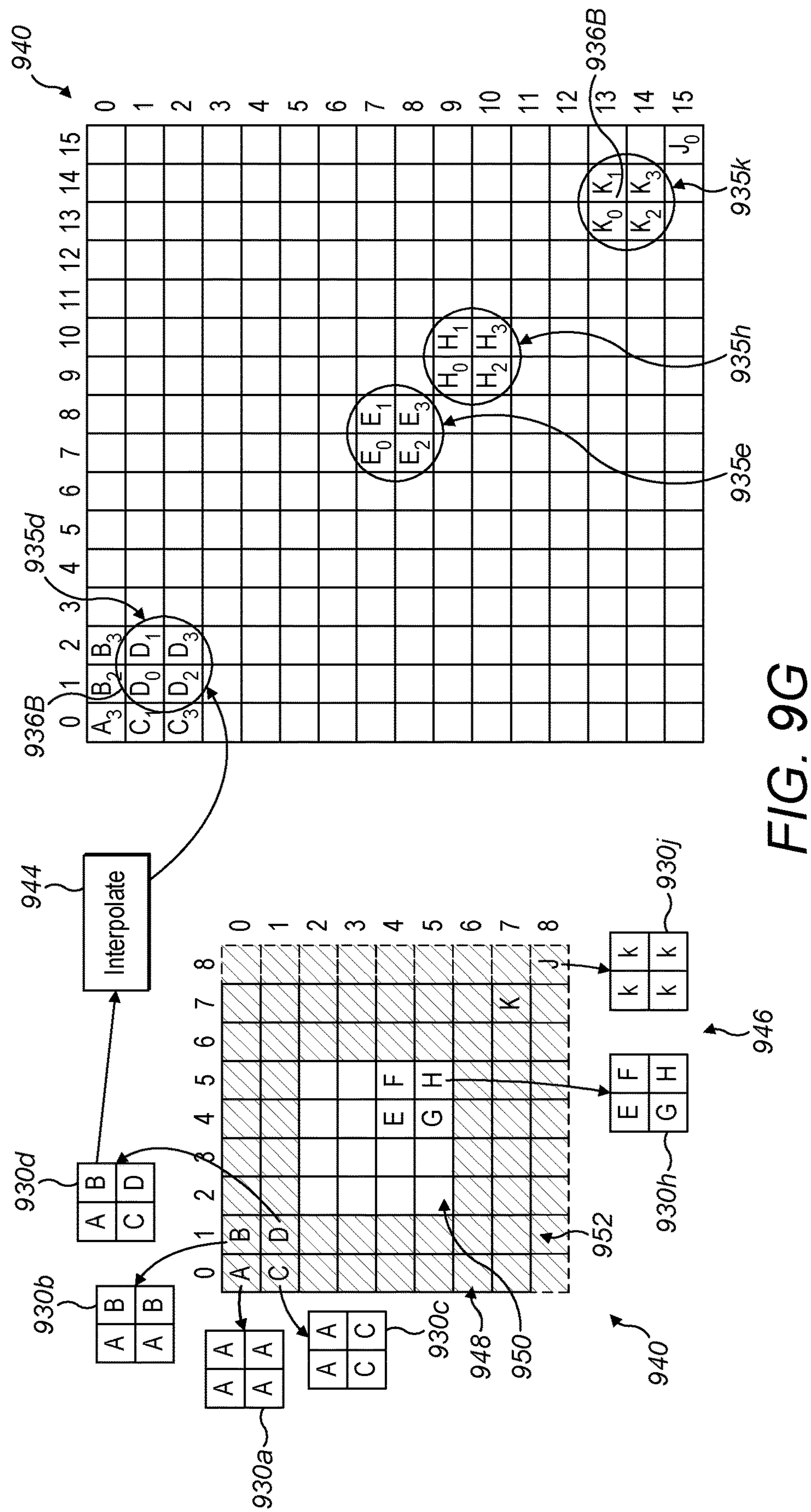

FIGS. 9E, 9F and 9G illustrate a bilinear up-sampling method. The bilinear up-sampling method can be divided into three main steps. The first step involves constructing a 2×2 source grid 930 of source pixels 932 in the source frame. The second step involves performing a bilinear interpolation. The third step involves writing the interpolation result to destination pixels 936 in the destination frame.

Bilinear Up-Sampling—Step 1: Source Pixel Grid

FIG. 9E illustrates a construction example of the 2×2 source grid 930 (which may also be called a bilinear grid). The 2×2 source grid 930 is used instead of a source pixel 932 because the bilinear up-sampling method performs up-sampling by considering the values of the nearest 3 pixels to a base pixel 932B, i.e. the nearest 3 pixels falling within the 2×2 source grid 930. In this example, the base pixel 932B is at the bottom right of the 2×2 source grid 930, but other positions are possible. During the bilinear up method the 2×2 source grid 930 may be determined for multiple source frame pixels, so as to iteratively determine destination frame pixel values for the whole destination frame. The base pixel 932B location is used to determine an address of a destination frame pixel.

Bilinear Up-Sampling—Step 2: Bilinear Interpolation

FIG. 9F illustrates a bilinear coefficient derivation. In this example, the bilinear interpolation is a weighted summation of the values of the four pixels in the 2×2 source grid 930. The weighted summation is used as the pixel value of a destination pixel 936 being calculated. The particular weights employed are dependent on the position of the particular destination pixel 936 in a 2×2 destination grid 935. In this example, the bilinear interpolation applies weights to each source pixel 932 in the 2×2 source grid 930, using the position of the destination pixel 936 in the 2×2 destination grid 935. For example, if calculating the value for the top left destination pixel (shown as 936/936B in FIG. 9F), then the top left source pixel value will receive the largest weighting coefficient 934 (e.g. weighting factor 9)

while the bottom right pixel value (diagonally opposite) will receive the smallest weighting coefficient (e.g. weighting factor 1), and the remaining two pixel values will receive an intermediate weighting coefficient (e.g. weighting factor 3). This is visualized in FIG. 9F with the weightings shown in the 2×2 source grid 930.

For the pixel on the right of 936/936B within the 2×2 destination grid 935, the weightings applied to the weighted summation would change as follows: the top right source pixel value will receive the largest weighting coefficient (e.g. weighting factor 9) while the bottom left pixel value (diagonally opposite) will receive the smallest weighting coefficient (e.g. weighting factor 1), and the remaining two pixel values will receive an intermediate weighting coefficient (e.g. weighting factor 3).

In FIG. 9F, four destination pixels are computed for the base pixel 932B based on the 2×2 source grid 930 but each destination pixel is determined using a different set of weights. These weights may be thought of as an up-sampling kernel. In this way, there may be four different sets of four weighted values that are applied to the original pixel values within the 2×2 source grid 930 to generate the 2×2 destination grid 935 for the base pixel 932B. After the four destination pixel values are determined, another base pixel is selected with a different source grid and the process begins again to determine the next four destination pixel values. This may be iteratively repeated until pixel values for the whole destination (e.g. up-sampled) frame are determined. The next section describes in more detail the mapping of these interpolated pixel values from the source frame to the destination frame.

Bilinear Up-Sampling—Step 3: Destination Pixels

FIG. 9G shows an overview of the bilinear up-sampling method comprising a source frame 940, a destination frame 942, an interpolation module 944, a plurality of 2×2 source grids 930 (*a,b,c,d,h,j*), and a plurality of 2×2 destination grids 935 (*d,e,h,k*). The source frame 940 and destination frame 942 have indexes starting from 0 on each column and row for pixel addressing (although other indexing schemes may be used).

In general, each of the weighted averages generated from each 2×2 source grid 930 is mapped to a corresponding destination pixel 936 in the corresponding 2×2 destination grid 935. The mapping uses the source base pixel 932B of each 2×2 source grid 930 to map to a corresponding destination base pixel 936B of the corresponding 2×2 destination grid 942, unlike the nearest sampling method. The destination base pixel 936B address is calculated from the equation (applied for both axes):

$$Dst\_\text{base\_addr}=(Src\_\text{base\_address}\times 2)-1$$

Also, the destination pixels have three corresponding destination sub-pixels 721S calculated from the equation:

$$Dst\_\text{sub\_addr}=Dst\_\text{base\_addr}+1\text{(for both axes)}$$

And so, each 2×2 destination grid 935 generally comprises a destination base pixel 936B together with three destination sub pixels 936S, one each to the right, below, and diagonally down to the right of the destination base pixel, respectively. This is shown in FIG. 9F. However, other configurations of destination grid and base pixel are possible.

The calculated destination base and sub addresses for destination pixels 936B and 936S respectively can be out of range on the destination frame 942. For example, pixel A (0, 0) on source frame 940 generates a destination base pixel address (−1, −1) for a 2×2 destination grid 935. Destination address (−1, −1) does not exist on the destination frame 942. When this occurs, writes to the destination frame 942 are ignored for these out of range values. This is expected to occur when up-sampling the border source frames. However, it should be noted that in this particular example one of the destination sub-pixel addresses (0, 0) is in range on the destination frame 942. The weighted average value of the 2×2 source grid 930 (i.e. based on the lower left pixel value taking the highest weighting) will be written to address (0, 0) on the destination frame 942. Similarly, pixel B (1, 0) on source frame 940 generates a destination base pixel address (1, −1) which is out of range because there is no −1 row. However, the destination sub-pixel addresses (1, 0) and (2, 0) are in range and the corresponding weighted sums are each entered into the corresponding addresses. Similar happens for pixel C, but only the two values on the column 0 are entered (i.e. addresses (0, 1) and (0, 2)). Pixel D at address (1, 1) of the source frame contributes a full 2×2 destination grid 935*d* based on the weighted averages of source grid 930*d*, as do pixels E, H and K, with 2×2 destination grids 935*e*, 935*h*, and 935*k* and corresponding source grids 930*e*, 930*h* and 930*k* illustrated in FIG. 9G.

As will be understood, these equations usefully deal with the border area 910B and its associated segments, and ensure that when the centre 910C segment is up-sampled it will remain in the centre of the destination frame 942. Any pixel values that are determined twice using this approach, e.g. due to the manner in which the destination sub-pixels are determined, may be ignored or overwritten.

Furthermore, the ranges for border segments 910BR and 910BB are extended by +1 in order to fill all pixels in the destination frame. In other words, the source frame 940 is extrapolated to provide a new column of pixels in border segment 910BR (shown as index column number 8 in FIG. 9G), and a new row of pixels in border segment 910BB (shown as index row number 8 in FIG. 9G).

Cubic Up-Sampling

Figure 9H:
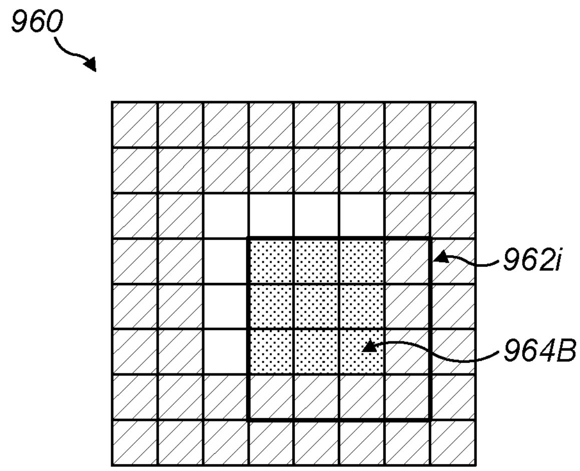
Figure 9I:
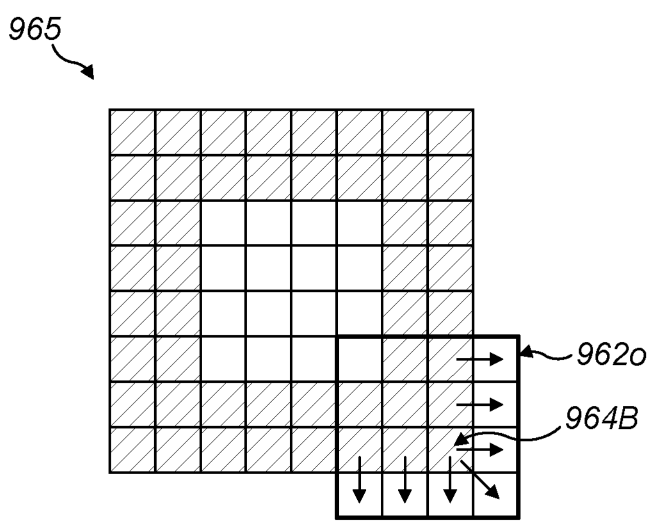
Figure 9J:
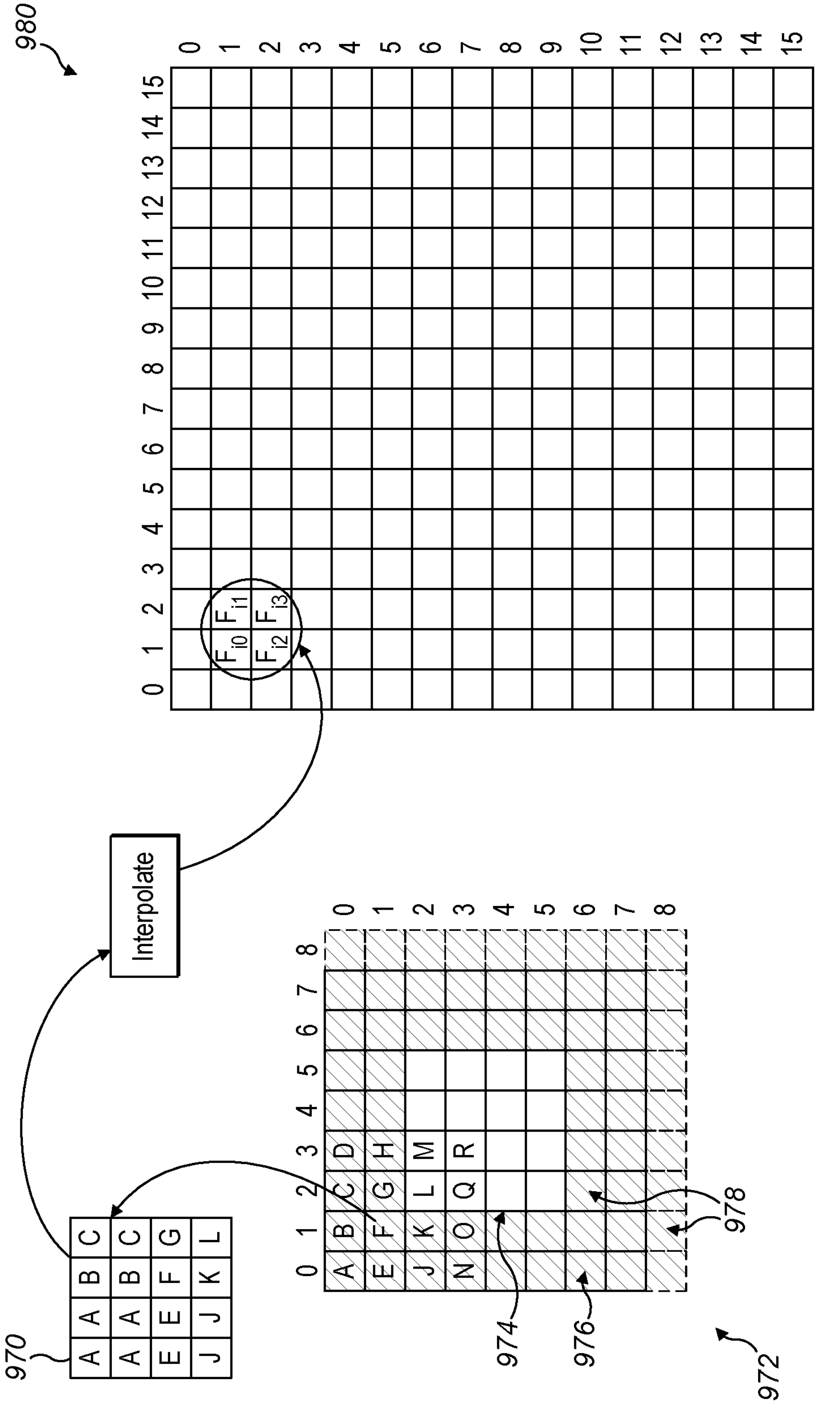

FIGS. 9H, 9I and 9J together illustrate a cubic up-sampling method, in particular, a bicubic method. The cubic up-sampling method of the present example may be divided into three main steps. The first step involves constructing a 4×4 source grid 962 of source pixels with a base pixel 964B positioned at the local index (2, 2) within the 4×4 source grid 815. The second step involves performing a bicubic interpolation. The third step involves writing the interpolation result to the destination pixels.

Cubic Up-Sampling—Step 1: Source Pixel Grid

FIG. 9H shows a 4×4 source grid 962 construction on source frame 960 for an in-bound grid 962*i* and separately an out-of-bound grid 962*o*. In this example, "in-bound" refers to the fact that the grid covers source pixels that are within the source frame, e.g. the centre region 910C and the border regions 910B; "out-of-bound" refers to the fact that the grid includes locations that are outside of the source frame. The cubic up-sampling method is performed by using the 4×4 source grid 962 which is subsequently multiplied by a 4×4 kernel. This kernel may be called an up-sampling kernel. During the generation of the 4×4 source grid 962, any pixels which fall outside the frame limits of the source frame 960 (e.g. those shown in out of bounds grid 962*o*) are replaced with the value of the source pixels 964 the at the boundary of the source frame 960.

Cubic Up-Sampling—Step 2: Bicubic Interpolation

The kernels used for the bicubic up-sampling process typically have a 4×4 coefficient grid. However, the relative position of the destination pixel with reference to the source pixel will yield a different coefficient set, and since the up-sampling is a factor of two in this example, there will be 4 sets of 4×4 kernels used in the up-sampling process. These sets are represented by a 4-dimensional grid of coefficients (2×2×4×4). For example, there will be one 4×4 kernel for each destination pixel in a 2×2 destination grid, that represents a single up-sampled source pixel 964B.

In one case, the bicubic coefficients may be calculated from a fixed set of parameters. In one case, this comprises a core parameter (bicubic parameter) and a set of spline creation parameters. In an example, a core parameter of −0.6 and four spline creation parameters of [1.25, 0.25, −0.75 & −1.75] may be used. An implementation of the filter may use fixed point computations within hardware devices.

Cubic Up-Sampling—Step 3: Destination Pixels

FIG. 9J shows an overview of the cubic up-sampling method comprising a source frame 972, a destination frame 980, an interpolation module 982, a 4×4 source grid 970, and a 2×2 destination grid 984. The source frame 972 and destination frame 980 have indexes starting from 0 on each column and row for pixel addressing (although other addressing schemes may be used).

Similarly to the bilinear method, the bicubic destination pixels have a base address calculated from the equation for both axes:

$$Dst\_base\_addr=(Src\_base\_address\times 2)-1$$

Also, the destination addresses are calculated from:

$$Dst\_sub\_addr=Dst\_base\_addr+1 \text{ (for both axes)}$$

And so, as for the bilinear method, each 2×2 destination grid 984 generally comprises a destination base pixel together with three destination sub pixels, one each to the right, below, and diagonally down to the right of the destination base pixel, respectively. However, other configurations of destination grid and base pixel are possible.

Again, these equations ensure that when the centre segment is up-sampled it will remain in the centre of the destination frame. Furthermore, the ranges for border segments 510BR and 510BB are extended by +1 in order to fill all pixels in the destination frame 980 in the same way as described for the bilinear method. Any pixel values that are determined twice using this approach, e.g. due to the manner in which the destination sub-pixels are determined, may be ignored or overwritten. The calculated destination base and sub addresses can be out of range. When this occurs, writes to the destination frame are ignored for these out of range values. This is expected to occur when up-sampling the border area.

Example Entropy Encoding

FIGS. 10A to 10I illustrate different aspects of entropy encoding. These aspects may relate to an entropy encoding performed, for example, by entropy encoding components 325, 344 in FIGS. 3A and 3B and/or an entropy decoding performed, for example, by entropy decoding components 571, 581 in FIGS. 5B and 5C.

Figure 10A:
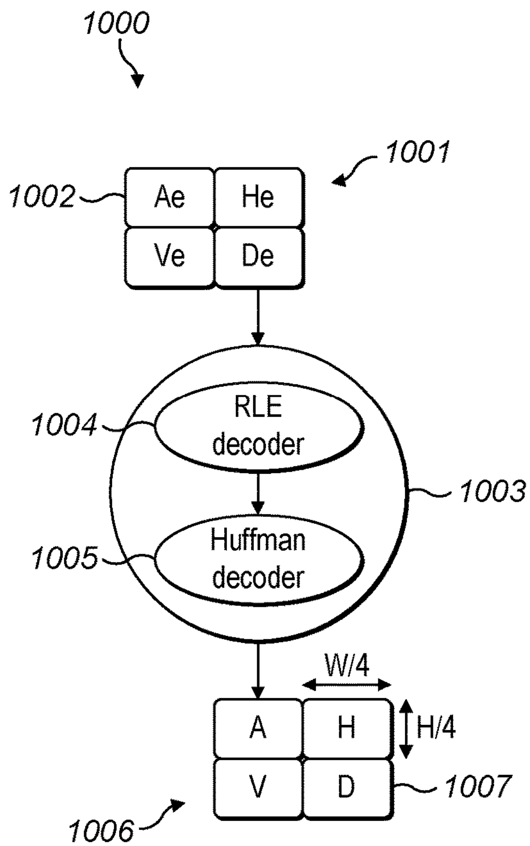
FIG. 10A to 10I are schematic illustrations showing various methods of entropy encoding quantized data.

FIG. 10A illustrates one implementation 1000 of an example entropy decoding component 1003 (e.g. one or more of entropy decoding components 571, 581 in FIGS. 5B and 5C). The entropy decoding component 1003 takes as inputs a set 1001 of entropy encoded residuals (Ae, He, Ve, De) 1002 and outputs a set 1006 of quantized coefficients 1007 (e.g. quantized transformed residuals in this illustrated example). The entropy encoded residuals 1002 may comprise a received encoded level 1 or level 2 stream (e.g. 226 or 246 as shown in FIG. 2). The entropy decoding component 1003 comprises a Huffman decoder 1004 followed by a run-length decoder 1005. The Huffman decoder 1004 receives the encoded enhancement stream that is encoded using Huffman encoding and decodes this to produce a run-length encoded stream. The run-length encoded stream is then received by the run-length decoder 1005, which applies run-length decoding to generate the quantized coefficients 1007. In FIG. 10A, a 2×2 transform example is shown, hence, the coefficients are shown as A, H, V and D coefficients from a 2×2 directional decomposition.

An entropy encoding component may be arranged in an inverse manner to the implementation 1000. For example, an input of an entropy encoding component may comprise a surface (e.g. residual data derived from a quantized set of transformed residuals) and may be configured to an entropy encoded version of the residual data, e.g. data in the form of the encoded stream data 1001 (with, for a 2×2 example, Ae, He, Ve, De encoded and quantized coefficients).

Example Entropy Encoding—Header Formats

FIGS. 10B to 10E illustrate a specific implementation of the header formats and how the code lengths may be written to a stream header depending on the amount of non-zero codes.

Figure 10B:
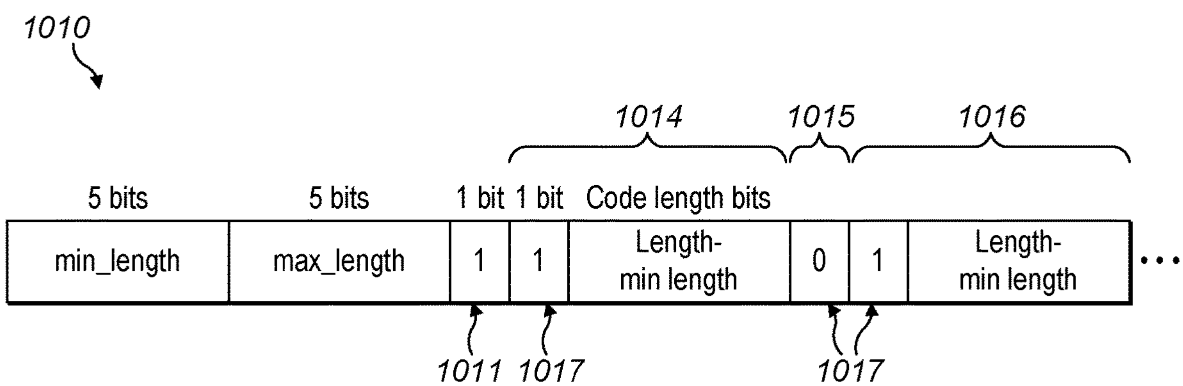

FIG. 10B shows a prefix coding (i.e. Huffman) decoder stream header 1010 for a case where there are more than 31 non-zero codes. A first 5 bits indicate a minimum length for a prefix code. A second 5 bits indicate a maximum length for a prefix code. A third bit then provides a compression flag 1011 that indicates whether compression is being applied. There then follow 3 symbols in the example of FIG. 10B: a first non-zero symbol 1014, a second zero symbol 1015 and a third non-zero symbol 1016. Non-zero length flags 1017 comprise one bit flag indicating whether each symbol is non-zero; the flags for the first and third symbols 1014, 1016 are 1 whereas the flag for the second symbol 1015 is 0. Each non-zero symbol indicates a code length for prefix coding that is equal to a code length minus the minimum length (e.g. as sent with the first 5 bits). The code lengths may be used to initialise the prefix (i.e. Huffman) decoder, such as 1004 in FIG. 10A. In this example, the number of code length bits may equal: log 2(max_length−min_length+1).

Hence, in the example of FIG. 10A there are more than 31 non-zero values in the data and the header includes a minimum code length and a maximum code length. The code length for each symbol is then sent sequentially. A flag indicates that the length of the symbol is non-zero. The bits of the code length are then sent as a difference between the code length and the minimum signalled length. This reduces the overall size of the header.

Figure 10C:
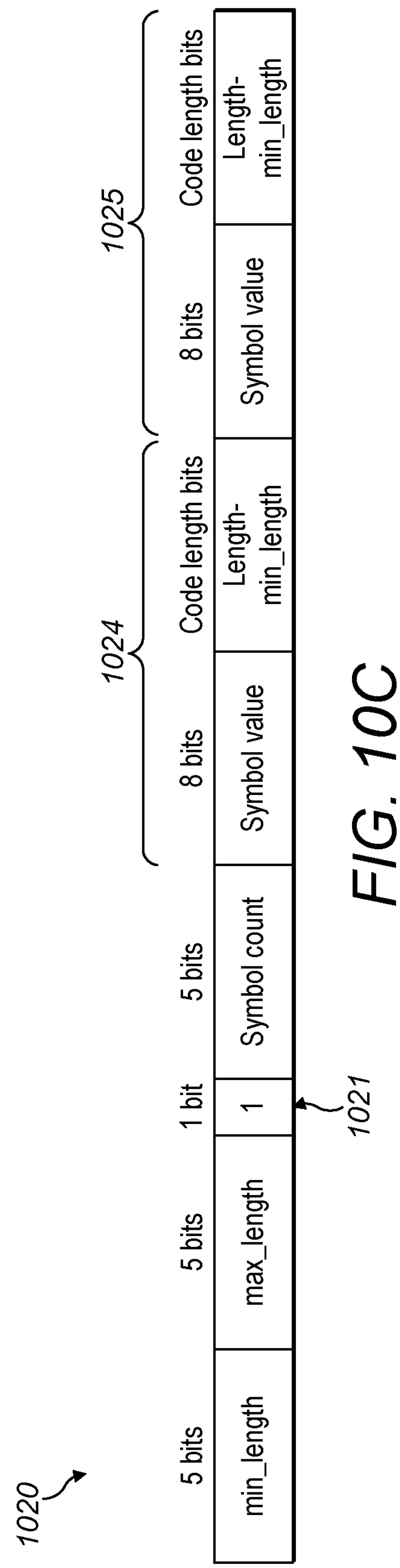

FIG. 10C illustrates a header 1020 similar to FIG. 10B but used where there are fewer than 31 non-zero codes. This may comprise a normal case. The header 1020 again has a first 5 bits that indicate a minimum length, a subsequent 5 bits that indicate a maximum length, and a compression flag 1021 (e.g. that may be 0 or 1 to indicate a compression as is described elsewhere herein). The header 1020 then further includes the number of symbols in the data, followed by a set of consecutive symbols 1024, 1025. Each symbol may comprise 8 bits that indicate the symbol value followed by the length of the codeword for that symbol, again sent as a difference between the length and the minimum length as described with respect to FIG. 10A.

In both cases, the header 1010 or 1020 is used to initialise the entropy decoding component (in particular the Huffman or prefix coding decoder) by reading the code lengths from the header.

Figure 10D:
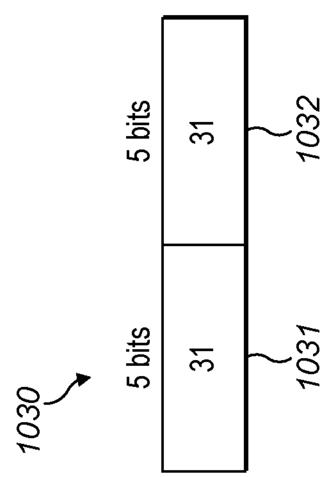
Figure 10E:
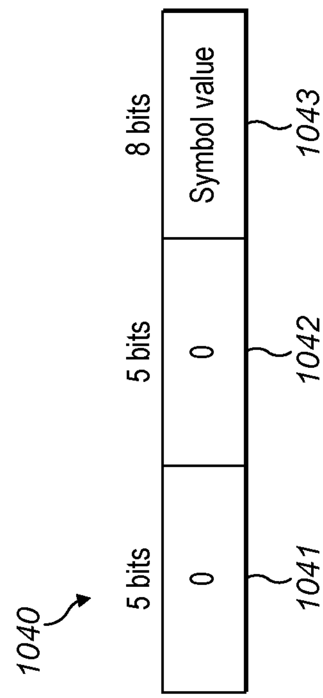

FIGS. 10D and 10E illustrate further headers 1030 and 1040 that may be sent in outlying cases. For example, where the frequencies are all zero, the stream header may comprise the header 1030 be as illustrated in FIG. 10D where the 5 bit minimum and maximum lengths (1031 and 1032) are both set to 31 (i.e. to a maximum value) to indicate the special situation. FIG. 10E shows a header 1040 that may be used where there is only one code in the Huffman tree. In this case, a 0 (i.e. minimum) value in the minimum and maximum length fields (1041 and 1042) indicates the one-code special situation and then these field values are followed by the symbol value to be used 1043. In this latter example, where there is only one symbol value, this may indicate that there is only one data value in the set of quantized coefficients data.

Example Entropy Encoding—RLE State Machine

Figure 10F:
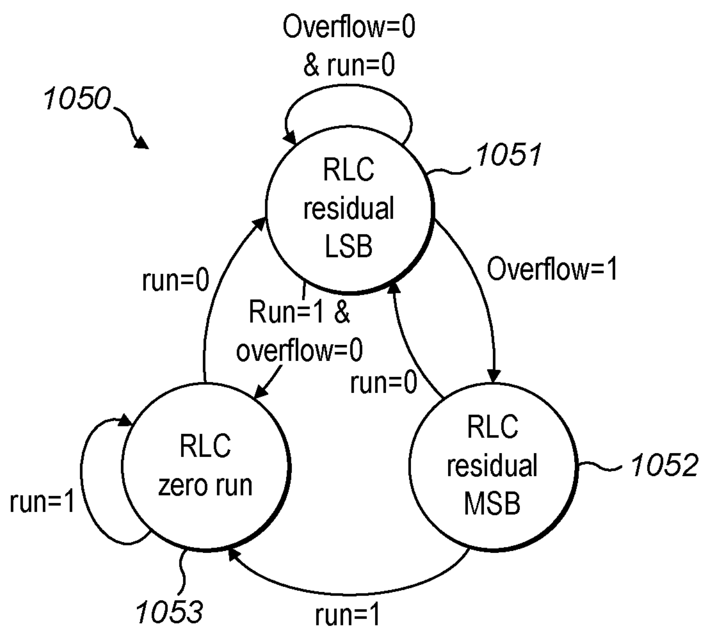

FIG. 10F shows a state machine 1050 that may be used be a run length decoder, such as run length decoder 1005 in FIG. 10A. The run length decoder is configured to read a set of run length encoded data byte by byte. The state machine 1050 has three states: a run-length coding (RLC) residual least-significant bit (LSB) case 1051; a run-length coding (RLC) residual most-significant bit (MSB) case 1052; and a run-length coding (RLC) zero run case 1053. Different run-length encoders and decoders may be used for different types of data. For example, different run-length encoding and decoding configurations may be used for each of: coefficient groups, temporal signal coefficient groups, and entropy encoded tiles of data.

In certain examples, the prefix or Huffman coding may be optionally and signalled in the headers (e.g. using an rle_only flag). The input of the RLE decoder may comprise a byte stream of Huffman decoded data if Huffman coding is used (e.g. the rle_only flag is equal to zero) or may comprise a byte stream of raw data if Huffman coding is not used (e.g. if the flag rle_only is equal to 1). The output of the RLE decoder may comprise a stream of quantized transform coefficients. In one case, these coefficients may belong to a chunk as indicated in FIG. 9A (e.g. indexed by plane, level and layer—as pointed by the variables planeIdx, levelIndex and layerIndex described in later examples) or comprise a stream of temporal signals (a temporal chunk that forms part of a temporal layer that is used to implement temporal prediction—this is described with reference to later examples).

The state machine 1050 of FIG. 10F may be used to implement a RLE decoder for coefficient groups. The run length state machine 1050 may be used by the Huffman encoding and decoding processed to know which Huffman code to use for the current symbol or code word. The RLE decoder uses the run length state machine 1050 to decode sequences of zeros. It also decodes the frequency tables used to build the Huffman trees for the Huffman decoding.

Figure 10G:
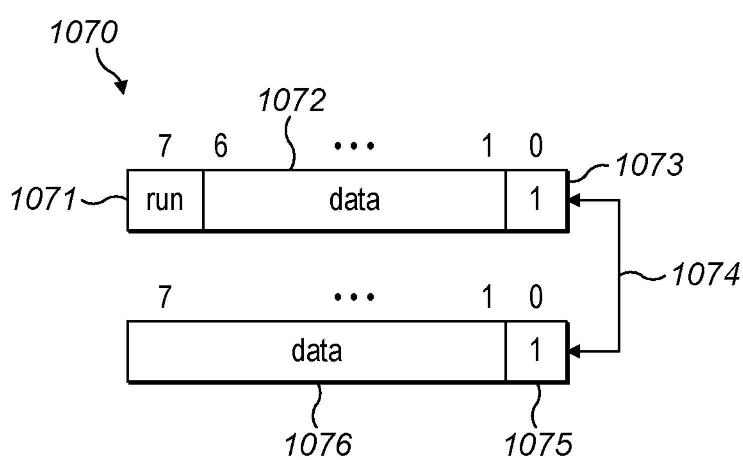
Figure 10H:
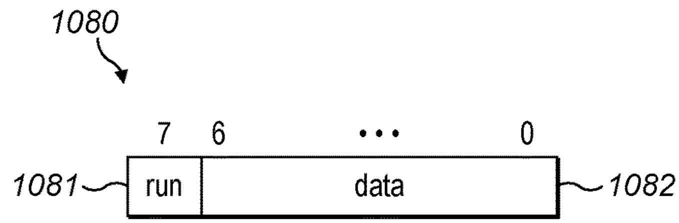
Figure 10I:
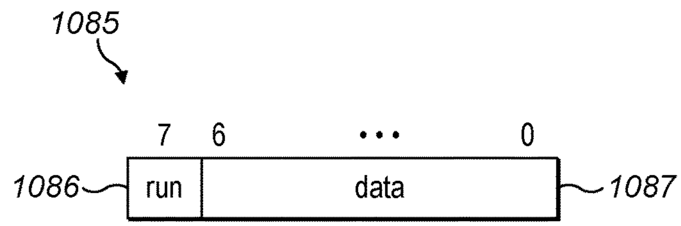

By configuration, the state of the first byte of data is guaranteed to be in the first state 1051 (i.e. a RLC residual LSB state). The RLE decoder uses the state machine 1050 to determine the state of the next byte of data based on the contents of the received stream. The current state tells the decoder how to interpret the current byte of data. FIGS. 10G, 10H and 10I shows how the RLE decoder of the present example is configured to interpret the byte.

As shown in FIG. 10F, the state machine 1050 has three states:

the RLC residual LSB state 1051: this is where the state machine 1050 starts. For bytes in a received stream, this state 1051 expects the 6 lesser significant bits (bits 6 to 1) to encode a non-zero element value. An example of a byte 1070 divided as expected by this state is shown in FIG. 10G. The run bit 1071 indicates that the next byte is encoding a count of a run of zeros. This is encoded in data portion 1072. The overflow bit 1073, which in this example is the least significant bit of the byte, is set if the element value does not fit within 6 bits of data (e.g. is set to 0 if there is no overflow and is set to 1 if there is overflow). If the run bit 1071 is 0 and the overflow bit 1073 is 0, then the state machine 1050 remains in the RLC residual LSB state 1051. When the overflow bit 1073 is set (e.g. is 1), as shown by the arrow 1074, the state of the next byte moves to the RLC residual MSB state 1052 as described below. The lower half of FIG. 10G thus shows a byte in the RLC residual LSB state 1051 that causes a state transition. When the overflow bit is set, as shown at 1075, the next state cannot be a run of zeros and bit 7 can be used to encode data instead, e.g. as shown by the data portion 1076.

the RLC residual MSB state: this state (shown as 1052) encodes bits 7 to 13 of element values that do not fit within 6 bits of data. Run length encoding of a byte 1080 for the RLC residual state is as shown in FIG. 10H. A data portion 1082 fills the seven least significant bits. In this example, bit 7—indicated as run bit 1081—encodes whether the next byte is a run of zeros. If the run bit is set (e.g. to 1), then the state transitions to the RLC zero run state 1053.

the RLC zero run state: this state (shown as 1053) encodes 7 bits of a zero run count. Run length coding of a byte 1085 for the RLC zero run state 1053 is shown in FIG. 10I. Again, a data portion 1087 is provided in the seven least signification bits. The most significant bit 1086 is a run bit. The run bit is high if more bits are needed to encode the count. If the run bit is high (e.g. 1) the state machine 1050 remains in the RLC zero run state 1053. If the run bit is low (e.g. 0), the state machine 1050 transitions to the RLC residual LSB state 1051. In the RLC residual LSB state 1051, if the run bit is high (e.g. 1) and the overflow bit is low (e.g. 0), then the state machine 1050 transitions from the RLC residual LSB state 1051 to the RLC zero run state 1053.

In examples, a frequency table is created for each state for use by the Huffman encoder. In order for the decoder to start on a known state, the first symbol in the encoded stream will always be a residual. Bits can of course be inverted (0/1, 1/0, etc.) without loss of functionality. Similarly, the locations within the symbols or bytes of the flags is merely illustrative.

Temporal Prediction and Signalling

Certain variations and implementation details of the temporal prediction will now be described, including certain aspects of temporal signalling.

In certain examples described herein, information from two of more frames of video that relate to different time samples may be used. This may be described as a temporal mode, e.g. as it relates to information from different times. Not all embodiments may make use of temporal aspects. Components for temporal prediction are shown in the examples of FIGS. 1 to 5C. As described herein, a step of encoding one or more sets of residuals may utilise a temporal buffer that is arranged to store information relating to a previous frame of video. In one case, a step of encoding a set of residuals may comprise deriving a set of temporal coefficients from the temporal buffer and using the retrieved set of temporal coefficients to modify a current set of coefficients. "Coefficients", in these examples, may comprise transformed residuals, e.g. as defined with reference to one or more coding units of a frame of a video stream—approaches may be applied to both residuals and coefficients. In certain cases, the modifying may comprise subtracting the set of temporal coefficients from the current set of coefficients. This approach may be applied to multiple sets of coefficients, e.g. those relating to a level 1 stream and those relating to a level 2 stream. The modification of a current set of coefficients may be performed selectively, e.g. with reference to a coding unit within a frame of video data.

Temporal aspects may be applied at both the encoding and decoding stages. Use of a temporal buffer is shown in the encoder 300 of FIGS. 3A and 3B and in the decoder 580, 590 of FIGS. 5B and 5C. As described herein, prior to modifying a current set of coefficients, the current set of coefficients may be one or more of ranked and transformed. In one case, dequantized transformed coefficients—$dqC_{x,y,n-1}$—from a previous encoded (n−1) frame at a corresponding position (e.g. a same position or mapped position) are used to predict the coefficients $C_{x,y,n}$ in a frame to be encoded (n). If a 4×4 transform is used, x, y may be in the range [0,3]; if a 2×2 transform is used x,y may be in the range [0,1]. Dequantized coefficients may be generated by an inverse quantize block or operation. For example, in FIG. 3B, dequantized coefficients are generated by inverse quantize component 372.

In certain examples, there may be at least two temporal modes.

- A first temporal mode that does not use the temporal buffer or that uses the temporal buffer with all zero values. The first temporal mode may be seen as an intra-frame mode as it only uses information from within a current frame. In the first temporal mode, following any applied ranking and transformation, coefficients may be quantized without modification based on information from one or more previous frames.
- A second temporal mode that makes use of the temporal buffer, e.g. that uses a temporal buffer with possible non-zero values. The second temporal mode may be seen as an inter-frame mode as it uses information from outside a current frame, e.g. from multiple frames. In the second temporal mode, following any applied ranking and transformation, previous frame dequantized coefficients may be subtracted from the coefficients to be quantized—$C_{x,y,n,inter.}=C_{x,y,n}-dqC_{x,y,n-1}$.

Figure 11A:
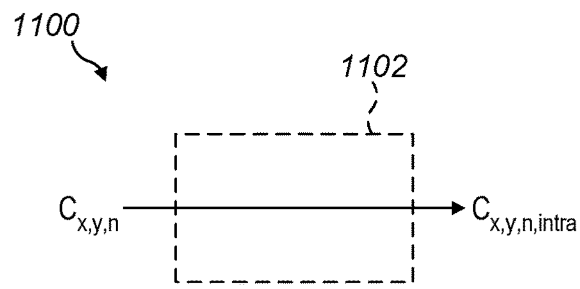
FIGS. 11A to 11C are schematic illustrations showing aspects of different temporal modes.
Figure 11B:
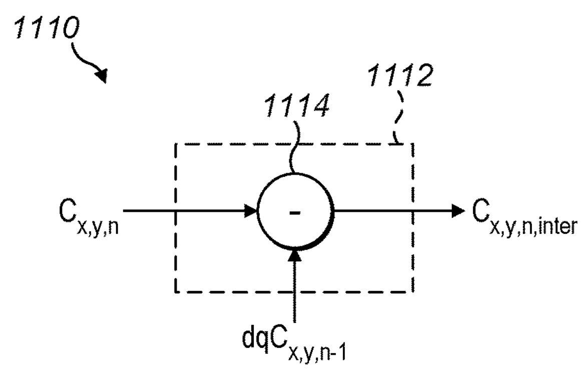

In one case, a first temporal mode may be applied by performing a subtraction with a set of zeroed temporal coefficients. In another case, the subtraction may be performed selectively based on temporal signalling data. FIGS. 11A and 11B show example operations in the encoder for two respective temporal modes. A first example 1100 in FIG. 11A shows a set of coefficients being generated by an encoding component 1102 in a first temporal mode—$C_{x,y,n,intra}$. These are then passed for quantization. In FIG. 11A, a set of coefficients in a second temporal mode—$C_{x,y,n,inter}$—are produced by an encoding component 1112 by subtraction 1114 as described above and are then passed for quantization. The quantized coefficients in both cases are then encoded as per FIGS. 3A and 3B. It should be noted that in other examples, a temporal mode may be applied after quantization, or at another point in the encoding pipeline.

Each of the two temporal modes may be signalled. Temporal signalling may be provided between an encoder and a decoder. The two temporal modes may be selectable within a video stream, e.g. different modes may be applied to different portions of the video stream (e.g. different encoded pictures and/or different areas with a picture such as tiles). The temporal mode may also or alternatively be signalled for the whole video stream. Temporal signalling may form part of metadata that is transmitted to the decoder, e.g. from the encoder. Temporal signalling may be encoded.

In one case, a global configuration variable may be defined for a video stream, e.g. for a plurality of frames within the video stream. For example, this may comprise a temporal_enabled flag, where a value of 0 indicates the first temporal mode and a value of 1 indicates a second temporal mode. In other cases, as well or, or instead of the global configuration value, each frame or "picture" within a video stream may be assigned a flag indicating the temporal mode. If a temporal_enabled flag is used as a global configuration variable this may be set by the encoder and communicated to the decoder.

Figure 11C:
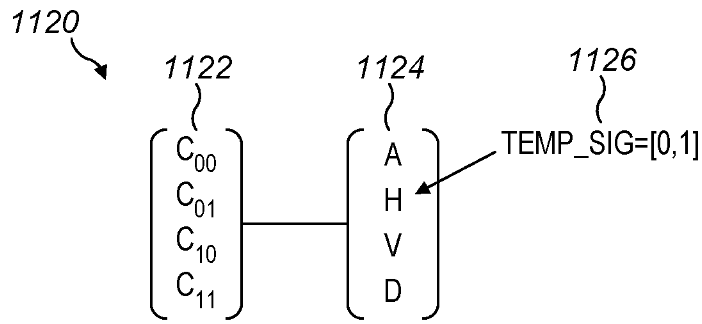

In certain cases, one or more portions of a frame of a video stream may be assigned a variable that indicates a temporal mode for the portions. For example, the portions may comprise coding units or blocks, e.g. 2×2 or 4×4 areas that are transformed by a 2×2 or 4×4 transform matrix. In certain cases, each coding unit may be assigned a variable that indicates a temporal mode. For example, a value of 1 may indicate a first temporal mode (e.g. that the unit is an "intra" unit) and a value of 0 may indicate a second temporal mode (e.g. that the unit is an "inter" unit). The variable associated with each portion may be signalled between the encoder and the decoder. In one case, this may be performed by setting one of the transformed coefficients to the variable value, e.g. this may be signalled by setting an H coefficient for a 2×2 coding unit or an HH coefficient for a 4×4 coding unit to the variable value (e.g. 0 or 1). In another case, each coding unit may comprise metadata and/or side-band signalling that indicates the temporal mode. FIG. 11C shows an example 1120 of the former case. In this example 1120, there are four coefficients 1122 that result from a 2×2 transformation. These four coefficients 1122 may be generated by transforming a 2×2 coding unit of residuals (e.g. for a given plane). When a Hadamard transform is used, the four coefficients may be referred to as A, H, V and D components 1124 respectively representing Average, Horizontal, Vertical and Diagonal aspects within the coding unit. In the example 1120 of FIG. 11C, the H component is used to signal a temporal mode, as shown by 1126.

Temporal processing may be selectively applied at the encoder and/or the decoder based on an indicated temporal mode. Temporal signalling within metadata and/or a side-band channel for portions of a frame of an enhancement stream may be encoded, e.g. with run-length encoding or the like to reduce the size of the data that is to be transmitted to the decoder. Run-length encoding may be advantageous for small portions, e.g. coding units and/or tiles, where there are a few temporal modes (e.g. as this metadata may comprise streams of '0's and '1's with sequences of repeated values).

A temporal mode may be signalled for one or more of the two enhancement streams (e.g. at level 2 and/or at level 1). For example, in one case, a temporal mode may be applied at LoQ2 (i.e. level 2) but not at LoQ1 (i.e. level 1). In another case, a temporal mode may be applied at both LoQ2 and LoQ1. The temporal mode may be signalled (e.g. as discussed above) independently for each level of enhancement. Each level of enhancement may use a different temporal buffer. For LoQ1 a default mode may be not to use a temporal mode (e.g. a value of 0 indicates no temporal features are used and a value of 1 indicates a temporal mode is used). Whether a temporal mode is used at a particular level of enhancement may depend on capabilities of a decoder. The temporal modes of operation described herein may be applied similarly at each level of enhancement.

Temporal Processing at the Encoder

In certain cases, a cost of each temporal mode for at least a portion of video may be estimated. This may be performed at the encoder or in a different device. In certain cases, a temporal mode with a smaller cost is selected and signalled. In the encoder, this may be performed by the temporal mode selection block shown in FIGS. 3A and 3B. A decoder may then decode the signalling and apply the selected temporal mode, e.g. as instructed by the encoder.

Costing may be performed on a per frame basis and/or on a per portion basis, e.g. per tile and/or per coding unit. In the latter case, a result of a costing evaluation may be used to set the temporal mode variable for the coding unit prior to quantization and encoding.

In certain cases, a map may be provided that indicates an initial temporal mode for a frame, or a set of portions of a frame, of video. This map may be used by the encoder. In one case, a temporal type variable may be obtained by the encoded for use in cost estimation as described in more detail below.

In one case, a cost that is used to select a temporal mode may be controllable, e.g. by setting a parameter in a configuration file. In one case, a cost that is used to select a temporal mode may be based on a difference between an input frame and one or more sets of residuals (e.g. as reconstructed). In another case, a cost function may be based on a difference between an input frame and a reconstructed frame. The cost for each temporal mode may be evaluated and the mode having the smallest cost may be selected. The cost may be based on a sum of absolute differences (SAD) computation. The cost may be evaluated in this manner per frame and/or per coding unit.

For example, a first cost function may be based on $J_o=\mathrm{Sum}(\mathrm{abs}(I_{x,y,n}-R_{x,y,v,o}))$, where $I_{x,y,n}$ is an input value, $R_{x,y,v,o}$ is a reconstructed residual and o is intra or inter frame (i.e. indicates a first or second temporal mode). The cost function may be evaluated using reconstructed residuals from each temporal mode and then the results of the cost function may be compared for each temporal mode. A second cost function may be based on additional terms that apply a penalty for non-zero quantized coefficients and/or based on values of one or more directional components if these are used for signalling (e.g. following transformation. In the second case, the second cost function may be based on $J_o=\mathrm{sum}(\mathrm{abs}(I_{x,y,n}-R_{x,y,v,o}))+\mathrm{step\_widthAA}*\mathrm{Sum}((qC_{x,y,n,o}!=0)+((o==\mathrm{intra})\&(qC_{0,3,n,intra}==0)))$, where the step width is a configurable weight or multiplier that may be tuned empirically, $qC_{x,y,n,o}$ is a quantized coefficient and $qC_{0,3,n,intra}$ is a coefficient that relates to an H (for a 2×2 transform) or HH (for a 4×4 transform) element. In other cases, where a side-band signalling in used, a cost of setting these bits to 1 may be incorporated into the second cost function. For the first temporal mode (e.g. an intra mode), residuals may be reconstructed according to $R_{x,y,n,\ intra}=\mathrm{Transform}(dqC_{x,y,n,intra})$, where "dq" indicates dequantized. For a second temporal mode (e.g. an inter mode), residuals may be reconstructed according to $R_{x,y,n,inter}=\mathrm{Transform}(dqC_{x,y,n,inter}+dqC_{x,y,n-1})$. "Transform" in both cases may indicate an inverse transform of the coefficients. If a transform matrix is a self-inverse matrix then a common or shared matrix may be used for both forward and inverse transformations. As before, the temporal mode that is used may be indicated in signalling information, e.g. metadata and/or a set parameter value.

In one case, the cost may be evaluated at the encoder. For example, the temporal selection block may evaluate the cost. In other cases, the cost may be evaluated by a separate entity (e.g. a remote server during pre-processing of a video stream) and the temporal mode signalled to the encoder and/decoder.

If the second temporal mode is selected (e.g. inter frame processing), then modified quantized coefficients (e.g. output by the subtraction block 342 between transform component 341 and quantize component 343 in FIG. 3B) are then sent for entropy encoding. The dequantized values of these coefficients may then be kept for temporal prediction of the next frame, e.g. frame n+1. Although FIG. 3B shows two separate inverse quantize operations for a level 1 stream, it should be noted that these may comprise a single common inverse quantize operation in certain cases.

Temporal mode selection and temporal prediction may be applied to one or more of the level 2 and level 1 streams shown in FIG. 3B (e.g. to one or both sets of residuals). In certain cases, a temporal mode may be separately configured and/or signalled for each stream.

Temporal Refresh

As described in later sections, in certain examples, a second temporal mode may utilise a temporal refresh parameter. This parameter may signal when a temporal buffer is to be refreshed, e.g. where a first set of values stored in the temporal buffer are to be replaced with a second set of values. Temporal refresh may be applied at one or more of the encoder and the decoder. The temporal buffer may be any one of the temporal buffers 124, 144, 230, 250, 345, 361, 424, 444, 530, 550, and 591. For example, in the encoder, a temporal buffer may store dequantized coefficients for a previous frame that are loaded when a temporal refresh flag is set (e.g. is equal to 1 indicating "refresh"). In this case, the dequantized coefficients are stored in the temporal buffer and used for temporal prediction for future frames (e.g. for subtraction) while the temporal refresh flag for a frame is unset (e.g. is equal to 0 indicating "no refresh"). In this case, when a frame is received that has an associated temporal refresh flag set to 1, the contents of the temporal buffer are replaced. This may be performed on a per frame basis and/or applied for portions of a frame such as tiles or coding units.

A temporal refresh parameter may be useful for a set of frames representing a slow-changing or relatively static scene, e.g. a first shot for the set of frames may be used for subsequent frames in the scene. When the scene changes again, a first frame in a set of frames for the next scene may indicate that temporal refresh is again required. This may help speed up temporal prediction operations.

A temporal refresh operation for a temporal buffer may be effected by zeroing all values with the temporal buffer.

A temporal refresh parameter may be signalled to the decoder by the encoder, e.g. as a binary temporal_refresh_bit where 1 indicates that the decoder is to refresh the temporal buffer for a particular encoded stream (e.g. level 1 or level 2).

Temporal Estimates and Refreshing for Tiles

As described herein, in certain examples, data may be grouped into tiles, e.g. 32×32 blocks of an image. In this case, a temporal refresh operation, e.g. as described above, may be performed on a tile-by-tile basis for a frame, e.g. where coefficients are stored in the temporal buffer and may be addressed by tile. A mechanism for tiled temporal refresh may be applied asymmetrically at the encoder and the decoder.

In one case, a temporal processing operation may be performed at the encoder to determine temporal refresh logic on a per frame or per block/coding unit basis. In certain cases, the signalling for a temporal refresh at the decoder may be adapted to conserve a number of bits that are transmitted to the decoder from the encoder.

Figure 12A:
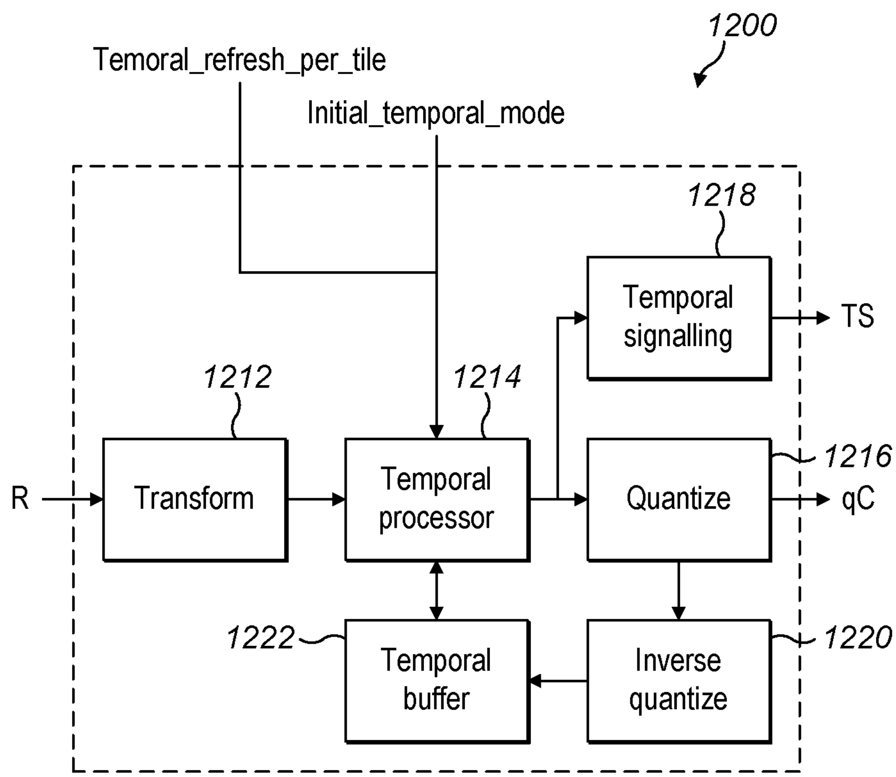
FIGS. 12A and 12B are schematic illustrations showing components for applying temporal prediction according to examples.

FIG. 12A shows an example 1200 of temporal processing that may be performed at the encoder. FIG. 12A shows a temporal processing subunit 1210 of an example encoder. This encoder may be based on the encoder 300, 360 of FIG. 3A or 3B. The temporal processing subunit receives a set of residuals indicate as R. These may be level 2 or level 1 residuals as described herein. They may comprise a set of ranked and filtered residuals or a set of unranked and unfiltered residuals. The temporal processing subunit 1210 outputs a set of quantized coefficients—indicated as qC—that may then be entropy encoded. In the present example, the temporal processing subunit 1210 also outputs temporal signalling data—indicated as TS—for communication to the decoder. The temporal signalling data TS may be encoded together with, or separately from, the quantized coefficients. The temporal signalling data TS may be provided as header data and/or as part of a side-band signalling channel. In one case, temporal data may be encoded as a separate surface that is communicated to the decoder.

In the example 1200 of FIG. 12A, the residuals (R) are received by a transform component 1212. This may correspond to the transform component of other examples, e.g. one of transform components 322, 341 in FIGS. 3A and 3B. The transform component 1212 outputs transform coefficients as described herein (i.e. transformed residuals). The temporal processing subunit 1210 also comprises a central temporal processor 1214. This also receives metadata in the form of a tile-based temporal refresh parameter temporal_refresh_per_tile and an estimate of a temporal mode initial_temporal_mode. The estimate of temporal mode may be provided per coding unit of a frame and the tile-based temporal refresh parameter may be provided per tile. For example, if a 2×2 transform is used, then a coding unit relates to a 2×2 area, and in a 32×32 tile there are 16×16 such areas, and so 256 coding units. The metadata may be generated by another subunit of the encoder, e.g. in a pre-processing operation and/or may be supplied to the encoder, e.g. via a network Application Programming Interface (API).

In the example 1200 of FIG. 12A, the temporal processor 1214 receives the metadata and is configured to determine a temporal mode for each coding unit and a value for a temporal refresh bit for the whole frame or picture. The temporal processor 1214 controls the application of a temporal buffer 1222. The temporal buffer 1222 may correspond to the temporal buffer of previous examples as referenced above. The temporal buffer 1222 receives de- or inverse quantized coefficients from an inverse quantize component 1220, which may correspond to one of the inverse quantize components 372 or 364 in FIGS. 3A and 3B. The inverse quantize component 1220 is communicatively coupled in turn to an output of a quantize component 1216, which may correspond to one of quantize components 323 or 343 in FIGS. 3A and 3B. The temporal processor 1214 may implement certain functions of the temporal mode selection components 363 or 370 as shown in FIGS. 3A and 3B. Although, FIG. 12A shows a certain coupling between the quantize component 1216, the inverse quantize component 1220 and the temporal buffer 1222, in other examples, the temporal buffer 1222 may receive an output of the temporal processor 1214 before quantization and so the inverse quantize component 1220 may be omitted. In FIG. 12A, a temporal signalling component 1218 is also shown that generates the temporal signalling TS based on operation of the temporal processor 1214.

Figure 12B:
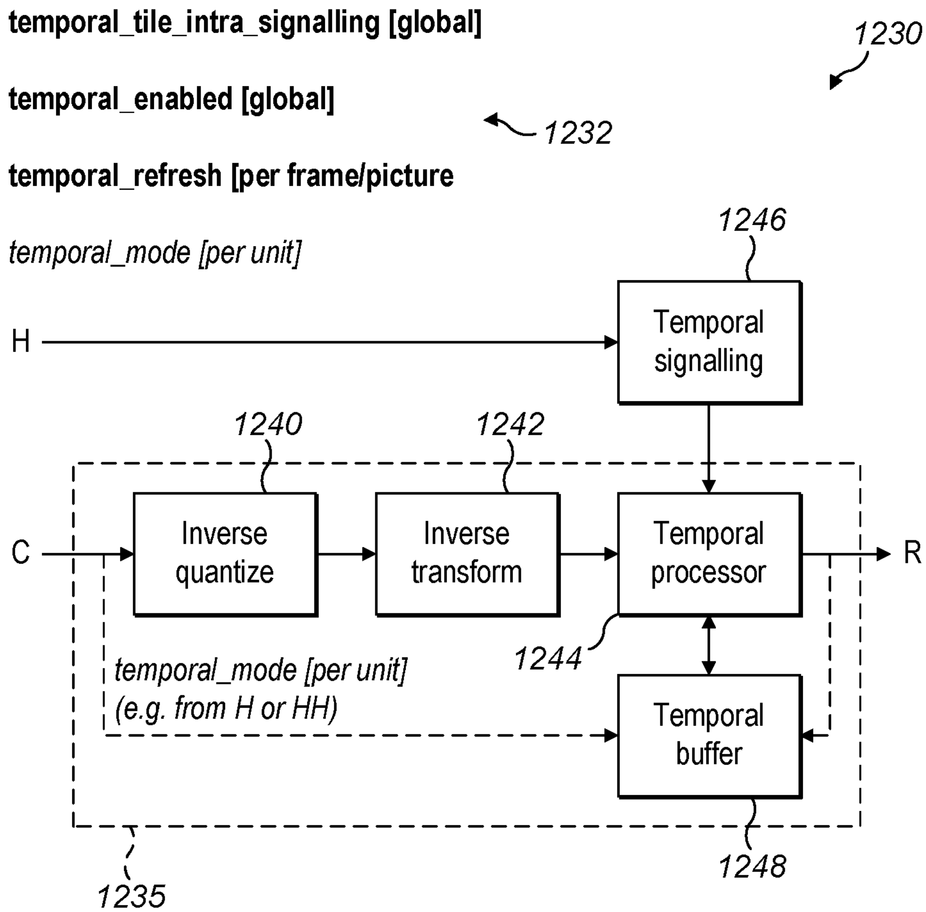

FIG. 12B shows a corresponding example 1230, e.g. as implemented at a decoder, where the decoder receives a temporal_refresh bit per frame and a temporal_mode bit per coding unit. As discussed above, in certain cases the temporal mode for each coding unit may be set within the encoded coefficients, e.g. by replacing an H or HH value within the coefficients. In other examples, the temporal mode for each coding unit may be sent via additional signalling information, e.g. via a side-band and/or as part of frame metadata.

In the example 1230 of FIG. 12B, a temporal processing subunit 1235 is provided at the decoder. This may implement at least a portion of a level 1 or level 2 decoding component. The temporal processing subunit 1235 comprises an inverse quantize component 1240, an inverse transform component 1242, a temporal processor 1244 and a temporal buffer 1248. The inverse quantize component 1240 and the inverse transform component 1242 may comprise implementations of the inverse quantize components 572, 582 and the inverse transform components 573, 583 shown in FIGS. 5B and 5C. The temporal processor 1244 may correspond to functionality applied by the temporal prediction component 585 and the third summation component 594, or by the temporal prediction component 585 and the fourth summation component 595. The temporal buffer 1248 may correspond to one the temporal buffers 550 or 591. In FIG. 12B, there is also a temporal signalling component 1246 that receives data 1232 that is, in this example, indicated in a set of headers H for the bitstream. These headers H may correspond to the headers 556 of FIG. 5C. It should be noted that the temporal subunits 1210 and 1235 may, in certain cases, be implemented with respective encoders and decoders that differ from the other examples herein.

In certain cases, when a temporal mode is enabled, e.g. as set by a global temporal_enabled bit, the temporal processor 1214 of FIG. 12A is configured to use the tile-based temporal refresh parameter temporal_refresh_per_tile and the estimate of the temporal mode initial_temporal_mode and to determine values for the temporal mode for each coding unit and the temporal refresh bit for the whole frame that improve communication efficiency between the encoder and the decoder.

In one case, the temporal processor may determine costs based on the estimate of the temporal modes initial_temporal_mode and use these costs to set the values that are communicated to the decoder.

In one case, the temporal processor may initially determine whether a per frame refresh should be performed and signalled based on percentages of different estimated temporal modes across the set of coding units for the frame, e.g. where the coding units have an initial estimate of the temporal mode. For example, first, all coding units of both estimated temporal modes (e.g. elements associated with a 2×2 or 4×4 transform) may be ignored if they have a zero sum of absolute differences (e.g. cases where there is no residual). A refresh bit for the frame may then be estimated based on proportions (e.g. percentages) of non-zero coding units. In certain examples, a refresh operation for the contents of a temporal buffer may be set based on a percentage of coding units that are initially estimated to relate to the first temporal mode. For example, if more than 60% of coding units that are estimated to relate to the first temporal mode in the case that temporal_refresh_per_tile is not set, or if more than 75% of coding units are deemed to relate to the first temporal mode in the case that temporal_refresh_per_tile is set, then the temporal buffer 1222 may be refreshed (e.g. by zeroing values within the buffer) for the whole frame and appropriate signalling set for the decoder. In these cases, even if temporal processing is enabled (e.g. via the temporal_enabled signalling), any subtraction is performed with respect to zeroed values within the temporal buffer 1222 and so temporal prediction at the decoder is inhibited similar to the first temporal mode. This may be used to revert back to the first temporal mode based on changes within the video stream (e.g. if it is a live stream) even though a second temporal mode with temporal prediction is signalled. This may improve viewing quality.

Similarly, in certain cases, even if the second temporal mode is selected for coding units and signalled to the decoder, if a frame encoded by the base encoder is set as an I or intra frame (e.g. by setting the temporal_refresh_bit for the frame), then the temporal buffer 1222 is refreshed as above (e.g. effecting processing similar to the first temporal mode). This may help to ensure that Group of Pictures (GoP) boundaries of the base stream, e.g. as encoded, are respected when temporal processing is enabled.

Whether a temporal refresh is performed, e.g. for a tile, may depend on whether noise sequences are present with isolated static edges. The exact form of the cost function may depend on the implementation.

Returning to processing performed by the temporal processing subunit 1210 of FIG. 12A, following a decision on whole frame refresh, a second stage may involve tile-based processing based on the temporal_refresh_per_tile bit value. This may be performed per tile for a given set of tiles for a frame. If temporal_refresh_per_tile is used, and if the flag temporal_refresh_per_tile is set in the metadata received by the temporal processor, then the following processing may be performed.

At a first substage, it may be checked whether a temporal buffer for a given tile is already empty. If it is, all temporal signals in the tile are zero and coding units in this tile are encoded in the second temporal mode (e.g. inter encoded), e.g. the temporal mode for the unit is set as the second mode, further temporal processing is performed in relation to this mode at the encoder, and the temporal mode is signalled to the decoder (e.g. either by setting a coefficient value or via sideband signalling). This may effectively code the tile as per the first temporal mode (e.g. intra coding) as the temporal buffer is empty. If the second temporal mode (e.g. inter mode) is set via a 0 value in the temporal mode bit, this approach may reduce the number of bits that need to be communicated to the decoder in cases where the temporal buffer will be empty.

If the flag temporal_refresh_per_tile is not set for a given tile, a first coding unit in the tile may be encoded as per the second temporal mode (e.g. as an inter unit) and temporal signalling for this tile is not set. In this case, a costing operation as described previously is performed for the other coding units within the tile (e.g. the first or second temporal mode may be determined based on a sum of absolute differences (SAD) metric). In this case, for the other coding units, the initial estimated temporal mode information is recomputed based on current (e.g. live) encoding conditions. All other coding units in the tile may be subjected to the procedure and costing steps above. The encoding of the first coding unit in the tile as the second temporal mode may be used to instruct initial temporal processing at the decoder (e.g. to instruct an initial refresh for the tile), where the temporal processing for the other coding units is performed at the decoder based on the confirmed values of the temporal_mode bit set for the coding units.

If the flag temporal_refresh_per_tile for a given tile is set and a temporal buffer for the tile is not empty, then the temporal processor may arrange for a temporal refresh of the tile, where temporal signalling is then set to instruct this at the decoder. This may be performed by setting a temporal mode value for a first coding unit to 1 and the temporal mode value for all other coding units to 0. This matter of 1 in the first coding unit and 0 in the other coding units indicates to the decoder that a refresh operation is to be performed with respect to the tile yet reduces the information to be transmitted across. In this case, the temporal processor effectively ignores the temporal mode values and encodes all the coding units as per the first temporal mode (e.g. as intra coding units without temporal prediction).

Hence, in these examples, when the temporal_refresh_per_tile is set as part of the encoder metadata, a first coding unit may be used to instruct the decoder to clean (i.e. empty) its corresponding temporal buffer at the position of that tile and the encoder logic may apply temporal processing as an appropriate temporal mode.

The approaches above may allow temporal prediction to be perform on a per tile basis based on coding units within the tile. Configurations for a given tile may be set for one coding unit within the tile. These approaches may be applied for one or more of the level 2 stream and the level 1 stream, e.g. for one or more of the sets of residuals.

In certain cases, a temporal_tile_intra_signalling global parameter may be set for a video stream to indicate that the tile refresh logic described above is to be used at the decoder.

Initial Temporal Mode Flag

In certain examples, the initial_temporal_mode data may be provided for a plurality of frames, e.g. for a current frame and a next frame. In these examples, the initial_temporal_mode estimate for a next frame, e.g. frame n+1, may also be used to remove quantized values that are not considered important to reduce the bit rate, the estimated temporal mode information may be used to control comparisons with one or more thresholds to instruct removal of quantized values (e.g. at one of the quantize components 323, 343, at one of the temporal mode selection components 363, 370 or at the RM L−1 control components 324, 365 in FIG. 3A or 3B).

In certain cases, if an initial_temporal_mode for a coding unit at the same position in a next frame is estimated to be related to the first temporal mode (e.g. an intra mode), it may be assumed that residuals to be coded in the present coding unit will disappear in the next frame and hence residuals that are smaller or equal to a given threshold may be removed. As an example, in a test case, this threshold may be set to 2, meaning all quantized values smaller than +/−3 will be removed from the coding unit.

Figure 12C:
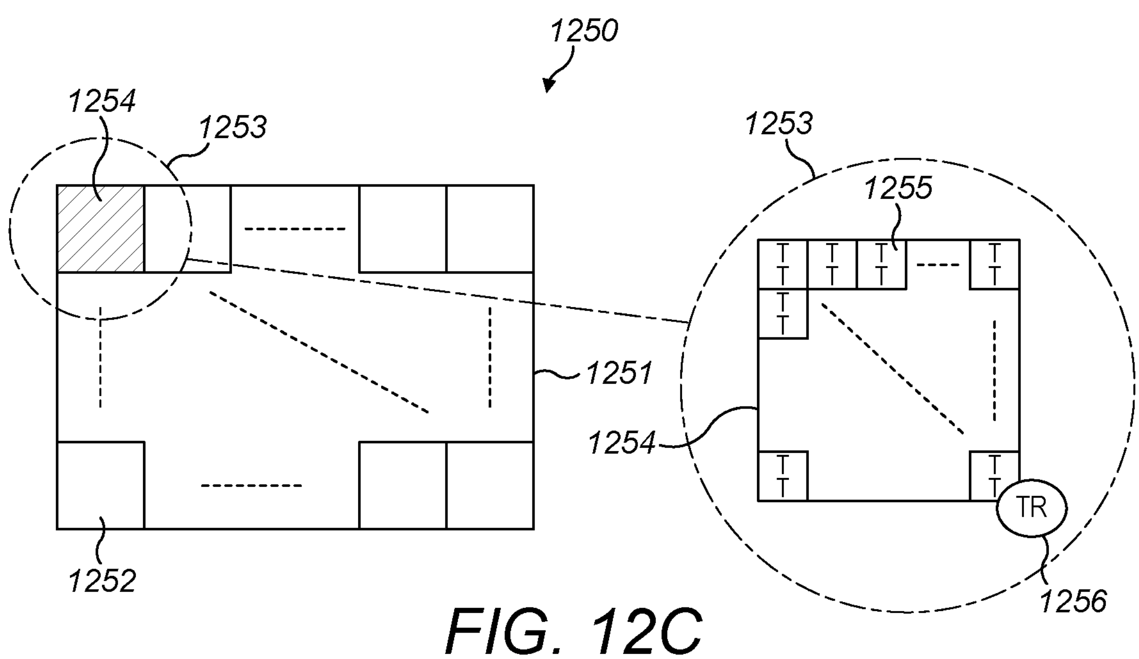
FIGS. 12C and 12D are schematic illustrations showing how temporal signalling relates to coding units and tiles.

FIG. 12C shows an example 1250 of how temporal signalling information may be provided for a frame of residuals 1251. References to a "frame" in these examples may refer to a frame for a particular plane, e.g. where separate frames of residuals generated for each of YUV planes. As such the terms "plane" and "frame" may be used interchangeably. The left-hand-side of FIG. 12C shows how a frame of residuals may be divided into a number of tiles 1252. The right-hand-side of FIG. 12C shows how temporal signalling information may be assigned to each tile. For example, circle 1253 indicates a first tile 1254. In the frame 1251, the tiles form a raster-like pattern of rows across the frame 1251. The right-hand-side shows the first tile 1254 in more detail.

The circle 1253 on the right-hand-side of FIG. 12C shows how each tile 1254 comprises a number of coding units. A coding unit may comprise one or more residuals. In one case, a coding unit may relate to a block of residuals associated with a transform operation, e.g. a 2×2 block as described herein, which may relate to a Directional Decomposition transformation (DD—described in more detail below), or a 4×4 block as described herein, which may relate to a Directional Decomposition Squared (DDS). In FIG. 12C, each coding unit within the tile has a temporal_type flag 1255 (shown as "TT") and the tile 1254 has a temporal_refresh_per_tile flag 1256 (shown as "TR"). This information may be obtained and used by the encoder to apply temporal encoding as described above.

Other Temporal Signalling Examples

As described above, in one case, temporal signalling may be provided "in-stream", e.g. as part of an enhancement stream. This may be performed by replacing a particular coefficient following transformation, e.g. the temporal signalling is embedded within the transform coefficients. In one case, a horizontal coefficient (e.g. H in a 2×2 Directional Decomposition transform or HH in a 4×4 Directional Decomposition Squared transform) may be used to signal a temporal mode for a particular coding unit. A horizontal coefficient may be used as this may minimise an effect on a reconstructed signal. In certain cases, the effect of the horizontal coefficient may be reconstructed by the inverse transform at the decoder, e.g. based on the data carried by the other coefficients in the coding block.

In another case, temporal signalling may be performed using metadata. Metadata, as used here, may be a form of side-band signalling, e.g. that does not form part of the base or enhancement streams. In one case, metadata is transmitted in a separate stream (e.g. by the encoder or a remote server) that is received by the decoder.

Although "in-stream" temporal signalling can provide certain advantages for compression, sending temporal data for a frame as a separate chunk of information, e.g. metadata, allows different and possibly more efficient entropy coding to be used for this information. In also allows temporal control and processing, e.g. as described above, to be performed without the need for received enhancement stream data. This allows the temporal buffer to be prepared and makes in-loop temporal decoding a simple additive process.

If the second temporal mode (e.g. if temporal processing is enabled) there may be three levels of temporal signalling:

At a first level, there may be per frame temporal signals. These may comprise a per frame temporal refresh signal. This may be a per frame refresh bit. If this is set the whole frame may be encoded without temporal prediction. A signal at this level may be used to encode the frame and may be signalled to the decoder.

At a second level, there may be per tile temporal signals. For example, these may be set per m by n tile, where m and n may be 32. Per tile temporal signals may comprise a per tile temporal refresh signal. This may be a per tile refresh bit. If the temporal refresh signal is set for a tile then that whole tile is encoded without temporal information. This level of temporal signalling may be used to encode the frame. In one case, it may not be explicitly signalled to the decoder; in this case, a tile refresh signal may be indicated by a first temporal signal at a third level as described below. In another case, a per tile temporal refresh signal may be explicitly signalled to the decoder.

At a third level, there may be per block or coding unit temporal signals. These may comprise a temporal mode signal for the block. This may be signalled to the decoder. If the per tile temporal refresh signal is set to 1, and the whole tile is encoded without temporal information (e.g. according to the first temporal mode), then this may be signalled to the decoder with a one-bit per block temporal signal for the first block, which may be set to 1. If the per tile temporal refresh signal is set to 0, then the first transform block in the tile (e.g. 2×2 or 4×4 block) may be encoded with temporal prediction (e.g. using the temporal buffer). In this case, the temporal signal per block may be set to 0 indicating temporal prediction is used (e.g. encoded according to the second temporal mode). If the per tile temporal refresh signal is set to 0, all other transform blocks in the tile may have a one-bit temporal signal that is set to 1 if the tile is encoded without temporal information and that is set to 0 if the transform coefficients from the previous frame at the same spatial position are first subtracted from the transform coefficients and difference is then quantized and passed to the entropy encoder (i.e. if the second temporal mode and the temporal buffer are to be used).

Figure 12D:
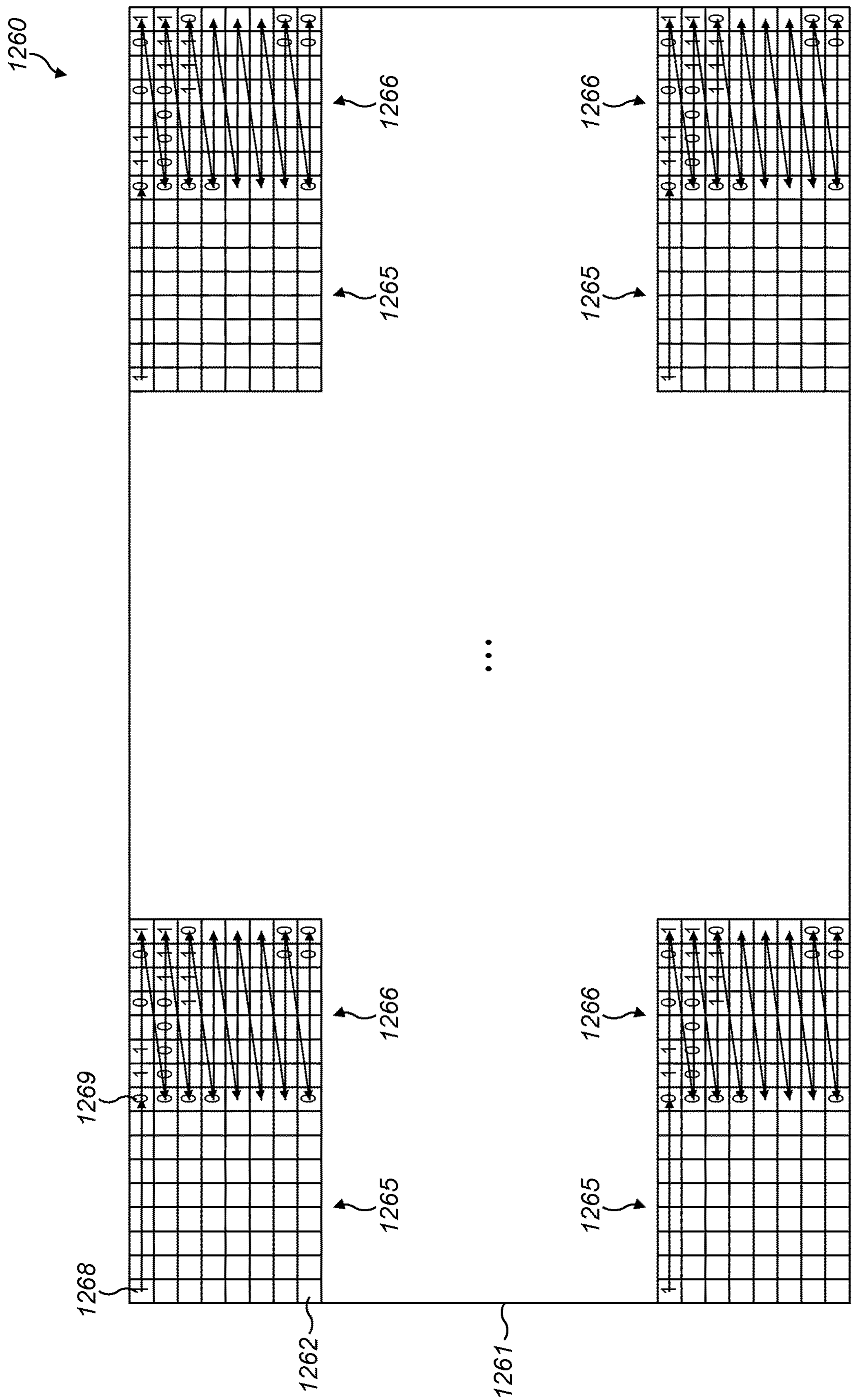

FIG. 12D shows a representation 1260 of temporal signals for 4×4 transform size (e.g. a DDS transform). A 2×2 transform size may be signalled in a corresponding manner. FIG. 12D shows a frame (or plane) 1261 of elements 1262 (e.g. derived from residuals) with a plurality of tiles 1265, 1266 (e.g. similar to FIG. 12C). Temporal signals are organized using the tiles 1265, 1266. For a 4×4 transform and a 32×32 tile, there are 8×8 temporal signals per tile (i.e. 32/4). For a 2×2 transform and a 32×32 tile, there are 16×16 temporal signals per tile (i.e. 32/2). The set of temporal signals for a frame of residuals, e.g. as shown in FIG. 12D, may be referred to as a "temporal map". The temporal map may be communicated from the encoder to the decoder.

FIG. 12D shows how a temporal signal for a first transform block 1268, 1269 within the tile 1265, 1266 may indicate whether the tile is to be processed within the first or second temporal mode. The temporal signal may be a bit indicating the temporal mode. If the bit is set to 1 for the first transform block, e.g. as shown for block 1268, this indicates that the tile 1265 is to be decoded according to the first temporal mode, e.g. without use of the temporal buffer. In this case, bits for the other transform blocks may not be set. This can reduce the amount of temporal data that is transmitted to the decoder. If the temporal signalling bit of the first transform block is set to 0, e.g. as is the case for block 1269, this indicates in FIG. 12D that the tile 1266 is to be decoded according to the second temporal mode, e.g. with temporal prediction and use of the temporal buffer. In this case, the temporal signalling bits of the remaining transform blocks are set to either 0 or 1, providing a level of temporal control at the (third) per block level.

Encoding Temporal Signals

In certain cases, the temporal signalling at the third level, as described above may be efficiently encoded if it is sent as metadata (e.g. sideband data).

In the case described above, and e.g. as shown in FIG. 12D, the temporal map for a frame may be sent to a run-length encoder (e.g. where a frame is a "picture" of encoded residuals). The temporal map may be efficiently encoded using run length encoding. The run-length encoding may be performed using the same run-length encoder used in the "Entropy Coding" component of one or more of the first and second enhancement streams (or a copy of this encoder process). In other cases, a different run-length encoder may be used.

If run-length encoding is to be used, then when the temporal map is received by the run-length encoder several operations may occur. In one case, if first temporal signal in the tile is 1, the temporal signalling for the rest of the tile is skipped. This is shown by the arrow from the first transform block with a value of 1. In this case, if the first temporal signal in the tile is 0, e.g. as shown for the subsequent tiles 1266 in FIG. 12D, the temporal signalling bits for the tile may be scanned line by line (e.g. along a first row of transform blocks before moving to the next row of transform blocks, at each step moving to a next column of transform blocks). In FIG. 12D, each tile has 8 rows and 8 columns, so for a 0 bit, an iteration is performed over the first 8 columns of the first row, and then the iteration is repeated for the same 8 columns for the second row, and so on until all the temporal signals for the transform blocks for that particular tile are encoded.

Figure 12E:
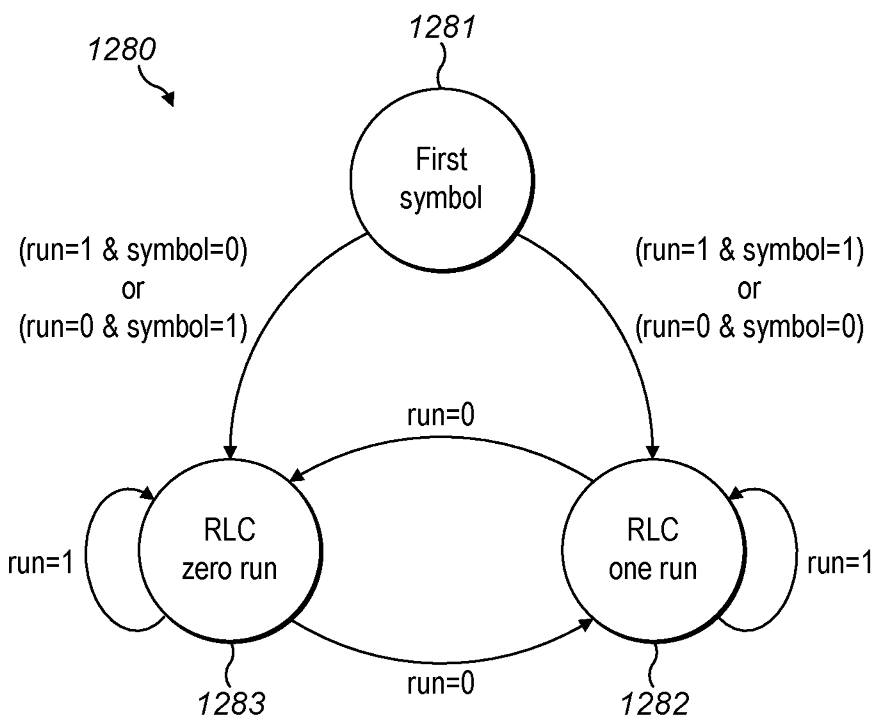
FIG. 12E is a schematic illustration showing an example state machine for run-length encoding.

In one case, a run-length encoder for the temporal signals may have two states, representing bit values of 0 and 1 (i.e. second temporal mode and first temporal mode). These may be used to encodes runs of 1s and runs of 0s. In one case, the run-length encoder may encode runs byte by byte, using 7 bits per byte to encode the run and bit 7 to encode either that more bits are needed to encode the run (set to 1) or that context is changed. By convention, the first symbol in the stream is always coded as 0 or 1, so decoder can initialize the state machine. A state machine 1280 that may be used is shown in FIG. 12E. The data shown in FIG. 12D may be referred to as a "temporal surface", e.g. a surface of temporal signalling data.

The state machine 1280 of FIG. 12E has a start state 1281 and then two subsequent states 1282 and 1283. A run length decoder for the temporal signalling may read the run length encoded data byte by byte (e.g. the data shown in FIG. 12D that is encoded by a run length encoder). By construction the state 1281 of the first byte of data may be guaranteed to be true value of the first symbol in the stream. The decoder uses the state machine 1280 to determine the state of the next byte of data. A byte of data may be encoded in a similar manner to the bytes 1080 and 1085 in FIGS. 10H and 10I. In these cases, a first subsequent state is a one-run state 1282. This may have the most significant bit (bit 7) as a run flag bit (e.g. similar to 1081 in FIG. 10H) and the remaining bits (bits 6 to 0—seven in total—similar to 1082 in FIG. 10H) as a data portion. The one-run state 1082 encodes 7 bits of a one run count. The run bit is high if more bits are needed to encode the count. From the first symbol state 1281, the state machine 1280 may move to the one-run state 1282 if the run and symbol bits are both 0 or both 1 and may move to a zero-run state if the run and symbol bits are different (e.g. 0 and 1 or 1 and 0). A run bit value of 0 may toggle between the one-run and zero-run states 1282 and 1283. The zero-run state 1283 may also have a byte structure similar to that shown in FIG. 10H or 10I). The zero-run state encodes 7 bits of a zero-run count. The run bit is high if more bits are needed to encode the count.

In one example, a run-length decoder may write 0 and 1 values into a temporal signal surface array TempSigSurface of the size (PictureWidth/nTbs, PictureHeight/nTbs) where nTbs is transform size (e.g. 2 or 4 in examples herein). If the value to write at the writing position (x,y) in the TempSigSurface is 1 and x %(32/nTbs)==0 and y %(32/nTbs)==0, the next writing position is moved to (x, y+32/nTbs) when y+32/nTbs<PictureWidth/nTbs, otherwise it is moved to (x+32/nTbs, 0). Run length encoding and decoding for the temporal signalling may be implemented in a similar manner to the run length encoding described for the residual data (e.g. with reference to FIGS. 10A to 10I).

In one case, the information generated by the run-length encoder may be sent to an entropy encoder. This may comprise a Huffman encoder. A Huffman encoder may write into a metadata stream two Huffman codes for each state and Huffman encoded values. The run-length encoding and entropy encoding may thus use existing entropy coding components and/or suitably adapted duplicates of these components (e.g. as suitably initialised threads). This may simplify the encoding and decoding, as components may be re-used with different configuration information. In certain cases, Huffman or prefix coding may be implemented in a similar manner for both residual data and temporal signalling data (e.g. as described with reference to FIGS. 10A to 10I).

Temporal Processing Flowchart Example

Figure 13A:
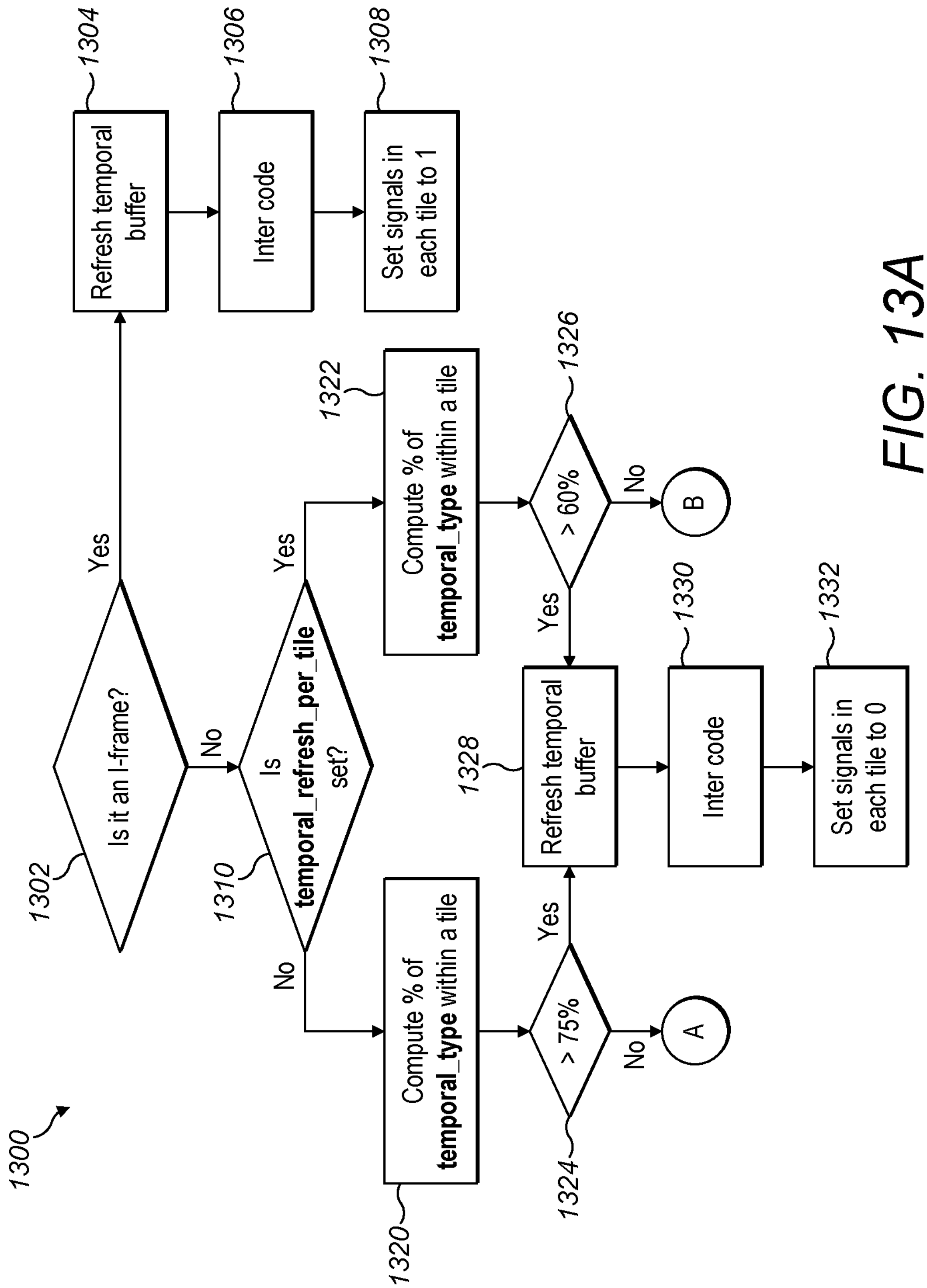
FIGS. 13A and 13B are two halves of a flow chart that shows a method of applying temporal processing according to an example.
Figure 13B:
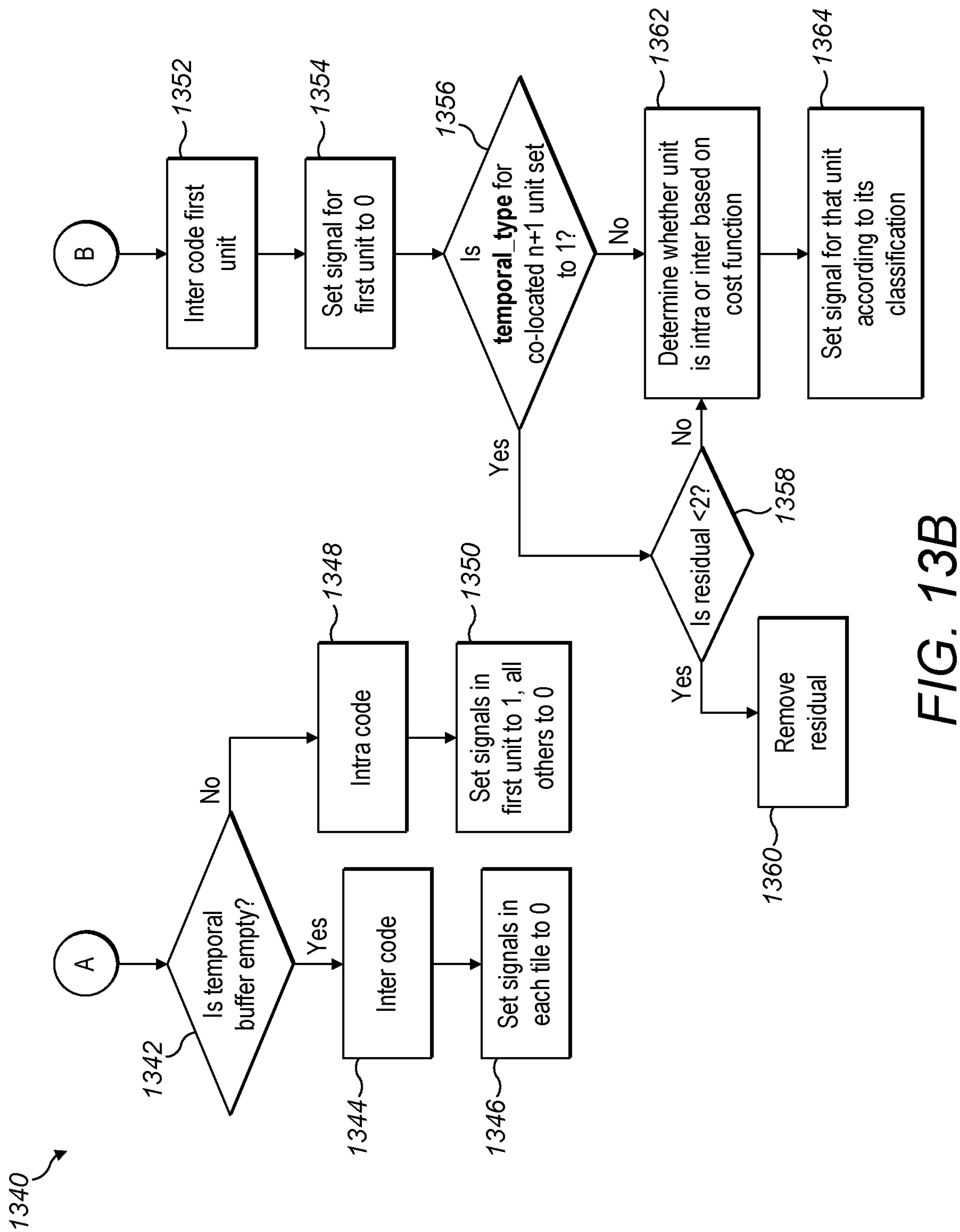

FIGS. 13A and 13B are two halves 1300, 1340 of a flow chart showing a method of temporal processing according to an example. The method of temporal processing may be performed at the encoder. The method of temporal processing may implement certain processes described above. The method of processing may be applied to the frame of residuals shown in FIG. 12C.

At a first block 1302, a check is made as to whether a current frame of residuals is an I-frame (i.e. an intra-coded frame). If the current frame of residuals is an I-frame then the temporal buffer is refreshed at block 1304, and the current frame of residuals is encoded as an Inter-frame at block 1306 with per picture signalling set to 1 at block 1308. If the current frame of residuals is determined not to be an I-frame at block 1302, then a first tile is selected and a check is made at block 1310 to determine whether the temporal_refresh_per_tile flag is set (e.g. has a value of 1). This may be the TR variable 1256 as shown on the right-hand-side of FIG. 12C. If the temporal_refresh_per_tile flag is set, then at a next block 1320 the temporal_type flags of the units within the current tile are analysed. For example, for a first tile, these may be the temporal_type flags 1255 of the units shown on the right-hand-side of FIG. 12C. At the next block 1324, a percentage of I or first temporal mode flag values may be counted (e.g. values of '1'). If these are greater than 75%, then the temporal buffer is refreshed at block 1328 and the tile is inter coded at block 1330, with the temporal signals in each tile set to 0 at block 1332. If these are less than 75%, the method proceeds to FIG. 13B (e.g. via node A). A similar process takes place if the temporal_refresh_per_tile is not set (e.g. has a value of 0), where a check at block 1322 is made to determine whether more than 60% of the temporal_type flags of the units within the current tile are set to an I or first temporal mode (e.g. have values of '1'). If this is the case, a similar process as per the previous 75% check takes place (e.g. blocks 1328 to 1332 are performed). If less than 60% of the temporal_type flags of the units within the current tile are set to an I or first temporal mode, then the method again proceeds to FIG. 13B (e.g. via node B).

Turning to the second half 1340 shown in FIG. 13B, and starting with the node A at the left-hand-side of FIG. 13B, if less than 75% of units have an I or first temporal mode then a check at block 1342 is made as to whether the temporal buffer is empty. If the temporal buffer is empty, the units within the tile are inter coded at block 1344 and the temporal signals are set to 0 for the units in the tile at block 1346. If the temporal buffer is not empty, then the units within the tile are intra coded at block 1348. In this case, then at block 1350, the temporal signal for the first unit is set to 1 and the temporal signal for all other units in the tile are set to 0.

Now turning to the right-hand-side of FIG. 13B and starting at node B, if less than 60% of units have an I or first temporal mode, then the first unit in the current tile is inter coded at block 1352 and the temporal signal for the first unit is set to 0 at block 1354. Then a check is made at block 1356 as to whether a temporal_type for a co-located n+1 unit (i.e. co-located unit in a next frame) is set to 1. If so and the residual value is determined to be less than 2 at block 1358 then the residual is removed at block 1360, e.g. by setting the residual value to 0. If the residual value is not less than 2 at block 1358, or if the co-located unit is not set to 1, then a determination is made at block 1362 as to whether the next unit in the tile is to be intra or inter coded based on a cost function. The temporal signal for the next unit may be set according to the cost function classification at block 1364. This may be repeated for the remaining units in the tile. The method, e.g. from the check on temporal_refresh_per_tile, may be repeated for each tile in the frame.

Cloud Configuration

In certain examples, an encoder (or encoding process) may communicate with one or more remote devices. The encoder may be an encoder as shown in any one of FIGS. 1, 3A and 3B or described in any other of the examples.

Figure 14A:
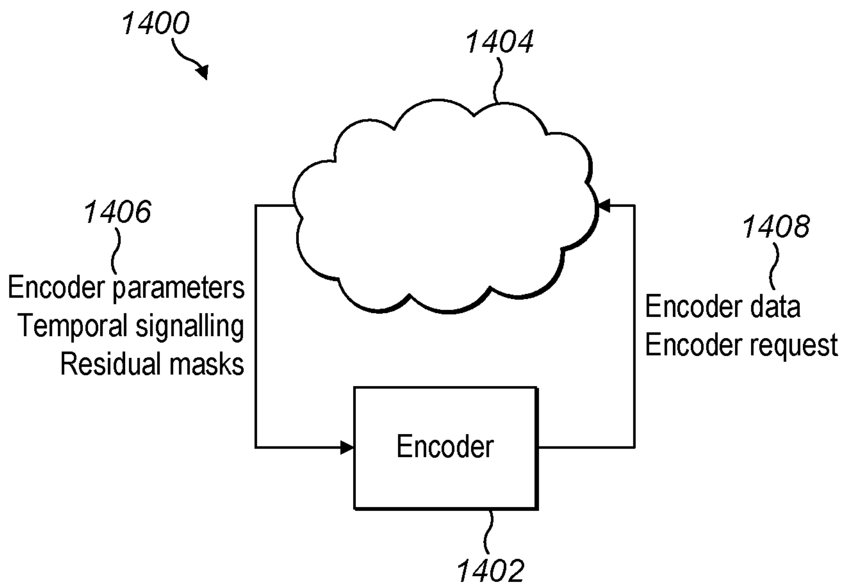
FIGS. 14A to 14C are schematic illustrations showing example aspects of cloud control.

FIG. 14A shows an example 1400 of an encoder 1402 communicating across a network 1404. In one case, the encoder 1402 may receive configuration data 1406 across the network 1404 and/or transmit configuration data 1408 across the network 1404. In the example of FIG. 14A, the encoder receives configuration data 1406 in the form of one or more of encoder parameters, temporal signalling and residual masks. The temporal signalling may comprise any of the temporal signalling discussed herein. Encoder parameters may comprise values for one or more parameters that control the encoder. In one case, encoder parameters may include parameters for one or more of the base encoder, the processing components for the level 1 stream and the processing components for the level 2 stream. The encoder parameters may be used to configure one or more of a stream resolution, quantization, sequence processing, bitrates and codec for each stream. Residual masks may comprise a weighting, e.g. from 0 to 1, to apply to sets of residuals, e.g. to apply to 2×2 or 4×4 groupings (i.e. blocks) of residuals. The residual masks may indicate a priority for delivery of the blocks to the decoder and/or for encoding. In another case, the residual masks may comprise a weighting that control processing of the blocks, e.g. certain blocks may be visually enhanced or weighted. Weighting may be set based on a class (e.g. a label or numeric value) applied to one or more blocks of residuals.

In certain cases, the encoder 1402 may be adapted to perform encodings at a plurality of bitrates. In this case, the encoder parameters may be supplied for each of the plurality of bitrates. In certain cases, the configuration data 1406 that is received from the network 1404 may be provided as one or more of global configuration data, per frame data and per block data. In examples, residual masks and temporal signalling may be provided on a per frame basis. For example, the plurality of bitrates may be set based on an available capacity of a communications channel, e.g. a measured bandwidth, and/or a desired use, e.g. use 2 Mbps of a 10 Mbps downlink channel.

The configuration data 1408 communicated from the encoder 1402 may comprise one or more of a base codec type, a set of required bitrates and sequence information. The base codec type may indicate a type of base encoder that is used for a current set of processing. In certain cases, different base encoders may be available. In one case, the base encoder may be selected based on a received base codec type parameter; in another case, a base codec type may be selected based on local processing within the encoder and communicated across the network. The set of bitrates that are required may indicate one or more bitrates that are to be used to encode one or more of the base stream and the two enhancement streams. Different streams may use different bitrates. The enhancement streams may use additional bandwidth if available; e.g. if bandwidth is not available then bandwidth may be used by the encoded base and level 1 streams to provide a first level of quality at a given bitrate; the encoded level 2 stream may then use a second bitrate to provide further improvements. This approach may also be applied differentially to the base and level 2 streams in place of the base and level 1 streams.

In one case, the encoder parameters received across the network 1404 may indicate one or more of a residual mode and a temporal mode to be applied by the encoder 1402. The encoder parameters may indicate modes for each stream separately or indicate a common mode for both enhancement streams. The residual mode parameters may be received by the residual mode selection components 150, 350 shown in FIGS. 1, 3A and 3B. In certain cases, the residual mode selection components may be omitted and the residual mode parameters may be received by other components of the encoder directly, e.g. the L-1 or L-2 encoding components 122, 142 in FIG. 1, or the RM L-1 control and/or RM L-2 selection/ranking components 321, 340 in FIGS. 3A, 3B may receive the residual mode parameters from a cloud interface of the encoder 1402. In certain cases, each residual or temporal mode may be indicated by an integer value, e.g. '1' for temporal processing and/or a residual mode 2 where only certain coefficients are retained following the transform operation. The residual mode may indicate what form of predicted coefficient processing is to be applied, e.g. whether certain coefficients are to be predicted, such as using data from a lower resolution stream.

In one case, the encoder 1402 may have different configuration settings relating to a remote or cloud configuration. In one mode, which may be a "default" mode, the encoder may be configured to make a remote program call across the network to retrieve initial configuration parameters to perform encoding as described herein. In another mode, which may be a "custom" mode, the encoder 1402 may retrieve local parameter values that indicate a particular user configuration, e.g. a particular set of tools that are used by the encoder and/or configurations for those tools. In one case, the encoder 1402 may have different modes which indicate which parameters are to be retrieved from a remote device and which parameters are to be retrieved from local storage.

In one case, the temporal signalling may indicate certain processing for a frame of video data, e.g. as described above. The temporal signalling may, for example, indicate a temporal mode for a particular frame as described above (e.g. mode 1 or 0 indicating an intra or inter frame). The temporal signalling may be provided for one or both of the enhancement streams.

Figure 14B:
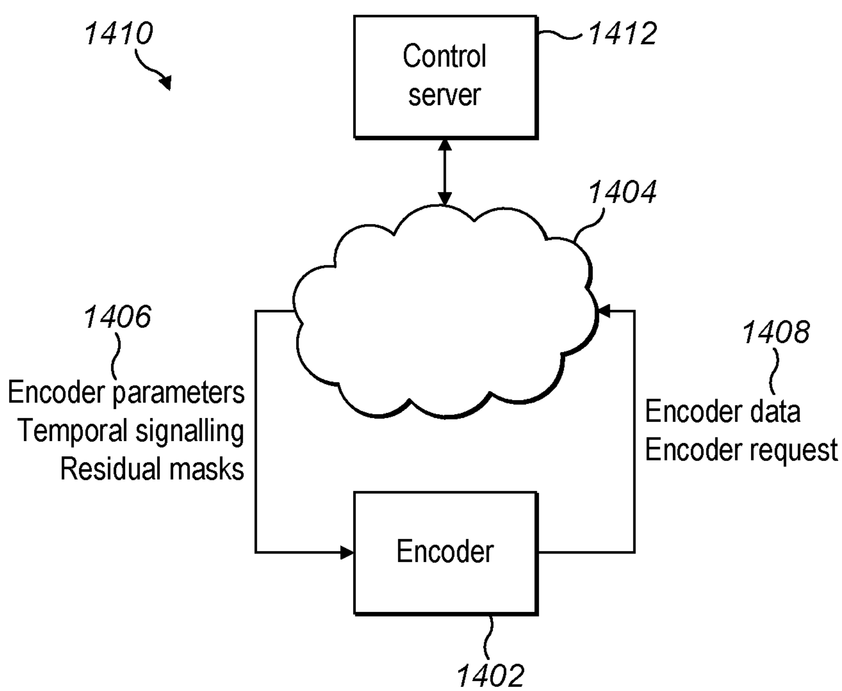

FIG. 14B shows that the encoder 1402 may send and/or receive configuration data 1406, 1408 to and/or from a remote control server 1412. The control server 1412 may comprise a server computing device that implements an application programming interface for receiving or sending data. For example, the control server may implement a RESTful interface, whereby data may be communicated by (secure) HyperText Transfer Protocol (HTTP) requests and responses. In another case, a side channel implemented using a specific communication protocol (e.g. at the transport or application layer) may be used for communications between the control server 1412 and the encoder 1402 over the network 1404. The network 1404 may comprise one or more wired and/or wireless networks, including local and wide area networks. In one case, the network may comprise the Internet.

Figure 14C:
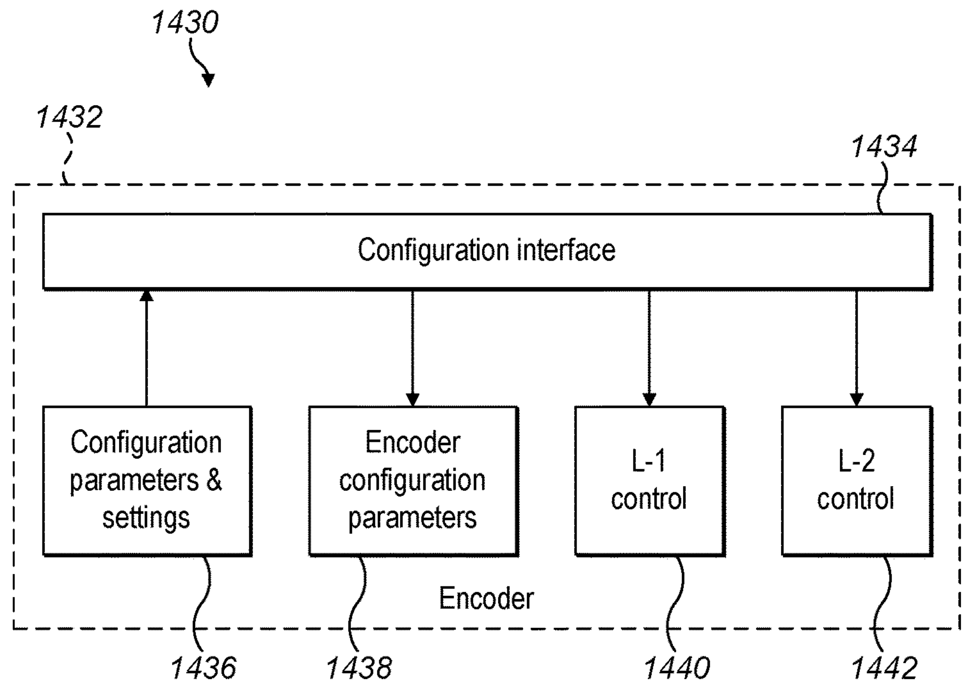

FIG. 14C shows how an encoder 1432 (which may implement any of the described encoders including encoder 1402 in FIGS. 14A and 14B) may comprise a configuration interface 1434 that is configured to communicate over the network, e.g. with the remote control server 1412. The configuration interface 1434 may comprise a hardware interface, e.g. an Ethernet and/or wireless adapter, and/or software to provide a communications stack to communicate over one or more communications networks. In FIG. 14C, configuration parameters and settings 1436 that are used and/or stored by the encoder 1432 are communicated over the network 1404 using the configuration interface 1434. Encoder configuration parameters 1438, e.g. that may be stored in one or more memories or registers, are received from the configuration interface. In one case, the encoder configuration parameters 1438 may control one or more of down-sampling, base encoder and base decoder components within the encoder 1432, e.g. as shown in the Figures. The configuration interface 1434 also communicates data to a L-1 stream control component 1440 and a L-2 stream control component 1442. These components may configure tool use on each enhancement stream. In one case, the L-1 and the L-2 stream control components 1440, 1442 control one or more of residual mode selection, transform, quantize, residual mode control, entropy encoding and temporal processing components (e.g. as shown in the Figures and described herein).

Using a cloud configuration as described herein may provide implementation advantages. For example, an encoder may be controlled remotely, e.g. based on network control systems and measurements. An encoder may also be upgraded to provide new functionality by upgrading firmware that provides the enhancement processing, with additional data, e.g. based on measurements or pre-processing being supplied by one or more remote data sources or control servers. This provides a flexible way to upgrade and control legacy hardware devices.

Residual Mode Selection

As described above, e.g. in relation to FIGS. 3A and 3B, certain examples may implement different residual processing modes. For example, in FIG. 3A, a residual mode ranking component 350 controls residual mode selection components 321, 340 in each of the level 1 and level 2 enhancement streams; in FIG. 3B, a residual mode selection component 350 controls residual mode ranking components 321, 340 in each of the level 1 and level 2 enhancement streams. In general, an encoder may comprise a residual mode control component that selects and implements a residual mode and residual mode implementation components that implements processing for a selected residual mode upon one or more enhancement streams.

In one example, once the residuals have been computed, the residuals may be processed to decide how the residuals are to be encoded and transmitted. As described earlier, here residuals are computed by comparing an original form of an image signal with a reconstructed form of an image signal. For example, in one case, residuals for a level 2 enhancement stream are determined by subtracting an output of the up-sampling (e.g. in FIGS. 1, 3A and 3B) from an original form of an image signal (e.g. the input video 120, 302 as indicated in the Figures). The input to the up-sampling may be said to be a reconstruction of a signal following a simulated decoding. In another case, residuals for an level 1 enhancement stream are determined by subtracting an image stream output by the base decoder from a down-sampled form of the original image signal (e.g. the output of the down-sampling component 104, 304 in FIGS. 1, 3A and 3B).

To process residuals, e.g. in a selected residual mode, the residuals may be categorized. For example, residuals may be categorized in order to select a residual mode. A categorization process of the residuals may be performed based, for example, on certain spatial and/or temporal characteristic of the input image.

In one example, the input image is processed to determine, for each element (e.g., a pixel or an area including multiple pixels) and/or group of elements whether that element and/or group of elements has certain spatial and/or temporal characteristics. For example, the element is measured against one or more thresholds in order to determine how to classify it against respective spatial and/or temporal characteristics. Spatial characteristics may include the level of spatial activity between specific elements or groups of elements (e.g., how many changes exists between neighbouring elements), or a level of contrast between specific elements and/or between groups of elements (e.g., how much a group of element differs from one or more other groups of elements). The spatial characteristics may be a measure of a change in a set of spatial directions (e.g. horizontal and/or vertical directions for a 2D planar image). Temporal characteristics may include temporal activity for a specific element and/or group of elements (e.g., how much an element and/or a group of elements differ between collocated elements and/or group of elements on one or more previous frames). The temporal characteristics may be a measure of a change in a temporal direction (e.g. along a time series). The characteristics may be determined per element and/or element group; this may be per pixel and/or per 2×2 or 4×4 residual block.

The categorization may associate a respective weight to each element and/or group of elements based on the spatial and/or temporal characteristics of the element and/or group of elements. The weight may be a normalized value between 0 and 1.

In one residual mode, a decision may be made as to whether to encode and transmit a given set of residuals. For example, in one residual mode, certain residuals (and/or residual blocks—such as the 2×2 or 4×4 blocks described herein) may be selectively forwarded along the level 1 and/or level 2 enhancement processing pipelines by the RM L-x ranking components and/or the RM L-x selection components as shown in FIGS. 3A and 3B. Put another way, different residual modes may have different residual processing in the level 1 and/or level 2 encoding components 122, 142 in FIG. 1. For example, in one residual mode, certain residuals may not be forwarded for further level 1 and/or level 2 encoding, e.g. may not be transformed, quantized and entropy encoded. In one case, certain residuals may not be forwarded by setting the residual value to 0 and/or by setting a particular control flag relating to the residual or a group that includes the residual.

In one residual mode, a binary weight of 0 or 1 may be applied to residuals, e.g. by the components discussed above. This may correspond to a mode where selective residual processing is "on". In this mode, a weight of 0 may correspond to "ignoring" certain residuals, e.g. not forwarding them for further processing in an enhancement pipeline. In another residual mode, there may be no weighting (or the weight may be set to 1 for all residuals); this may correspond to a mode where selective residual processing is "off". In yet another residual mode, a normalised weight of 0 to 1 may be applied to a residual or group of residuals. This may indicate an importance or "usefulness" weight for reconstructing a video signal at the decoder, e.g. where 1 indicates that the residual has a normal use and values below 1 reduce the importance of the residual. In other cases, the normalised weight may be in another range, e.g. a range of 0 to 2 may give prominence to certain residuals that have a weight greater than 1.

In the residual modes described above, the residual and/or group of residuals may be multiplied by an assigned weight, where the weight may be assigned following a categorization process applied to a set of corresponding elements and/or groups of elements. For example, in one case, each element or group of elements may be assigned a class represented by an integer value selected from a predefined set or range of integers (e.g. 10 classes from 0 to 9). Each class may then have a corresponding weight value (e.g. 0 for class 0, 0.1 for class 1 or some other non-linear mapping). The relationship between class and weight value may be determined by analysis and/or experimentation, e.g. based on picture quality measurements at a decoder and/or within the encoder. The weight may then be used to multiply a corresponding residual and/or group of residuals, e.g. a residual and/or group of residuals that correspond to the element and/or group of elements. In one case, this correspondence may be spatial, e.g. a residual is computed based on a particular input element value and the categorisation is applied to the particular input element value to determine the weight for the residual. In other words, the categorization may be performed over the elements and/or group of elements of the input image, where the input image may be a frame of a video signal, but then the weights determined from this categorization are used to weight co-located residuals and/or group of residuals rather than the elements and/or group of elements. In this way, the characterization may be performed as a separate process from the encoding process, and therefore it can be computed in parallel to the encoding of the residuals process.

Example of Residual Mode Processing

Figure 15:
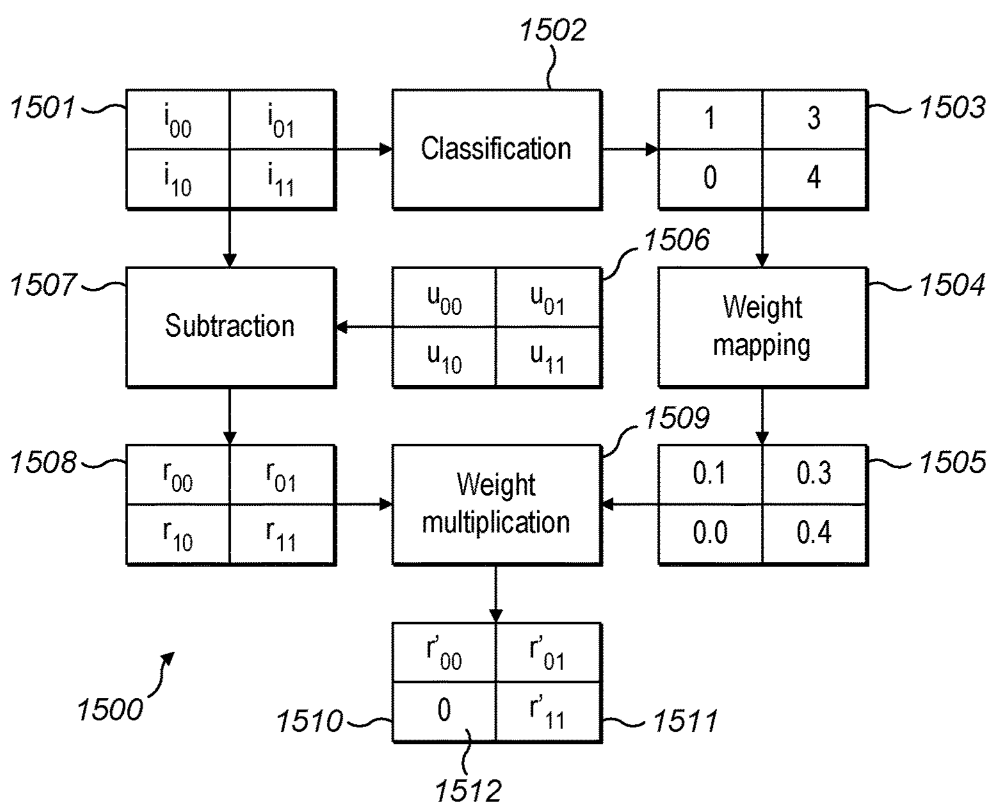
FIG. 15 is a schematic illustration showing residual weighting according to an example.

FIG. 15 shows an example of a residual mode. This example relates to a level 2 stream but a similar set of components may be provided for a level 1 stream. A set of input image elements 1501 are classified via a classification component 1502 to generate a set of class indications 1503 (e.g. in a range of 0 to 4). The class indications 1503 are then used by a weight mapping component 1504 to retrieve a set of weights 1505 associated with the class indications 1503. In parallel, a set of reconstructed up-sampled elements $u_{ij}$ 1506 are subtracted from the input image elements 1501 to generate an initial set of residuals $r_{ij}$ 1508. These residuals 1508 and the set of weights 1505 are then input to a weight multiplication component 1509 that multiplies the residuals 1508 by the set of weights 1505 to output a set of modified residuals $r'_{ij}$ 1510. FIG. 15 shows that the residual mode selection may involve filtering a subset of residual values 1512 (e.g. by multiplying them by a 0 weight) and passing through or modifying another subset of residual values 1511 (e.g. where there are non-zero weights).

In certain cases, the characterization may be performed at a location remote from the encoder and communicated to the encoder. For example, a pre-recorded movie or television show may be processed once to determine a set of weights for a set of residuals or group of residuals. These weights may be communicated over a network to the encoder, e.g. they may comprise the residual masks described with reference to FIGS. 14A to 14C.

In one case, instead of, or as well as weighting the residuals, the residuals may be compared against one or more thresholds derived from the categorization process. For example, the categorisation process may determine a set of classes that have an associated set of weights and thresholds, or just an associated set of thresholds. In this case, the residuals are compared with the determined thresholds and residuals that falls below a certain one or more thresholds are discarded and not encoded. For example, additional threshold processing may be applied to the modified residuals 1510 from FIG. 15 and/or the weight mapping and weight multiplication components may be replaced with threshold mapping and threshold application stages. In general, in both cases, residuals are modified for further processing based on a categorisation process, where the categorisation process may be applied to corresponding image elements.

The above described methods of residual mode processing may be applied at the encoder but not applied at the decoder. This thus represents a form of asymmetrical encoding that may take into account increased resources at the encoder to improve communication. For example, residuals may be weighted to reduce a size of data transmitted between the encoder and decoder, allowing increases of quality for constrained bit rates (e.g. where the residuals that are discarded have a reduced detectability at the decoder).

Predicted Averages

As described herein, a residual element may be defined as a difference between an input frame element and a corresponding/co-located up-sampled element, as indicated below:

$$r_{ij}=i_{ij}-u_{ij}$$

At the encoder, the residuals are transformed before being quantized, entropy coded and transmitted to the decoder. In particular, the encoder uses two possible transforms, the first one called Directional Decomposition (DD), the other called Directional Decomposition Squared (DDS). More details on these transforms are also included in patent applications PCT/EP2013/059847 and PCT/GB2017/052632, which are included herein by reference.

Figure 16A:
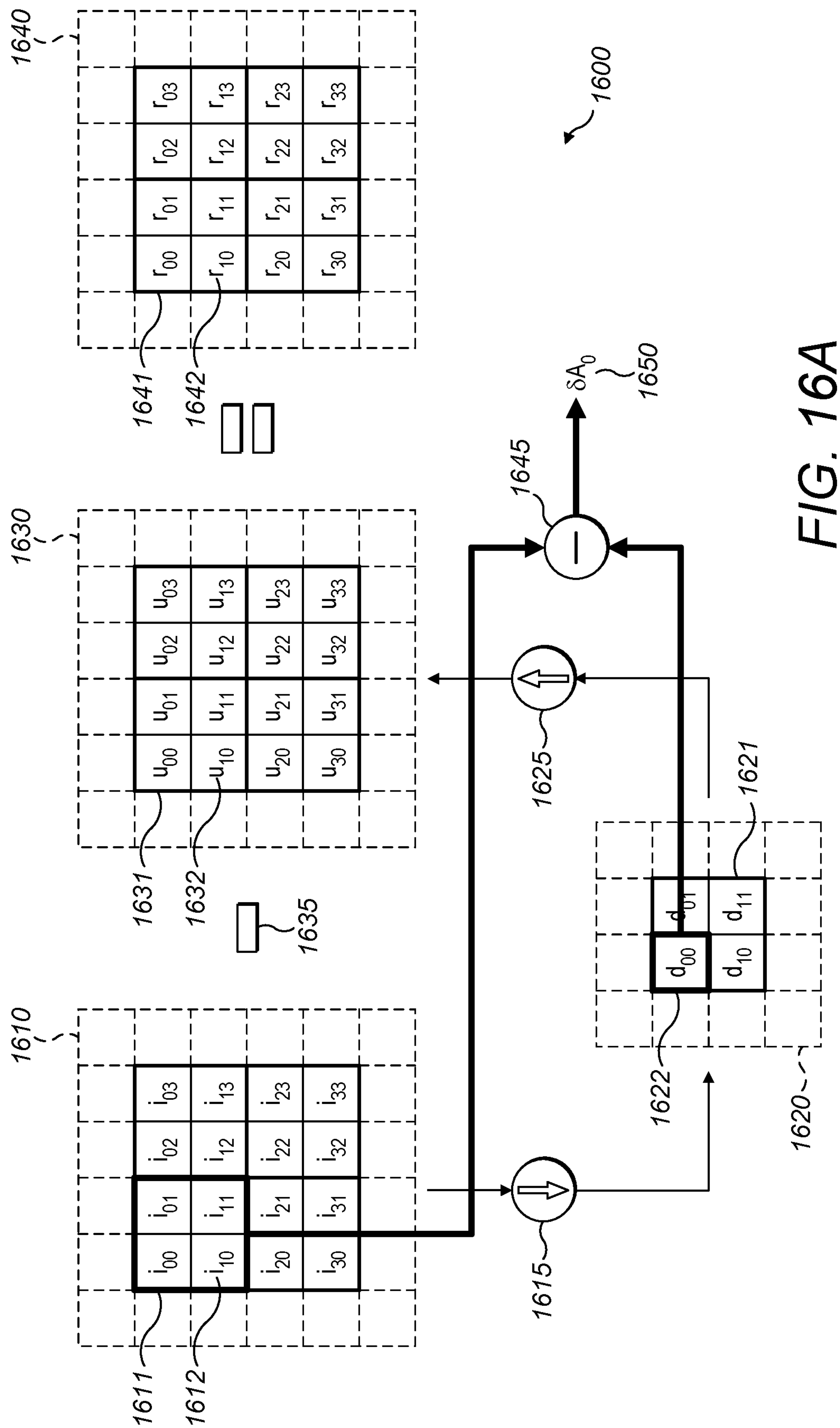
FIGS. 16A to 16D are schematic illustrations showing calculation of predicted average elements according to various examples.

FIG. 16A shows a process 1600 involving a DD transform at the encoder. In the case of a DD, a transform is applied to each 2×2 block of a frame or plane of input data 1610. By reference to FIG. 16A, four 2×2 blocks 1611 of input values 1612 are presented. These are down-sampled by a down-sampling process 1615 (e.g. similar to the down-sampling component 104, 304 of FIGS. 1 and 3A/B) to generate a down-sampled frame or plane 1620, with element values 1621. The down-sampled frame 1620 is then up-sampled by up-sampling process 1625 (e.g. as shown via components 134, 334 in FIGS. 1 and 3A/3B). This results in an up-sampled frame 1630, which also has blocks 1631 of up-sampled values 1632, where, in FIG. 16A, one down-sampled value 1622 is up-sampled to generate four up-sampled values 1632 (i.e. one up-sampled block 1631).

In FIG. 16A, the up-sampled frame 1630 is subtracted 1635 from the input frame 1610 to generate a frame of residuals 1640, which comprise blocks 1641 of residual values 1642.

In a transformation, the following coefficients are calculated for each block of residuals 1641 (the expression below, for simplicity, refers to the left uppermost 2×2 block, but similar expressions can be easily derived for the other blocks):

$$A_0 = \frac{1}{4}\sum_{i,j=0}^{1} r_{ij} = \frac{1}{4}(r_{00} + r_{01} + r_{10} + r_{11})$$

$$H_0 = \frac{1}{4}(r_{00} - r_{01} + r_{10} - r_{11})$$

$$V_0 = \frac{1}{4}(r_{00} + r_{01} - r_{10} - r_{11})$$

$$D_0 = \frac{1}{4}(r_{00} - r_{01} - r_{10} + r_{11})$$

Looking now at an Average component ($A_0$) this can be decomposed as follows:

$$A_0 = \frac{1}{4}\sum_{i,j=0}^{1} r_{ij} = \frac{1}{4}\sum_{i,j=0}^{1} i_{ij} - \frac{1}{4}\sum_{i,j=0}^{1} u_{ij}$$

It is noted that each up-sampled 2×2 block 1631 with up-sampled values 1632 as shown in FIG. 16A is obtained from an up-sampling operation starting from the corresponding lower resolution element 1622. This lower resolution element 1622 may be referred to as a "controlling element". In the case of left uppermost block, that element would be $d_{00}$.

Accordingly, $d_{00}$ may be can added and deleted as follows to obtain:

$$A_0 = \frac{1}{4}\sum_{i,j=0}^{1} i_{ij} - \frac{1}{4}\sum_{i,j=0}^{1} u_{ij} - d_{00} + d_{00}$$

Which could then be grouped as follows:

$$A_0 = \left(\frac{1}{4}\sum_{i,j=0}^{1} i_{ij} - d_{00}\right) - \left(\frac{1}{4}\sum_{i,j=0}^{1} u_{ij} - d_{00}\right) = \delta A_0 + PA_0$$

whereas $\delta A_0$ (delta average) is shown as 1650 corresponds to the difference 1645 between the average of the elements in the input image (e.g. of block 1611) and the controlling element 1622. The predicted average $PA_0$ corresponds to the difference between the average of the up-sampled elements and the controlling element. This may be computed at a decoder.

Figure 16B:
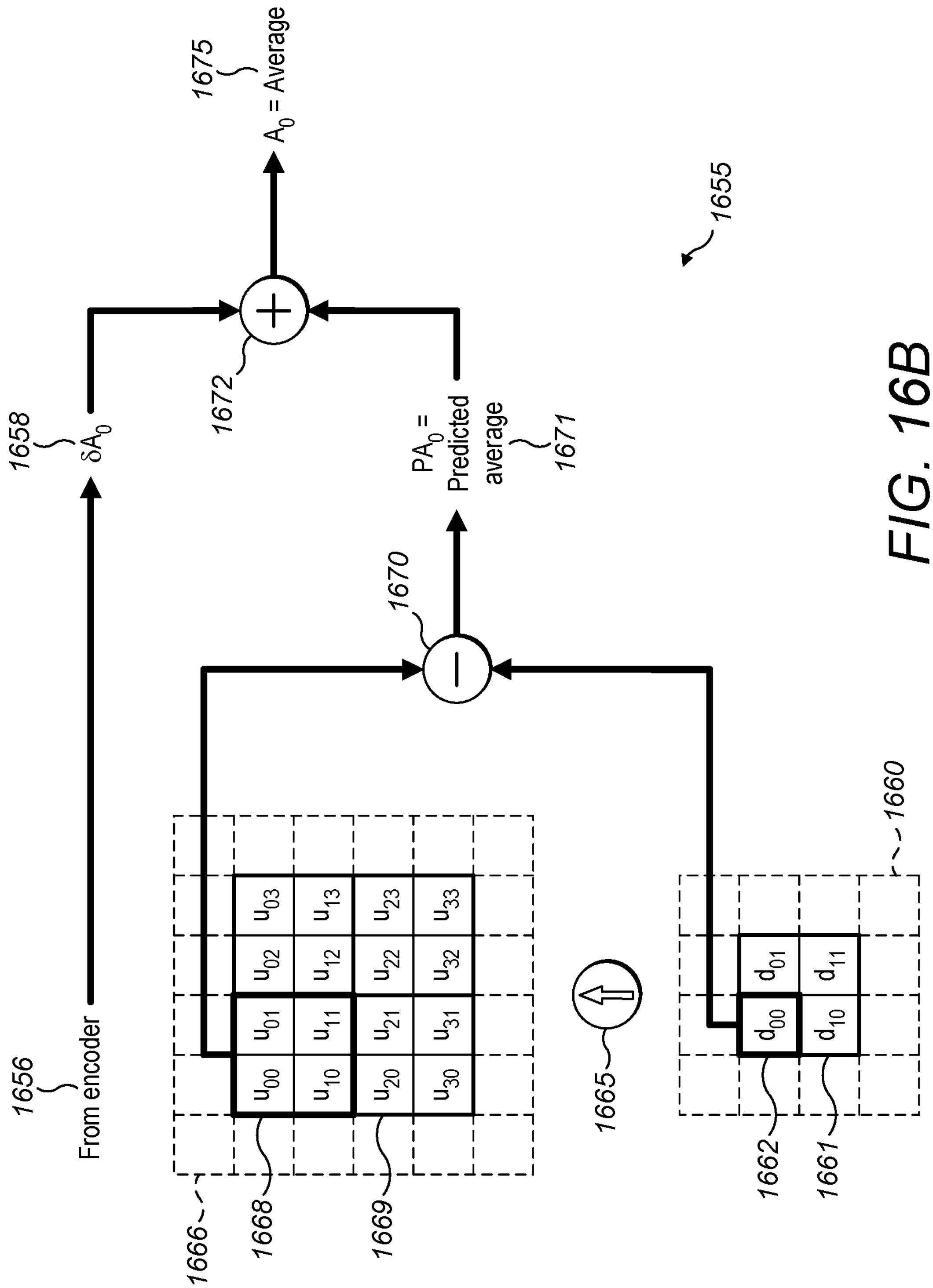

FIG. 16B sets out a corresponding process 1655 at the decoder. Data from the encoder 1656 communicates the δA value 1658. In parallel, a level 1 resolution frame 1660 is reconstructed and up-sampled 1665 to form an up-sampled frame 1666. FIG. 16B shows a block 1661 of four lower resolution elements 1662. These elements correspond to a reconstructed video signal. The up-sampled frame 1666 is shown with four blocks 1668 of four up-sampled elements 1669. The decoder is capable of calculating the PA using the up-sampled elements 1668 and the controlling element 1662 obtained from decoding the lower resolution frame (e.g., the frame obtained from decoding a base encoded with a separate codec such as AVC, HEVC, etc.). In FIG. 16B, the predicted average 1671 is determined as the difference 1670 of the average of the block of up-sampled elements 1668 and the controlling element 1662. The original average 1675 may then be reconstructed by summing 1672 the δA value 1658 and the predicted average value PA 1671. This is also why this element is called "predicted average" in that it is the component of the Average that can be predicted at the decoder. The decoder would then need only the δA, which is provided by the encoder since there information about the input image frame is known at the encoder.

Accordingly, when using the DD transform type, the decoder is able to compute the predicted average using one or more up-sampled elements and a corresponding element from a lower resolution image ("controlling element"), said corresponding element being used to generate said one or more up-sampled elements. Then, it is able to decode a value received from an encoder, said value representing the difference between one or more elements in a reference (e.g., input) image and the controlled element. It is then able to combine said predicted average and decoded value to generate one of the transformed coefficients, namely the average coefficient.

When using the DD transform type, the encoder is able to compute a value to be transmitted to the decoder, said value representing the difference between one or more elements in a reference (e.g., input) image and a corresponding element from a lower resolution image ("controlling element"). The encoder is able to generate said controlling element by replicating the operations which an encoder would need to perform in order to reconstruct the image. In particular, the controlling elements correspond to the element which the decoder would use in order to generate said one or more up-sampled elements. The encoder is then able to further transmit the H, V and D coefficients to the decoder.

In the case of a DDS transform, the operations are slightly modified. The DDS operates over a 4×4 blocks of residuals and generate 16 transformed coefficients. A DDS could be implemented in at least two ways. Either directly, by summing and subtracting the 16 residuals in the 4×4 blocks—see below:

$$DDS = (AA\ AH\ \ldots\ VD\ DD) = \begin{pmatrix} & \cdots & \\ \vdots & \ddots & \vdots \\ & \cdots & \end{pmatrix}\begin{pmatrix} r_{00} \\ r_{01} \\ \vdots \\ r_{32} \\ r_{33} \end{pmatrix}$$

Alternatively, and in a more efficient manner, it can be implemented as a "two-step" transform by first performing a DD transform over each 2×2 blocks of residuals to generate a 2×2 block of DD coefficients, and then applying a second DD transform over First Step $$DD_{00} = (A_{00}\ H_{00}\ V_{00}\ D_{00}) = \begin{pmatrix} 1 & 1 & 1 & 1 \\ 1 & -1 & 1 & -1 \\ 1 & 1 & -1 & -1 \\ 1 & -1 & -1 & 1 \end{pmatrix}\begin{pmatrix} r_{00} \\ r_{01} \\ r_{10} \\ r_{11} \end{pmatrix}$$

-continued $$DD_{01} = (A_{01}\ H_{01}\ V_{01}\ D_{01}) = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} r_{02} \\ r_{03} \\ r_{12} \\ r_{13} \end{pmatrix}$$

$$DD_{10} = (A_{10}\ H_{10}\ V_{10}\ D_{10}) = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} r_{20} \\ r_{21} \\ r_{30} \\ r_{31} \end{pmatrix}$$

$$DD_{11} = (A_{11}\ H_{11}\ V_{11}\ D_{11}) = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} r_{22} \\ r_{23} \\ r_{32} \\ r_{33} \end{pmatrix}$$

Second Step $$DDS = \begin{pmatrix} AA & AH & AV & AD \\ HA & HH & HV & HD \\ VA & VH & VV & VD \\ DA & DH & DV & DD \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} A_{00} & H_{00} & V_{00} & D_{00} \\ A_{01} & H_{01} & V_{01} & D_{01} \\ A_{10} & H_{10} & V_{10} & D_{10} \\ A_{11} & H_{11} & V_{11} & D_{11} \end{pmatrix}$$

As it can be seen, in the DDS case there are four "averages" coefficients, one for each directions: (1) AA, or average of the average coefficients; (2) AH, or average of the horizontal coefficients; (3) AV, or average of the vertical coefficients; and (4) AD, or average of the diagonal coefficients.

Similarly to the DD transform, each of these average coefficients can be decomposed into a delta average (to be computed by the encoder and decoded at the decoder) and a predicted average (to be computed by the decoder), as follows:

$$AA=\delta AA+PAA$$

$$AH=\delta AH+PAH$$

$$AV=\delta AV+PAV$$

$$AD=\delta AD+PAD$$

Accordingly, there are four delta averages to be computed by the encoder, namely δAA, δAH, δAV and δAD.

Using the two-step approach defined above, the four delta averages can be computed as follows:

$$\delta AA = \frac{1}{4}\sum_{i,j=0}^{1} \delta A_{ij}$$

$$\delta AH = \frac{1}{4}\sum_{i,j=0}^{1} \delta H_{ij}$$

$$\delta AV = \frac{1}{4}\sum_{i,j=0}^{1} \delta V_{ij}$$

$$\delta AD = \frac{1}{4}\sum_{i,j=0}^{1} \delta D_{ij}$$

On the other hand, the various predicted averages can be computed as follows:

$$PAA = \frac{1}{4}\sum_{i,j=0}^{1} PA_{ij}$$

$$PAH = \frac{1}{4}\sum_{i,j=0}^{1} PH_{ij}$$

$$PAV = \frac{1}{4}\sum_{i,j=0}^{1} PV_{ij}$$

$$PAD = \frac{1}{4}\sum_{i,j=0}^{1} PD_{ij}$$

where $$PA_{ij} = d_{ij} - \frac{1}{4}(u_{(2i)(2j)} + u_{(2i+1)(2j)} + u_{(2i+1)(2j)} + u_{(2i+1)(2j+1)})$$

$$PH_{ij} = d_{ij} - \frac{1}{4}(u_{(2i)(2j)} - u_{(2i+1)(2j)} + u_{(2i+1)(2j)} - u_{(2i+1)(2j+1)})$$

$$PV_{ij} = d_{ij} - \frac{1}{4}(u_{(2i)(2j)} + u_{(2i+1)(2j)} - u_{(2i+1)(2j)} - u_{(2i+1)(2j+1)})$$

$$PD_{ij} = d_{ij} - \frac{1}{4}(u_{(2i)(2j)} - u_{(2i+1)(2j)} - u_{(2i+1)(2j)} + u_{(2i+1)(2j+1)})$$

An alternative way of computing the predicted averages is to first compute the predicted averages for each 2×2 block and then perform a Directional Decomposition on them.

In other words, the first step is to compute:

$$PA_{ij}=d_{ij}-1/4(u_{(2i)(2j)}+u_{(2i+1)(2j)}+u_{(2i+1)(2j)}+u_{(2i+1)(2j+1)})$$

and then $$PAA = \frac{1}{4}\sum_{i,j=0}^{1} PA_{ij}$$

$$PAH = \frac{1}{4}(PA_{00} - PA_{01} + PA_{10} - PA_{11})$$

$$PAV = \frac{1}{4}(PA_{00} + PA_{01} - PA_{10} - PA_{11})$$

$$PAD = \frac{1}{4}(PA_{00} - PA_{01} - PA_{10} + PA_{11})$$

Accordingly, when using a DDS transform, the encoder may generate the various delta averages δAA, δAH, δAV and δAD and send them to the decoder, along with the other DDS coefficients HA, HH, HV, HD, VA, VH, VV, VD, DA, DH, DV, DD.

At the decoder, the decoder may compute PAA, PAH, PAV and PAD as illustrated above. Further, in the present examples, it receives the delta averages, decode them and then may sum them to the predicted averages in order to obtain the averages AA, AH, AV and AD. The averages are then be combined with the other DDS coefficients, an inverse DDS is applied, and then residuals are obtained from the inverse transform.

Alternatively, as transform and inverse transform are linear operations, inverse DDS can be done on the delta averages δAA, δAH, δAV and δAD and the other DDS coefficients HA, HH, HV, HD, VA, VH, VV, VD, DA, DH, DV, DD to obtain residuals and $PA_{ij}$s could be added post-transform to the residuals in corresponding 2×2 blocks to obtain final residual values.

Figure 16C:
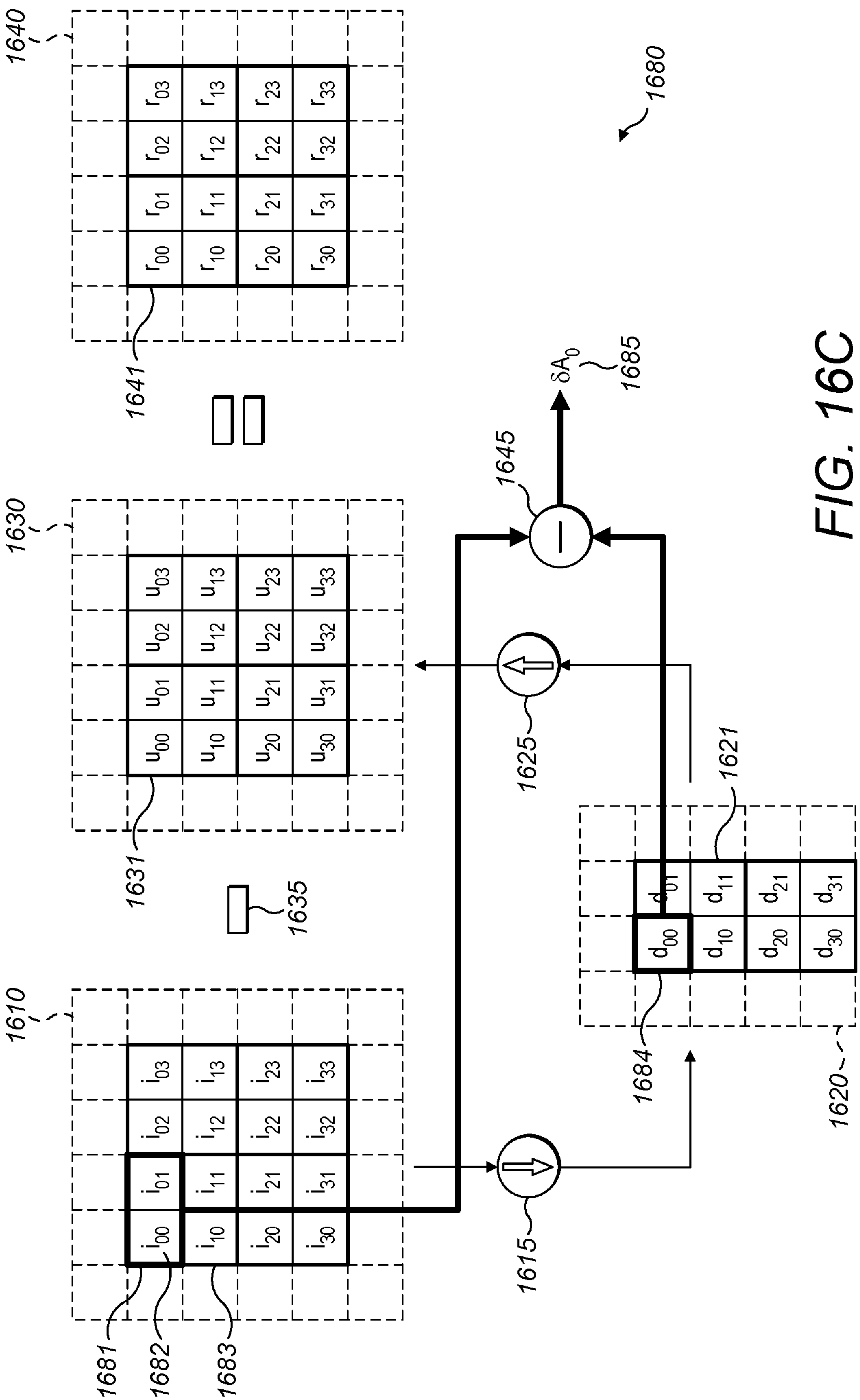
Figure 16D:
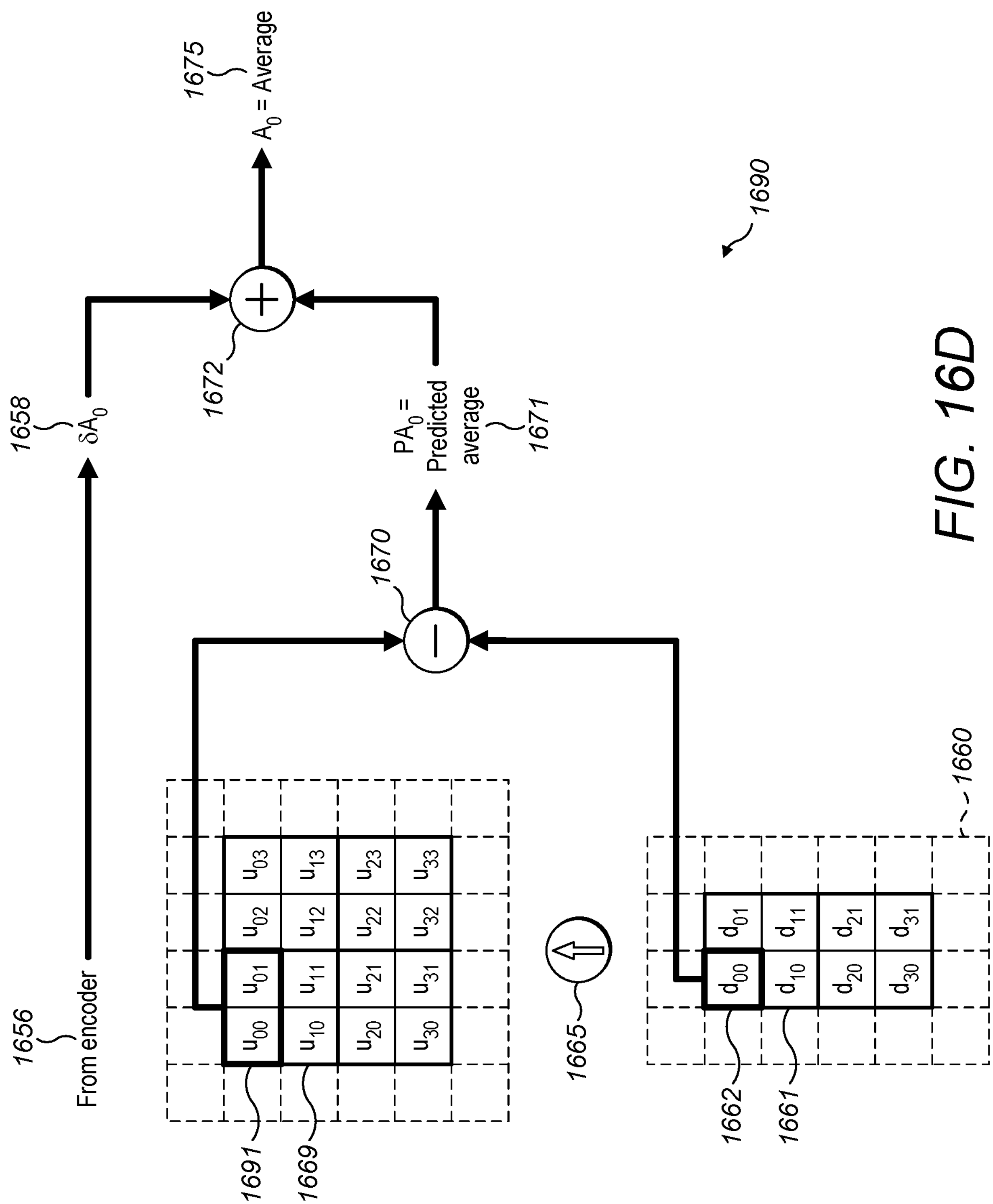

FIGS. 16C and 16D respectively show an encoding process 1680 and a decoding process 1690 that correspond to FIGS. 16A and 16B but where the transformation is one-dimensional, e.g. where down-sampling and up-sampling are performed in one direction rather than two directions. This, for example, may be the case for a horizontal-only scaling mode that may be used for interlaced signals. This may be seen by the indicated elements 1681 where two elements 1682 in a block 1683 are down-sampled to generate element 1684. The input data elements 1681 and the down-sampled ("control") element are then used to generate the delta average (δA) 1685. Correspondingly, at the decoding process 1690, a two element block 1691 of up-sampled elements is compared with the down-sampled element 1662 to determine the predicted average 1671.

Signalling within DDS

In certain implementations, bit or bytestream signalling may be used to indicate whether one or more of the coefficients from the DDS transform are used for internal signalling (e.g. as opposed to carrying transformed coefficient values).

For example, in one case, a signalling bit may be set to a value of 0 to indicate that no internal signalling is used (e.g. a predefined coefficient value carries the transformed residual value for the coding unit) and may be set to a value of 1 to indicate that internal signalling is used (e.g. any existing transformed residual value is replaced by a signalling value that carries information to the decoder). In the latter case, the value of the coefficient may be ignored when inverse transforming the transformed residuals, e.g. may be assumed to be 0 regardless of the value used for signalling therein.

In one case, the HH coefficient of the DDS transform may be adapted to carry signalling in the case that the signalling bit is set to 1. This coefficient may be selected as its value has been determined to least affect the decoded residual values for a coding block.

The value carried in the internal coefficient signalling may be used for a variety of purposes. The information may be used at the decoder if the decoder is configured to receive and act on the information (e.g. at the discretion of the decoder).

In one case, the within-coefficient signalling may indicate information associated with post-processing to perform on the wider coding unit (e.g. the coding unit associated with the signalling coefficient). In one case, the within-coefficient signalling may indicate information associated with a potential artefact or impairment that may be present when the decoded coding unit is applied in one or more of the level 1 and level 2 enhancement operations. For example, the within-coefficient signalling may indicate that decoded residual data (and/or a portion of reconstructed video frame) associated with the coding unit may be subject to banding, blockiness etc. One or more post-processing algorithms may then use this information embedded within the coefficient data to selective apply one or more post-processing operations to address the impairment and improve the reconstructed video.

Predicted Residuals

As described above, certain examples may use an approach that acts to predict a coefficient generated by the transform stage. In one case, an average component (A) may be predicted using a "predicted average" computation. The predicted average computation enables a delta average to be transmitted in place of a full average value. This can save a signification amount of data (e.g. reduce a required bitrate) as it reduces the entropy of the average component to be encoded (e.g. often this delta average may be small or zero).

For example, when decoding a level 2 enhancement stream, one picture element at a level 1 resolution may be input to an up-sampling operation, where it is used to create four picture elements at an up-sampled or level 2 resolution. As part of the reconstruction, the value of the predicted average for the up-sampled coding unit of four picture elements may be added to the up-sampled values for the four picture elements.

In one case, a variation to the above predicted average computation may be applied.

In this variation, the addition of the predicted average value after up-sampling may be modified. The addition may be modified by a linear or non-linear function that acts to add different proportions of the predicted average value to different locations within the up-sampled coding block.

For example, in one case, information from one or more neighbouring coding blocks may be used to weight the predicted average value differently for different picture elements. In this case, picture elements that neighbour lower-valued picture elements may receive less of the predicted average value and picture elements that neighbour higher-valued picture elements may receive more of the predicted average value. The weighting of the predicted average may thus be set for a picture element based on the relative values of its neighbouring picture elements.

This may provide improvements when an edge is present within the coding block. In cases, where an edge is present in the up-sampled coding block, it may be beneficial to weight the predicted average value in accordance with the edge location. For example, if the edge is vertical then picture elements within one column of the coding unit may be combined with a higher or lower value than the other column of the coding unit, wherein the exact weighting depends on the gradient of the edge. Edges at different angles may have more complex weightings of the predicted average value. This form of correction to the predicted average addition may be referred to as adding a form of "tilt". It may form part of a predicted residuals computation. In these cases, each picture element may receive a different value for combination, as opposed to a common single predicted average value.

Modified Transform

In certain examples, the transformation process (e.g. as applied by the transform components 322 or 341 in FIGS. 3A and 3B) may be modified in order to reduce the bitrate required to encode a specific level of quality (e.g., LoQ1 or L-1) and/or reduce the quantization step width used when quantizing the transformed residuals (also called "coefficients") at the same output bitrate.

In one example, it may be decided to keep only average transformed coefficients (e.g., A for a Directional Decomposition transform (e.g. 2×2), AA, AH, AV, AD for DDS transform e.g. 4×4) and send only those to the quantizer and the entropy encoder. In another example, particularly useful for a Directional Decomposition Squared (4×4) transform, it may be decided to keep only the average of average coefficient, i.e., AA. In another embodiment, all coefficients are kept. In certain cases, different coefficients may be weighted in a differential manner, e.g. each coefficient location within an x by y coding unit or block may have a different weight. Any combination can be used.

For example, in certain cases, the residual processing described above may be applied following the transform stage as opposed to before the transform stage. In these cases, the result of the transform, referred to herein as coefficients, may be weighted instead or, or as well as, the input residuals. For example, keeping certain coefficients may be equivalent to weighting those coefficients by 1 and other coefficients by 0.

In one example, a decision as to what coefficients to forward for further processing may be made before transforming the residuals. In other words, rather than performing the transformation and then discard the coefficients which are not selected for quantization and transmission, only the coefficients to be quantized, entropy encoded and transmitted are computed, thus saving additional computation. For example, instead of weighting an output of the transform, certain transform operations may be selectively performed, e.g. only an average transform (A or Ax) may be performed. This may correspond to only multiplying by a subset of rows of a transformation matrix, e.g. only multiplying residuals by a vector representing a first row of a transformation matrix to determine average (A) coefficients (e.g. for a 2×2 case with a 4×4 transformation matrix).

Each of the above selection can be associated with a respective transform mode.

The selection is typically be based on a respective decision associated with the bitrate to be used for a respective enhancement level (e.g. level 1 or level 2), and/or the respective quantization step-width to be used for a specific enhancement level, but it can also use as an input the residual mode categorization discussed above. In one case, the bitrate to be used for a respective enhancement level may be determined based on data received over a network as described with reference to FIGS. 14A to 14C.

Rate Control & Quantization

In certain implementations the quantization operation may be controlled to control a bit rate of one or more of the encoded streams. For example, quantization parameters for the quantize components 323 and/or 343 in FIGS. 3A and 3B may be set to provide a desired bitrate in one or more of the encoded video streams (whether that be a common bit rate for all streams so as to generate a common encoded stream or different bit rates for different encoded streams).

In certain cases, the quantization parameters may be set based on an analysis of one or more of the base encoding and the enhancement stream encoding. Quantization parameters may be chosen to provide a desired quality level, or to maximise a quality level, within a set of pre-defined bit-rate constraints. Multiple mechanisms may be used to control a variation in the original video.

Figure 17A:
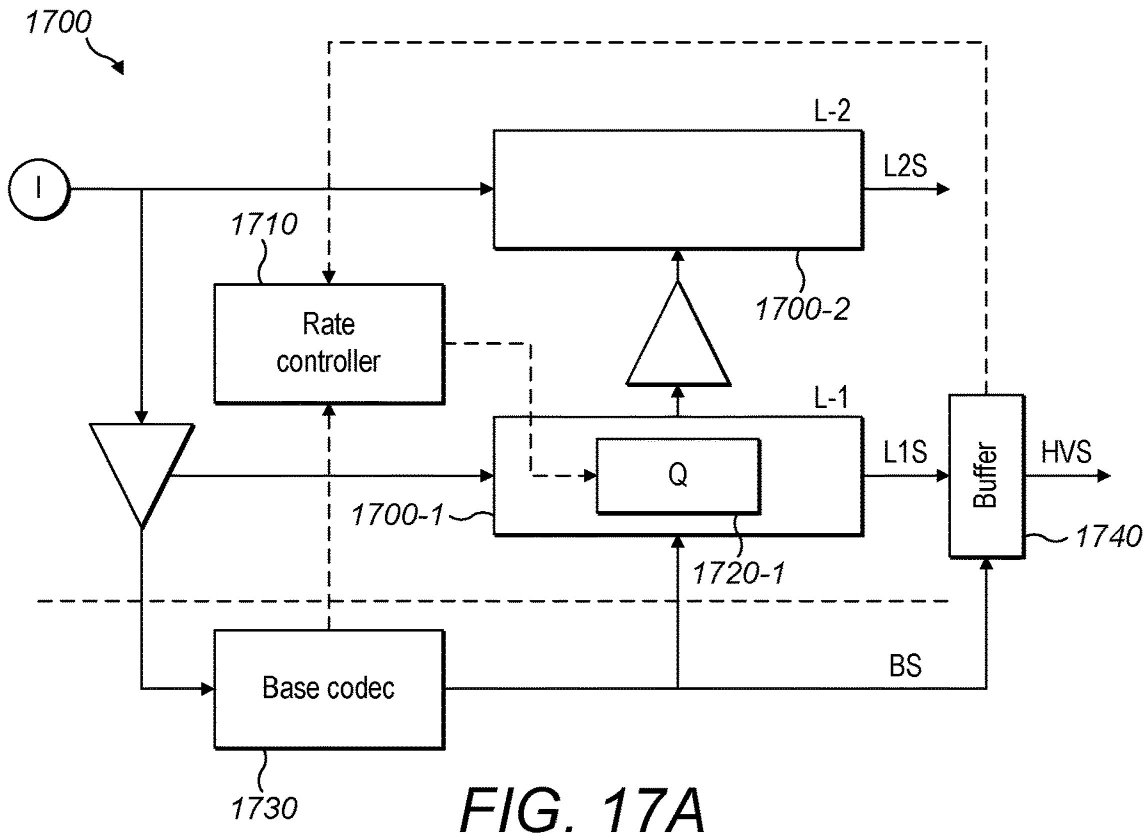
FIGS. 17A and 17B are schematic illustrations showing a rate controller that may be applied to one or more of first and second level enhancement encoding.

FIG. 17A shows a schematic diagram of an example encoder 1700. The encoder 1700 may be one of the encoders shown in FIGS. 1, 3A and 3B, with certain components omitted for clarity. The encoder 1700 has two enhancement level encoding components 1700-1 and 1700-2. These may correspond to components 122 and 142 in FIG. 1. In addition to the examples of FIGS. 1, 3A and 3B, the encoder 1700 of FIG. 17A comprise a rate controller 1710. The rate controller 1710 may control an encoding rate of one or more of the enhancement level encoding components 1700-1 and 1700-2. The rate controller 1710 may further receive information from the base codec 1730, which may correspond to the base encoder 112 and the base decoder 114. The example encoder 1700 also comprises a buffer 1740. Unlike the temporal buffer, this is a buffer that receives encoded streams, e.g. prior to transmission and/or storage. The rate controller 1710 may comprise a software routine (e.g. in a fast low-level language like C or C++) as executed by a processor and/or dedicated electronic circuitry. The buffer 1740 may comprise a software-defined buffer (e.g. a reserved section of memory resources) and/or a dedicated hardware buffer. The rate controller 1710 of FIG. 17A receives data from the base processing layer (e.g. at least the base encoder of the base codec 1730) and the buffer 1740. The buffer 1740 is used to store and/or combine at least the encoded base stream (BS) and an encoded enhancement stream (L1S and/or L2S).

Figure 17B:
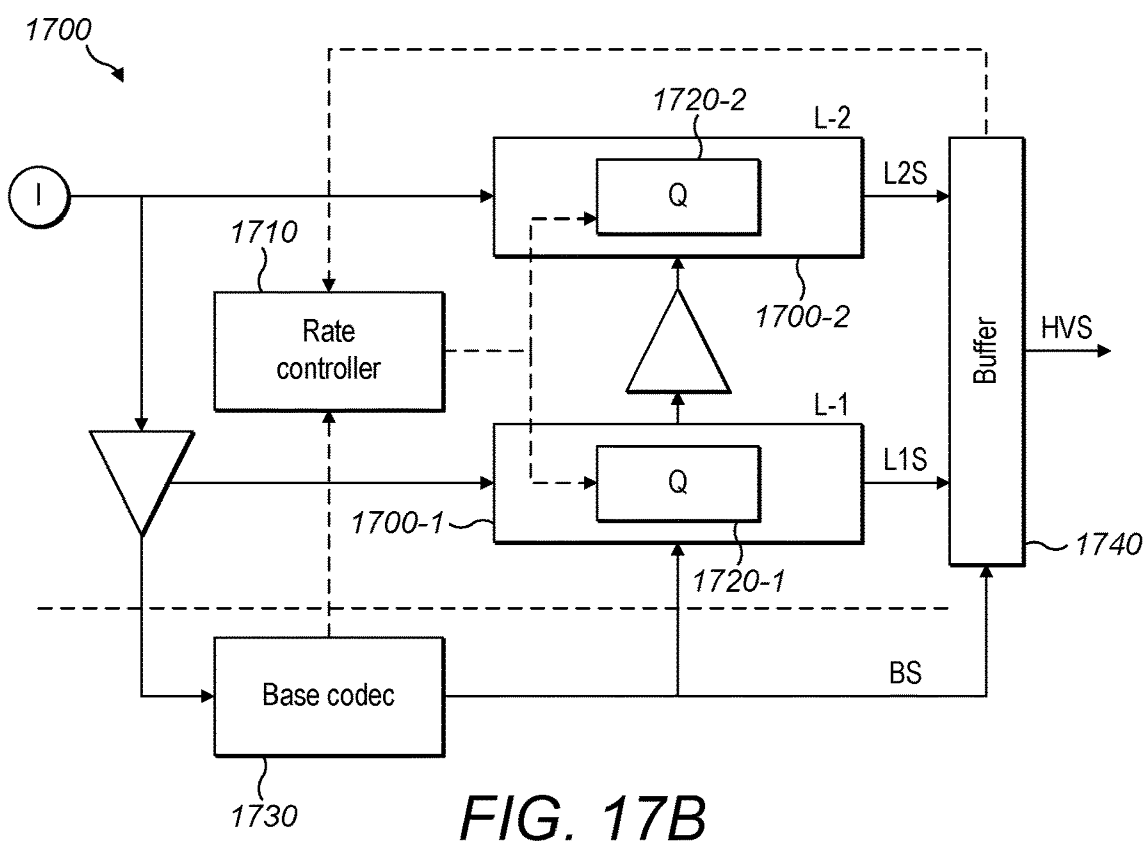

FIG. 17A shows the use of the buffer 1740 with respect to the encoded base stream and the encoded L-1 stream; FIG. 17B shows another example, where the buffer 1740 receives the encoded base stream and both the encoded level 1 and level 2 enhancement streams. In the example of FIG. 17A, the rate controller 1710 controls quantization 1720 within the level 1 encoding layer by supplying a set of quantization parameters. In the example of FIG. 17B, the rate controller 1710 controls quantization 1720 within both enhancement encoding layers by supplying quantization parameters to respective quantize components (e.g. 1720-1 and 1720-2, which may correspond to quantize components 323 and 343). In yet another case, the buffer 1740 may be configured to receive the encoded base stream and the encoded level 2 stream.

In the examples of FIGS. 17A and 17B, the buffer 1740 is configured to receive inputs at variable bit rates while the output is read at a constant rate. In the Figures, the output is shown as a hybrid video stream (HVS). The rate controller 1710 reads the status from the buffer 1740 to ensure it does not overflow or get empty, and data are always available to be read at its output.

Figure 18:
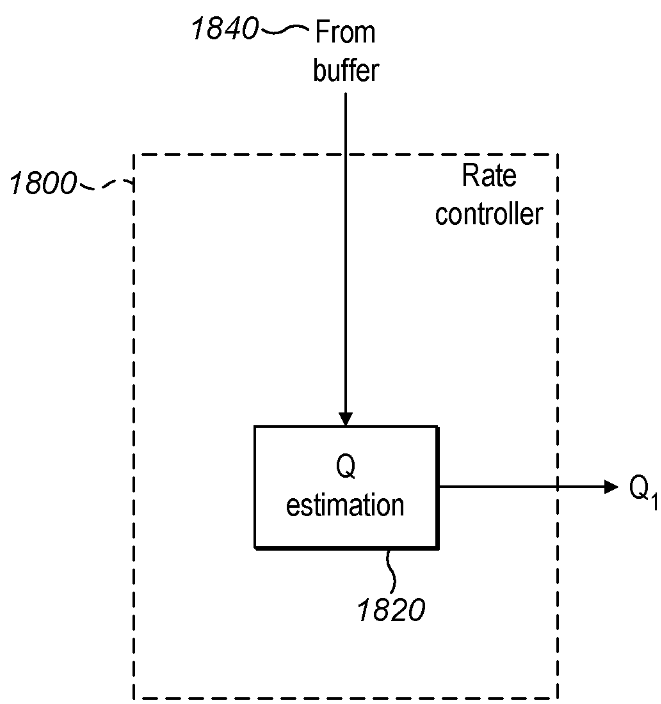
FIG. 18 is a schematic illustration showing a rate controller according to a first example.
Figure 19:
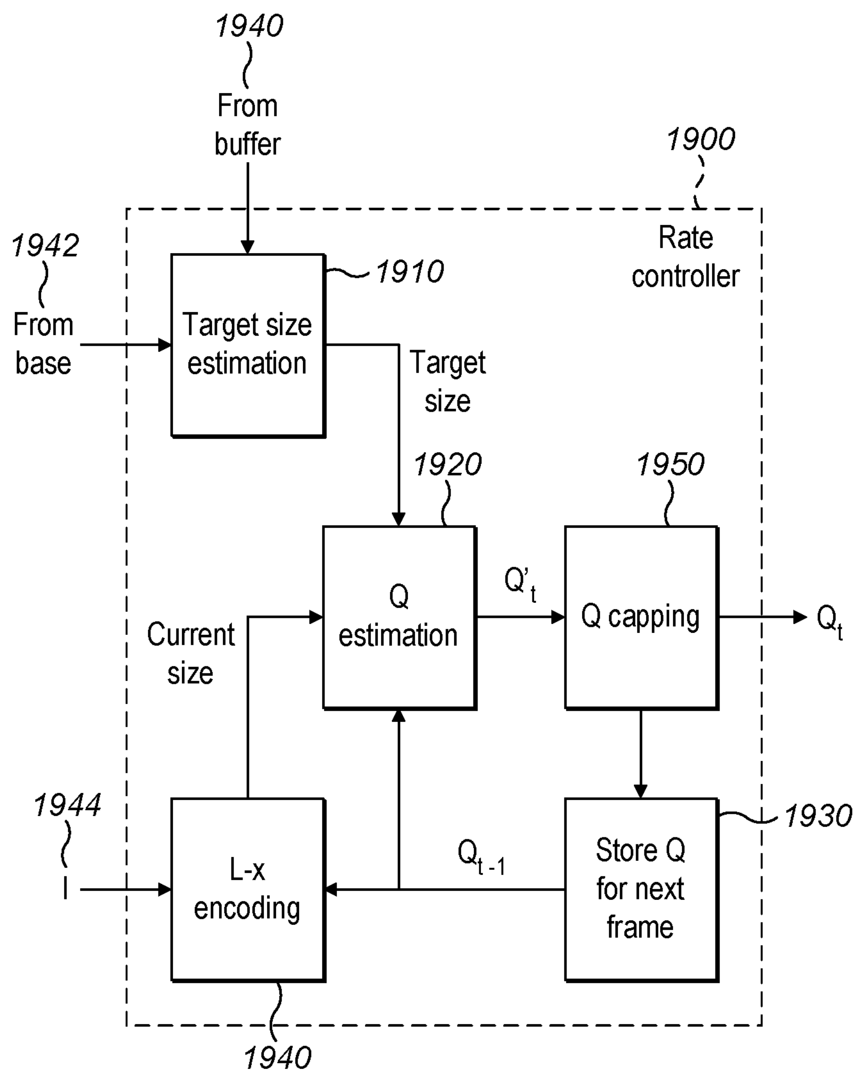
FIG. 19 is a schematic illustration showing a rate controller according to a second example.

FIGS. 18 and 19 show two possible implementations of the rate controller (e.g. rate controller 1710). These implementation uses a status of the buffer to generate a set of quantization parameters $Q_t$ for a current frame t. The quantization parameters may be supplied to the quantize component 323, 343 in one or more of the level 1 and level 2 encoding pipelines as shown in FIGS. 3A, 3B. In one case, the architecture of FIG. 18 or FIG. 19 may be replicated for each of the level 1 and level 2 encoding pipelines, such that difference quantization parameters are generated for each pipeline.

FIG. 18 shows a first example rate controller 1800 that comprises a Q (i.e. quantization) estimation component 1820 that receives a signal 1840 from a buffer and computes a set of quantization parameters at a given time t, i.e. $Q_t$. FIG. 19 shows a second example rate controller 1900 that also comprises a Q (i.e. quantization) estimation component 1920 that receives a signal 1940 from a buffer and computes a set of quantization parameters at a given time t, i.e. $Q'_t$. The second example rate controller 1900 also comprises a target size estimation component 1910, a Q buffer 1930 to store a set of quantization parameters for a next frame, an encoding component 1940 and a Q capping component 1950. The target size estimation component 1910 receives data 1942 from the base layer and the encoding component 1940 receives an input 1944.

The general operation of the rate controller 1800, 1900 may be as follows. The quantization parameters $Q_t$ are controlled based on the amount of data within the buffer (e.g. buffer 1740). In both FIGS. 18 and 19, an indication of the amount of data within the buffer (i.e. how "full" the buffer is) is received via the "From Buffer" signal 1840, 1940. This is then used, either directly or indirectly by the Q estimation component 1820, 1920 to estimate a set of quantization parameters that are used as the quantize component (e.g. 323 and/or 343) operating parameters.

In one case, the quantization parameters values are inversely related to the amount of data in the buffer. For example, if, at the moment of receiving a new frame, there is a large amount of data within the buffer then the rate controller 1800 sets low values of Q in order to reduce the amount of residual data that is encoded, where low values of Q correspond to larger quantization step-width values that result in fewer quantization bins or groups for a given range of residual values. Alternatively, if the buffer is relatively empty then the rate controller 1800 is configured to set high values of Q (i.e. low step-width values) to encode more residual data into the hybrid video stream.

The example of FIG. 19 uses additional components to determine the set of quantization parameters. In the example of FIG. 19, the rate controller 1900 also uses the amount of "filler" data the base encoder intends to add to its flow (e.g. as received via the "From Base" signal 1942). In this case, the encoder may replace the base encoder "filler" data with extra enhancement stream data to maximize the available bandwidth. In this case, if there is a high level of filler, the rate controller 1900 may be able to set higher Q values (e.g. lower step-width values such that much residual data is received within the buffer), as this "filler" data may be removed or replaced in the base encoder stream (e.g. either before or at the buffer).

In FIG. 19, the target size estimation component 1910 receives a status of the buffer and information regarding the amount of "filler" data that the base encoder is planning to add to a frame. The amount of data held within the buffer may be indicated by a "fullness" parameter that may be normalised within a range of 0 to 1, or 0% to 100% —where 60% indicates that the buffer is 60% full (i.e. has 40% of remaining space). In this case, a mapping function or lookup table may be defined to map from "fullness" bins to a "target size" parameter, where the target size is a target size for a next frame to be encoded by one or more of the level 1 and level 2 enhancement layers. In one case, the mapping function or lookup table may implement a non-linear mapping that may be set based on experimentation. In one case, the target size estimation may also be set based on a configuration parameter that indicates a desired proportion of the hybrid video stream that is to be filled by the enhancement stream (e.g. with the remainder of the hybrid video stream being filled by the base stream).

In the example of FIG. 19, the target size determined by the target size estimation component 1910 is communicated to the Q estimation component 1920. In FIG. 19, the Q estimation component 1920 additionally receives inputs from a Q buffer 1930 that stores the Q value from a previous frame and an implementation of at least one of the enhancement encoding pipelines. In FIG. 19, the Q estimation component 1920 receives the "target size", $Q_{t-1}$ (i.e. the set of quantization parameters determined for a previous frame), and a size of a current frame encoded with $Q_{t-1}$ ("current size"). The size of the current frame is supplied by the implementation of at least one of the enhancement encoding pipelines (e.g. level 1 and level 2 components). In certain cases, the implementation of at least one of the enhancement encoding pipelines may also supplied a size for one or more previous frames encoded with $Q_{t-1}$. In one case, the "current size" information may be determined by a parallel copy of at least one of the enhancement encoding pipelines, e.g. the current frame is to be quantized with quantization parameters $Q_t$ for transmission but the L-x Encoding component 1940 in FIG. 19 receives $Q_{t-1}$ and determines a current size based these quantization parameters by performing an encoding that is not transmitted. In another example, a current size may be alternatively received from a cloud configuration interface, e.g. based on pre-processing for a pre-recorded video. In this other example, a parallel implementation may not be required.

In FIG. 19, the Q estimation components 1920 takes its input (e.g. as described above) and computes an initial set of estimated quantization parameters $Q'_t$. In one case, this may be performed using a set of size functions that map a data size (e.g. as expressed by target or current size) to a quantization parameter. The data size and/or the quantization parameter may be normalised, e.g. to values between 0 and 1. The quantization parameter may be associated with a quantization step size, e.g. it may be a "Quality factor" that is inversely proportional to a quantization step size and/or may be the quantization step size.

In the example of FIG. 19, a set of curves may be defined to map a normalised size onto a quantization parameter. Each curve may have one or more of a multiplier and an offset that may depend on the properties of a current frame (e.g. that may depend on a complexity of information to encode within the frame). The multiplier and the offset may define the shape of the curve. The multiplier may be applied to a size normalisation function that is a function of the quantization parameter Q. In one case, the current size (i.e. the size of frame t encoded with $Q_{t-1}$) and $Q_{t-1}$ may be used to define a point within the space of the set of curves. This point may be used to select a set of closest curves from the set of curves. These may be a curve that is above the point and a curve that is below the point or a highest or lowest curve for the point. The set of closest curves may be used in an interpolation function together with the point to determine a new curve associated with the point. Once this new curve is determined, a multiplier and an offset for the new curve may be determined. These values may then be used together with the received target size to determine a value for $Q_t$ (e.g. the curve may define a function of size and Q).

In certain cases, at least the Q estimation of the rate controller is adaptive, wherein properties of one or more previous frames affect the Q estimation of a current frame. In one case, the set of curves may be stored in an accessible memory and updated based on a set of curves determined for a previous frame. In certain cases, adaptive quantization may be applied differently for different coefficient locations within a coding unit or block, e.g. for different elements in an array of 4 or 16 coefficients (for 2×2 or 4×4 transforms).

Lastly, the example of FIG. 19 features a Q capping component 1950 that receives the estimated set of quantization parameters $Q'_t$ that are output from the Q estimation component 1920 and corrects this set based on one or more factors. The estimated set of quantization parameters $Q'_t$ may comprise one or more values. In one case, the initial set of quantization parameters $Q'_t$ may be corrected based on one or more of operating behaviour of the base encoding layer and changes in the quantization parameter Q. In one case, the estimated set of quantization parameters $Q'_t$ may be capped based on a set of quantization parameters used by the base encoding layer, which may be received with the data from this layer. In one case, either with or without the adaptation using the base encoding layer data, the estimated set of quantization parameters $Q'_t$ may be limited based on values of a previous set of quantization parameters. In this case, one or more of a minimum value and a maximum value for $Q'_t$ may be set based on a previous Q value (e.g. $Q_{t-1}$). The output of the capping is then provided as $Q_t$ in FIG. 19.

In one case, the set of quantization parameters comprise one value for $Q_t$. In this case, a step-width applied by one of the quantize components to a frame t may be set based on $Q_t$. The function to determine the step-width may also be based on a maximum step-width (e.g. step-widths may range between 0 and 10). An example step-width computation is:

$$\text{Stepwidth}=[(1-Q^{0.2})\cdot(\text{Stepwidth}_{max}-1)]+1$$

Quantization Features

Certain quantization variations will now be described with reference to FIGS. 20A to 20D.

Figure 20A:
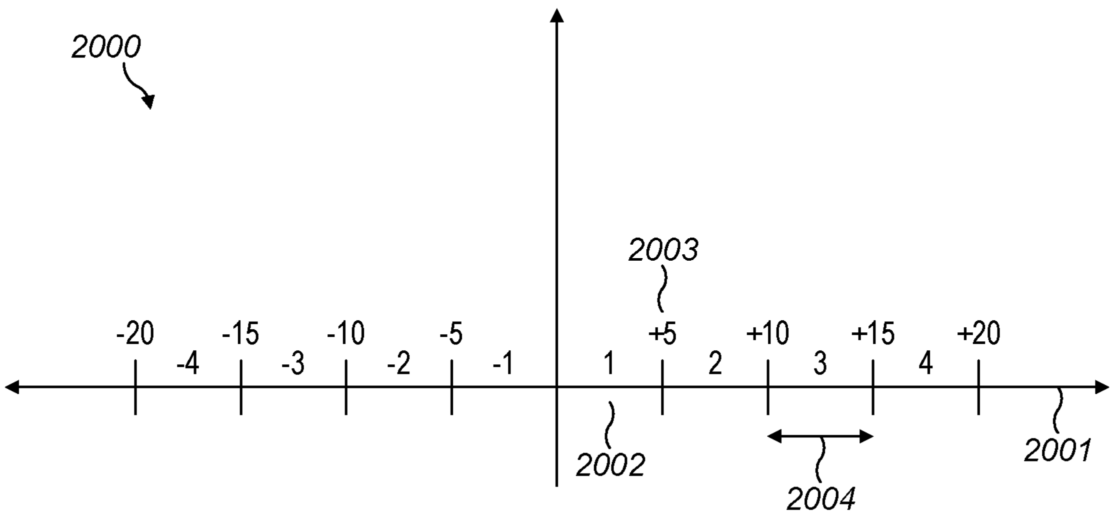
FIGS. 20A to 20D are schematic illustrations showing various aspects of quantization that may be used in examples.

FIG. 20A provides an example 2000 of how quantization of residuals and/or coefficients (transformed residuals) may be performed based on bins having a defined step width. The x-axis 2001 of FIG. 20A represents residual or coefficient values. In this example a number of bins 2002 are defined with a step-width of 5 (e.g. shown by 2003). The size of the step-width 2004 may be selectable, e.g. based on a parameter value. In certain cases, the size of the step-width 2004 may be set dynamically, e.g. based on the rate control examples described above. In FIG. 20A, the step-width 2004 results in bins 2002 corresponding to residual values in the ranges of 0-4, 5-9, 10-14, 15-19 (i.e. 0 to 4 including both 0 and 4). Bin widths may be configured to include or exclude end points as required. In this example, quantization is performed by replacing all values that fall into the bin with an integer value (e.g. residual values of between 0 and 4 inclusive have a quantized value of 1). In FIG. 20A, quantization may be performed by dividing by the step-width 2004 (e.g. 5), taking the floor of the result (i.e. the nearest integer less than a decimal for positive values) and then adding one (e.g. 3/5=0.6, floor(0.6)=0, 0+1=1; or 16/5=3.2, floor(3.2)=3, 3+1=4). Negative values may be treated in a similar way, e.g. by working on absolute values then converting to negative values following calculation (e.g. abs(−9)=9, 9/5=1.8, floor(1.8)=1, 1+1=2, 2*−1=−2). FIG. 20A shows a case of linear quantization where all bins have a common step-width. It should be noted that various different implementations based on this approach may be enacted, for example, a first bin may have a quantized value of 0 instead of 1, or may comprise values from 1 to 5 inclusive. FIG. 20A is simply one illustration of quantization according to bins of a given step-width.

Deadzone

Figure 20B:
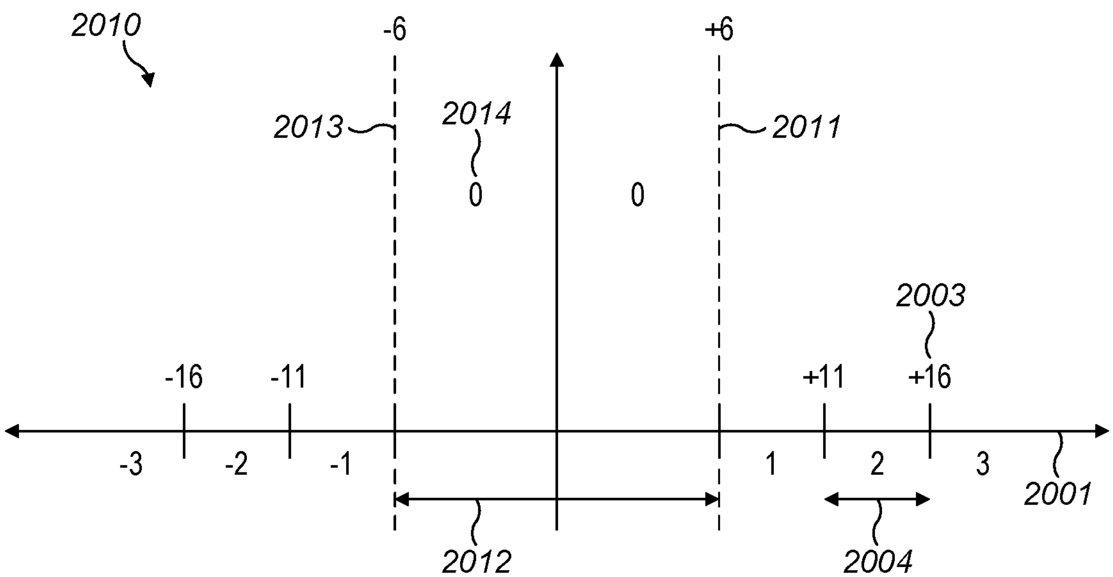

FIG. 20B shows an example 2010 how a so-called "deadzone" (DZ) may be implemented. In FIG. 20B, residuals or coefficients with a value within a pre-defined range 2012 are set to 0. In FIG. 20B the pre-defined range is a range around a value of 0 as shown by range limits 2011 and 2013. In FIG. 20B, values that are less than 6 and greater than −6 are set to 0 as shown by 2014. The deadzone may be set as a fixed range (e.g. −6 to 6) or may be set based on the step-width. In one case, the deadzone may be set as a predefined multiple of the step-width, e.g. as a linear function of a step-width value. In the example of FIG. 20B the deadzone is set as 2.4*step-width. Hence, with a step-width of 5, the deadzone extends from −6 to +6. In other case, the deadzone may be set as a non-linear function of a step-width value.

In one case, the deadzone is set based on a dynamic step-width, e.g. may be adaptive. In this case, the deadzone may change as the step-width changes. For example, if the step-width were updated to be 3 instead of 5, a deadzone of 2.4*step-width may change from a range of −6 to +6 to a range of −3.6 to 3.6; or, if the step-width is updated to be 10, the deadzone may change to extend from −12 to 12. In one case, the multiplier for the step-width may range from between 2 and 4. In one case, the multiplier may also be adaptive, e.g. based on operating conditions such as available bit rates.

Having a deadzone may help reduce an amount of data to be transmitted over a network, e.g. help reduce a bit rate. When using a deadzone, residual or coefficient values that fall into the deadzone are effectively ignored. This approach may also help remove low levels of residual noise. Having an adaptive, rather than constant, deadzone means that smaller residual or coefficient values are not overly filtered when the step-width decreases (e.g. if more bandwidth is available) and that a bit rate is suitably reduce if the step-width is increased. The deadzone need only be enacted at the encoder, the decoder simply receives a quantized value of 0 for any residual or coefficient that falls within the deadzone.

Bin Folding

Figure 20C:
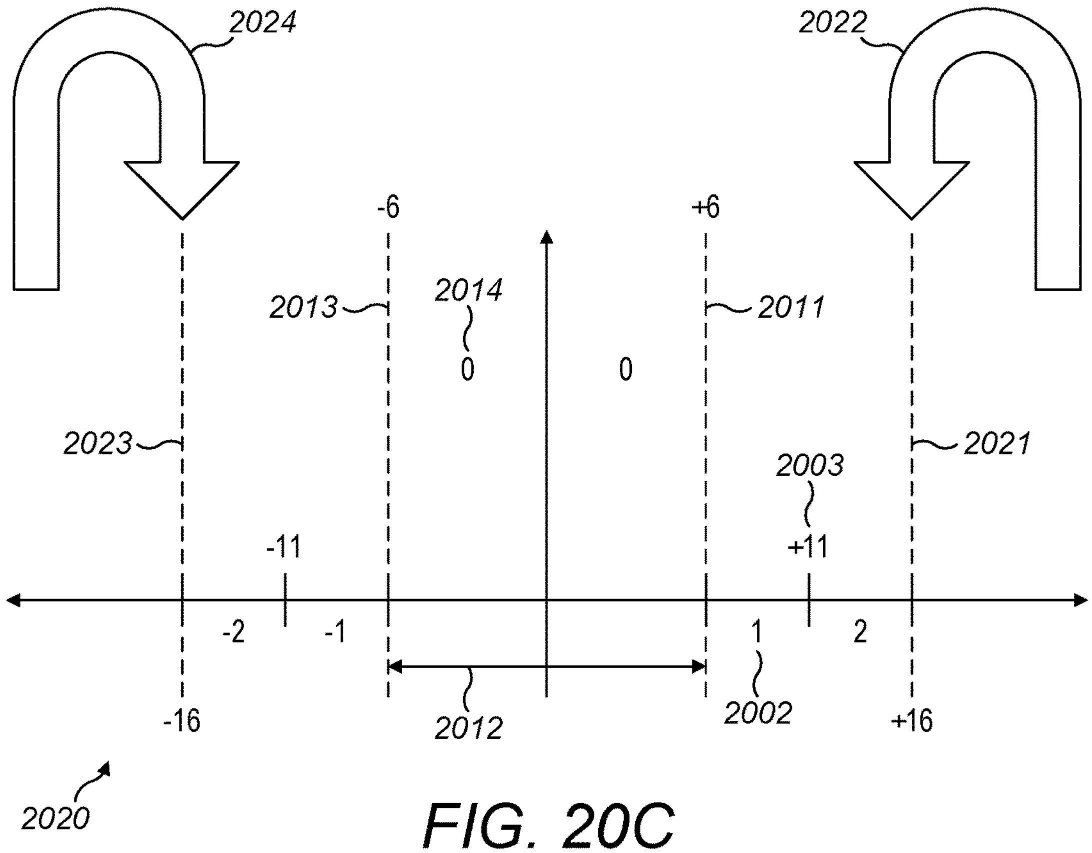

FIG. 20C shows an example 2020 of how an approach called bin folding may be applied. In the example of FIG. 20C bin folding is used together with a deadzone, but in other cases it may be used without a deadzone and/or with other quantization approaches. In FIG. 20C, bin folding acts to place all residual or coefficient values that reside above a selected quantization bin 2021 into the selected bin. For example, this may be seen as a form of clipping. It is shown for positive values via limit 2021 and arrow 2022 for positive values and for negative values via limit 2023 and arrow 2024.

In FIG. 20C, a step-width of 5 is again applied. A deadzone 2012 with a range of 2.4*step-width is also applied, such that values between −6 and 6 are set to 0. This can also be seen as following into a larger first quantization bin (having a value of 0). Two quantization bins 2002 with a width of 5 (as shown by 2003) are then defined for positive and negative values. For example, a bin with a quantization value of 1 is defined between 6 and 11 (e.g. having a step-width of 5), and a bin with a quantization value of 2 is defined between 11 and 16. In this example, to enact bin folding, all residual or coefficients with a value that would normally fall into a bin above the second bin (e.g. that have a value greater than 16) are "folded" 2022 into the second bin, e.g. are clipped to have a quantization value of 2. This may be performed by setting all values greater than a threshold to the maximum bin value (e.g. 2). A similar process occurs for the negative values. This is illustrated in FIG. 20C by the large arrows 2022 and 2024.

Bin folding may be a selectable processing option at the encoder. It does not need to be enacted during dequantization at the decoder (e.g. "folded" or "clipped" values of 2 are simply dequantized as if they were in the second bin). Bin folding may be enacted to reduce a number of bits that are sent over a network to the decoder. Bin folding may be configurable so as to reduce a bit rate based on network conditions and/or base stream processing.

Quantization Offsets

Figure 20D:
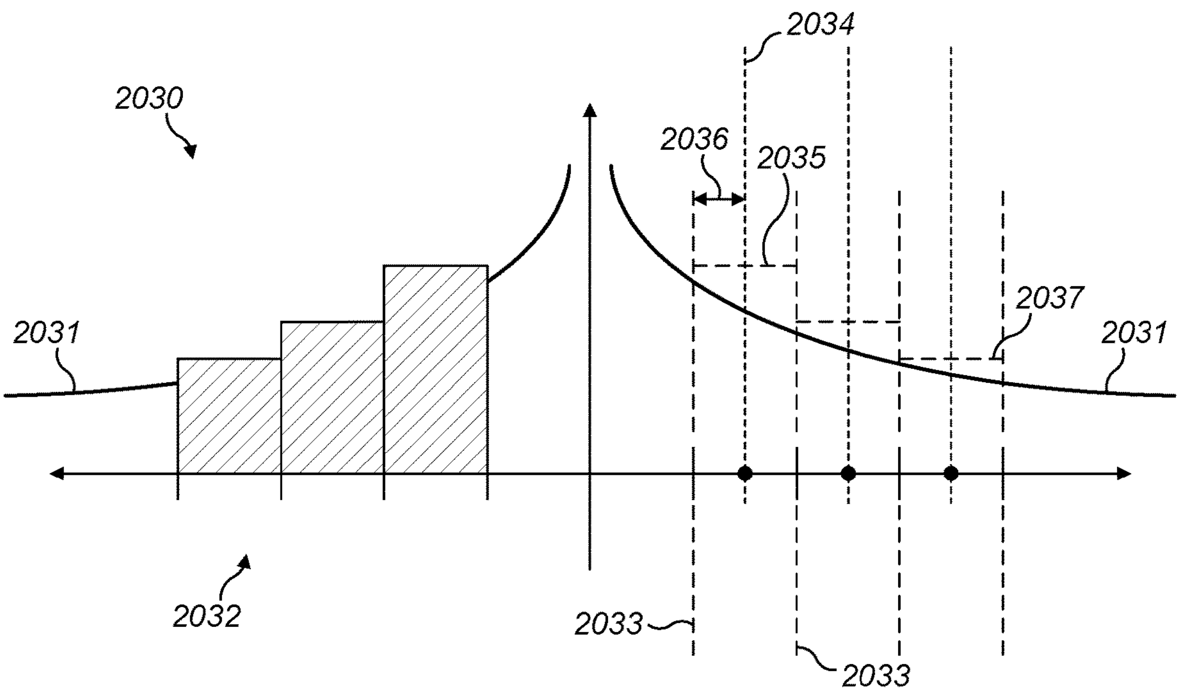

FIG. 20D shows an example 2030 of how a quantization offset may be used in certain cases. A quantization offset may be used to shift locations of quantization bins. FIG. 20D shows a line 2031 indicating possible real world counts along the x-axis residual or coefficient value range. In this example, many values are near zero, with the count of higher values decreasing as you move away from 0. If a count value is normalized, the line may also indicate a probability distribution for residual or coefficient values.

The left-hand side bars 2032, and the dashed lines 2033 on the right-hand side of FIG. 20D, illustrate a histogram that models quantization. For ease of explanation, count values for first to third bins following a deadzone are shown (for both positive and negative values, the latter being striped to illustrate the bars). For example, the bars 2035 show counts for quantized values of 1, 2, 3 and −1, −2, −3. Due to the quantization, the distribution modelled by the histogram differs from the actual distribution shown by the line. For example, an error 2037 is shown that displays how the bar differs from the line.

To vary the properties of the error 2037 a quantization offset 2036 may be applied. For positive values, a positive quantization offset acts to shift each bin to the right and a negative quantization offset acts to shift each bin to the left. In one case, a deadzone may be applied based on a first set of thresholds, e.g. all values less than (n*step_width)/2 and greater than (n*step_width*−1)/2 are set to 0, and bin folding may be applied based on a second set of thresholds, e.g. from the last example, all values greater than 16 or less than −16 are set to 2. In this case, the quantization offset may not shift the start of the first bin or the end of the last bin, as these are set based on the aforementioned higher and lower thresholds, but may shift the location 2034 of the bins between these thresholds. An example quantization offset may be 0.35.

In one case, the quantization offset 2036 may be configurable. In one case, the quantization offset may be varied dynamically, e.g. based on conditions during encoding. In this case, the quantization offset may be signalled to the decoder for use in dequantization.

In one case, at the encoder, a quantization offset may be subtracted from a residual or coefficient value before quantization based on a step-width. Hence, in the decoder, a signalled offset may be added to a received quantized value prior to dequantization based on a step-width. In certain cases, the offset may be adjusted based on a sign of the residual or coefficient to allow for symmetrical operations about a 0 value. In one case, use of an offset may be disabled by setting a quantization or dequantization offset value to 0. In one case, an applied quantization offset may be adjusted based on a defined deadzone width. In one case, a deadzone width may be computed at the decoder, e.g. as a function of step-width and quantization parameters received from the encoder.

Quantization Matrix

In one case, a step-width for quantization may be varied for different coefficients within a 2×2 or 4×4 block of coefficients. For example, a smaller step-width may be assigned to coefficients that are experimentally determined to more heavily influence perception of a decoded signal, e.g. in a 4×4 Directional Decomposition (DD-Squared or “DDS”) as described above AA, AH, AV and AD coefficients may be assigned smaller step-widths with later coefficients being assigned larger step-widths. In this case, a base_step-width parameter may be defined that sets a default step-width and then a modifier may be applied to this to compute a modified_stepwidth to use in quantization (and de-quantization), e.g. modified_stepwidth=base_stepwidth*modifier where modifier may be set based on a particular coefficient within a block or unit.

In certain cases, the modifier may also, or alternatively, be dependent on a level of enhancement. For example, a step-width may be smaller for the level 1 enhancement stream as it may influence multiple reconstructed pixels at a higher level of quality.

In certain cases, modifiers may be defined based on both a coefficient within a block and a level of enhancement. In one case, a quantization matrix may be defined with a set of modifiers for different coefficients and different levels of enhancement. This quantization matrix may be pre-set (e.g. at the encoder and/or decoder), signalled between the encoder and decoder, and/or constructed dynamically at the encoder and/or decoder. For example, in the latter case, the quantization matrix may be constructed at the encoder and/or decoder as a function of other stored and/or signalled parameters, e.g. those received via a configuration interface as previously described.

In one case, different quantization modes may be defined. In one mode a common quantization matrix may be used for both levels of enhancement; in another mode, separate matrices may be used for different levels; in yet another mode, a quantization matrix may be used for only one level of enhancement, e.g. just for level 2. The quantization matrix may be indexed by a position of the coefficient within the block (e.g. 0 or 1 in the x direction and 0 or 1 in the y direction for a 2×2 block, or 0 to 3 for a 4×4 block).

In one case, a base quantization matrix may be defined with a set of values. This base quantization matrix may be modified by a scaling factor that is a function of a step-width for one or more of the enhancement levels. In one case, a scaling factor may be a clamped function of a step-width variable. At the decoder, the step-width variable may be received from the encoder for one or more of the level 1 stream and the level 2 stream. In one case, each entry in the quantization matrix may be scaled using an exponential function of the scaling factor, e.g. each entry may be raised to the power of the scaling factor.

In one case, different quantization matrices may be used for each of the level 1 stream and the level 2 stream (e.g. different quantization matrices are used when encoding and decoding coefficients—transformed residuals—relating to these levels). In one case, a particular quantization configuration may be set as a predefined default, and any variations from this default may be signalled between the encoder and the decoder. For example, if different quantization matrices are to be used by default, this may require no signalling to this effect between the encoder and the decoder. However, if a common quantization matrix is to be used, this may be signalled to override the default configuration. Having a default configuration may reduce a level of signalling that is needed (as the default configuration may not need to be signalled).

Tiling

As described above, for example with reference to FIG. 12C, in certain configurations a frame of video data may be divided into two-dimensional portions referred to as “tiles”. For example, a 640 by 480 frame of video data may contain 1200 tiles of 16 pixels by 16 pixels (e.g. 40 tiles by 30 tiles). Tiles may thus comprise non-overlapping successive areas within a frame, where each area is of a set size in each of two-dimensional. A common convention is for tiles to run successively in rows across the frame, e.g. a row of tiles may run across a horizontal extent of the frame before starting a row of tiles below (a so-called “raster” format, although other conventions, such as interlaced formats may also be used). A tile may be defined as a particular set of coding units, e.g. a 16 by 16 pixel tile may comprise an 8 by 8 set of 2×2 coding units or a 4 by 4 set of 4×4 coding units.

In certain cases, a decoder may selectively decode portions of one or more of a base stream, a level 1 enhancement stream and a level 2 enhancement stream. For example, it may be desired to only decode data relating to a region of interest in a reconstructed video frame. In this case, the decoder may receive a complete set of data for one or more of the base stream, the level 1 enhancement stream and the level 2 enhancement stream but may only decode data within the streams that is useable to render the region of interest in the reconstructed video frame. This may be seen as a form of partial decoding.

Partial decoding in this manner may provide advantages in a number of different areas.

When implementing a virtual or augmented reality application, only a portion of a wide field of view may be being viewed at any one time. In this case, only a small region of interest relating to the viewed area may be reconstructed at a high level of quality, with the remaining areas of the field of view being rendered at a low (i.e. lower) level of quality. Further details regarding this approach may be found in patent publication WO2018/015764 A1, which is incorporated by reference herein. Similar, approaches may be useful when communicating video data relating to a computer game.

Partial decoding may also provide an advantage for mobile and/or embedded devices where resources are constrained. For example, a base stream may be decoded rapidly and presented to a user. The user may then select a portion of this base stream to render in more detail. Following selection of a region of interest, data within one or both of the level 1 and level 2 enhancement streams relating to the region of interest may be decoded and used to render a particular limited area in high detail. A similar approach may also be advantageous for object recognition, whereby an object may be located in a base stream, and this location may form a region of interest. Data within one or both of the level 1 and level 2 enhancement streams relating to the region of interest may then be decoded to further process video data relating to the object.

In the present examples, partial decoding may be based on tiles. For example, a region of interest may be defined as a set of one or more tiles within frames of the reconstructed video stream, e.g. the reconstructed video stream at a high level of quality or full resolution. Tiles in the reconstructed video stream may correspond to equivalent tiles in frames of the input video stream. Hence, a set of tiles that covers an area that is smaller that a complete frame of video may be decoded.

In certain configurations described herein, the encoded data that forms part of at least the level 1 enhancement stream and the level 2 enhancement stream may result from a Run-Length encoding then Huffman encoding. In this encoded data stream, it may not be possible to discern data relating to specific portions of the reconstructed frame of video without first decoding the data (e.g. until obtaining at least quantized transformed coefficients that are organised into coding units).

In the above configurations, certain variations of the examples described herein may include a set of signalling within the encoded data of one or more of the level 1 enhancement stream and the level 2 enhancement stream such that encoded data relating to particular tiles may be identifier prior to decoding. This can then allow for the partial decoding discussed above.

For example, in certain examples, the encoding scheme illustrated in one or more of FIGS. 10A to 10I may be adapted to include header data that identifies a particular tile within a frame. The identifier may comprise a 16-bit integer that identifies a particular tile number within a regular grid of tiles (such as shown in FIG. 12C). For example, at the start of transmission of encoded data relating to a particular tile of the input video frame, an identifier for the tile may be added to a header field of the encoded data. At the decoder, all data following the identifier may be deemed to relate to the identified tile, up to a time where a new header field is detected within the encoded stream or a frame transition header field is detected. In this case, the encoder signals tile identification information within one or more of the level 1 enhancement stream and the level 2 enhancement stream and this information may be received within the streams and extracted without decoding the streams. Hence, in a case where a decoder is to decode one or more tiles relating to a defined region of interest, the decoder may only decode portions of one or more of the enhancement streams that relate to those tiles.

Use of a tile identifier within the encoded enhancement streams allows variable length data, such as that output by the combination of Huffman and Run-length encoding, while still enabling data that relates to particular areas of a reconstructed video frame to be determined prior to decoding. The tile identifier may thus be used to identify different portions of a received bitstream.

In the present examples, enhancement data (e.g. in the form of transformed coefficients and/or decoded residual data) relating to a tile may be independent of enhancement data relating to other tiles within the enhancement streams. For example, residual data may be obtained for a given tile without requiring data relating to other tiles. In this manner, the present examples may differ from comparative Scalable Video Coding schemes, such as in associated with the HEVC and AVC standards (e.g. SVC and SHVC), that require other intra or inter picture data to decode data relating to a particular area or macroblock of a reconstructed picture. This enables the present examples to be efficiently implemented using parallel processing—different tiles and/or coding units of the reconstructed frame may be reconstructed in parallel. This can greatly speed up decoding and reconstruction on modern computing hardware where multiple CPU or GPU cores are available.

Tiles within the Bytestream

Figure 21A:
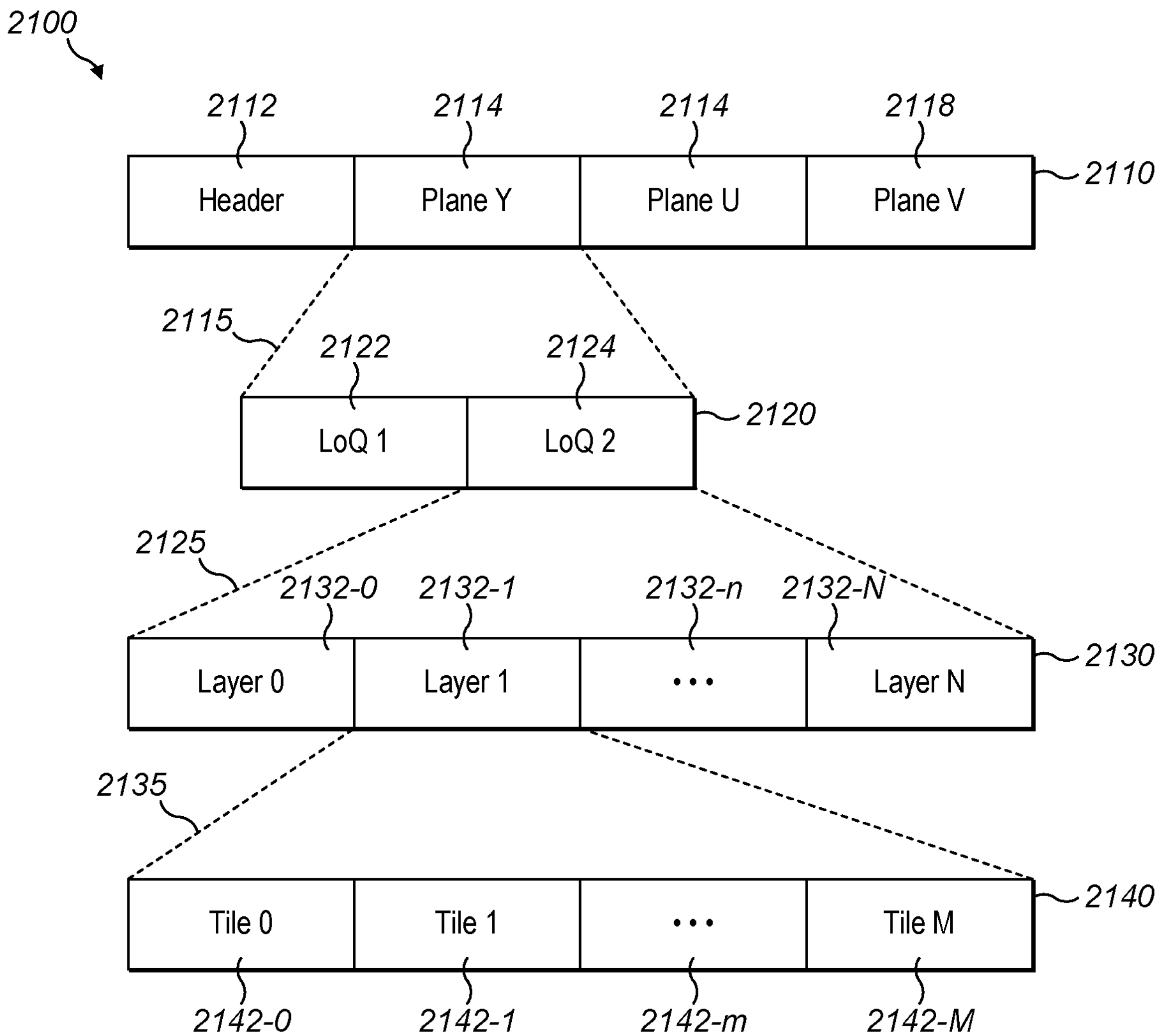
FIGS. 21A and 21B are schematic illustrations showing different bitstream configurations.

FIG. 21A shows another example 2100 of a bit or bytestream structure for an enhancement stream. FIG. 21A may be seen as another example similar to FIG. 9A. The top of FIG. 21A shows components 2112 to 2118 of an example bytestream 2110 for a single frame of video data. A video stream will then comprise multiple such structures for each frame of the video. The bytestream for a single frame comprises a header 2112, and data relating to each of three planes. In this example, these planes are colour components of the frame, namely Y, U and V components 2114, 2216 and 2218.

In the second level of FIG. 21A, the general structure of a bytestream for a given colour plane 2115 is shown. In this case, the sub-portions of a Y plane are shown. The other planes may have a similar structure. In FIG. 21A, each plane comprises data 2120 relating to each of the two levels of enhancement: a first level of quality (level or LoQ 1) 2122 and a second level of quality (level or LoQ 2) 2124. As discussed above, these may comprise data for the level 1 enhancement stream and the level 2 enhancement stream.

In the third level of FIG. 21A, each enhancement level 2125 further data 2130 that comprises bytestream portions 2132 relating to a plurality of layers. In FIG. 21A, N layers are shown. Each layer here may relate to a different "plane" of encoded coefficients, e.g. residual data following transformation, quantization and entropy encoding. If a 2×2 coding unit is used, there may be four such layers (e.g. each direction of the directional decomposition—DD). If a 4×4 coding unit is used, there may be sixteen such layers (e.g. each direction of the directional decomposition squared—DDS). In one case, each layer may be decoded independently of the other layers; as such each layer may form an Independently Decodable Unit—IDU. If a temporal mode is used, there may also be one or more layers relating to temporal information.

When a tiling configuration is used, e.g. for partial decoding, there may be an extra decomposition 2135 of the data

2140 for each layer into portions 2142 relating to multiple tiles. These tiles may correspond to a rectangular area of the original input video. Tile size may be fixed for each Group of Pictures (GOP). Tiles may be ordered in a raster order. FIGS. 6B and 12C show examples of a tile structure.

Figure 21B:
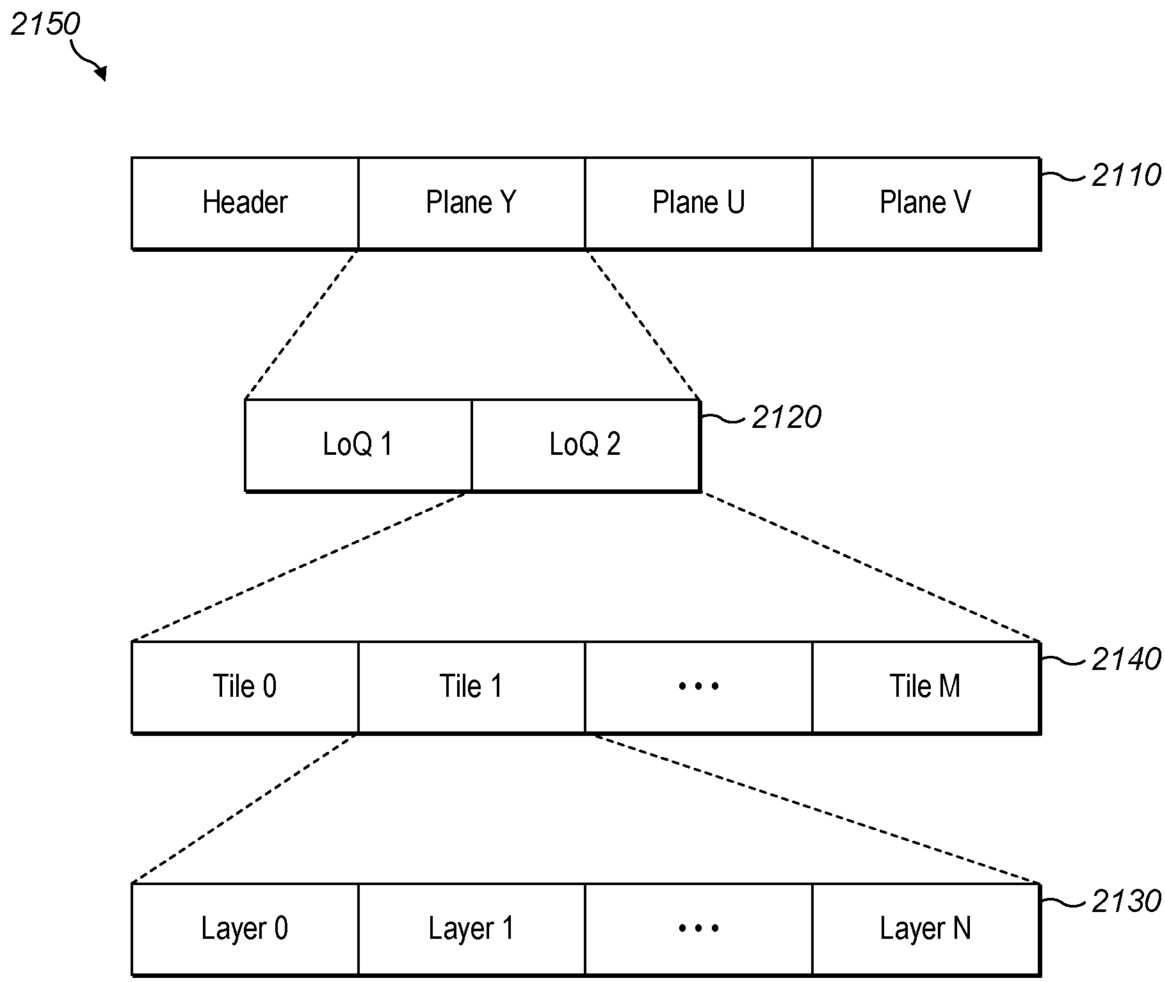

FIG. 21A shows an example whereby each layer further comprises portions 2142 of the bytestream relating to M tiles. Each tile thus forms an IDU and may be decoded independently of other tiles. This independence then enables selectable or partial decoding. FIG. 21B shows an alternative example 2150 where each level of quality 2120 or a bytestream 2110 is first decomposed into portions 2140 relating to the M tiles, whereby each tile portion is then decomposed into portions relating to each layer 2130. Either approach may be used.

In examples, each IDU may comprise header information such as one or more of an isAlive field (e.g. indicating use or non-zero data), a StreamLength (indicating a data size of the stream portion) and a payload carrying the encoded data for the IDU. Using an indication of whether a particular tile contains data (e.g. isAlive=1) may help reduce the data to be transmitted, as often particular tiles may be 0 due to the use of residual data, and so additional tile data to be transmitted may be minimised.

When tiling is used, a header, e.g. for a group of pictures (GOP), may be modified to include a tiling mode flag. In this case, a first flag value (e.g. 0) may represent a "null region" mode whereby partial decoding is not supported and a second flag value (e.g. 1) may represent a "tile" mode, whereby partial decoding is supported. The second flag value may indicate that a particular fixed-size tile mode is being used, whereby a plane (e.g. one of the YUV planes) is divided into fixed size rectangular regions (tiles), of size $T_W \times T_H$, and that the tiles are indexed in raster-order. In other cases, different flag values may indicate different tiling modes, e.g. one mode may indicate a custom tile size that is transmitted together with the header information.

In one case, a tile size may be signalled in header information. The tile size may be signalled explicitly (e.g. by sending a tile width $T_W$ in pixels and a tile height in pixels $T_H$). In one case, a tile size may be signalled by sending an index for a look-up table stored at the decoder. The tile size may thus be signalled using one byte that indicates one of up to 255 tile sizes. One index value may also indicate a custom size (e.g. to be additionally signalled in the header). The tile size, if signalled explicitly in the header information, may be communicated using 4 bytes (two bytes per width/height).

If a tiling mode is signalled, there may be one or more tile-specific configurations that are signalled in the header information. In one case, a data aggregation mode may be signalled (e.g. using a 1-bit flag). A value of one may indicate that tile data segments within the bytestream, such as the isAlive/StreamLength/Payload portions described above, are to be grouped or aggregated (e.g. the data stream first contains the isAlive header information for the set of tiles, then the StreamLength information for the set of tiles, followed by the payload information for the set of tiles). Organising the bytestream in this manner may facilitate selective decoding of tiles, e.g. as stream length information for each tile may be received prior to the payload data. In this case, the aggregated data may also be optionally compressed using Run-Length and Huffman encoding (e.g. as described herein) and this may also be flagged (e.g. using a 1-bit field). Different portions of the aggregated data stream may have different compression settings. If information such as the stream length fields are Huffman encoded, then these may be encoded as either absolute or relative values (e.g. as a relative difference from the last stream value). Relative value encoding may further reduce bytestream size.

In these examples, a method of encoding an enhancement stream is described whereby an enhancement bitstream may be split into portions or chunks that represent different spatial portions of a frame of video (i.e. tiles). The data relating to each tile may be received and decoded independently, allowing parallel processing and selective or partial decoding.

Neural Network Up-Sampling

In certain examples, up-sampling may be enhanced by using an artificial neural network. For example, a convolutional neural network may be used as part of the up-sampling operation to predict up-sampled pixel or signal element values. Use of an artificial neural network to enhance an up-sampling operation is described in WO 2019/111011 A1, which is incorporated by reference herein. A neural network up-sampler may be used to implement any one of the up-sampling components described in the examples herein.

Figure 22A:
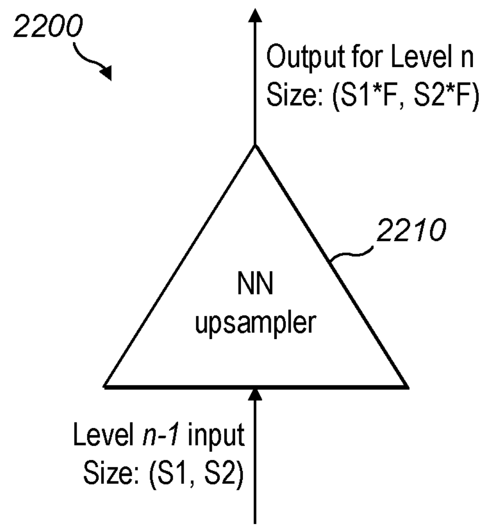
FIGS. 22A to 22D are schematic illustrations showing different aspects of an example neural network up-sampler.

FIG. 22A shows a first example 2200 of a neural network up-sampler 2210. The neural network up-sampler may be used to convert between signal data at a first level (n−1) and signal data at a second level n. In the context of the present examples, the neural network up-sampler may convert between data processed at enhancement level 1 (i.e. level of quality—LoQ—1) and data processed at enhancement level 2 (i.e. level of quality—LoQ—2). In one case, the first level (n−1) may have a first resolution (e.g. size_1 by size_2 elements) and the second level n may have a second resolution (e.g. size_3 by size_4 elements). The number of elements within each dimension at the second resolution may be a multiple of the number of elements within each dimension at the first resolution (e.g. size_3=F1*size_1 and size_4=F2*size_2). In described example, the multiples may be the same in both dimensions (e.g. F1=F2=F and in some examples, F=2).

In certain examples, use of an artificial neural network may include conversion of element data (e.g. picture elements such as values for a colour plane) from one data format to another. For example, element data (e.g. as input to the up-sampler in non-neural cases) may be in the form of 8- or 16-bit integers, whereas a neural network may operate upon float data values (e.g. 32- or 64-bit floating point values). Element data may thus be converted from an integer to a float format before up-sampling, and/or from a float format to an integer format after neural-enhanced up-sampling. This is illustrated in FIG. 22B.

Figure 22B:
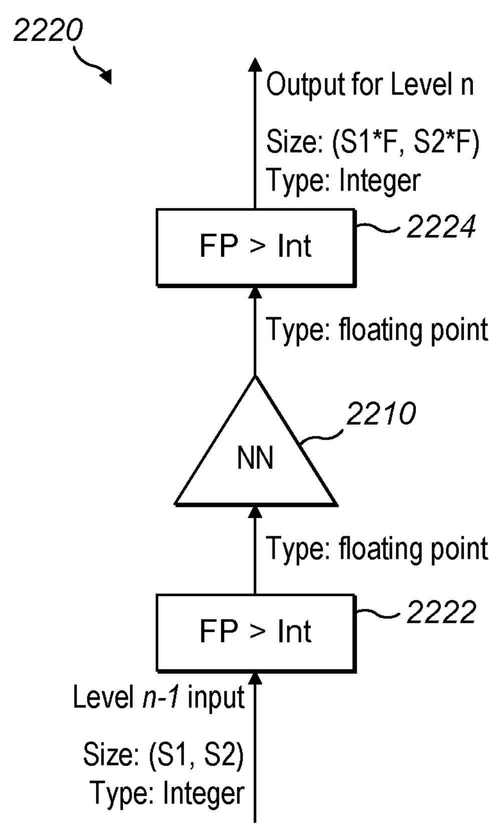

In FIG. 22B, the input to the neural network up-sampler 2210 (e.g. the up-sampler from FIG. 22A) is first processed by a first conversion component 2222. The first conversion component 2222 may convert input data from an integer format to a floating-point format. The floating-point data is then input to the neural network up-sampler 2210, which is free to perform floating-point operations. An output from the neural network up-sampler 2210 comprises data in a floating-point format. In FIG. 22B, this is then processed by a second conversion component 2224, which converts the data from the floating-point format to an integer format. The integer format may be the same integer format as the original input data or a different integer format (e.g. input data may be provided as an 8-bit integer but output as a 10-, 12- or 16-bit integer). The output of the second conversion component 2224 may place the output data in a format suitable for upper enhancement level operations, such as the level 2 enhancement described herein.

In certain examples, instead of, or as well as data format conversion the first and/or second conversion components 2222 and 2224 may also provide data scaling. Data scaling may place the input data in a form better suited to the application of an artificial neural network architecture. For example, data scaling may comprise a normalisation operation. An example normalisation operation is set out below:

norm_value=(input_value−min_int_value)/(max_int_value−min_int_value)

where input_value is an input value, min_int_value is a minimum integer value and max_int_value is a maximum integer value. Additional scaling may be applied by multiplying by a scaling divisor (i.e. dividing by a scale factor) and/or subtracting a scaling offset. The first conversion component 2222 may provide for forward data scaling and the second conversion component 2224 may apply corresponding inverse operations (e.g. inverse normalisation). The second conversion component 2224 may also round values to generate an integer representation.

Figure 22C:
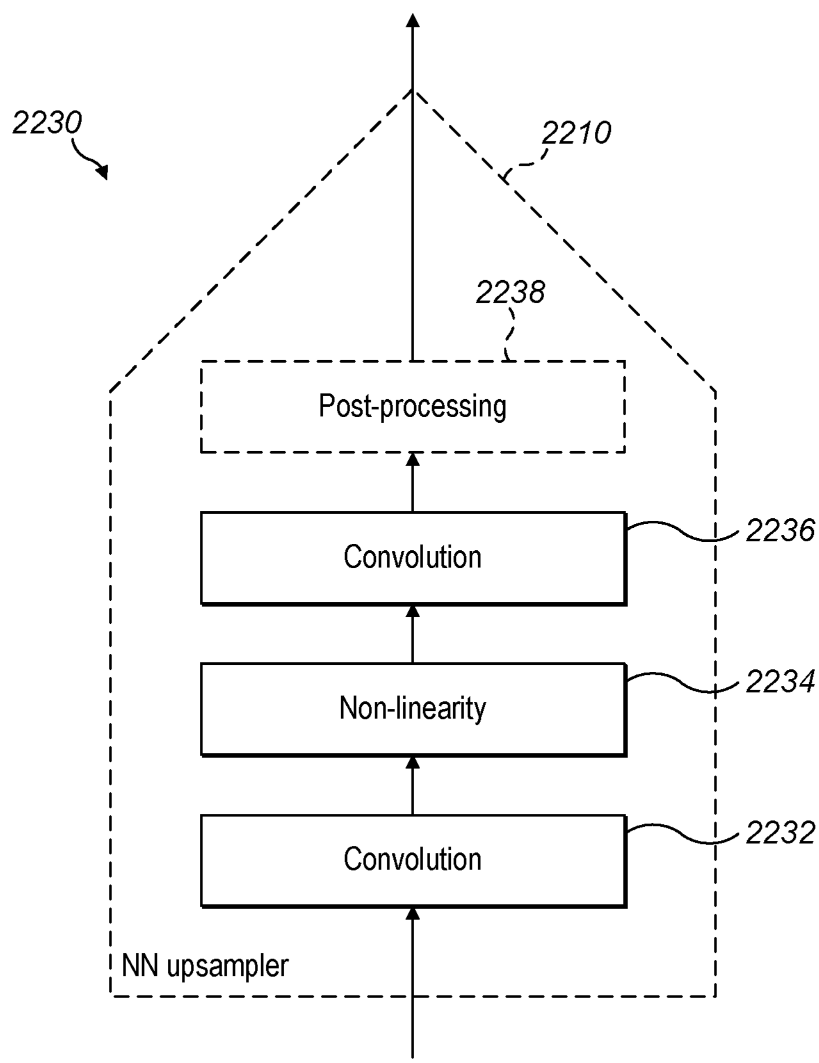

FIG. 22C shows an example architecture 2230 for a simple neural network up-sampler 2210. The neural network up-sampler 2210 comprises two layers 2232, 2236 separated by a non-linearity 2234. There is also an optional post-processing operation 2238. By simplifying the neural network architecture, up-sampling may be enhanced while still allowing real-time video decoding.

The convolution layers 2232, 2236 may comprise a two-dimensional convolution. The convolution layers may apply one or more filter kernels with a predefined size. In one case, the filter kernels may be 3×3 or 4×4. The convolution layers may apply the filter kernels, which may be defined with a set of weight values, and may also apply a bias. The bias is of the same dimensionality as the output of the convolution layer. In the example of FIG. 22C both convolution layers 2232, 2236 may share a common structure or function but have different parameters (e.g. different filter kernel weight values and different bias values). Each convolution layer may operate at a different dimensionality. The parameters of each convolution layer may be defined as a four-dimensional tensor have size—(kernel_size1, kernel_size2, input_size, output_size). The input of each convolution layer may comprise a three-dimensional tensor of size—(input_size_1, input_size_2, input_size). The output of each convolution layer may comprise a three-dimensional tensor of size—(input_size_1, input_size_2, output_size). The first convolution layer 2232 may have an input_size of 1, i.e. such that it receives a two-dimensional input similar to a non-neural up-sampler as described herein. Example values for these sizes are as follows: kernel_size1 and kernel_size2=3; for the first convolutional layer 2232, input_size=1 and output_size=16; and for the second convolutional layer 2236, input_size=16 and output_size=4. Other values may be used depending on the implementation and empirical performance. In the case that the output size is 4 (i.e. four channels are output for each input element), this may be refactored into a 2×2 block representing the up-sampled output for a given picture element.

The input to the first convolution layer 2232 may be a two-dimensional array similar to the other up-sampler implementations described herein. For example, the neural network up-sampler 2210 may receive portions of a reconstructed frame and/or a complete reconstructed frame (e.g. the base layer plus a decoded output of the level 1 enhancement). The output of the neural network up-sampler 2210 may comprise a portion of and/or a complete reconstructed frame at a higher resolution, e.g. as per the other up-sampler implementations described herein. The neural network up-sampler 2210 may thus be used as a modular component in common with the other available up-sampling approaches described herein. In one case, the selection of the neural network up-sampler, e.g. at the decoder, may be signalled within a transmitted bytestream, e.g. in global header information.

The non-linearity layer 2234 may comprise any known non-linearity, such as a sigmoid function, a tanh function, a Rectified Linear Unit (ReLU), or an Exponential Linear Unit (ELU). Variations of common functions may also be used, such as a so-called Leaky ReLU or a Scaled ELU. In one example, the non-linearity layer 2234 comprises a Leaky ReLU—in this case the output of the layer is equal to the input for values of input greater than 0 (or equal to 0) and is equal to a predefined proportion of the input, e.g. a*input, for values of the input less than 0. In one case, a may be set as 0.2.

Figure 22D:
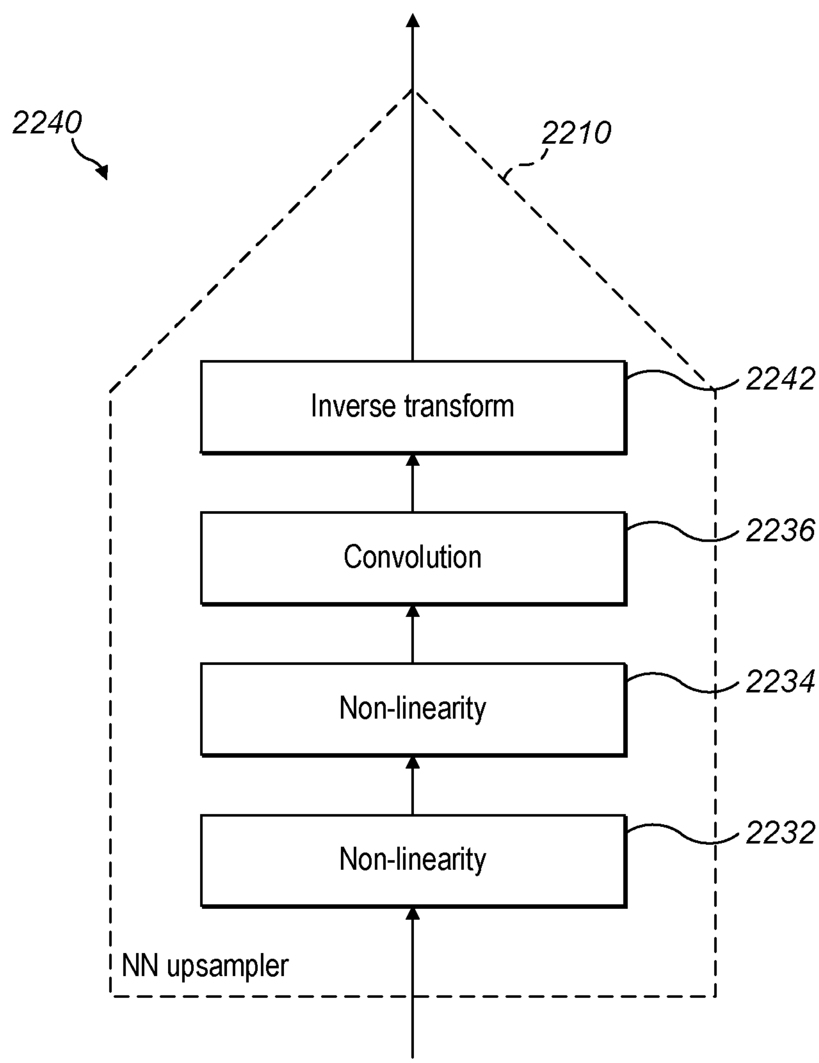

FIG. 22D shows an example 2240 with one implementation of the optionally post-processing operation 2238 from FIG. 22C. In this case, the post-processing operation may comprise an inverse transform operation 2242. In this case, the second convolution layer 2236 may output a tensor of size (size1, size2, number_of_coefficients)—i.e. the same size as the input but with a channel representing each direction within a directional decomposition. The inverse transform operation 2242 may be similar to the inverse transform operation that is performed in the level 1 enhancement layer. In this case, the second convolution layer 2236 may be seen as outputting coefficient estimates for an up-sampled coding unit (e.g. for a 2×2 coding block, a 4-channel output represents A, H, V and D coefficients). The inverse transform step then converts the multi-channel output to a two-dimensional set of picture elements, e.g. an [A, H, V, D] vector for each input picture element is converted to a 2×2 picture element block in level n.

Similar adaptations may be provided for down-sampling. An up-sampling approach applied at the encoder may be repeated at the decoder. Different topologies may be provided based on available processing resources.

The parameters of the convolutional layers in the above examples may be trained based on pairs of level (n−1) and level n data. For example, the input during training may comprise reconstructed video data at a first resolution that results from applying one or more of the encoder and decoder pathways, whereas the ground truth output for training may comprise the actual corresponding content from the original signal (e.g. the higher or second resolution video data rather than up-sampled video data). Hence, the neural network up-sampler is trained to predict, as closely as possible, the input level n video data (e.g. the input video enhancement level 2) given the lower resolution representation. If the neural network up-sampler is able to generate an output that is closer to the input video that a comparative up-sampler, this will have a benefit of reducing the level 2 residuals, which will further reduce the number of bits that need to be transmitted for the encoded level 2 enhancement stream. Training may be performed off-line on a variety of test media content. The parameters that result from training may then be used in an on-line prediction mode. These parameters may be communicated to the decoder as part of an encoded bytestream (e.g. within header information) for a group of pictures and/or during an over-the-air or wire update. In one case, different video types may have different sets of parameters (e.g. movie vs live sport). In one case, different parameters may be used for different portions of a video (e.g. periods of action vs relatively static scenes).

Example Encoder and Decoder Variations

Graphical Example with Optional Level 0 Upscaling

Figure 23:
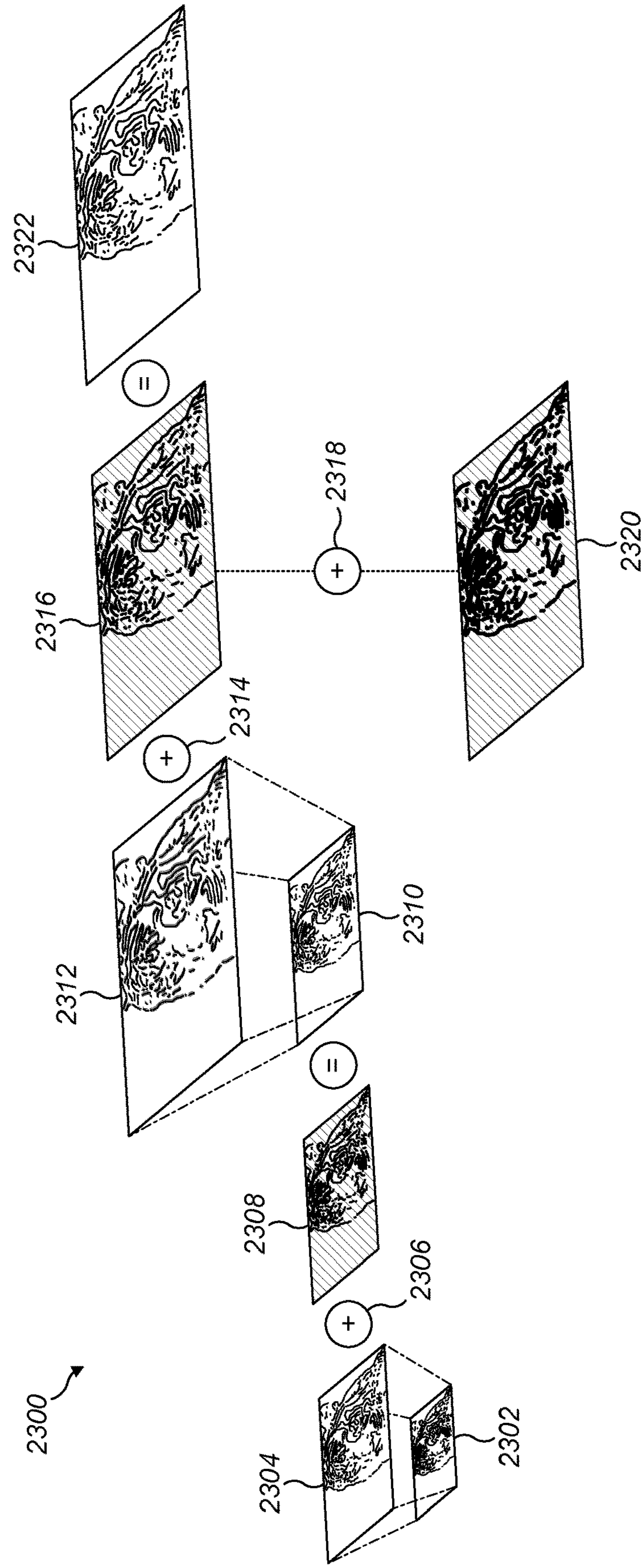
FIG. 23 is a schematic illustration showing an example of how a frame may be encoded.

FIG. 23 shows a graphical representation 2300 of the decoding process described in certain examples herein. The various stages in the decoding process are shown from left to right in FIG. 23. The example of FIG. 23 shows how an additional up-sampling operation may be applied following the decoding of the base picture. An example encoder and an example decoder to perform this variation are shown respectively in FIGS. 25 and 26.

At the far left of FIG. 23, a decoded base picture 2302 is shown. This may comprise the output of the base decoder as described in examples herein. In the present example, a selectable up-sampling (i.e. up-scaling) is performed on a lower resolution decoded base picture 2302. For example, in one case, there may comprise a further down-sampling component prior to the base encoder 112 or 332 of FIGS. 1, 3A and 3B that may be selectively applied. The lower resolution decoded base picture 2302 may be considered as a level 0 or layer 0 signal. Up-sampling of a decoded base picture may be applied based on a signalled scaling factor.

FIG. 23 shows a first up-sampling operation to generate a preliminary intermediate picture 2304. This may be considered to be at a spatial resolution associated with the level 1 enhancement (e.g. a level 1 or layer 1 signal). In FIG. 23, the preliminary intermediate picture 2304 is added 2306 to a first layer of decoded residuals 2308 (e.g. as resulting from enhancement sub-layer 1) to generate a combined intermediate picture 2310. The combined intermediate picture 2310 may then be up-sampled during a second up-sampling operation to generate a preliminary output picture 2312. The second up-sampling operation may be selectively applied (e.g. may be omitted or only performed in one-dimension rather than two) depending on a signalled scaling factor. The preliminary output picture 2312 may be considered to be at a level 2 spatial resolution. The combined intermediate picture 2310 may comprise the output of the summation components 220 or 530 and the preliminary output picture 2312 may comprise the input to the summation components 258 or 558.

At stage 2314, the preliminary output picture 2312 is added to a second layer of decoded residuals 2316 (e.g. as resulting from enhancement sub-layer 2). The second layer of decoded residuals 2316 are shown with an added 2318 contribution from information stored in a temporal buffer 2320. The information 2320 may reduce the amount of information needed to reconstruct the second layer of residuals 2316. This may be of benefit as there is more data at the second level (level 2) due to the increased spatial resolution (e.g. as compared to the first level—level 1—resolution). In FIG. 23, the output of the last addition is a final combined output picture 2322. This may be viewed as a monochrome video, and/or the process may be repeated for a plurality of colour components or planes to generate a colour video output.

Fourth Example Decoder

Figure 24:
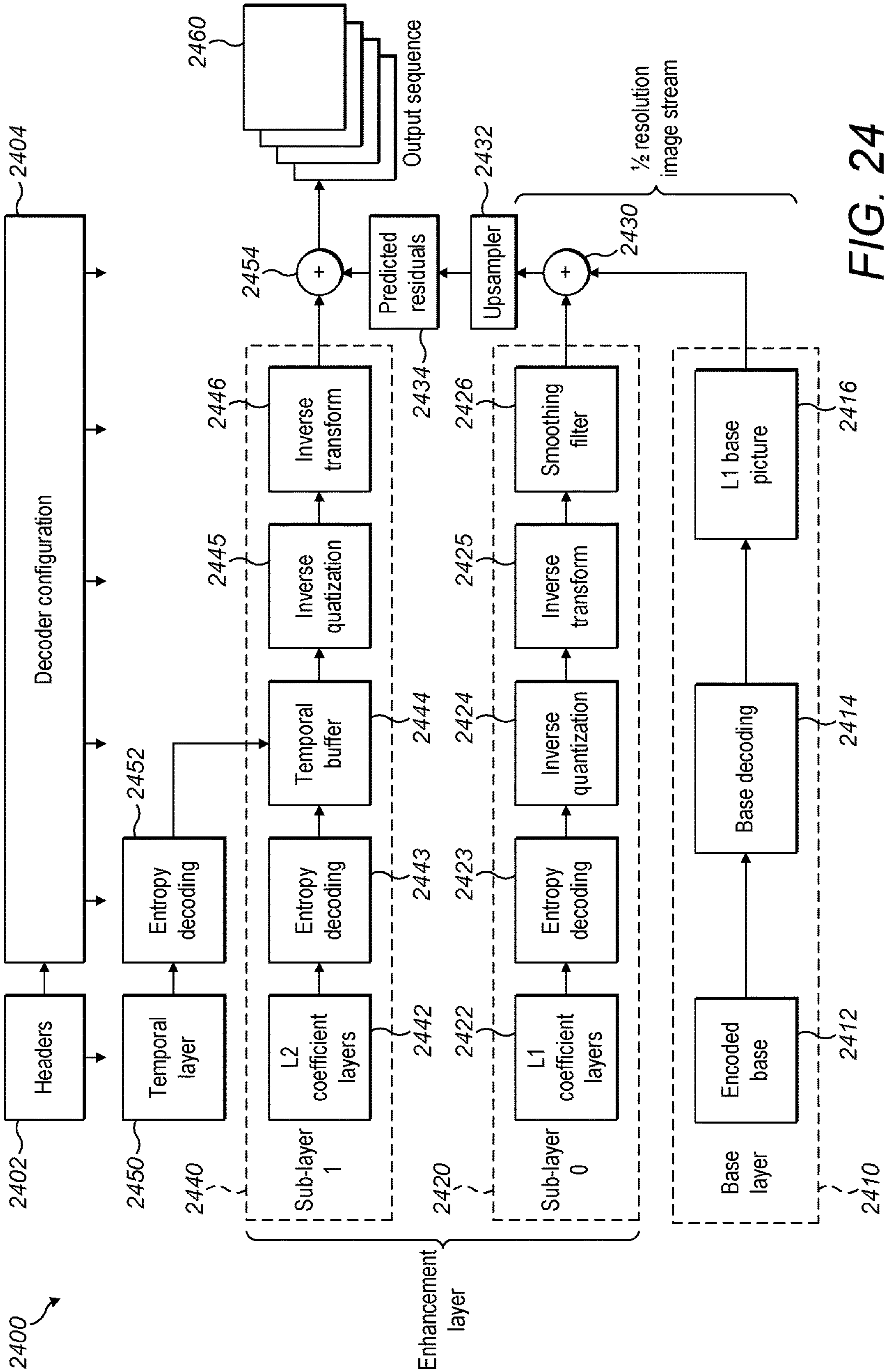
FIG. 24 is a schematic illustration of a decoder according to a fourth example.

FIG. 24 shows a fourth example decoder 2400. The fourth example decoder 2400 may be seen as a variation of the other example decoders described herein. FIG. 24 represents in a block diagram some of the processes described in more detail above and below. The scheme comprises an enhancement layer of residual data, which are then added, once processed and decoded, to a decoded base layer. The enhancement layer further comprises two sub-layers 1 and 2, each comprising different sets of residual data. There is also a temporal layer of data including signalling to predict some of the residuals at sub-layer 2, e.g. using a zero-motion vector algorithm.

In FIG. 24, the decoder 2400 receives a set of headers 2402. These may form part of a received combined bitstream and/or may originate from cloud control components. Headers 2402 may comprise decoder configuration information that is used by a decoder configuration component 2404 to configure the decoder 2400. The decoder configuration component 2404 may be similar to the configuration interface 1434 of FIG. 14C.

FIG. 24 also shows a base layer 2410 and an enhancement layer that is composed on two sub-layers: sub-layer 1 2420 and sub-layer 2 2440. These sub-layers may be equivalent to the previously described levels or sub-levels (e.g. levels 1 and 2 respectively). The base layer 2410 receives an encoded base 2412. As in the other examples, a base decoding process 2414 decodes the encoded base 2412 to generate a level 1 base picture 2416. Without base layer up-sampling, the level 1 base picture 2416 may comprise the preliminary intermediate picture 2304. In certain other examples, the base picture 2416 may be up-sampled based on scaling information to generate the preliminary intermediate picture 2304.

Sub-layer 1 receives a set of level 1 coefficient layers 2422. For example, the level 1 coefficient layers 2422 may comprise layers similar to layers 2130 for LoQ1 2122 in FIGS. 21A and 21B. Sub-layer 2 receives a set of level 2 coefficient layers 2442. These may comprise layers similar to layers 2130 for LoQ2 2124 in FIGS. 21A and 21B. A plurality of layers may be received for multiple planes as shown in FIGS. 21A and 21B, i.e. the process shown in FIG. 24 may be applied in parallel to multiple (colour) planes. In FIG. 24, a temporal layer 2450 is also received. This may comprise temporal signalling such as that described above and illustrated in FIG. 12D. Two or more of the encoded base 2412, the level 1 coefficient layers 2422, the level 2 coefficient layers, the temporal layer 2450 and the headers 2402 may be received as a combined bitstream, e.g. along the lines shown in FIG. 9A or FIGS. 21A and 21B.

Turning to sub-layer 1 2420, encoded quantized coefficients are received and processed by entropy decoding component 2423, inverse quantization component 2424, inverse transformation component 2425 and smoothing filter 2426. The encoded quantized coefficients may this be decoded, dequantized and inverse transformed, and may be further processed with a deblocking filter to generate decoded residuals for sub-layer 1 (e.g. the residuals 2308 of enhancement sub-layer 1 of FIG. 23). Turning to sub-layer 2 2440, encoded quantized coefficients are received for enhancement sub-layer 2, and are processed by an entropy decoding component 2443, a temporal processing component 2444, an inverse quantization component 2445, and an inverse transformation component 2446. The encoded quantized coefficients may thus be decoded, dequantized and inverse transformed to generate decoded residuals for sub-layer 2 (e.g. residuals 2316 of the enhancement sub-layer 2 of FIG. 23). Prior to dequantization, the decoded quantized transform coefficients may be processed by the temporal processing component 2444 that applies a temporal buffer. The temporal buffer contains transformed residuals (i.e. coefficients) for a previous frame. The decision on whether to combine them depends on information received by the decoder as to whether to use inter or intra prediction for reconstructing the coefficients prior to dequantization and inverse transformation, where inter prediction means using information from the temporal buffer to predict the coefficients to be dequantized and inverse transformed, together with the additional information received from the decoded quantized transform coefficients.

As described above the base layer may be further up-sampled (not shown) based on scaling information to generate an up-sampled base (e.g. the preliminary intermediate picture 2304 in FIG. 23). In any case, an output of the base layer 2410 at a level 1 resolution is combined at first summation component 2430 with the decoded residuals output by enhancement sub-layer 1 to generate a combined intermediate picture (such as 2310 in FIG. 23). This picture may be further up-sampled by up-sampler 2432 based on scaling information to generate an up-sampled base (e.g. the preliminary output picture 2312 in FIG. 23). The up-sampler may also include a step of adding predicted residuals 2434 as described in previous examples. The preliminary output picture can then be added, at second summation component 2454, to the decoded residuals output by enhancement sub-layer 2 2440 to generate a final output picture 2460 (e.g. the final combined output picture 2322 of FIG. 23).

Fifth Example Encoder and Decoder

Figure 25:
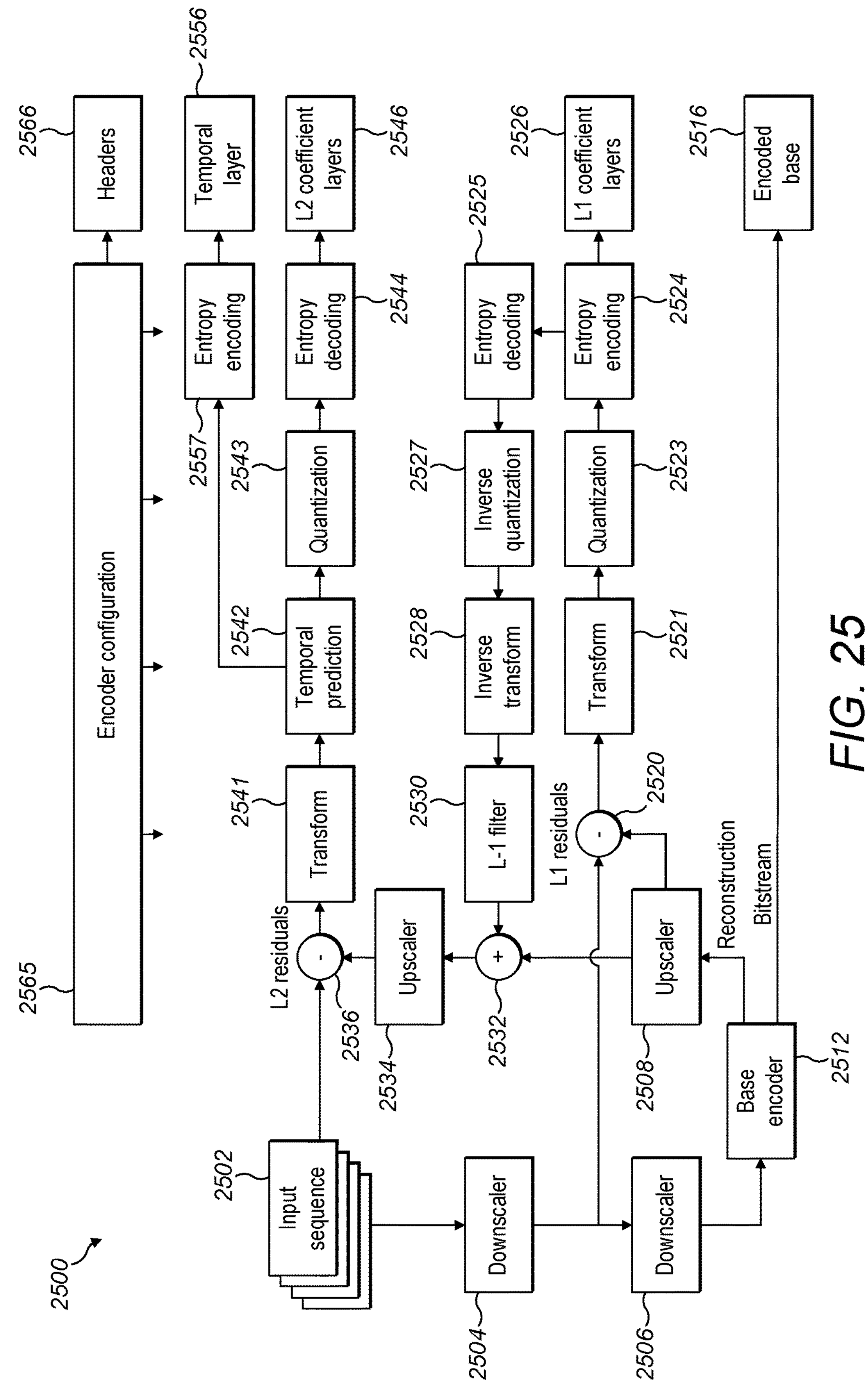
FIG. 25 is a schematic illustration of an encoder according to a fifth example.
Figure 26:
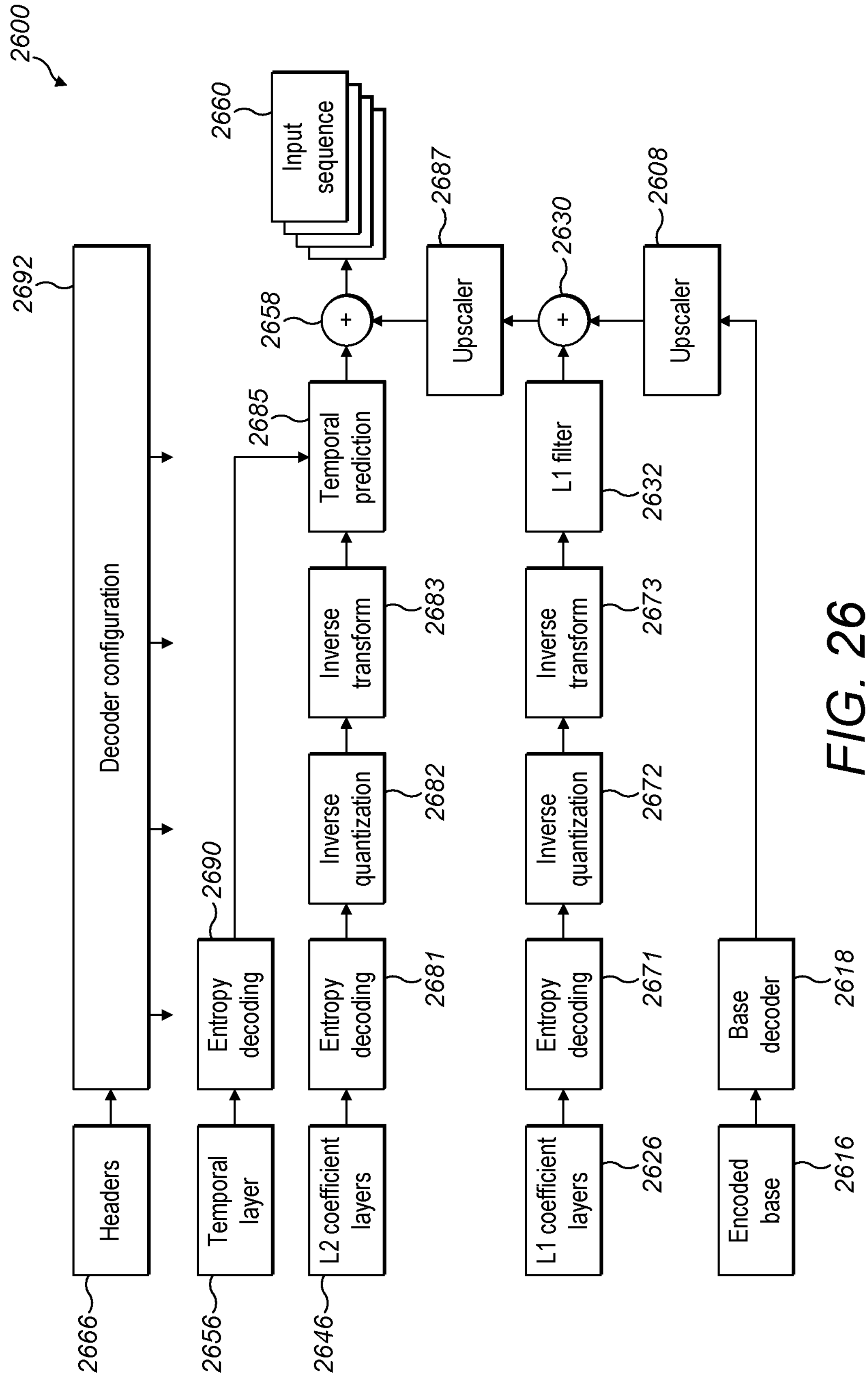
FIG. 26 is a schematic illustration of a decoder according to a fifth example.

FIGS. 25 and 26 respectively show variations of the encoder architecture of FIGS. 1, 3A and 3B and the decoder architecture of FIGS. 2, 5A and 5B.

The encoding process 2500 to create a bitstream is shown in FIG. 25. Firstly, the input sequence 2502 is fed into a first down-sampler 2504, then a second down-sampler 2506 (i.e. consecutive down-samplers that are called down-scalers in the Figure) and is processed according to a chosen scaling mode. The variation of FIG. 25 differs from that of previous examples in that there are additional down-sampling and up-sampling stages prior to the base layer, e.g. an additional down-sampling stage shown as second down-scaler 2506 is possible prior to passing data to a base encoder 2512 and an additional up-sampling stage (shown an as first up-scaler 2508 in FIG. 25) is possible following receipt of decoded data from the base layer. In certain examples, a given scaling mode may be used to turn on and off the down-scaler and up-scaler pairs at each stage. In one case, the scaling mode may indicate a direction of scaling, e.g. as per the horizontal only down-sampling/up-sampling described herein. If the second down-scaler 2506 and the first up-scaler 2508 are turned off, then the spatial scaling resembles that of FIGS. 1, 3A and 3B.

In FIG. 25, as per the previous examples, a base codec is used that produces a base bitstream 2516 according to its own specification. This encoded base may be included as part of a combined bitstream for the present video coding framework.

With or without additional upscaling, a reconstructed base picture, e.g. a decoded version of a base encoded frame, is subtracted at first subtraction component 2520 from a first-order downscaled input sequence in order to generate the sub-layer 1 residuals (the level 1 residual data as descried herein). These residuals form the starting point for the encoding process of the first enhancement layer. Transform component 2521, quantization component 2523 and entropy encoding component 2524 (amongst others) as described herein process the first set of (level 1) residuals to generate (level 1) entropy encoded quantized transform coefficients 2526.

In FIG. 25, as per previous examples, the entropy encoded quantized transform coefficients from sub-layer 1 are processed by an in-loop decoder that performs inverse or decoding operations. These operations simulate a decoding process for the first set of residuals that would be performed at a decoder. In the example of FIG. 25, these comprise an entropy decoding component 2525, an inverse quantization component 2527, an inverse transform component 2528 and a level 1 filter 2530. These may be similar to previously described components. The processed or "decoded" first set of residuals are added to data derived from the output of the base encoder (e.g. as decoded and optionally upscaled) at summation component 2532 to generate a reconstructed frame. In FIG. 25, the reconstructed frame is processed by a second up-scaler 2534. The use of the up-scaler may again depend on a chosen scaling mode. Finally, the residuals for a second sub-layer 2 (which may also be called a L2 layer) are calculated at a second subtraction component 2536 by a subtraction of the input sequence and the upscaled reconstruction. These form a second set of (level 2) residuals and these residuals are also processed by a set of coding components or tools, which include a transform component 2541, a temporal prediction component 2542, a quantization component 2543 and an entropy encoding component 2544. The output is a set of level 2 coefficient layers 2546. As described in other examples, if a temporal mode is activated, an additional temporal prediction may be applied by the temporal prediction component 2542 on the transform coefficients in order to remove certain temporally redundant information and reduce the energy of the level 2 residual stream (e.g. the number of values and the number of non-zero residual values). The entropy encoded quantized transform coefficients of sub-layer 2 as well as a temporal layer 2556 specifying the use of the temporal prediction on a block basis are included in the enhancement bitstream. The temporal layer 2556 may comprise the temporal signalling described with reference to previous examples (e.g. similar to that described with reference to FIGS. 12C and 12D). It may be entropy encoded by an entropy encoding component 2557. The entropy encoding component 2557 may apply at least run length encoding as discussed with reference to the examples.

The encoder 2500 may be configured with a set of encoder configuration information 2565, e.g. as described with reference to the examples of FIGS. 14A to 14C. This information may be transmitted to a decoder as a set of headers 2566 for the output bitstream. In FIG. 25, a combined bitstream for the encoder may comprise headers 2566, a temporal layer 2556, level 2 (L2) encoded coefficients 2546, level 1 (L1) encoded coefficients 2526 and an encoded base stream 2516.

FIG. 26 shows a variation of a decoder 2600 according to an example. The decoder may comprise a variation of the decoder shown in any one of FIGS. 2, 5A, 5B and 24. The decoder of FIG. 26 may be used together with the encoder of FIG. 25.

First, for the creation of an output sequence of frames, the decoder 2600 analyses the bitstream. As can be seen in FIG. 26, the process can again be divided into three parts.

In order to generate a decoded base picture (e.g. at Layer 0), a base decoder 2618 is fed with the extracted base bitstream 2616. According to the chosen scaling mode, this reconstructed picture may be upscaled by an additional first up-scaler 2608 prior to a summation component 2630 that adds a first set of (level 1) residuals. The input to the summation component 2630 from the first up-scaler 2608 may be referred to as a preliminary intermediate picture.

Following (or in parallel with) the base layer decoding, the enhancement layer bitstream (including the two sublayers of residuals) needs to be decoded. Firstly, the coefficients 2626 belonging to sub-layer 1 (L1) are decoded using inverse versions of the coding components or tools used during the encoding process. Hence, the level 1 coefficient layers 2626 are processed, in turn, by an entropy decoding component 2671, a inverse quantization component 2672, and an inverse transform component 2673. Additionally, a sub-layer 1 (L1) filter 2632 might be applied in order to smooth the boundaries of the transform block (i.e. the coding unit). The output of the sub-layer 1 (L1) decoding process may be referred to as an enhancement sub-layer 1 output. This enhancement sub-layer 1 output is added to the preliminary intermediate picture at the first (lower) summation component 2630, which results in a combined intermediate picture. Again, depending on the scaling mode, a second up-scaler 2687 may be applied and the resulting preliminary output picture produced. The preliminary output picture is provided to the second upper summation component 2658. It has the same dimensions as the overall output picture.

As a final step, the encoded coefficients 2646 for the second enhancement sub-layer 2 are decoded. Again, this uses a set of inverse coding components or tools as described in other examples herein. In FIG. 26, these components include an entropy decoding component 2681, an inverse quantization component 2682, and an inverse transform component 2683. If a temporal mode is activated, then a temporal prediction component 2685 may apply temporal prediction. Temporal prediction may be applied at any point within the second enhancement sub-layer 2. In one case, it is applied to the quantized transform coefficients. Temporal prediction may be applied based on signalling received as the temporal layer 2656. In FIG. 26, the temporal layer 2656 is decoded by an entropy decoding component 2690 (e.g. may be run-length decoded). The output of the temporal prediction is provided into the second upper summation component 2658 as an enhancement sub-layer 2 output. It is then added to the preliminary output picture by said summation component 2658 to form a combined output picture 2660 as a final output of the decoding process.

Again, the decoding process may be controlled according to a decoder configuration 2692 as transmitted within headers 2666 of the bit stream.

As described with reference to the above examples, unlike comparative scalable codecs, the new approaches described herein may be completely agnostic of the codec used to encode the lower layer. This is because the upper layer is decodable without any information about the lower layer, as it shown in FIGS. 2, 24 and 26, for example. As shown in FIG. 26, a decoder receives multiple streams generated by the encoder. These may be five or so streams that include: a first encoded stream (encoded base) that is produced by feeding a base codec (e.g., AVC, HEVC, or any other codec) with a down-sampled version of the input video; a second encoded stream (level 1 coefficient layers) that is produced by processing the residuals obtained by taking the difference between the reconstructed base codec video and the down-sampled version of the input video (level 1 residuals); a third encoded stream (level 2 coefficient layers) that is produced by processing the residuals obtained by taking the difference between an up-sampled version of a corrected version of the reconstructed base coded video and the input video (level 2 residuals); a fourth encoded stream (e.g. in the form of a temporal layer) that is produced from the temporal processing to instruct the decoder; and a fifth stream (headers) that are produced for configuring the decoder. The encoded base stream is decoded by a base decoder implementing a decoding algorithm corresponding to the encoding algorithm implemented by the base codec used in the encoder, and the output of this is a decoded base. Separately, and independently, the level 1 coefficient groups are decoded in order to obtain level 1 residual data. Further, separately and independently, the level 2 coefficient groups are decoded in order to obtain level 2 residual data. The decoded base, the level 1 residual data and the level 2 residual data are then combined. In particular, the decoded base is combined with the level 1 residuals data to generate an intermediate picture. The intermediate picture may be then up-sampled and further combined with the level 2 residual data.

Moreover, the new approach uses an encoding and decoding process which processes the picture without using any inter-block prediction. Rather, it processes the picture by transforming an N×N block of picture elements (e.g., 2×2 or 4×4) and processing the blocks independently from each other. This results in efficient processing as well as in no-dependency from neighbouring blocks, thus allowing the processing of the picture to be parallelised.

In general summary, with reference to FIG. 26, there is shown there is shown a non-limiting exemplary embodiment according to the present invention. In FIG. 26, an exemplary decoding module 2600 is depicted. The decoding module 2600 receives a plurality of input bitstreams, comprising encoded base 2616, level 1 coefficient groups 2626, level 2 coefficient groups 2646, a temporal coefficient group 2656 and headers 2666.

In general, the decoding module 2600 processes two layers of data. A first layer, namely the base layer, comprises a received data stream 2616 which includes the encoded base. The encoded base 2616 is then sent to a base decoding module 2618, which decodes the encoded base 2616 to produce a decoded base picture. The base decoding may be a decoder implementing any existing base codec algorithm, such as AVC, HEVC, AV1, VVC, EVC, VC-6, VP9, etc. depending on the encoded format of the encoded base.

A second layer, namely the enhancement layer, is further composed of two enhancement sublayers. The decoding module receives a first group of coefficients, namely level 1 coefficient groups 2626, which are then passed to an entropy decoding module 2671 to generate decoded coefficient groups. These are then passed to an inverse quantization module 2672, which uses one or more dequantization parameters to generate dequantized coefficient groups. These are then passed to an inverse transform module 2673 which performs an inverse transform on the dequantized coefficient groups to generate residuals at enhancement sublayer 1 (level 1 residuals). The residuals may then be filtered by a smoothing filter 2632. The level 1 residuals (i.e., the decoded first enhancement sublayer) is applied to a processed output of the base picture.

The decoding module receives a second group of coefficients, namely level 2 coefficient groups 2646, which are then passed to an entropy decoding module 2681 to generate decoded coefficient groups. These are then passed to an inverse quantization module 2682, which uses one or more dequantization parameters to generate dequantized coefficient groups. The dequantization parameters used for the enhancement sublayer 2 may be different from the dequantization parameters used for the enhancement sublayer 1. The dequantized coefficient groups are then passed to an inverse transform module 2683 which performs an inverse transform on the dequantized coefficient groups to generate residuals at enhancement sublayer 2 (level 2 residuals).

Variations of Aspects of the Described Examples

A number of variations of certain aspects described above will now be described.

Partial Tiling

In certain examples, each group of coefficients may be encoded and decoded separately. However, each group contains the respective coefficients for the whole frame (e.g. one group may relate to all the "A" coefficients and another group may relate to all the "V" coefficients for a 2×2 transform). In the present description, the groups of coefficients are also referred to as coefficient layers.

In certain variations, smaller portions of the frame (e.g., tiles) may be decoded individually by the decoder, thus enabling features such as partial decoding.

In particular, the bitstream signals to the decoder whether the tiling of the coefficients has been enabled. If enabled, the decoder is then able to select which tiles to decode by identifying, within a group of coefficients, the portions of the group corresponding to the selected tiles.

For example, in one case, the layers of FIG. 9A may be tiled as shown in FIG. 21A. Each of the tiles 2140 may be alternatively referred to as sub-groups of coefficients (SGs). Each coefficient group may be split into M sub-groups, each sub-group corresponding to a tile.

In certain examples, the size of each sub-group may differ between sub-groups as the size may depend on the amount of data encoded in each group. The size of each sub-group as well as whether the sub-group is active or not (a subgroup is only active if it contains any encoded data) may be signalled as compressed metadata, which may, for example, be encoded and decoded using Huffman coding and/or RLE as described with respect to other examples.

Partial decoding, e.g. decoding certain tiles but not decoding other tiles, may be particularly useful for virtual and augmented reality applications and for telepresence applications (e.g. remote medicine or surgery). The solution described here enables a decoder to selectively choose the portion of the video to decode, for example based on a viewport area, and decode only that part. By way of non-limiting example, the decoder may receive an 8K picture (8,192×4,320 pixels) but decide only to display a portion of it due, for example, to the viewpoint of the user (e.g., a 4K area of 4,096×2,160 pixels).

In particular, in a hierarchical coding scheme like the one described in examples herein, a base layer may be a lower resolution layer (e.g., 4K) encoded with a legacy codec (e.g., HEVC, VVC, EVC, AV1, VP9, AVC, etc.) and the enhancement layer may be a higher resolution layer (e.g., 8K) encoded with an enhancement codec such as the low complexity enhancement video coding described herein. The decoder may select a portion of the 8K full resolution picture to decode, for example a 4K portion. The decoder would first decode the base layer using the legacy codec, and then would only select the portion of interest of the 8K enhancement layer, for example a 4K area or a slightly bigger one depending on the decision of the decoder. In this way, the decoder would significantly speed up the time to decode the region of interest of the picture without losing on the resolution.

An exemplary method of the above variation may comprise: receiving first and second sets of reconstruction data, said reconstruction data to be used to reconstruct a video sequence (e.g. comprising the encoded residual data described herein); selecting a region of interest in a video sequence; decoding a first portion of the first set of reconstruction data based on the selected region of interest; and decoding a second portion of the second set of reconstruction data based on the selected region of interest. The first portion may correspond to the entirety of the first set. The method may comprise a step of processing the first portion to produce a preliminary reconstruction of the video sequence. The method may further comprise combining the decoded second portion with the preliminary reconstruction to produce a final reconstruction of the video sequence. The final reconstruction may correspond to a region of interest of the reconstruction that would be produced if the whole first and second set were to be decoded and combined together.

User Data Signalling

In certain variations of the examples described herein, a bit in the bitstream may be used to signal the presence of user data in place of one of the coefficients associated with a transform block (e.g., the HH coefficient), specifically in the case of a 4×4 transform. For example, this may comprise signalling user data in place of the temporal signalling described with respect to other examples (and shown, for example, in FIG. 11C).

In certain examples, an encoding of user data in place of one of the coefficients may be configured as follows. If the bit is set to "0", then the decoder shall interpret that data as the relevant transform coefficient. If the bit is set to "1", then the data contained in the relevant coefficient is deemed to be user data, and the decoder is configured to ignore that data—i.e., decode the relevant coefficient as zero.

User data transmitted in this manner may be useful to enable the decoder to obtain supplementary information including, for example, various feature extractions and derivations, as described in co-filed patent application number GB1914413.8, which is incorporated herein by reference.

Modular Signalling of Parameters

In an aspect of the present disclosure, there is provided a method for signalling certain decoding parameters in a modular manner. In particular, one or more bits may be used in a signalling portion of a bitstream (for example, in a header indicating parameters associated with a sequence, such as Sequence Parameter Sets (SPS), or with a picture, such as Picture Parameter Sets (PPS)) to indicate that certain parameters are indicated in the bitstream.

In particular, the bitstream may contain one or more bits which, when set to one or more certain values, indicate to the decoder the presence of additional information to be decoded. The decoder, once received the bitstream, decodes the one or more bits and, upon determining that the one or more bits corresponds to said one or more certain values, interpret one or more subsequent set of bits in the bitstream as one or more specific parameters to be used when decoding the bitstream (e.g., a payload included in the bitstream).

In a non-limiting example, said one or more specific parameters may be associated with the decoding of a portion of encoded data. For example, the one or more specific parameters may be associated with one or more quantization parameters to decode a portion of the encoded data. For example, if the encoded data comprises two or more portions of encoded data (for example, each portion may be a sublayer of an enhancement layer as described previously), the one or more specific parameters may be one or more quantization parameters associated with decoding some of the two or more portions of encoded data. In another example, the one or more specific parameters may be one or more parameters associated with some post-processing operations to be performed at the decoder, for example applying a dithering function.

In a specific example, the one or more bits may be a bit (e.g., step_width_level1_enabled_bit) which enables explicit signalling of a quantization parameter (e.g., step_width_level1) only when required. For example, this may occur only when there are data encoded in sublayer 1 as described above. In particular, if the bit step_width_level1_enabled is set to "0", then the value of the step width for sublayer 1 would be set by default to a maximum value. On the other hand, when the bit step_width_level1_enabled is set to "1", then step_width_level1 is explicitly signalled and the value of the step width for sublayer 1 is derived from it. A decoding module/decoder would decode the bit step_width_level1_enabled and, if it determines that it is set to "0", it is able to set the value of the step width for sublayer 1 to a maximum value. On the other hand, if it determines that it is set to "1", it is able to set the value of the step width for sublayer 1 to a value corresponding to the parameter step_width_level1 (for example, a value between 0 and $2^N-1$ where N is the number of bits associated with step_width_level1).

In a different example, the one or more bits may be a bit (e.g., decoder_control bit) to enable two parameters (e.g., dithering control variables dithering_type and dithering_strength) to be signalled on a per picture basis if decoder_control is set to "1". A decoding module/decoder would decode the bit decoder_control and, if it determines that it is set to "1", it would decode the dithering control variables dithering_type and dithering_strength and apply the dithering as described in the present application.

The above mechanism provides some important technical advantages, here described by reference to the specific examples but which can be easily generalised to general cases. First, there are some efficiency gains coming from the use of the bit step_width_level1_enabled, which brings an N bits per picture saving in the event no enhancement is used for sub-layer 1. This could result, for example, in a saving of 800 bps for a 50 fps sequence. Second, the use of the bit step_width_level1_enabled may lead to a decoding module/decoder being able to "by-pass" completely any processing for enhancement sub-layer 1, thus further decreasing the decoding complexity.

Further examples of different signalling approaches are described with respect to the syntax and semantic sections below.

Hybrid Decoding Module

In an aspect of the present disclosure, there is provided a decoding module to enable decoding of a combined bitstream made of at least a first bitstream decodable with a first decoding algorithm (e.g., a base codec such as AVC, HEVC, VVC, etc.) and a second bitstream decodable with a second decoding algorithm (e.g., the enhancement codecs described herein). The two bitstreams may comprise the bitstreams referred to herein as the encoded base stream and the encoded enhancement stream, where the encoded enhancement stream may have two sub-streams corresponding to each of a plurality of layers, levels or sub-levels.

In a first non-limiting aspect, the combined bitstream is received by a receiving module which separates the first bitstream and the second bitstream, and sends the first bitstream to a first decoding module (capable of decoding with the first decoding algorithm) and a second bitstream to a second decoding module (capable of decoding with the second decoding algorithm). This may comprise a form of demultiplexer. Further, the module may receive from the first decoding module a stream corresponding to the decoded first bitstream and pass it to the second decoding module. The second decoding module may then use it in order to generate a final decoded stream as described in further detail in the present specification.

In a second non-limiting aspect, the combined bitstream is received by a first decoding module (capable of decoding with the first decoding algorithm) and at the same time by a second decoding module (capable of decoding with the second decoding algorithm). The first decoding module would decode only the first bitstream and discard the second bitstream. The second decoding module would decode only the second bitstream and discard the first bitstream. The second decoding module may then receive the decoded first bitstream and then use it in order to generate a final decoded stream as described in further detail in other examples.

The example of NALU processing set out below describes certain ones of these aspects in more detail.

NALU Processing

Examples are described herein where a base stream and an enhancement stream may be encapsulated within a set of Network Abstraction Layer Units or NALUs. The Network Abstraction Layer or NAL was introduced as part of the H.264/AVC and HEVC video coding standards. It provides a mechanism whereby a video coding layer, e.g. that may comprise one or more of the base stream and the enhancement stream, is mapped onto underlying network transport layers such as RTP/IP (for Internet traffic) and MPEG-2 (for broadcast signals).

Each NALU may be seen as a packet of information that contains an integer number of bytes. One set of bytes form a NAL header. The NAL header may indicate a type of data that is contained within NALU. This, for example, is illustrated in the later examples of syntax for the bitstream. The NAL header may be a number of bytes (e.g. 1 or 2 bytes). The remaining bytes of the NALU comprise payload data of the type indicated by the NAL header. The NAL header may comprise a nal_unit_type variable, which indicates the NALU type. This is shown in some of the later described examples.

The NAL unit may specify a generic format for use in both packet-oriented and bitstream-oriented transport systems, and a series of NALUs generated by an encoder may be referred to as a NALU stream. In the present case, both the base layer and the enhancement layer may be encapsulated as a NALU stream. In certain cases, each layer may comprise a different NALU stream. In those cases, the first and second enhancement layer streams (e.g. level 1 and level 2 as described herein) may be encapsulated in a single NALU stream (e.g. a general "enhancement stream") or supplied as separate NALU streams (e.g. enhancement stream 1 and enhancement stream 2).

In one embodiment, as indicated in the later section on syntax, at least one enhancement stream comprising the encoded enhancement data is indicated with a specific NAL header unit type value (e.g. 0 in the later section). This indicates to a decoder that the NAL stream relates to the video coding specifications described in examples herein.

In certain implementations, it may be desired that a legacy decoder is able to receive and decode the encoded base stream as described herein. However, certain decoders may not be able to parse NALUs for the enhancement layers, e.g. they may only be configured to process NALUs for legacy video coding standards such as AVC or HEVC. In this case, if the decoder receives NALUs that do not comply with the specified configurations of the legacy video coding standards, it may experience an error and/or refuse to decode the encoded base stream as well as the encoded enhancement streams. For example, a legacy decoder may receive both an encoded base stream and an encoded enhancement stream; however, as the encoded enhancement stream has a NALU type that is not expected by the legacy decoder, it may result in an exception that prevents the processing of the encoded base stream, despite the encoded base stream being configured according to the legacy standard. Or alternatively, the NALU type used by the enhancement stream may be parsed differently according to the legacy standard, resulting in unpredictable operation of the decoder.

One solution to this issue is to provide a front-end component at the decoder that parses received NALUs and that is configured with knowledge of the enhancement coding technology as well as the base coding technology and as such may filter the NALUs that are sent to a downstream legacy decoder. However, this may complicate decoding and requires an additional entity within the decoding pipeline.

Another solution is for the encoded enhancement stream to use a NALU structure that is supported by the base coding technology (e.g. the base codec) but where the NALU header indicates a unit type that is not used by the base coding technology. Reference will be made to a single enhancement stream in these examples, where this stream encapsulates the two layers of the described enhancement streams. However, in other examples, there may be two separate enhancement streams.

In the second solution discussed above, the enhancement stream may use an NALU structure supported by the base stream but may set the NALU type to a unit type that is not specified within the base coding technology or that is set as a reserved unit type. For example, a base coding technology may have a unit type that is set by a byte or two bytes, indicating, respectively, 256 or 65536 possible integer values representing the same number of possible unit types. Only a small number of these unit types may actually be used by the base coding technology (e.g. as specified in a decoding specification for the technology), with remaining unit types indicated as a range of "non-specified" unit types. In certain cases, certain ranges of integer values may be reserved as well as, or instead of, being indicated as "non-specified".

In this case, the encoder of the enhancement stream may encapsulate the stream using NALUs that comply with the structure of the base coding technology but have an NALU type that is set to a non-specified or reserved value. A legacy decoder may then be able to receive and parse the header of the NALUs for the enhancement stream but the indication of the unit type as non-specified or reserved may cause the legacy decoder to simply ignore or discard these units (e.g. as instructed by the base coding technology). The legacy decoder may then also receive the NALUs for the encoded base stream, which will have the same NAL structure as the NALUs for the enhancement stream, but the NALU type will not be non-specified or reserved. As the same NAL structure is used, the header of the NALU may be processed as a conventional stream according to the legacy standard. In this case, an enhancement decoder that is configured to process the enhancement stream may receive the enhancement stream as a set of NALUs, and parse the NAL header to determine the unit type. In this case, although the unit type may be non-specified or reserved with respect to the base coding technology, it may be specified in a specification for the enhancement coding technology, meaning the enhancement decoder is able to parse and process the enhancement stream.

For example, a NALU header for an example base coding technology may be 1 byte. In this example base coding technology, a range of 0 to 128 may indicate different specified (i.e. supported) unit types, a range of 129 to 192 may indicate a range of non-specified unit types and a range of 193 to 255 may indicate reserved values. The encoded base stream as described herein may thus use a NALU structure that is supported by the base coding technology and have a unit type in the supported range (0 to 128). The enhancement coding technology may use the same NALU header and structure but use NALU types within the range 129 to 255 (or one of 129 to 192 or 193 to 255). A legacy decoder and an enhancement decoder may receive both the encoded base stream and the encoded enhancement stream. The enhancement coding technology may be configured to use a NALU type that is specified in the base coding technology to be ignored or discarded by a decoder. Hence, the legacy decoder receives both streams but only processes the base stream, discarding NALUs (i.e. packets) for the enhancement stream. The enhancement decoder, on the other hand, is able to process the packets for the enhancement stream but, if so configured, discard NALUs (i.e. packets) for the base stream. In this manner there is no requirement for a front-end parser to distribute packets. This is all performed based on the NALU type as specified in the NALU header.

Thus, in certain examples, there is a stream of packets (e.g. NALUs) where the packets relate to either an encoded base stream or an encoded enhancement stream. The packets of the encoded base stream and the encoded enhancement stream have a structure that is compatible with a base coding technology (e.g. a base codec). The packets comprise a header, where the header indicates a packet type (e.g. NALU type). Packets relating to the encoded base stream have a first range of packet type values that are supported by the base coding technology (e.g. that have a value that may be parsed and processed by a decoder configured according to the base coding technology). Packets relating to the encoded enhancement stream have a second range of packet type values that differ from the first range of packet type values and that do not have a function within the base coding technology (e.g. that are non-specified or reserved). The packet type thus allows for a mapping between the packets and a decoder adapted to process those packets.

A decoder configured according to the base coding technology may thus process the encoded base stream and output a decoded base stream using the packets relating to the encoded base stream. The same decoder may process the headers of the packets relating to the encoded enhancement stream (i.e. process the encoded enhancement stream packets within breaking) but may discard or ignore according to the specification of the base coding technology. The decoded base stream may be rendered on a display device or used together with a decoded enhancement stream as set out below.

A decoder configured according to the enhancement coding technology (e.g. as described with respect to "enhancement" coding herein, also referred to herein as a low complexity enhancement video coding or LCEVC codec) may thus process the encoded enhancement stream and output a decoded enhancement stream using the packets relating to the encoded enhancement stream. The same decoder may discard or ignore the packets relating to the encoded base stream according to the specification of the enhancement coding technology. The decoded enhancement stream may be combined with the decoded base stream as described herein, e.g. to generate an enhanced reconstructed video at a level of quality that is higher than the level of quality of the base stream.

In both cases, the packet type as set out in the packet header (e.g. the NALU type in the NALU header) enables a mapping between NALU and decoder. The same data stream may thus be received and processed by both a legacy and enhancement decoder but selectively processing applied to different components of that stream (e.g. base and enhancement portions) based on the unit type value. Legacy decoders may also operate with enhancement coding technology without error. Both decoders need only parse the header of the NALU, which allows for efficient processing of large quantities of data, e.g. neither decoder needs to parse payload data for a data stream it does not process.

Selection of NAL Structure by an Enhancement Encoder

In the case above, in the context of the previously described examples, different base coding technologies may be used. For example, a base coding technology (i.e. a base codec) may be selected by an enhancement encoder based on configuration data. The configuration data may represent a user selection and/or a selection according to one or more operating parameters. In this case, the enhancement encoder supports multiple base encodings.

In the case that the enhancement encoder supports multiple base encodings, the enhancement encoder may be configured to select a NAL structure, e.g. a format for the NALU and a NALU type, based on a selected base encoding. For example, a hybrid encoding may comprise a base encoding and an enhancement encoding as described herein. In the examples above, the NALUs for both the base encoding and the enhancement encoding have a structure where the NALU header may be parsed by a base decoder. In this case, the structure that is used for both the base encoding and the enhancement encoding may be selected based on the selected base encoding. While a base encoder may, by default, generate an encoded base stream with a compatible NALU structure, the enhancement encoder may need to be configured to generate one or more enhancement streams that have a NALU structure that is compatible with the base encoding. In other words, the enhancement encoder may support multiple NAL structures and select the structure that is needed based on the base encoder. The enhancement encoder may determine a base coding technology that is being used (e.g. AVC or HEVC) and then configured the NALUs and the NALU type in the header in accordance with that base coding technology. This may be useful where different base coding technologies have different non-specified and/or reserved unit types. For example, different base coding technologies may use a different number of bytes for the NALU header, and as such the integer values for the non-specified and/or reserved unit types may differ for the base coding technologies. The enhancement encoder in the above examples is adapted to select a NALU header value (e.g. a non-specified and/or reserved unit type) that is compatible with the base coding technology to facilitate success decoding of both the base and enhancement streams.

Similarly, when multiple base coding technologies are selectable, an enhancement decoder may be configured to determine a base coding technology that is being used in relation to a received stream (e.g. an enhancement stream that is associated with a corresponding base stream), and parse the NAL accordingly. For example, the enhancement decoder may determine a base codec that is being used and use this determination to configure the parsing of NALUs, including at least a parsing of the NALU header. In one case, the base coding technology may be signalled by the enhancement encoder. In another case, the enhancement decoder may be configured to match a received NALU against a set of possible NALUs, e.g. without explicit signalling from the enhancement encoder. For example, a byte size of the NALU header may indicate a particular base coding technology. The enhancement decoder may be configured to parse one or more NALU headers for one or more of the encoded base stream and the encoded enhancement stream to determine a base coding technology. In yet another case, the enhancement decoder may be configured to receive information from a base codec that indicates which base codec is being used. This information may then be used to select a NALU configuration for parsing one or more of the encoded base stream (e.g. to ignore) and the encoded enhancement stream (e.g. to process). In this case, the base codec and/or a configuration layer may comprise an application programming interface, where a method call is used to return the base codec type (i.e. to determine at least a base decoder that is used to decode the base stream).

Up-Sampler Coefficient Signalling

An enhancement encoder and decoder as described herein may perform up-sampling ("up-scaling") to convert from one spatial layer to another (e.g. from a lower resolution to a higher resolution). The up-sampling may be performed in one or more dimensions, and in certain cases may be omitted.

Different types of up-sampling may be used. At least nearest neighbour, bilinear, bicubic, modified cubic and neural network up-samplers are described in the examples herein. These up-samplers may use an up-sampling kernel. An up-sampling kernel may comprise one or more coefficient values to implement the up-sampling. For example, the one or more coefficient values may be used in one or more up-sampling computations, such as additions or multiplications. In one case, an up-sampling kernel may comprise coefficient values for use in one or more matrix transformations. An up-sampling kernel may comprise a multi-dimensional array (e.g. a matrix or tensor). For example, a cubic up-sampler may use a two-dimensional matrix as an up-sampling kernel and neural network up-sampler may use a series of one or more convolutions (e.g. with or without non-linear activation functions) that use one or more multi-dimensional tensors (see the 4D and 3D examples described herein).

In the above cases, an up-sampler (or up-sampling component, process or operation) may be defined by way of an up-sampler type and a set of configurable coefficients (the "kernel" described above). The set of configurable coefficients may be signalled to an enhancement decoder. The signalling may be sent from an enhancement encoder and/or from a cloud configuration server. In one case, the up-sampler type may be determined by the enhancement decoder by parsing (e.g. processing or otherwise examining) a received set of configurable coefficients. This may avoid the need to explicitly signal the up-sampler type and thus free up bandwidth.

In one case, a plurality of different up-sampler types may have a set of configurable coefficients that are supplied in a common or shared format (e.g. as one or more matrices or a multi-dimensional array). For example, a set of cubic, modified cubic or neural network up-samplers may use a kernel that has coefficients stored as a multidimensional array. The values of these coefficients may then determine which type of up-sampler is applied. In this manner, an up-sampler may be changed by changing the kernel coefficient values that are signalled to the enhancement decoder. This again may avoid the need to explicitly signal the up-sampler type, and efficiencies in the up-sampler definitions may be shared by multiple up-sampler types (e.g. optimisations within compiled computer program code).

Temporal Signalling and Temporal Modifier

In an aspect of the present application, there is a mechanism for managing temporal information separately from the encoded data (encoded coefficients). In particular, the temporal signalling information is sent via a separate layer of encoded data. In the event that no coefficients are sent (for example, by setting the step-width for level 2 enhancement sub-layer to the maximum value) the temporal buffer can be used to continue applying the residuals computed in previous frames and stored in the buffer to the current frame.

In particular, if no enhancement is sent (e.g., by setting the no_enhancement_flag to zero), the temporal buffer could be reset for the whole frame based on a signalling (e.g., by setting the temporal_refresh_bit to one) in which case no residuals are applied to the current frame. In the event however that the buffer is not reset for the whole frame based on a signalling (e.g., by setting the temporal_refresh_bit to zero), a second flag may be used to determine whether a temporal signalling should be read by a decoder. In particular, an encoder would set a flag to one (e.g., temporal_signalling_present_flag set to one) in order to inform the decoder that a temporal signalling layer is present. In that case, the decoder should read the temporal signalling and apply the temporal logic indicated by the encoder to the decoded bitstream. In particular, it should refresh the tiles and/or the block that are indicated in the signalling. On the other hand, if the encoder sets the flag to zero (e.g., temporal_signalling_present_flag set to zero), no temporal signalling is sent and the decoder would apply the residuals contained in the temporal buffer to the current frame.

By the above mechanism, temporal information and residuals belonging to static areas can be preserved even in the event no further data are sent, thus allowing to maintain high quality and details.

In a second aspect, the step-width to be applied to an enhancement sub-layer is reduced for static areas of a picture. In particular, based on a signalling that identifies tiles (i.e., groups of blocks) which are to be decoded using information from the buffer and additional delta residuals from the current frame, i.e., static tiles, the step-width can be reduced by a factor proportional to a signalled parameter (e.g., stepwidth_modifier) in order to enable a greater quantization granularity for those parts of the video which are static, and therefore are more likely to be visually relevant. Also, because the step-width is applied to the delta residuals (i.e., the difference between the residuals for a current frame and the co-located residuals already stored in the temporal buffer) a lower step-width (i.e., a higher quantization step) would enable more accuracy in the quantization of the delta residuals, which are likely to be much smaller than the residuals. Thus, improved quality would be achieved.

Quantization Deadzone for Lossless Coding

In case of lossless coding, there may be a need to change the deadzone to a smaller size. This is because in a lossless case, it may be necessary to ensure that the coefficients near zero are encoded rather than set to zero. In that case, a different deadzone may be created, by setting it, for example, to the size of the step-width rather than a size higher than that of the step-width as it would be for lossy encoding. Typical values at which the deadzone is changed are in the range of step-widths between 8 and 16, and typically at 16.

Bitstream

An example bitstream as generating by the video coding frameworks described herein may contain a base layer, which may be at a lower resolution, and an enhancement layer consisting of up to two sub-layers. The following subsection briefly explains the structure of this bitstream and how the information can be extracted.

The base layer can be created using any video encoder and is may be flexibly implemented using a wide variety of existing and future video encoding technologies. The bitstream from the base layer may resemble a bitstream as output by an existing codec. The enhancement layer has an additional different structure. Within this structure, syntax elements are encapsulated in a set of network abstraction layer (NAL) units. These also enable synchronisation of the enhancement layer information with the base layer decoded information (e.g. at a decoder so as to reconstruct a video). Depending on the position of a frame of video within a group of pictures (GOP), additional data specifying the global configuration and for controlling the decoder may be present.

As described in the examples herein, and as shown in FIGS. 9A, 21A and 21B, the data of one enhancement picture may be encoded as several chunks. These data chunks may be hierarchically organised as shown in the aforementioned Figures. In these examples, for each plane (e.g. corresponding to a colour component), up to two enhancement sub-layers are extracted. Each of them again unfolds into numerous coefficient groups of transform coefficients. The number of coefficients depends on the chosen type of transform (e.g. a 4×4 transform applied to 2×2 coding units may generate 4 coefficients and a 16×16 transform applied to 4×4 coding units may generate 16 coefficients). Additionally, if a temporal processing mode is used, an additional chunk with temporal data for one or more enhancement sub-layers may be present (e.g. one or more of the level 1 and level 2 sub-layers). Entropy-encoded transform coefficients within the enhancement bitstream may be processed at a decoder by the coding tools described herein.

As described herein the terms bitstream, bytestream and stream of NALUs may be used interchangeably. Implementations of examples may only comprise an implementation of the enhancement levels and base layer implementations, such as base encoders and decoders may be implemented by third-party components, wherein an output of a base layer implementation may be received and combined with decoded planes of the enhancement levels, with the enhancement decoding as described herein.

In certain examples, the bitstream can be in one of two formats: a NAL unit stream format or a byte stream format. A NAL unit stream format may be considered conceptually to be the more "basic" type. It consists of a sequence of syntax structures called NAL units. This sequence is ordered in decoding order. There may be constraints imposed on the decoding order (and contents) of the NAL units in the NAL unit stream. The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

For bit-oriented delivery, the bit order for the byte stream format may be specified to start with the most significant bit of the first byte, proceed to the least significant bit of the first byte, followed by the most significant bit of the second byte, etc. The byte stream format may consist of a sequence of byte stream NAL unit syntax structures. Each byte stream NAL unit syntax structure may contain one 4-byte length indication followed by one nal_unit (NumBytesInNalUnit) syntax structure. This syntax structure may be as follows:

| Syntax | Descriptor |
|---|---|
| byte_stream_nal_unit( ) { | |
| nal_unit_length | u(32) |
| nal_unit( nal_unit_length ) | |
| } | |

The order of byte stream NAL units in the byte stream may follow a decoding order of the NAL units contained in the byte stream NAL units. The content of each byte stream NAL unit may be associated with the same access unit as the NAL unit contained in the byte stream NAL unit. In the above nal_unit_length is a 4-byte length field indicating the length of the NAL unit within the nal_unit( ) syntax structure.

Relationship Between Base Bitstream and Enhancement Bitstream

A relationship between the base bitstream and the enhancement bitstream may be realized using one of the two following mechanisms. In a first case, if the base bitstream and the enhancement bitstream are not interleaved, a relationship between the Access Units of the base decoder and the Access Units of the enhancement decoder (i.e. the enhancement layers) may be specified. In a second case, if the base decoder bitstream and the enhancement bitstream are interleaved in a single elementary stream, a relationship may be realized by interleaving the Access Units of the base bitstream and the Access Units of the enhancement bitstream.

For example, in the first case, the relationship may be specified using the interleaving and synchronization mechanisms specified by International Standard (IS) 13818-1 Program Stream or the interleaving and synchronization mechanisms specified by IS 14496-14 File Format. In the second case, the interleaving of base Access Units and corresponding enhancement Access Units may be implemented with a number of constraints. These constraints may comprise one or more of: the order of Access Units in the input base bitstream is preserved in the interleaved base and enhancement bitstream; the enhancement Access Unit associated to the corresponding base Access Unit is inserted immediately after the base Access Unit and immediately before the following base Access Unit in bitstream order; the discrimination between Access Units belonging to the base bitstream and Access Units belonging to the enhancement bitstream is realized by means of the NAL unit types, as described with respect to later examples; and the enhancement decoder infers that the residuals obtained from decoding the enhancement Access Unit are to be processed in combination with the samples of the base picture obtained from decoding the immediately preceding base Access Unit.

Payload Processing

A payload data block unit process may be applied to the input bitstream. The payload data block unit process may comprise separating the input bitstream into data blocks, where each data block is encapsulated into a NALU. The NALU may be used as described above to synchronise the enhancement levels with the base level. Each data block may comprise a header and a payload. The payload data block unit may comprise parsing each data block to derive a header and a payload where the header comprises configuration metadata to facilitate decoding and the payload comprises encoded data. A process for decoding the payload of encoded data may comprise retrieving a set of encoded data and this may be performed following the decoding process for a set of headers. Payloads may be processed based on the structure shown in one or more of FIGS. 9A, 21A and 21B, e.g. a set of entropy encoded coefficients grouped be plane, levels of enhancement or layers. As mentioned, each picture of each NALU may be preceded by picture configuration payload parameters.

It is noted for example that each layer is a syntactical structure containing encoded data related to a specific set of transform coefficients. Thus, each layer may comprise, e.g. where a 2×2 transform is used, a set of 'average' values for each block (or coding unit), a set of 'horizontal' values for each block, a set of 'vertical' for each block and a set of 'diagonal' values for each block. Of course, it will be understood that the specific set of transform coefficients that are comprised in each layer will relate to the specific transform used for that particular level of enhancement (e.g. first or further, level 1 or 2, defined above).

Bitstream Syntax

In certain examples, the bitstreams described herein (e.g. in particular, the enhancement bitstream) may be configured according to a defined. This section presents an example syntax that may be used. The example syntax may be used for interpreting data and may indicate possible processing implementations to aid understanding of the examples described herein. It should be noted that the syntax described below is not limiting, and that different syntax to that presented below may be used in examples to provide the described functionality.

In general, a syntax may provide example methods by which it can be identified what is contained within a header and what is contained within data accompanying the header. The headers may comprise headers as illustrated in previous examples, such as headers 256, 556, 2402, 2566 or 2666. The syntax may indicate what is represented but not necessarily how to encode or decode that data. For example, with relation to a specific example of an up-sample operation, the syntax may describe that a header comprises an indicator of an up-sample operation selected for use in the broader encoding operation, i.e. the encoder side of the process. It may also be indicated where that indication is comprised in the header or how that indicator can be determined. As well as the syntax examples described below, a decoder may also implement components for identifying entry points into the bitstream, components for identifying and handling non-conforming bitstreams, and components for identifying and handling errors.

The table below provides a general guide to how the example syntax is presented. When a syntax element appears, it is indicated via a variable such as syntax element; this specifies that a syntax element is parsed from the bitstream and the bitstream pointer is advanced to the next position beyond the syntax element in the bitstream parsing process. The letter "D" indicates a descriptor, which is explained below. Examples of syntax are presented in a most significant bit to least significant bit order.

| General Guide - Syntax Specification | D |
|---|---|
| /* A statement can be a syntax element with an associated descriptor or can be an expression used to specify conditions for the existence, type and quantity of syntax elements, as in the following two examples */ | |
| syntax_element | u(n) |
| conditioning statement | |
| /* A group of statements enclosed in curly brackets is a compound statement and is treated functionally as a single statement. */ | |
| { | |
| Statement | |

-continued

| General Guide - Syntax Specification | D |
|---|---|
| Statement | |
| ... | |
| } | |
| /* A "while" structure specifies a test of whether a condition is true, and if true, specifies evaluation of a statement (or compound statement) repeatedly until the condition is no longer true */ | |
| while (condition) | |
| Statement | |
| /* A "do ... while" structure specifies evaluation of a statement once, followed by a test of whether a condition is true, and if true, specifies repeated evaluation of the statement until the condition is no longer true */ | |
| do | |
| Statement | |
| while (condition) | |
| /* An "if ... else" structure specifies a test of whether a condition is true and, if the condition is true, specifies evaluation of a primary statement, otherwise, specifies evaluation of an alternative statement. The "else" part of the structure and the associated alternative statement is omitted if no alternative statement evaluation is needed */ | |
| if (condition) | |
| primary statement | |
| else | |
| alternative statement | |
| /* A "for" structure specifies evaluation of an initial statement, followed by a test of a condition, and if the condition is true, specifies repeated evaluation of a primary statement followed by a subsequent statement until the condition is no longer true. */ | |
| for (initial statement; condition; subsequent statement) | |
| primary statement | |

In the examples of syntax, functions are defined as set out in the table below. Functions are expressed in terms of the value of a bitstream pointer that indicates the position of the next bit to be read by the decoding process from the bitstream.

| Syntax function | Use |
|---|---|
| byte_stream_has_data( ) | If the byte-stream has more data, then returns TRUE; otherwise returns FALSE. |
| process_payload_function (payload_type, payload_byte_size) | Behaves like a function lookup table, by selecting and invoking the process payload function relating to the payload_type. |
| read_bits(n) | Reads the next n bits from the bitstream. Following the read operation, the bitstream pointer is advanced by n bit positions. When n is equal to 0, read_bits(n) returns a value equal to 0 and the bitstream pointer is not advanced. |
| read_byte(bitstream) | Reads a byte in the bitstream returning its value. Following the return of the value, the bitstream pointer is advanced by a byte. |
| read_multibyte(bitstream) | Executes a read_byte(bitstream) until the MSB of the read byte is equal to zero. |
| bytestream_current (bitstream) | Returns the current bitstream pointer. |
| bytestream_seek (bitstream, n) | Returns the current bitstream pointer at the position in the bitstream corresponding to n bytes. |

The following descriptors, which may be used in the "D" column of the example tables, specify the parsing process of each syntax element:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first. The parsing process for this descriptor is specified later examples.

mb: read multiple bytes. The parsing process for this descriptor is specified by the return value of the function read_multibyte(bitstream) interpreted as a binary representation of multiple unsigned char with most significant bit written first, and most significant byte of the sequence of unsigned char written first.

NAL Unit and NAL Unit Header Syntax

NAL unit and NAL unit header syntax may be configured as set out in the respective two tables below:

| Syntax | D |
|---|---|
| nal_unit(NumBytesInNALunit) { | |
| nal_unit_header( ) | |
| NumBytesInRBSP = 0 | |
| for (i = 2; i < NumBytesInNALunit; i++) { | |
| if (i + 2 < NumBytesInNALunit && next_bits(24) == 0x000003) { | |
| rbsp_byte[NumBytesInRBSP++] | u(8) |
| rbsp_byte[NumBytesInRBSP++] | u(8) |
| i += 2 | |
| emulation_prevention_three_byte /* equal to 0x03 */ | u(8) |
| } else | |
| rbsp_byte[NumBytesInRBSP++] | u(8) |
| } | |
| } | |

| Syntax | D |
|---|---|
| nal_unit_header( ) { | |
| forbidden_zero_bit | u(1) |
| forbidden_one_bit | u(1) |
| nal_unit_type | u(5) |
| reserved_flag | u(9) |
| } | |

Process Block Syntax

An example process block syntax is set out in the table below:

| Syntax | D |
|---|---|
| process_block( ) { | |
| payload_size_type | u(3) |
| payload_type | u(5) |
| payload_size = 0 | |
| if (payload_size_type == 7) { | |
| custom_byte_size | mb |
| payload_size = custom_byte_size | |
| } else { | |
| if (payload_size_type == 0) payload_size = 0 | |
| if (payload_size_type == 1) payload_size = 1 | |
| if (payload_size_type == 2) payload_size = 2 | |
| if (payload_size_type == 3) payload_size = 3 | |
| if (payload_size_type == 4) payload_size = 4 | |
| if (payload_size_type == 5) payload_size = 5 | |
| } | |
| if (payload_type == 0) | |
| process_payload_sequence_config(payload_size) | |

-continued

| Syntax | D |
|---|---|
| else if (payload_type == 1) | |
| process_payload_global_config(payload_size) | |
| else if (payload_type == 2) | |
| process_payload_picture_config(payload_size) | |
| else if (payload_type == 3) | |
| process_payload_encoded_data(payload_size) | |
| else if (payload_type == 4) | |
| process_payload_encoded_data_tiled(payload_size) | |
| else if (payload_type == 5) | |
| process_payload_additional_info(payload_size) | |
| else if (payload_type == 6) | |
| process_payload_filler(payload_size) | |
| } | |

Process Payload—Sequence Configuration

A process payload sequence configuration syntax may be as set out in the table below:

<table>
<tr><th>Syntax</th><th>D</th></tr>
<tr><td>process_payload_sequence_config(payload_size) {</td><td></td></tr>
<tr><td>profile_idc</td><td>u(4)</td></tr>
<tr><td>level_ide</td><td>u(4)</td></tr>
<tr><td>sublevel_idc</td><td>u(2)</td></tr>
<tr><td>conformance_window_flag</td><td>u(1)</td></tr>
<tr><td>reserved_zeros_5bit</td><td>u(5)</td></tr>
<tr><td>if (profile_idc == 16 || level_idc == 16) {</td><td></td></tr>
<tr><td>extended_profile_idc</td><td>u(3)</td></tr>
<tr><td>extended_level_idc</td><td>u(4)</td></tr>
<tr><td>reserved_zeros_1bit</td><td>u(1)</td></tr>
<tr><td>}</td><td></td></tr>
<tr><td>if (conformance_window_flag == 1) {</td><td></td></tr>
<tr><td>conf_win_left_offset</td><td>mb</td></tr>
<tr><td>conf_win_right_offset</td><td>mb</td></tr>
<tr><td>conf_win_top_offset</td><td>mb</td></tr>
<tr><td>conf_win_bottom_offset</td><td>mb</td></tr>
<tr><td>}</td><td></td></tr>
<tr><td>}</td><td></td></tr>
</table>

Process Payload—Global Configuration

A process payload global configuration syntax may be as set out in the table below:

| Syntax | D |
|---|---|
| process_payload_global_config(payload_size) { | |
| processed_planes_type_flag | u(1) |
| resolution_type | u(6) |
| transform_type | u(1) |
| chroma_sampling_type | u(2) |
| base_depth_type | u(2) |
| enhancement_depth_type | u(2) |
| temporal_step_width_modifier_signalled_flag | u(1) |
| predicted_residual_mode_flag | u(1) |
| temporal_tile_intra_signalling_enabled_flag | u(1) |
| temporal_enabled_flag | u(1) |
| upsample_type | u(3) |
| level_1_filtering_signalled_flag | u(1) |
| scaling_mode_level1 | u(2) |
| scaling_mode_level2 | u(2) |
| tile_dimensions_type | u(2) |
| user_data_enabled | u(2) |
| level1_depth_flags | u(1) |
| reserved_zeros_1bit | u(1) |
| if (temporal_step_width_modifier_signalled_flag == 1) { | |
| temporal_step_width_modifier | u(8) |
| } else { | |
| temporal_step_width_modifier = 48 | |
| } | |
| if (level_1_filtering_signalled_flag) { | |
| level_1_filtering_first_coefficient | u(4) |
| level_1_filtering_second_coefficient | u(4) |
| } | |
| if (tile_dimensions_type > 0) { | |
| if (tile_dimensions_type == 3) { | |
| custom_tile_width | u(16) |
| custom_tile_height | u(16) |
| } | |
| reserved_zeros_5bit | u(5) |
| compression_type_entropy_enabled_per_tile_flag | u(1) |
| compression_type_size_per_tile | u(2) |
| } | |
| if (resolution_type == 63) { | |
| custom_resolution_width | u(16) |
| custom_resolution_height | u(16) |
| } | |
| } | |

Process Payload—Picture Configuration

A process payload picture configuration syntax, e.g. for a frame of video, may be as set out in the table below:

| Syntax | D |
|---|---|
| process_payload_picture_config(payload_size) { | |
| no_enhancement_bit_flag | u(1) |
| if (no_enhancement_bit_flag == 0) { | |
| quant_matrix_mode | u(3) |
| dequant_offset_signalled_flag | u(1) |
| picture_type_bit_flag | u(1) |
| temporal_refresh_bit_flag | u(1) |
| step_width_level1_enabled_flag | u(1) |
| step_width_level2 | u(15) |
| dithering_control_flag | u(1) |
| } else { | |
| reserved_zeros_4bit | u(4) |
| picture_type_bit_flag | u(1) |
| temporal_refresh_bit_flag | u(1) |
| temporal_signalling_present_flag | u(1) |
| } | |
| if (picture_type_bit_flag == 1) { | |
| field_type_bit_flag | u(1) |
| reserved_zeros_7bit | u(7) |
| } | |
| if (step_width_level1_enabled_flag == 1) { | |
| step_width_level1 | u(15) |
| level_1_filtering_enabled_flag | u(1) |

-continued

| Syntax | D |
|---|---|
| } | |
| if (quant_matrix_mode == 2 \|\| quant_matrix_mode == 3 \|\| quant_matrix_mode == 5) { | |
| for(layerIdx = 0; layerIdx < nLayers; layerIdx++) { | |
| qm_coefficient_0[layerIdx] | u(8) |
| } | |
| } | |
| if (quant_matrix_mode == 4 \|\| quant_matrix_mode == 5) { | |
| for(layerIdx = 0; layerIdx < nLayers; layerIdx++) { | |
| qm_coefficient_1[layerIdx] | u(8) |
| } | |
| } | |
| if (dequant_offset_signalled_flag) { | |
| dequant_offset_mode_flag | u(1) |
| dequant_offset | u(7) |
| } | |
| if (dithering_control_flag == 1) { | |
| dithering_type | u(2) |
| reserverd_zero | u(1) |
| if (dithering_type != 0) { | |
| dithering_strength | u(5) |
| } else { | |
| reserved_zeros_5bit | u(5) |
| } | |
| } | |
| } | |

Process Payload—Encoded Data

A process payload encoded data syntax may be as set out in the table below:

| Syntax | D |
|---|---|
| process_payload_encoded_data(payload_size) { | |
| if (tile_dimensions_type == 0) { | |
| for (planeIdx = 0; planeIdx < nPlanes; planeIdx++) { | |
| if (no_enhancement_bit_flag == 0) { | |
| for (levelIdx = 1; levelIdx <= 2; levelIdx++) { | |
| for (layerIdx = 0; layerIdx < nLayers;layerIdx++) { | |
| surfaces[planeIdx][levelIdx][layerIdx].entropy_enabled_flag | u(1) |
| surfaces[planeIdx][levelIdx][layerIdx].rle_only_flag | u(1) |
| } | |
| } | |
| } | |
| if (temporal_signalling_present_flag == 1){ | |
| temporal_surfaces[planeIdx].entropy_enabled_flag | u(1) |
| temporal_surfaces[planeIdx].rle_only_flag | u(1) |
| } | |

-continued

| Syntax | D |
|---|---|
| } | |
| byte_alignment( ) | |
| for (planeIdx = 0; planeIdx < nPlanes; planeIdx++) { | |
| for (levelIdx = 1; levelIdx <= 2; levelIdx++) { | |
| for (layerIdx = 0; layerIdx < nLayers; layerIdx++) | |
| process_surface(surfaces[planeIdx][levelIdx][layerIdx]) | |
| } | |
| if (temporal_signalling_present_flag == 1) | |
| process_surface(temporal_surfaces[planeIdx]) | |
| } | |
| } else { | |
| process_payload_encoded_data_tiled(payload_size) | |
| } | |
| } | |

Process Payload—Encoded Tiled Data

A process payload encoded tiled data syntax may be as set out in the table below:

| Syntax | D |
|---|---|
| process_payload_encoded_data_tiled(payload_size) { | |
| for (planeIdx = 0; planeIdx < nPlanes; planeIdx++) { | |
| for (levelIdx = 1; levelIdx <= 2; levelIdx++) { | |
| if (no_enhancement_bit_flag == 0) { | |
| for (layerIdx = 0; layerIdx < nLayers;layerIdx++) | |
| surfaces[planeIdx][levelIdx][layerIdx].rle_only_flag | u(1) |
| } | |
| } | |
| if (temporal_signalling_present_flag == 1) | |
| temporal_surfaces[planeIdx].rle_only_flag | u(1) |
| } | |
| byte_alignment( ) | |
| if (compression_type_entropy_enabled_per_tile_flag == 0) { | |
| for (planeIdx = 0; planeIdx < nPlanes; planeIdx++) { | |
| if (no_enhancement_bit_flag == 0) { | |
| for (levelIdx = 1; levelIdx <= 2; levelIdx++) { | |
| if (levelIdx == 1) | |
| nTiles = nTilesL1 | |
| else | |

-continued

| Syntax | D |
|---|---|
|             nTiles = nTilesL2 | |
|           for (layerIdx = 0; layerIdx < nLayers; layerIdx++) { | |
|             for (tileIdx = 0; tileIdx < nTiles; tileIdx++) | |
|               surfaces[planeIdx][levelIdx][layerIdx].tiles[tileIdx].<br>                entropy_enabled_flag | u(1) |
|           } | |
|         } | |
|       } | |
|       if (temporal_signalling_present_flag == 1) { | |
|         for (tileIdx = 0; tileIdx < nTilesL2; tileIdx++) | |
|           temporal_surfaces[planeIdx].tiles[tileIdx].entropy_enabled_flag | u(1) |
|       } | |
|     } | |
|   } else { | |
|     entropy_enabled_per_tile_compressed_data_rle | mb |
|   } | |
|   byte_alignment( ) | |
|   if (compression_type_size_per_tile == 0) { | |
|     for (planeIdx = 0; planeIdx < nPlanes; planeIdx++) { | |
|       for (levelIdx = 1; levelIdx <= 2; levelIdx++) { | |
|         if (levelIdx == 1) | |
|           nTiles = nTilesL1 | |
|         else | |
|           nTiles = nTilesL2 | |
|         for (layerIdx = 0; layerIdx < nLayers; layerIdx++) { | |
|           for (tileIdx = 0; tileIdx < nTiles; tileIdx++) | |
|             process_surface(surfaces[planeIdx][levelIdx][layerIdx].<br>              tiles[tileIdx]) | |
|         } | |
|       } | |
|       if (temporal_signalling_present_flag == 1) { | |
|         for (tileIdx = 0; tileIdx < nTilesL2; tileIdx++) | |
|           process_surface(temporal_surfaces[planeIdx].tiles[tileIdx]) | |
|       } | |
|     } | |
|   } else { | |
|     for (planeIdx = 0; planeIdx < nPlanes; planeIdx++) { | |
|       for (levelIdx = 1; levelIdx <= 2; levelIdx++) { | |
|         if (levelIdx == 1) | |
|           nTiles = nTilesL1 | |
|         else | |
|           nTiles = nTilesL2 | |
|         for (layerIdx = 0; layerIdx < nLayers; layerIdx++) { | |
|           if(surfaces[planeIdx][levelIdx][layerIdx].rle_only_flag) { | |
|             compressed_size_per_tile_prefix | mb |
|           } else { | |
|             compressed_prefix_last_symbol_bit_offset_per_tile_prefix | mb |
|             compressed_size_per_tile_prefix | mb |
|           } | |
|           for (tileIdx=0; tileIdx < nTiles; tileIdx++) | |
|             process_surface(surfaces[planeIdx][levelIdx][layerIdx],<br>              tiles[tileIdx]) | |
|         } | |
|       } | |
|       if (temporal_signalling_present_flag == 1) { | |
|         if(temporal_surfaces[planeIdx].rle_only_flag) { | |
|           compressed_size_per_tile_prefix | mb |
|         } else { | |
|           compressed_prefix_last_symbol_bit_offset_per_tile_prefix | mb |
|           compressed_size_per_tile_prefix | mb |
|         } | |
|         for (tileIdx = 0; tileIdx < nTilesL2; tileIdx++) | |
|           process_surface(temporal_surfaces[planeIdx].tiles[tileIdx]) | |
|       } | |
|     } | |
|   } | |
| } | |

Process Payload—Surface

A process payload surface syntax (e.g. a syntax for a set of data that may comprise encoded coefficients and/or temporal signalling) may be as set out in the table below:

```
Syntax                                          D

process_surface(surface) {
  if (compression_type_size_per_tile == 0) {
    if (surface.entropy_enabled_flag) {
      if (surface.rle_only_flag) {
        surface.size                            mb
        surface.data                            surface, size
      } else {
        reserved_zeros_3_bit                    u(3)
        surface.prefix_last_symbol_bit_offset   u(5)
        surface.size                            mb
        surface.data                            surface, size
      }
    }
  } else {
    if (surface.entropy_enabled_flag) {
      surface.data                              surface, size
    }
  }
}
```

Process Payload—Additional Information

A process payload additional information syntax may be as set out in the table below:

```
Syntax                                          D

additional_info(payload_size) {
  additional_info_type                          u(8)
  if (additional_info_type == 0) {
    payload_type                                u(8)
    sei_payload(payload_type, payload_size − 2)
  } else if (additional_info_type == 1)
    vui_parameters (payload_size − 1)
  else // (additional_info_type >= 2)
    // reserved for future use
}
```

Process Payload—Filler

A process payload filler syntax may be as set out in the table below:

```
Syntax                                          D

process_payload_filler(payload_size) {
  for(x = 0; x < payload_size; x++) {
    filler_byte // equal to 0xAA                u(8)
  }
}
```

Byte Alignment

A byte alignment syntax may be as set out in the table below:

```
Syntax                                          D

byte_alignment( ) {
  alignment_bit_equal_to_one /* equal to 1 */   f(1)
  while(!byte_aligned( ))
    alignment_bit_equal_to_zero /* equal to 0 */  f(1)
}
```

Bitstream Semantics

The section below provides further detail on the meaning of certain variables set out in the tables above. This detail may be referred to as the "semantics" of the bitstream. Example semantics associated with the syntax structures and with the syntax elements within these structures are described in this section. In certain cases, syntax elements may have a closed set of possible values and examples of these cases are presented in certain tables below.

NAL Unit Semantics

A number of examples of variables or parameters that relate generally to a NAL unit will now be described. These should not be seen as limiting.

The variable NumBytesInNalUnit may be used to specify the size of the NAL unit in bytes. This value may be used for the decoding of the NAL unit. Some form of demarcation of NAL unit boundaries may be used to enable inference of NumBytesInNalUnit. One such demarcation method is described with reference to other examples of the NALU for the byte stream format. A variety of methods of demarcation may be used.

The variable rbsp_byte[1] is the i-th byte of a raw byte sequence payload (RBSP). An RBSP may be specified as an ordered sequence of bytes and contain a string of data bits (SODB) as follows:

If the SODB is empty (i.e., zero bits in length), the RBSP is also empty.

Otherwise, the RBSP contains the SODB as follows:

1. The first byte of the RBSP contains the (most significant, left-most) eight bits of the SODB; the next byte of the RBSP contains the next eight bits of the SODB, etc., until fewer than eight bits of the SODB remain.
2. rbsp_trailing_bits( ) are present after the SODB as follows:
   i. The first (most significant, left-most) bits of the final RBSP byte contains the remaining bits of the SODB (if any).
   ii. The next bit consists of a single rbsp_stop_one_bit equal to 1.
   iii. When the rbsp_stop_one_bit is not the last bit of a byte-aligned byte, one or more rbsp_alignment_zero_bit is present to result in byte alignment.

Syntax structures having the above RBSP properties are denoted in the above syntax tables using an "_rbsp" suffix. These structures may be carried within NAL units as the content of the rbsp_byte[i] data bytes. The association of the RBSP syntax structures to the NAL units may be as set out in the table below. When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data for the decoding process may be contained in the SODB part of the RBSP.

The variable emulation_prevention_three_byte is a byte equal to 0x03. When an emulation_prevention_three_byte is present in the NAL unit, it may be discarded by the decoding process. In certain cases, the last byte of the NAL unit is prevented from being equal to 0x00 and within the NAL unit, the following three-byte sequences are excluded at any byte-aligned position: 0x000000, 0x000001 and 0x000002. It may also be configured that, within the NAL unit, any four-byte sequence that starts with 0x000003 other than the following sequences may not occur at any byte-aligned position (e.g. the following four-byte sequences 0x00000300, 0x00000301, 0x00000302, and 0x00000303).

NAL Unit Header Semantics

A number of examples of variables or parameters that may be used to carry information relating a NAL unit header will now be described. These should not be seen as limiting.

In certain examples, the variable forbidden zero bit is set as being equal to 0 and the variable forbidden_one_bit is set as being equal to 1. The variable nal_unit_type may be used to specify the type of RBSP data structure contained in the NAL unit as specified in the table below:

| nal_unit_ type | Name of nal_unit_type | Content of NAL unit and RBSP syntax structure | NAL unit type class |
|---|---|---|---|
| 0 . . . 27 | UNSPEC0 . . . UNSP EC27 | unspecified | Non-VCL |
| 28 | LCEVC_LEVEL | segment of a Low Complexity Enhancement Level | VCL/Non-VCL |
| 29-30 | RSV_LEVEL | reserved | Non-VCL |
| 31 | UNSPEC31 | unspecified | Non-VCL |

In this example, NAL units that have nal_unit_type in the range of UNSPEC0 . . . UNSPEC27, inclusive, and UNSPEC31 for which semantics are not specified, may be configured to not affect the enhancement decoding process. The reserved_flag may be equal to the bit sequence 111111111. NAL unit types in the range of UNSPEC0 . . . UNSPEC27 and UNSPEC31 may be used as determined by a particular application or implementation. These may to relate to "enhancement" decoding processes as described herein, which may be associated with the LCEVC_LEVEL nal_unit_type. Different applications may use NAL unit types in the range of UNSPEC0 . . . UNSPEC27 and UNSPEC31NAL for different purposes, and encoders and decoders may be adapted accordingly. For purposes other than determining the amount of data in the decoding units of the bitstream (e.g. as used in certain text configurations), decoders may be configured to ignore (remove from the bitstream and discard) the contents of all NAL units that use reserved values of nal_unit_type. Future compatible extensions to the aspects described herein may use reserved and/or unspecified NAL unit types.

Data Block Unit General Semantics

A number of examples of variables or parameters that may be used to carry information regarding a data block of a NAL unit will now be described. These should not be seen as limiting.

The variable payload_size_type may be used to specify the size of the payload. It may take a value between 0 and 7, as specified by the table below.

| pay_load_size_type | Size (bytes) |
|---|---|
| 0 | 0 |
| 1 | 1 |
| 2 | 2 |
| 3 | 3 |
| 4 | 4 |
| 5 | 5 |
| 6 | Reserved |
| 7 | Custom |

The variable payload_type may specify the type of the payload used (e.g. the content of the payload). It may take a value between 0 and 31, as specified by the table below. The table also indicates a suggested minimum frequency of appearance of each content within an example bitstream.

| pay_load_ type | Content of payload | Minimum frequency |
|---|---|---|
| 0 | process_payload_sequence_config( ) | at least once |
| 1 | process_payload_global_config( ) | at least every IDR |
| 2 | process_payload_picture_config( ) | picture |
| 3 | process_payload_encoded_data( ) | picture |
| 4 | process_payload_encoded_data_tiled( ) | picture |
| 5 | process_payload_additional_info( ) | picture |
| 6 | process_payload_filler( ) | picture |
| 7-30 | Reserved | |
| 31 | Custom | |

Data Block Semantics

The following describes the semantics for each of the data block units, e.g. the data that is carried by the NAL units. Certain variables discussed below relate to profiles, levels and toolsets. Profiles, levels and toolsets may be used to specify restrictions on the bitstreams and hence apply limits to the capabilities needed to decode the bitstreams. Profiles, levels and toolsets may also be used to indicate interoperability points between individual decoder implementations. It may be desired to avoid individually selectable "options" at the decoder, as this may increase interoperability difficulties.

A "profile" may specify a subset of algorithmic features and limits that are supported by all decoders conforming to that profile. In certain case, encoders may not be required to make use of any particular subset of features supported in a profile.

A "level" may specify a set of limits on the values that may be taken by the syntax elements (e.g. the elements described above). The same set of level definitions may be used with all profiles, but individual implementations may support a different level for each supported profile. For any given profile, a level may generally correspond to a particular decoder processing load and memory capability. Implementations of video decoders conforming to the examples described herein may be specified in terms of the ability to decode video streams conforming to the constraints of profiles and levels, e.g. the profiles and/or levels may indicate a certain specification for a video decoder, such as a certain set of features that are supported and/or used. As such, the capabilities of a particular implementation of a decoder may be specified using a profile, and a given level for that profile. The variable profile_idc may be used to indicate a profile for the bitstream and the variable level_idc may be used to indicate a level. The values for these variables may be restricted to a set of defined specifications. A reserved value of profile_idc between a set of specified values may not indicate intermediate capabilities between the specified profiles; however, a reserved value of level_idc between a set of specified values may be used to indicated intermediate capabilities between the specified levels. The variable sublevel_idc may also be used to indicate a sublevel for a set of capabilities. These levels and sublevels are not to be confused with the levels and sublevels of the enhancement encoders and decoders, which are a different concept.

As an example, there may be a "main" profile. Conformance of a bitstream to this example "main" profile may be indicated by profile_idc equal to 0. Bitstreams conforming to this example "main" profile may have the constraint that active global configuration data blocks have chroma_sampling_type equal to 0 or 1 only. All constraints for global configuration parameter sets that are specified may be constraints for global configuration parameter sets that are activated when the bitstream is decoded. Decoders conforming to the present example "main" profile at a specific level (e.g. as identified by a specific value of level_idc) may be capable of decoding all bitstreams and sublayer representations for which all of the following conditions apply: the bitstream is indicated to conform to the "main" profile and the bitstream or sublayer representation is indicated to conform to a level that is lower than or equal to the specified level. Variations of this example "main" profile may also be defined and given differing values of profile_idc. For example, there may be a "main 4:4:4" profile. Conformance of a bitstream to the example "main 4:4:4" profile may be indicated by profile_idc equal to 1. Bitstreams conforming to the example "main 4:4:4" profile may have the constraint that active global configuration data blocks shall have chroma_sampling_type in the range of 0 to 3, inclusive. Again, decoders conforming to the example "main 4:4:4" profile at a specific level (e.g. as identified by a specific value of level_idc) may be capable of decoding all bitstreams and sublayer representations for which all of the following conditions apply: the bitstream is indicated to conform to the "main" profile and the bitstream or sublayer representation is indicated to conform to a level that is lower than or equal to the specified level. The variables extended_profile_idc and extended_level_idc may be respectively used to indicate that an extended profile and an extended level are used.

In certain implementation, the "levels" associated with a profile may be defined based on two parameters: a count of luma samples of output picture in time (i.e. the Output Sample Rate) and maximum input bit rate for the Coded Picture Buffer for the enhancement coding (CPBL). Both sample rate and bitrate may be considered on observation periods of one second (e.g. the maximum CPBL bit rate may be measured in terms of bits per second per thousand Output Samples). The table below indicates some example levels and sublevels.

| Level | Sublevel | Maximum Output Sample Rate | Maximum CPBL bit rate | Example Resolution and Frame Rate |
|---|---|---|---|---|
| 1 | 0 | 29,410,000 | 4 | 1280 × 720 (30 fps) |
| 1 | 1 | 29,410,000 | 40 | 1280 × 720 (30 fps) |
| 2 | 0 | 124,560,000 | 4 | 1920 × 1080 (60 fps) |
| 2 | 1 | 124,560,000 | 40 | 1920 × 1080 (60 fps) |
| 3 | 0 | 527,650,000 | 4 | 3840 × 2160 (60 fps) |
| 3 | 1 | 527,650,000 | 40 | 3840 × 2160 (60 fps) |
| 4 | 0 | 2,235,160,000 | 4 | 7640 × 4320 (60 fps) |
| 4 | 1 | 2,235,160,000 | 40 | 7640 × 4320 (60 fps) |

Returning to further variables of the NAL unit data block, if the variable conformance_window_flag is equal to 1 this may be used to indicate that conformance cropping window offset parameters are present in the sequence configuration data block. If the variable conformance_window_flag is equal to 0 this may indicate that the conformance cropping window offset parameters are not present. The variables conf_win_left_offset, conf_win_right_offset, conf_win_top_offset and conf_win_bottom_offset specify the samples of the pictures in the coded video sequence that are output from the decoding process (i.e. the resulting output video), in terms of a rectangular region specified in picture coordinates for output. When conformance_window_flag is equal to 0, the values of conf_win_left_offset, conf_win_ right_offset, conf_win_top_offset and conf_win_bottom_offset may be inferred to be equal to 0. The conformance cropping window may be defined to contain the luma samples with horizontal picture coordinates from (SubWidthC*conf_win_left_offset) to (width−(SubWidthC*conf_win_right_offset+1)) and vertical picture coordinates from (SubHeightC*conf_win_top_offset to height−(SubHeightC*conf_win_bottom_offset+1)), inclusive. The value of SubWidthC*(conf_win_left_offset+conf_win_right_offset) may be constrained to be less than width, and the value of SubHeightC*(conf_win_top_offset+conf_win_bottom_offset) may be constrained to be less than height. The corresponding specified samples of the two chroma arrays (e.g. in a YUV example) may be similarly defined as the samples having picture coordinates (x/SubWidthC, y/SubHeightC), where (x,y) are the picture coordinates of the specified luma samples. Example value of SubWidthC and SubHeightC are indicated in the "Example Picture Formats" section above. Note that the conformance cropping window offset parameters may only be applied at the output; all internal decoding processes may be applied to the uncropped picture size.

Data Block Unit Global Configuration Semantics

A short description of certain global configuration variables as indicated in the above syntax will now be described. A number of examples of variables or parameters that may be used to carry information regarding the global configuration will be described. These should not be seen as limiting.

The variable processed_planes_type_flag may be used to specify the plane to be processed by the decoder. It may be equal to 0 or 1. For a YUV examples, if it is equal to 0, only the Luma (Y) plane may be processed; if it is equal to 1, all planes (e.g. one luma and two chroma) may be processed. In this case, if the processed_planes_type_flag is equal to 0, nPlanes shall be equal to 1 and if processed_planes_type_flag is equal to 1, nPlanes shall be equal to 3. An illustration of the variable nPlanes is shown in FIG. 9A.

The variable resolution_type may be used to specify the resolution of a Luma (Y) plane of the enhanced decoded picture. It may be defined as a value between 0 and 63, as specified in the table below. The value of the type is expressed as N×M, where N is the width of the Luma (Y) plane of the enhanced decoded picture and M is height of the Luma (Y) plane of the enhanced decoded picture. For example, the following values (amongst others) may be available:

| resolution_type | Value of type |
|---|---|
| 0 | unused/* Escape code prevention */ |
| 1 | 360 × 200 |
| 2 | 400 × 240 |
| 3 | 480 × 320 |
| 4 | 640 × 360 |
| 5 | 640 × 480 |
| 6 | 768 × 480 |
| 7 | 800 × 600 |
| 8 | 852 × 480 |
| 9 | 854 × 480 |
| 10 | 856 × 480 |
| 11 | 960 × 540 |
| 12 | 960 × 640 |
| 13 | 1024 × 576 |
| 14 | 1024 × 600 |
| 15 | 1024 × 768 |
| 16 | 1152 × 864 |
| 17 | 1280 × 720 |
| 18 | 1280 × 800 |
| 19 | 1280 × 1024 |
| 20 | 1360 × 768 |
| 21 | 1366 × 768 |
| 22 | 1400 × 1050 |
| 23 | 1440 × 900 |
| 24 | 1600 × 1200 |

-continued

| resolution_type | Value of type |
|---|---|
| 25 | 1680 × 1050 |
| 26 | 1920 × 1080 |
| 27 | 1920 × 1200 |
| 28 | 2048 × 1080 |
| 29 | 2048 × 1152 |
| 30 | 2048 × 1536 |
| 31 | 2160 × 1440 |
| 32 | 2560 × 1440 |
| 33 | 2560 × 1600 |
| 34 | 2560 × 2048 |
| 35 | 3200 × 1800 |
| 36 | 3200 × 2048 |
| 37 | 3200 × 2400 |
| 38 | 3440 × 1440 |
| 39 | 3840 × 1600 |
| 40 | 3840 × 2160 |
| 41 | 3840 × 2400 |
| 42 | 4096 × 2160 |
| 43 | 4096 × 3072 |
| 44 | 5120 × 2880 |
| 45 | 5120 × 3200 |
| 46 | 5120 × 4096 |
| 47 | 6400 × 4096 |
| 48 | 6400 × 4800 |
| 49 | 7680 × 4320 |
| 50 | 7680 × 4800 |
| 51-62 | Reserved |
| 63 | Custom |

The variable chroma_sampling_type defines the colour format for the enhanced decoded picture as set out in the table in the "Example Picture Formats" section.

The variable transform_type may be used to define the type of transform to be used. For example, the following values (amongst others) may be available:

| transform_type | Value of type |
|---|---|
| 0 | 2 × 2 directional decomposition transform |
| 1 | 4 × 4 directional decomposition transform |

In the example above, if transform_type is equal to 0, nLayers (e.g. as shown in FIG. 9A) may be equal to 4 and if transform_type is equal to 1, nLayers may be equal to 16.

The variable base_depth_type may be used to define the bit depth of the decoded base picture. For example, the following values (amongst others) may be available:

| base_depth_type | Value of type |
|---|---|
| 0 | 8 |
| 1 | 10 |
| 2 | 12 |
| 3 | 14 |

Similarly, the variable enhancement_depth_type may be used to define the bit depth of the enhanced decoded picture. For example, the following values (amongst others) may be available:

| enhancement_depth_type | Value of type |
|---|---|
| 0 | 8 |
| 1 | 10 |
| 2 | 12 |
| 3 | 14 |

The variable temporal_step_width_modifier_signalled_flag may be used to specify if the value of the temporal_step_width_modifier parameter is signalled. It may be equal to 0 or 1. If equal to 0, the temporal_step_width_modifier parameter may not be signalled.

The variable predicted_residual_mode_flag may be used to specify whether the decoder should activate the predicted residual process during the decoding process. If the value is 0, the predicted residual process shall be disabled.

The variable temporal_tile_intra_signalling_enabled_flag may be used to specify whether temporal tile prediction should be used when decoding a tile (e.g. a 32×32 tile). If the value is 1, the temporal tile prediction process shall be enabled.

The variable upsample type may be used to specify the type of up-sampler to be used in the decoding process. For example, the following values may be available:

| upsample_type | Value of type |
|---|---|
| 0 | Nearest |
| 1 | Linear |
| 2 | Cubic |
| 3 | Modified Cubic |
| 4-6 | Reserved |
| 7 | Custom |

The variable level_1_filtering_signalled may be used to specify whether a deblocking filter should use a set of signalled parameters, e.g. instead of default parameters. If the value is equal to 1, the values of the deblocking coefficients may be signalled.

The variable temporal_step_width_modifier may be used to specify a value to be used to calculate a variable step width modifier for transforms that use temporal prediction. If temporal_step_width_modifier_signalled_flag is equal to 0, this variable may be set to a predefined value (e.g. 48).

The variable level_1_filtering_first_coefficient may be used to specify the value of the first coefficient in the deblocking mask (e.g. $\alpha$ or the 4×4 block corner residual weight in the example from the earlier sections above). The value of the first coefficient may be between 0 and 15.

The variable level_1_filtering_second_coefficient may be used to specify the value of the second coefficient in the deblocking mask (e.g. $\beta$ or the 4×4 block side residual weight in the example from the earlier sections above). The value of the second coefficient may be between 0 and 15.

The variable scaling_mode_level1 may be provided to specify whether and how the up-sampling process should be performed between decoded base picture and preliminary intermediate picture (e.g. up-scaler 2608 in FIG. 26). The scaling mode parameter for level 1 (e.g. to convert from level 0 to level 1) may have a number of possible values including:

| scaling_mode_level1 | Value of type |
|---|---|
| 0 | no scaling |
| 1 | one-dimensional 2:1 scaling only across the horizontal dimension |
| 2 | two-dimensional 2:1 scaling across both dimensions |
| 3 | Reserved |

A similar variable scaling_mode_level2 may be used to specify whether and how the up-sampling process is be performed between combined intermediate picture and preliminary output picture (e.g. as per up-scaler 2687 in FIG. 26). The combined intermediate picture corresponds to the output of process 8.9.1. The scaling mode parameter for level 2 (e.g. to convert from level 1 to level 2) may have a number of possible values including:

| scaling_mode_level2 | Value of type |
|---|---|
| 0 | no scaling |
| 1 | one-dimensional 2:1 scaling only across the horizontal dimension |
| 2 | two-dimensional 2:1 scaling across both dimensions |
| 3 | Reserved |

As described in the section title "User Data Signalling" above, the variable user_data_enabled may be used to specify whether user data are included in the bitstream and the size of the user data. For example, this variable may have the following values:

| user_data_enabled | Value of type |
|---|---|
| 0 | disabled |
| 1 | enabled 2-bits |
| 2 | enabled 6-bits |
| 3 | reserved |

Variables may also be defined to indicate the bit depth of one or more of the base layer and the two enhancement sub-layers. For example, the variable level1_depth_flag may be used to specify whether the encoding and/or decoding components at level 1 process data using the base depth type or the enhancement depth type (i.e. according to a base bit depth or a bit depth defined for one or more enhancement levels). In certain cases, the base and enhancement layers may use different bit depths. It may also be possible for level 1 and level 2 processing to be performed at different bit depths (e.g. level 1 may use a lower bit depth than level 2 as level 1 may accommodate a lower level of bit quantization or level 2 may use a lower bit depth to reduce a number of bytes used to encode the level 2 residuals). In a case where a variable such as level1_depth_flag is provided, then a value of 0 may indicate that the level 1 sub-layer is to be processed using the base depth type. If a value of 1 is used, this may indicate that the level 1 sub-layer shall be processed using the enhancement depth type.

A variable tile_dimensions_type may be specified to indicate the resolution of the picture tiles. Example values for this variable are shown in the table below. The value of the type may be mapped to an N×M resolution, where N is the width of the picture tile and M is height of the picture tile.

| tile_dimensions_type | Value of type |
|---|---|
| 0 | no tiling |
| 1 | 512 × 256 |
| 2 | 1024 × 512 |
| 3 | Custom |

As indicated by type "3" above, in certain cases a custom tile size may be defined. If a custom tile size is indicated (e.g. via a value of 3 in the table above), the variables custom_tile_width and custom_tile_height may be used to specify a custom width and height for the tile.

One or variables may be defined to indicate a compression method for data associated with a picture tile. The compression method may be applied to signalling for the file. For example, the compression_type_entropy_enabled_per_tile_flag may be used to specify the compression method used to encode the entropy_enabled_flag field of each picture tile. It may take values as shown in the table below.

| compression_type_entropy_enabled_per_tile_flag | Value of type |
|---|---|
| 0 | No compression used |
| 1 | Run length encoding |

Similarly, a variable compression_type_size_per_tile may be defined to indicate a compression method used to encode the size field of each picture tile. In this case, the compression_type_size_per_tile may take the values indicated in the table below (where the terms Huffman Coding and Prefix Coding are used interchangeably).

| compression_type_size_per_tile | Value of type |
|---|---|
| 0 | No compression used |
| 1 | Prefix Coding encoding |
| 2 | Prefix Coding encoding on differences |
| 3 | Reserved |

Lastly, the variables custom_resolution_width and custom_resolution_height may be used to respectively specify the width and height of a custom resolution.

Data Block Unit Picture Configuration Semantics

A number of examples of variables or parameters that may be used to carry information regarding a picture configuration will now be described. These should not be seen as limiting.

In certain examples, a variable may be defined to indicate that certain layers are not to feature enhancement. This may indicate that the enhancement layer is effectively turned off or disabled for certain pictures. For example, if there is network congestion it may be desirable to turn off the enhancement layer for a number of frames and so not receive and add any enhancement data (e.g. not add one or more of the first set and the second set of the decoded residuals). In certain examples, a no_enhancement_bit_flag variable may be specified to indicate that there are no enhancement data for all layerIdx<nLayers in the picture (e.g. as shown with respect to FIG. 9A). A no_enhancement_bit_flag value of 0 may indicate that enhancement is being used and that there is enhancement data.

As described in other examples herein, a quantization matrix may be used to instruct quantization and/or dequantization. For dequantization at the decoder, signalling may be provided that indicates a quantization matrix mode, e.g. a particular mode of operation for generating and using one or more quantization matrices. For example, a variable such as quant_matrix_mode may be used to specify how a quantization matrix is to be used in the decoding process in accordance with the table below. In certain cases, when quant_matrix_mode is not present, i.e. when a mode is not explicitly signalled, the mode may be assumed to take a default value, e.g. be inferred to be equal to 0 as indicated below. By allowing the quantization matrix mode value to be absent, signalling bandwidth for each picture may be saved (e.g. the quantization components of the decoder may use a default setting). Use of modes such as indicated in the examples below may allow for efficient implementation of quantization control, whereby quantization parameters may be varied dynamically in certain cases (e.g. when encoding has to adapt to changing conditions) and retrieved based on default values in other cases. The examples in the table below are not intended to be limiting, and other modes may be provided for as indicated with respect to other examples described herein.

| quant_ matrix_mode | Value of type |
|---|---|
| 0 | each enhancement sub-layer uses the matrices used for the previous frame, unless the current picture is an instantaneous decoding refresh-IDR-picture, in which case both enhancement sub-layers use default matrices |
| 1 | both enhancement sub-layers use default matrices |
| 2 | one matrix of modifiers is signalled and should be used on both residual plane |
| 3 | one matrix of modifiers is signalled and should be used on enhancement sub-layer 2 residual plane |
| 4 | one matrix of modifiers is signalled and should be used on enhancement sub-layer 1 residual plane |
| 5 | two matrices of modifiers are signalled-the first one for enhancement sub-layer 2 residual plane, the second for enhancement sub-layer 1 residual plane |
| 6-7 | Reserved |

As described above, in certain examples a quantization offset may be used. For dequantization at the decoder, a quantization offset (also referred to as a dequantization offset for symmetrical quantization and dequantization) may be signalled by the encoder or another control device or may be retrieved from local decoder memory. For example, a variable dequant_offset_signalled_flag may be used to specify if the offset method and the value of the offset parameter to be applied when dequantizing is signalled. In this case, if the value is equal to 1, the method for dequantization offset and/or the value of the dequantization offset parameter may be signalled. When dequant_offset_signalled_flag is not present, it may be inferred to be equal to 0. Again, having an inferred value for its absence may help reduce a number of bits that need to be sent to encode a particular picture or frame.

Following from the above, the variable dequant_offset_mode_flag may be used to specify the method for applying dequantization offset. For example, different modes may be used to indicate different methods of applying the offset. One mode, which may be a default mode, may involve using a signalled dequant_offset variable that specifies the value of the dequantization offset parameter to be applied. This may vary dynamically. In one case, if the dequant_offset_mode_flag is equal to 0, the aforementioned default mode is applied; if the value of dequant_offset_mode_flag is equal to 1, a constant-offset method applies, which may also use the signalled dequant_offset parameter. The value of the dequantization offset parameter dequant_offset may be, in certain implementations, between 0 and 127, inclusive.

Further quantization variables may also be used. In one case, a set of variables may be used to signal one or more quantization step-widths to use for a picture or frame within the enhancement layer. The step-width values may be used to apply quantization and/or dequantization as explained with respect to the quantization and/or dequantization components of the above examples. For example, step_width_level1 may be used to specify the value of the step-width to be used when decoding the encoded residuals in enhancement sub-layer 1 (i.e. level 1) and step_width_level2 may be used to specify the value of the step-width value to be used when decoding the encoded residuals in enhancement sub-layer 2 (i.e. level 2).

In certain examples, a step-width may be defined for one or more of the enhancement sub-layers (i.e. levels 1 and 2). In certain cases, a step-width may be signalled for certain sub-layers but not others. For example, a step_width_level1_enabled_flag variable may be used to specify whether the value of the step-width to be used when decoding the encoded residuals in the enhancement sub-layer 1 (i.e. level 1 as described herein) is a default value or is signalled (e.g. from the encoder). It may be either 0 (default value) or 1 (to indicate that the value is signalled by step_width_level1). An example default value may be 32,767. When step_width_level1_enabled_flag is not present, it is inferred to be equal to 0.

In certain examples, a set of arrays may be defined to specify a set of quantization scaling parameters. The quantization scaling parameters may indicate how to scale each coefficient within a coding unit or block (e.g. for a 2×2 transform how to scale each of the four layers representing A, H, V and D components). In one example, an array qm_coefficient_0[layerIdx] may be defined to specify the values of the quantization matrix scaling parameter when quant_matrix_mode is equal to 2, 3 or 5 in the table above and an array qm_coefficient_1[layerIdx] may be used to specify the values of the quantization matrix scaling parameter when quant_matrix_mode is equal to 4 or 5 in the table above. The index layerIdx represents a particular layer (e.g. as shown in FIG. 9A), which in turn relates to a particular set of coefficients (e.g. one layer may comprise A coefficients etc.).

In examples, a picture_type_bit_flag variable may be used to specify whether the encoded data are sent on a frame basis (e.g., progressive mode or interlaced mode) or on a field basis (e.g., interlaced mode). An example of possible values is shown in the table below.

| picture_type_bit_flag | Value of type |
|---|---|
| 0 | Frame |
| 1 | Field |

If a field picture type is specified (e.g. via a value of 1 from the table above), a further variable may be provided to indicate a particular field. For example, a variable field_type_bit_flag may be used to specify, if the picture_type_bit_ flag is equal to 1, whether the data sent are for top or bottom field. Example values for the field_type_bit_flag are shown below.

| field_type_bit_flag | Value of type |
|---|---|
| 0 | Top |
| 1 | Bottom |

As discussed in the “Temporal Prediction and Signalling” section set out above, a number of variables may be defined to signal temporal prediction configurations and settings to the decoder. Certain variables may be defined at a picture or frame level (e.g. to apply to a particular picture or frame). Some examples are further discussed in this section.

In one case, a temporal_refresh_bit_flag variable may be signalled to specify whether the temporal buffer should be refreshed for the picture. If equal to 1, this may instruct the refreshing of the temporal buffer (e.g. the setting of values within the buffer to zero as described above).

In one case, a temporal_signalling_present_flag variable may be signalled to specify whether the temporal signalling coefficient group is present in the bitstream. If the temporal_signalling_present_flag is not present, it may be inferred to be equal to 1 if temporal_enabled_flag is equal to 1 and the temporal_refresh_bit_flag is equal to 0; otherwise it may be inferred to be equal to 0.

Lastly, a set of variables may be used to indicate and control filtering within the enhancement layer, e.g. as described with respect to the examples of the Figures. In one case, the filtering that is applied at level 1 (e.g. by filtering component 232, 532, 2426 or 2632 in FIG. 2, 5A to 5C, 24 or 26) may be selectively controlled using signalling from the encoder. In one case, signalling may be provided to turn the filtering on and off. For example, a level1_filtering_enabled_flag may be used to specify whether the level 1 deblocking filter should be used. A value of 0 may indicate that filtering is disabled and a value of 1 may indicate that filtering is enabled. When level1_filtering_enabled_flag is not present, it may be inferred to be equal to 0 (i.e. that filtering is disabled as a default if the flag is not present). Although an example is presented with respect to the filtering of residuals that are decoded in the level 1 enhancement sub-layer, in other examples, (e.g. in addition or instead of), filtering may also be selectively applied to residuals that are decoded in the level 2 enhancement sub-layer. Filtering may be turned off and on, and/or configured according to defined variables, in one or more of the levels using signalling similar to the examples described here.

As described in examples above, in certain examples, dithering may be applied to the output decoded picture. This may involve the application of random values generated by a random number generator to reduce visual artefacts that result from quantization. Dithering may be controlled using signalling information.

In one example, a dithering_control_flag may be used to specify whether dithering should be applied. In may be applied in a similar way to the residual filtering control flags. For example, a value of 0 may indicate that dithering is disabled and a value of 1 may indicate that dithering is enabled. When dithering_control_flag is not present, it may be inferred to be equal to 0 (e.g. disabled as per the level filtering above). One or more variables may also be defined to specify a range of values the additional random numbers are to have. For example, a variable dithering_strength may be defined to specify a scaling factor for random numbers. It may be used to set a range between [−dithering_strength, +dithering_strength]. In certain examples, it may have a value between 0 and 31.

In certain examples, different types of dithering may be defined and applied. In this case, the dithering type and/or parameters for each dithering type may be signalled from the encoder. For example, a variable dithering_type may be used to specify what type of dithering is applied to the final reconstructed picture. Example values of the variable dithering_type are set out in the table below.

| dithering_type | Value of type |
|---|---|
| 0 | None |
| 1 | Uniform |
| 2-3 | Reserved |

Data Block Unit Encoded Data Semantics

The following section sets out some examples of how the encoded data may be configured. In certain examples, a portion of encoded data, e.g. that relates to a given coefficient, is referred to as a chunk (e.g. with respect to FIG. 9A). The data structures 920 in FIG. 9A or 2130 indicated in FIG. 21 may be referred to as "surfaces". Surfaces may be stored as a multi-dimensional array. A first dimension in the multi-dimensional array may indicate different planes and use a plane index—planeIdx; a second dimension in the multi-dimensional array may indicate different levels, i.e. relating to the enhancement sub-layers, and use a level index—levelIdx; and a third dimension in the multi-dimensional array may indicate different layers, i.e. relating to different coefficients (e.g. different locations within a block of coefficients, which may be referred to as A, H, V and D coefficients for a 2×2 transform), and use a layer index—layerIdx. This is illustrated in FIG. 9A, where there are nPlanes, nLevels, and nLayers (where these indicate how many elements are in each dimension).

As described with respect to the examples of FIGS. 25 and 26, in certain cases additional custom layers may be added. For example, temporal signalling may be encoded as a non-coefficient layer in addition to the coefficient layers. Other user signalling may also be added as custom layers. In other cases, separate "surface" arrays may be provided for these uses, e.g. in addition to a main "surfaces" array structured as indicated in FIG. 9A.

In certain cases, the "surfaces" array may have a further dimension that indicates a grouping such as the tiles shown in FIG. 21A. The arrangement of the "surfaces" array is also flexible, e.g. tiles may be arranged below layers as shown in FIG. 21B.

Returning to the examples of the above syntax section, a number of control flags that relate to the surfaces may be defined. One control flag may be used to indicate whether there is encoded data within the surfaces array. For example, a surfaces[planeIdx][levelIdx][layerIdx].entropy_enabled_flag may be used to indicate whether there are encoded data in surfaces[planeIdx][levelIdx][layerIdx]. Similarly, a control flag may be used to indicate how a particular surface is encoded. For example, a surfaces[planeIdx][levelIdx][layerIdx].rle_only_flag may indicate whether the data in surfaces[planeIdx][levelIdx][layerIdx].are encoded using only run length encoding or using run length encoding and Prefix (i.e. Huffman) Coding.

If temporal data is configured as an additional set of surfaces, a temporal surfaces array may be provided with a dimensionality that reflects whether temporal processing is performed on one or two enhancement levels. With regard to the example shown in FIG. 3A and FIGS. 24 to 26, a one-dimensional temporal_surfaces[planeIdx] array may be provided, where each plane has a different temporal surface (e.g. providing signalling for level 2 temporal processing, where all coefficients use the same signalling). In other examples, with more selective temporal processing the temporal surfaces array may be extended into further dimensions to reflect one or more of different levels, different layers (i.e. coefficient groups) and different tiles.

With regard to the temporal surface signalling of the above syntax examples, similar flag to the other surfaces may be provided. For example, a temporal_surfaces[planeIdx].entropy_enabled_flag may be used to indicate whether there are encoded data in temporal_surfaces[planeIdx] and a temporal_surfaces[planeIdx].rle_only_flag may be used to indicate whether the data in temporal_surfaces[planeIdx] are encoded using only run length encoding or using run length encoding and Prefix (i.e. Huffman) Coding.

Data Block Unit Encoded Tiled Data Semantics

Similar variables to those set out above for the surfaces may be used for encoded data that uses tiles. In one case, the encoded tiled data block unit, e.g. tiled data, may have a similar surfaces[planeIdx][levelIdx][layerIdx].rle_only_flag. However, it may have an additional dimension (or set of variables) reflecting the partition into tiles. This may be indicated using the data structure surfaces[planeIdx][levelIdx][layerIdx].tiles[tileIdx]. As set out in the examples above, the tiled data may also have a surfaces[planeIdx][levelIdx][layerIdx].tiles[tileIdx].entropy_enabled_flag that indicates, for each tile, whether there are encoded data in the respective tiles (e.g. in surfaces[planeIdx][levelIdx][layerIdx].tiles[tileIdx]).

The tiled data structures may also have associated temporal processing signalling that is similar to that described for the surfaces above. For example, temporal_surfaces[planeIdx].rle_only_flag may again be used to indicate whether the data in temporal_surfaces[planeIdx] are encoded using only run length encoding or using run length encoding and Prefix (i.e. Huffman) Coding. Each tile may have a temporal_surfaces[planeIdx].tiles[tileIdx].entropy_enabled_flag that indicates whether there are encoded data in temporal_surfaces[planeIdx].tiles[tileIdx].

Tiled data may have some additional data that relates to the use of tiles. For example, the variable entropy_enabled_per_tile_compressed_data_rle may contain the RLE-encoded signalling for each picture tile. A variable compressed_size_per_tile_prefix may also be used to specify the compressed size of the encoded data for each picture tile. The variable compressed_prefix_last_symbol_bit_offset_per_tile_prefix may be used to specify the last symbol bit offset of Prefix (i.e. Huffman) Coding encoded data. Decoding examples that use this signalling are set out later below.

Data Block Unit Surface Semantics

The higher level "surfaces" array described above may additionally have some associated data structures. For example, the variable surface.size may specify the size of the entropy encoded data and surface.data may contain the entropy encoded data itself. The variable surface.prefix_last_ symbol_bit_offset may be used to specify the last symbol bit offset of the Prefix (i.e. Huffman) Coding encoded data.

Data Block Unit Additional Info Semantics

The additional information data structures may be used to communicate additional information, e.g. that may be used alongside the encoded video. Additional information may be defined according to one or more additional information types. These may be indicated via an additional_info_type variable. As an example, additional information may be provided in the form of Supplementary Enhancement Information (SEI) messages or Video Usability Information (VUI) messages. Further examples of these forms of additional information are provided with respect to later examples. When SEI messages are used a payload_type variable may specify the payload type of an SEI message.

Data Block Unit Filler Semantics

In certain cases, it may be required to fill NAL units with filler. For example, this may be required to maintain a defined constant bit rate when the enhancement layer contains a large number of 0 values (i.e. when the size of the enhancement layer is small, which may be possible depending on the pictures being encoded). A filler unit may be constructed using a constant filler byte value for the payload. The filler byte may be a byte equal to 0xAA.

It should be noted that the example syntax and semantics that are set out above are provided for example only. They may allow a suitable implementation to be constructed. However, it should be noted that variable names and data formats may be varied from those described while maintaining similar functionality. Further, not all features are required and certain features may be omitted or varied depending on the implementation requirements.

Detailed Example Implementation of the Decoding Process

A detailed example of one implementation of the decoding process is set out below. The detailed example is described with reference to the method 2700 of FIG. 27. The description below makes reference to some of the variables defined in the syntax and semantics section above. The detailed example may be taken as one possible implementation of the schematic decoder arrangements shown in FIGS. 2, 5A to 5C, 24, and 26. In particular, the example below concentrates on the decoding aspects for the enhancement layer, which may be seen as an implementation of an enhancement codec. The enhancement codec encodes and decodes streams of residual data. This differs from comparative SVC and SHVC implementations where encoders receive video data as input at each spatial resolution level and decoders output video data at each spatial resolution level. As such, the comparative SVC and SHVC may be seen as the parallel implementation of a set of codecs, where each codec has a video-in/video-out coding structure. The enhancement codecs described herein on the other hand receive residual data and also output residual data at each spatial resolution level. For example, in SVC and SHVC the outputs of each spatial resolution level are not summed to generate an output video—this would not make sense.

As set out in the "Syntax" section above, a syntax may be defined to process a received bitstream. The "Syntax" section sets out example methods such as retrieving an indicator from a header accompanying data, where the indicator may be retrieved from a predetermined location of the header and may indicate one or more actions according to the syntax of the following sections. As an example, the indicator may indicate whether to perform the step of adding residuals and/or predicting residuals. The indicator may indicate whether the decoder should perform certain operations, or be configured to perform certain operations, in order to decode the bitstream. The indicator may indicate if such steps have been performed at the encoder stage.

General Overview

Turning to the method 2700 of FIG. 27A, the input to the presently described decoding process is an enhancement bitstream 2702 (also called a low complexity enhancement video coding bitstream) that contains an enhancement layer consisting of up to two sub-layers. The outputs of the decoding process are: 1) an enhancement residuals planes (sub-layer 1 residual planes) to be added to a set of preliminary pictures that are obtained from the base decoder reconstructed pictures; and 2) an enhancement residuals planes (sub-layer 2 residual planes) to be added to the preliminary output pictures resulting from upscaling, and modifying via predicted residuals, the combination of the preliminary pictures 1 and the sub-layer 1 residual planes.

As described above, and with reference to FIGS. 9A, 21A and 21B, data may be arranged in chunks or surfaces. Each chunk or surface may be decoded according to an example process substantially similar to described below and shown in the Figures. As such the decoding process operates on data blocks as described in the sections above.

An overview of the blocks of method 2700 will now be set out. Each block is described in more detail in the subsequent sub-sections.

In block 2704 of the method 2700, a set of payload data block units are decoded. This allows portions of the bitstream following the NAL unit headers to be identified and extracted (i.e. the payload data block units).

In block 2706 of the method 2700, a decoding process for the picture receives the payload data block units and starts decoding of a picture using the syntax elements set out above. Pictures may be decoded sequentially to output a video sequence following decoding. Block 2706 extracts a set of (data) surfaces and a set of temporal surfaces as described above. In certain cases, entropy decoding may be applied at this block.

In block 2710 of the method 2700, a decoding process for base encoding data extraction is applied to obtain a set of reconstructed decoded base samples (recDecodedBaseSamples). This may comprise applying the base decoder of previous examples. If the base codec or decoder is implemented separately, then the enhancement codec may instruct the base decoding of a particular frame (including sub-portions of a frame and/or particular planes for a frame). The set of reconstructed decoded base samples (e.g. 2302 in FIG. 23) are then passed to block 2712 where an optional first set of upscaling may be applied to generate a preliminary intermediate picture (e.g. 2304 in FIG. 23). For example, block 2712 may correspond to up-scaler 2608 of FIG. 26. The output of block 2712 is a set of reconstructed level 1 base samples (where level 0 may comprise to the base level resolution).

At block 2714, a decoding process for the enhancement sub-layer 1 (i.e. level 1) encoded data is performed. This may receive variables that indicate a transform size (nTbs), a user data enabled flag (userDataEnabled) and a step-width (i.e. for dequantization), as well as blocks of level 1 entropy-decoded quantized transform coefficients (TransformCoeffQ) and the reconstructed level 1 base samples (recL1BaseSamples). A plane index (IdxPlanes) may also be passed to indicate which plane is being decoded (in monochrome decoding there may be no index). The variables and data may be extracted from the payload data units of the bitstream using the above syntax.

Block 2714 is shown as comprising a number of sub-blocks that correspond to the inverse quantization, inverse transform and level 1 filtering (e.g. deblocking) components of previous examples. At a first sub-block 2716, a decoding process for the dequantization is performed. This may receive a number of control variables from the above syntax that are described in more detail below. A set of dequantized coefficient coding units or blocks may be output. At a second sub-block 2718, a decoding process for the transform is performed. A set of reconstructed residuals (e.g. a first set of level 1 residuals) may be output. At a third sub-block 2720, a decoding process for a level 1 filter may be applied. The output of this process may be a first set of reconstructed and filtered (i.e. decoded) residuals (e.g. 2308 in FIG. 23). In certain cases, the residual data may be arranged in N×M blocks so as to apply an N×M filter at sub-block 2720.

At block 2730, the reconstructed level 1 base samples and the filtered residuals that are output from block 2714 are combined. This is referred to in the Figure as residual reconstruction for a level 1 block. At output of this block is a set of reconstructed level 1 samples (e.g. 2310 in FIG. 23). These may be viewed as a video stream (if multiple planes are combined for colour signals).

At block 2732, a second up-scaling process is applied. This up-scaling process takes a combined intermediate picture (e.g. 2310 in FIG. 23) that is output from block 2730 and generates a preliminary output picture (e.g. 2312 in FIG. 23). It may comprise an application of the up-scaler 2687 in FIG. 26 or any of the previously described up-sampling components.

Figure 27:
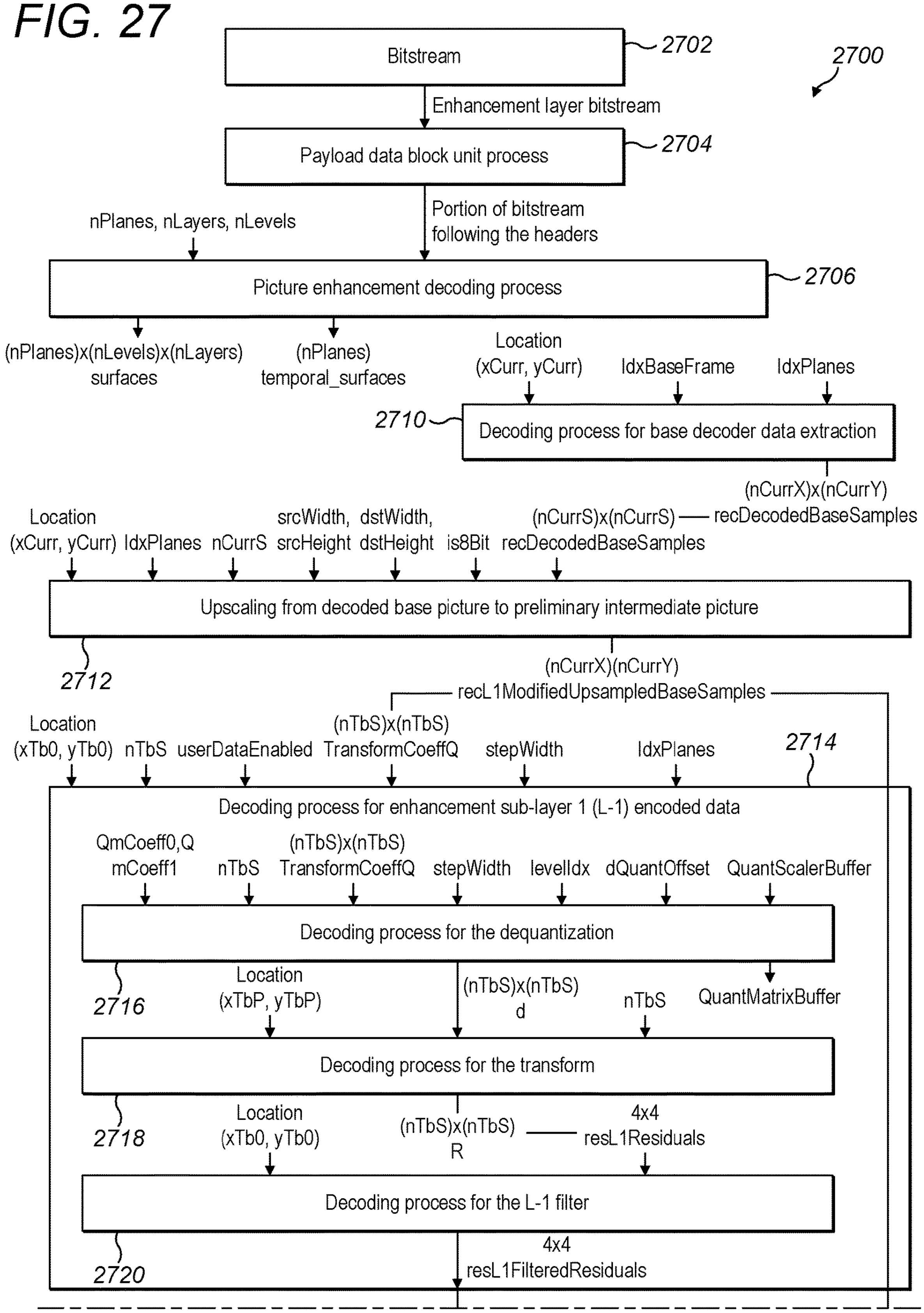
FIG. 27 is a flow chart indicated a decoding process according to an example.
Figure 27:
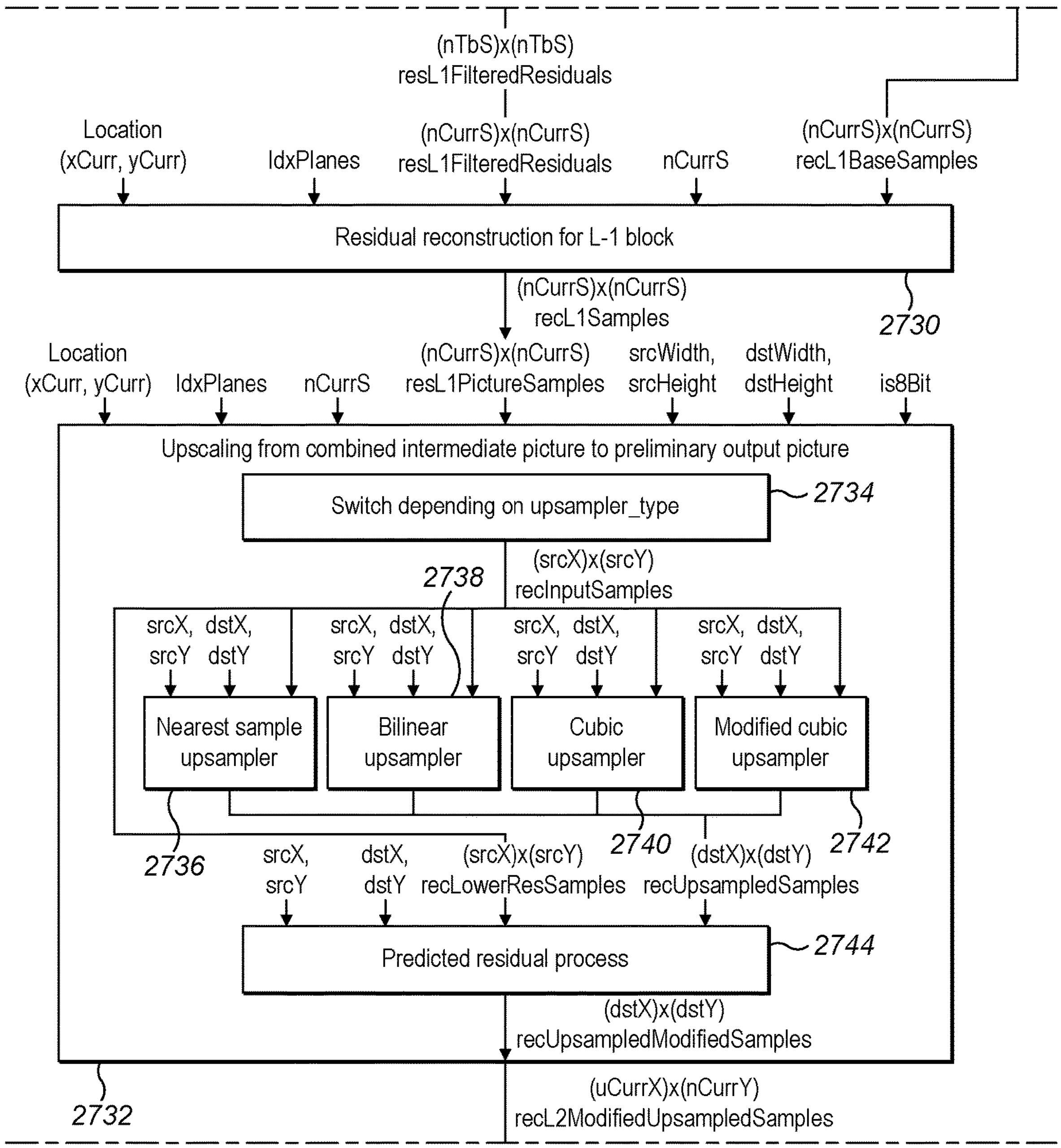
Figure 27:
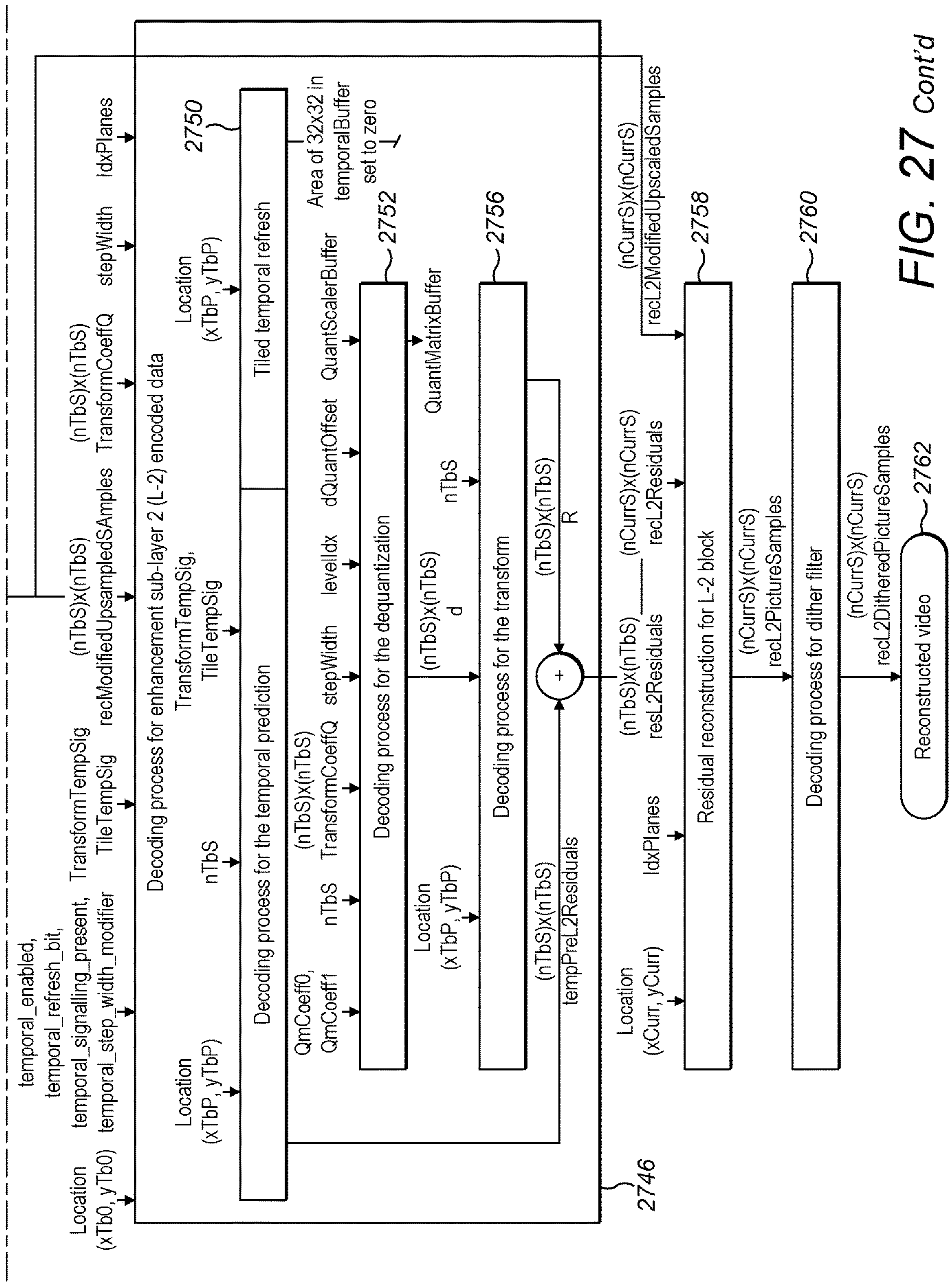

In FIG. 27, block 2732 comprises a number of sub-blocks. At block 2734, switching is implemented depending on a signalled up-sampler type. Sub-blocks 2736, 2738, 2740 and 2742 represent respective implementations of a nearest sample up-sampling process, a bilinear up-sampling process, a cubic up-sampling process and a modified cubic up-sampling process. Sub-blocks may be extended to accommodate new up-sampling approaches as required (e.g. such as the neural network up-sampling described herein). The output from sub-blocks 2736, 2738, 2740 and 2742 is provided in a common format, e.g. a set of reconstructed up-sampled samples (e.g. 2312 in FIG. 23), and is passed, together with a set of lower resolution reconstructed samples (e.g. as output from block 2730) to a predicted residuals process 2744. This may implement the modified up-sampling described herein to apply predicted average portions. The output of block 2744 and of block 2732 is a set of reconstructed level 2 modified up-sampled samples (recL2ModifiedUpsampledSamples).

Block 2746 shows a decoding process for the enhancement sub-layer 2 (i.e. level 2) encoded data. In a similar manner to block 2714, it receives variables that indicate a step-width (i.e. for dequantization), as well as blocks of level 2 entropy-decoded quantized transform coefficients (TransformCoeffQ) and the set of reconstructed level 2 modified up-sampled samples (recL2ModifiedUpsampledSamples). A plane index (IdxPlanes) is also passed to indicate which plane is being decoded (in monochrome decoding there may be no index). The variables and data may again be extracted from the payload data units of the bitstream using the above syntax.

Block 2746 comprises a number of temporal prediction sub-blocks. In the present example, temporal prediction is applied for enhancement sub-layer 2 (i.e. level 2). Block 2746 may thus receive further variables as indicated above that relate to temporal processing including the variables temporal_enabled, temporal_refresh_bit, temporal_signalling_present, and temporal_step_width_modifier as well as the data structures TransformTempSig and TileTempSig that provide the temporal signalling data.

Two temporal processing sub-blocks are shown: a first sub-block 2748 where a decoding process for temporal prediction is applied using the TransformTempSig and TileTempSig data structures and a second sub-block 2750 that applies a tiled temporal refresh (e.g. as explained with reference to the examples of FIGS. 11A to 13B). Sub-block 2750 is configured to set the contents of a temporal buffer to zero depending on the refresh signalling.

At sub-blocks 2752 and 2756, decoding processes for the dequantization and transform are applied to the level 2 data in a similar manner to sub-blocks 2718 and 2720 (the latter being applied to the level 1 data). A second set of reconstructed residuals that are output from the inverse transform processing at sub-block 2756 are then added at sub-block 2756 to a set of temporally predicted level 2 residuals that are output from sub-block 2748; this implements part of the temporal prediction. The output of block 2746 is a set of reconstructed level 2 residuals (resL2Residuals).

At block 2758, the reconstructed level 2 residuals (resL2Residuals) and the reconstructed level 2 modified up-sampled samples (recL2ModifiedUpsampledSamples) are combined in a residual reconstruction process for the enhancement sub-layer 2. The output of this block is a set of reconstructed picture samples at level 2 (recL2PictureSamples). At block 2760, these reconstructed picture samples at level 2 may be subject to a dithering process that applies a dither filter. The output to this process is a set of reconstructed dithered picture samples at level 2 (recL2DitheredPictureSamples). These may be viewed at block 2762 as an output video sequence (e.g. for multiple consecutive pictures making up the frames of a video, where planes may be combined into a multi-dimensional array for viewing on display devices).

Payload Data Block Unit Process

The operations performed at block 2704 will now be described in more detail. The input to this process is the enhancement layer bitstream. The enhancement layer bitstream is encapsulated in NAL units, e.g. as indicated above. A NAL unit may be used to synchronize the enhancement layer information with the base layer decoded information.

The bitstream is organized in NAL units, with each NAL unit including one or more data blocks. For each data block, the process_block( ) syntax structure (as shown in the "Syntax" section above) is used to parse a block header (in certain cases, only the block header). It may invoke a relevant process_block_( ) syntax element based upon the information in the block header. A NAL unit which includes encoded data may comprise at least two data blocks: a picture configuration data block and an encoded (tiled) data block. A set of possible different data blocks are indicated in the table above that shows possible payload types.

A sequence configuration data block may occur at least once at the beginning of the bitstream. A global configuration data block may occur at least for every instantaneous decoding refresh picture. An encoded (tiled) data block may be preceded by a picture configuration data block. When present in a NAL unit, a global configuration data block may be the first data block in the NAL unit.

Picture Enhancement Decoding Process

The present section describes in more detail the picture enhancement decoding process performed at block 2706.

The input of this process may be the portion of the bitstream following the headers decoding process described in the "Process Block Syntax" section set out above. Outputs are the entropy encoded transform coefficients belonging to the picture enhancement being decoded. An encoded picture may be preceded by the picture configuration payload described in the "Process Payload—Picture Configuration" and "Data Block Unit Picture Configuration Semantics" sections above.

The picture enhancement encoded data may be received as payload_encoded_data with the syntax for the processing of this data being described in the "Process Payload—Encoded Data" section. Inputs for the processing of the picture enhancement encoded data may comprise: a variable nPlanes containing the number of plane (which may depend on the value of the variable processed_planes_type_flag), a variable nLayers (which may depend on the value of transform_type), and a variable nLevels (which indicates the number of levels to be processed). These are shown in FIG. 9A. The variable nLevels may be a constant, e.g. equal to 2, if two enhancement sub-layers are used and processed.

The output of block 2706 process may comprise a set of (nPlanes)×(nLevels)×(nLayers) surfaces (e.g. arranged as an array—preferably multi-dimensional) with elements surfaces[nPlanes][nLevels][nLayers] If the temporal_signalling_present_flag is equal to 1, an additional temporal surface of a size nPlanes with elements temporal surface [nPlanes] may also be retrieved. The variable nPlanes may be derived using the following processing:

```
if (processed_planes_type_flag == 0)
   nPlanes = 1
else
   nPlanes = 3
```

and the variable nLayers may be derived using the following processing:

```
if (transform type == 0)
   nLayers = 4
else
   nLayers =16
```

The encoded data may be organized in chunks as shown in FIG. 9A (amongst others). The total number of chunks total chunk count may be computed as: nPlanes*nLevels*nLayers*(no_enhancement_bit_flag==0)+nPlanes*(temporal_signalling_present_flag==1). For each plane, a number (e.g. up to 2) enhancement sub-layers are extracted. For each enhancement sub-layer, a number (e.g. up to 16 for a 4×4 transform) coefficient groups of transform coefficients can be extracted. Additionally, if temporal_signalling_present_flag is equal to 1, an additional chunk with temporal data for enhancement sub-layer 2 may be extracted. Within this processing, a value of the variable levelIdx equal to 1 may be used to refer to enhancement sub-layer 1 and a value of the variable levelIdx equal to 2 may be used to refer to enhancement sub-layer 2. During the decoding process chunks may be read 2 bits at a time. Values for surfaces[planeIdx][levelIdx][layerIdx].entropy_enabled_ flag, surfaces[planeIdx][levelIdx][layerIdx].rle_only_flag, temporal_surfaces[planeIdx].entropy_enabled_flag and temporal_surfaces[planeIdx].rle_only_flag may be derived as follows:

```
shift_size = −1
for (planeIdx = 0; planeIdx < nPlanes; ++planeIdx) {
   if (no_enhancement_bit_flag == 0) {
      for (levelIdx = 1; levelIdx <= nLevels; ++levelIdx) {
         for (layerIdx = 0; layer < nLayers; ++layerIdx) {
            if (shift_size < 0) {
               data = read_byte(bitstream)
               shift_size = 8-1
            }
```

-continued

```
            surfaces [planeIdx][levelIdx][layerIdx].entropy_enabled_flag =
((data >> shift_size) & 0x1)
            surfaces [planeIdx][levelIdx][layerIdx].rle_only_flag = ((data >>
(shift_size - 1)) & 0x1)
            shift_size -= 2
          }
        }
    } else {
      for (layerIdx = 0; layer < nLayers; ++layerIdx)
        surfaces [planeIdx][levelIdx][layerIdx].entropy_enabled_flag = 0
    }
    if (temporal_signalling_present_flag == 1) {
      if (shift_size < 0) {
        data = read_byte(bitstream)
        shift_size = 8 - 1
      }
      temporal_surfaces[planeIdx].entropy_enabled_flag =
((data >> shift_size) & 0x1)
      temporal_surfaces[planeIdx].rle_only_flag =
((data >> (shift_size - 1)) & 0x1)
      shift_size -= 2
    }
}
```

Data associated with the entropy-encoded transform coefficients and the entropy-encoded temporal signal coefficient group may be derived according to respective values of the entropy_enabled_flag and rle_only_flag fields. Here entropy encoding may comprise run-length encoding only or Prefix/Huffman Coding and run-length encoding. The content for the surfaces[planeIdx][levelIdx][layerIdx].data provides a starting address for the entropy encoded transform coefficients related to the specific chunk of data and temporal_surfaces[planeIdx].data provides the starting address for the entropy-encoded temporal signal coefficient group related to the specific chunk of data. These portions of data may be derived as set out below:

```
for (planeIdx = 0; planeIdx < nPlanes; ++planeIdx) {
  for (levelIdx = 1; levelIdx <= nLevels; ++levelIdx) {
    for (layerIdx = 0; layer < nLayers; ++layerIdx) {
      if (surfaces [planeIdx][levelIdx][layerIdx].entropy_enabled_flag) {
        if (surfaces [planeIdx][levelIdx][layerIdx].rle_only_flag) {
          multibyte = read_multibyte(bitstream)
          surfaces[planeIdx][levelIdx][layerIdx].size = multibyte
          surfaces[planeIdx][levelIdx][layerIdx].data=
bytestream_current(bitstream)
        } else {
          data = read_byte(bitstream)
          surfaces[planeIdx][levelIdx][layerIdx].prefix_last_symbol_bit_
          offset =
(data&0x1F)
          multibyte = read_multibyte(bitstream)
          surfaces[planeIdx][levelIdx][layerIdx].size = multibyte
          surfaces[planeIdx][levelIdx][layerIdx].data =
bytestream_current(bitstream)
          bytestream_seek(bitstream, surfaces[planeIdx][levelIdx][lay-
          erIdx].size)
        }
      }
    }
  }
  if (temporal_signalling_present_flag == 1) {
    if (temporal_surfaces[planeIdx].entropy_enabled_flag) {
      if (temporal_surfaces[planeIdx].rle_only_flag) {
        multibyte = read_multibyte(bitstream)
        temporal_surfaces[planeIdx].size = multibyte
        temporal_surfaces[planeIdx].data = bytestream_current(bitstream)
      } else {
        data = read_byte(bitstream)
        temporal_surfaces[planeIdx].prefix_last_symbol_bit_offset =
        (data&0x1F)
        multibyte = read_multibyte(bitstream)
```

-continued

```
        temporal_surfaces[planeIdx].size = multibyte
        temporal_surfaces[planeIdx].data = bytestream_current(bitstream)
        bytestream_seek(bitstream, temporal_surfaces[planeIdx].size)
      }
    }
  }
}
```

The transform coefficients contained in the block of bytes of length surfaces [planeIdx][levelIdx][layerIdx].size and starting from surfaces[planeIdx][levelIdx][layerIdx].data address may then be extracted and passed to an entropy decoding process, which may apply the methods described above with respect to FIGS. 10A to 10I, and/or the methods described in more detail in the description below.

If temporal_signalling_present_flag is set to 1, the temporal signal coefficient group contained in the block of bytes of length temporal_surfaces[planeIdx].size and starting from temporal_surfaces[planeIdx].data address may also be passed to similar entropy decoding process.

Picture Enhancement Decoding Process—Tiled Data

The decoding process for picture enhancement encoded tiled data (payload_encoded_tiled_data) may be seen as a variation of the process described above. Syntax for this process is described in the above section entitled "Process Payload—Encoded Tiled Data".

Inputs to this process may be: variables nPlanes, nLayers and nLevels as above; a variable nTilesL2, which equals to Ceil(Picture_Width/Tile_Width)×Ceil(Picture_Height/Tile_Height) and refers to the number of tiles in the level 2 sub-layer; a variable nTilesL1, which refers to the number of tiles in level 1 sub-layer and equals: (a) nTilesL2 if the variable scaling_mode_level2 is equal to 0, (b) Ceil(Ceil(PictureWidth/2)/Tile_Width)×Ceil(Ceil(Picture_Height)/Tile_Height) if the variable scaling_mode_level2 is equal to 1, and (c) Ceil(Ceil(PictureWidth/2)/Tile_Width)×Ceil(Ceil(Picture_Height/2)/Tile_Height) if the variable scaling_mode_level2 is equal to 2; PictureWidth and Picture_Height, which refer to the picture width and height as derived from the value of the variable resolution_type; and Tile_Width and Tile_Height, which refer to the tile width and height as derived from the value of the variable tile_dimensions_type. Further details of the variables referred to here is set out in the Data Block Semantics sections above.

An output of this process is the (nPlanes)×(nLevels)×(nLayer) array "surfaces", with elements surfaces[nPlanes][nLevels][nLayer]. If temporal_signalling_present_flag is set to 1, the output may also comprise an additional temporal surface of a size nPlanes with elements temporal_surface[nPlanes]. Values for the variables nPlanes and nLayers may be derived as set out in the above section.

As above, the encoded data is organized in chunks. In this case, each chunk may correspond to a tile, e.g. each of the portions 2140 shown in FIG. 21A. The total number of chunks, total_chunk_count, is calculated as: nPlanes*nLevels*nLayers*(nTilesL1+nTilesL2)*(no_enhancement_bit_flag==0)+nPlanes*nTilesL2*(temporal_signalling_present_flag==1). The enhancement picture data chunks may be hierarchically organized as shown in one of FIGS. 21A and 21B. In accordance with the examples described herein, for each plane, up to 2 layers of enhancement sub-layers may be extracted and for each sub-layer of enhancement, up to 16 coefficient groups of transform coefficients may be extracted. Other implementations with different numbers of sub-layers or different transforms may have different numbers of extracted levels and layers. As before, as the present example applies temporal prediction in level 2, if temporal_signalling_present_flag is set to 1, an additional chunk with temporal data for enhancement sub-layer 2 is extracted. The variable levelIdx may be used as set out above.

In this tiled case, each chunk may be read 1 bit at a time. The surfaces[planeIdx][levelIdx][layerIdx].rle_only_flag and, if temporal_signalling_present_flag is set to 1, temporal_surfaces[planeIdx].rle_only_flag may be derived as follows:

```
shiftsize = −1
for (planeIdx = 0; planeIdx < nPlanes; ++ planeIdx) {
  if (no_enhancement_bit_flag == 0) {
    for (levelIdx = 1; levelIdx <= nLevels; ++levelIdx) {
      for (layerIdx = 0; layer < nLayers; ++layerIdx) {
        if (shift_size < 0) {
          data = readbyte(bitstream)
          shift_size = 8 − 1
        }
        surfaces [planeIdx][levelIdx][layerIdx].rle_only_flag =
        ((data »
(shift_size − 1)) & 0x1)
        shift_size −= 1
      }
    }
  }
  if (temporal_signalling_present_flag == 1) {
    if (shift_size < 0) {
      data = read_byte(bitstream)
      shift_size = 8 − 1
    }
    temporal_surfaces[planeIdx].rle_only_flag = ((data » (shift size −
    1)) & 0x1)
    shift_size −= 1
  }
}
```

The surfaces[planeIdx][levelIdx][layerIdx].tiles[tileIdx].entropy_enabled_flag and, if temporal_signalling_present_flag is set to 1, temporal_surfaces[planeIdx].tiles[tileIdx].entropy_enabled_flag may be derived as follows:

```
if (compression_type_entropy_enabled_per_tile_flag == 0) {
  shiftsize = −1
  for (planeIdx = 0; planeIdx < nPlanes; ++planeIdx) {
    if (no_enhancement_bit_flag == 0) {
      for (levelIdx = 1; levelIdx <= nLevels; ++levelIdx) {
        if (levelIdx == 1)
          nTiles = nTilesL1
        else
          nTiles = nTilesL2
        for (layerIdx = 0; layer < nLayers; ++layerIdx) {
          for (tileIdx=0; tileIdx < nTiles; tileIdx ++) {
            if (shift_size < 0) {
              data = read_byte(bitstream)
              shiftsize = 8 − 1
            }
            surfaces[planeIdx][levelIdx][layerIdx]
              .tiles[tileIdx].entropy_enabled_flag =
                ((data » (shift_size − 1)) & 0x1)
            shift_size −= 1
          }
        }
      }
    } else {
      for (levelIdx = 1; levelIdx <= nLevels; ++levelIdx) {
        if (levelIdx == 1)
          nTiles = nTilesL1
        else
          nTiles = nTilesL2
        for (layerIdx = 0; layer < nLayers; ++layerIdx) {
          for (tileIdx = 0; tileIdx < nTiles; tileIdx++)
            surfaces[planeIdx][levelIdx][layerIdx]
              .tiles[tileIdx].entropy_enabled_flag = 0
        }
      }
    }
    if (temporal_signalling_present_flag == 1) {
      for (tileIdx = 0; tileIdx < nTilesL2; tileIdx++) {
        if (shift_size < 0) {
          data = read_byte(bitstream)
          shift_size = 8 − 1
        }
        temporal_surfaces[planeIdx].tiles[tileIdx].entropy_enabled_flag =
              ((data » (shift_size − 1)) & 0x1)
        shift_size = 1
      }
    }
  }
} else {
  RLE decoding process as defined herein.
}
```

According to the value of the entropy_enabled_flag and rle_only flag fields, the content for the surfaces[planeIdx][levelIdx][layerIdx].tiles[tileIdx].data (i.e. indicating the beginning of the RLE only or Prefix Coding and RLE encoded coefficients related to the specific chunk of data) and, if temporal_signalling_present_flag is set to 1, according to the value of the entropy_enabled_flag and rle_only_flag fields, the content for the temporal_surfaces[planeIdx].tiles[tileIdx].data indicating the beginning of the RLE only or Prefix Coding and RLE encoded temporal signal coefficient group related to the specific chunk of data may be derived as follows:

```
if (compression_type_size_per_tile == 0) {
  for (planeIdx = 0; planeIdx < nPlanes; ++planeIdx) {
    for (levelIdx = 1; levelIdx <= nLevels; ++levelIdx) {
      if (levelIdx == 1)
        nTiles = nTilesL1
```

-continued

```
          else
            nTiles = nTilesL2
          for (layerIdx = 0; layer < nLayers; ++layerIdx) {
            for (tileIdx = 0; tileIdx < nTiles; tileIdx++) {
              if (surfaces
[planeIdx][levelIdx][layerIdx].tiles[tileIdx].entropy_enabled_flag) {
                if (surfaces [planeIdx][levelIdx][layerIdx].rle_only_flag) {
                  multibyte = read_multibyte(bitstream)
                  surfaces[planeIdx][levelIdx][layerIdx].tiles[tileIdx].size =
multibyte
                  surfaces[planeIdx][levelIdx][layerIdx].tiles[tileIdx]data =
                        bytestream_current(bitstream)
                } else {
                  data = read_byte(bitstream)
                  surfaces[planeIdx][levelIdx][layerIdx].
                        tiles[tileIdx].prefix_last_symbol_bit_offset =
(data&0x1F)
                  multibyte = read_multibyte(bitstream)
                  surfaces[planeIdx][levelIdx][layerIdx].tiles[tileIdx].size =
multibyte
                  surfaces[planeIdx][levelIdx][layerIdx].tiles[tileIdx].data =
                        bytestream_current(bitstream)
                  bytestream_seek(bitstream,
surfaces[planeIdx][levelIdx][layerIdx].tiles[tileIdx].size)
                }
              }
            }
          }
        }
        if (temporal_signalling_present_flag == 1) {
          for (tileIdx = 0; tileIdx < nTilesL2; tileIdx++) {
            if (temporal_surfaces[planeIdx].tiles[tileIdx].entropy_enabled_flag)
            {
              if (temporal_surfaces[planeIdx].rle_only flag) {
                multibyte = read_multibyte(bitstream)
                temporal_surfaces[planeIdx].tiles[tileIdx].size = multibyte
                temporal_surfaces[planeIdx].tiles[tileIdx].data =
bytestream_current(bitstream)
              } else {
                data = read_byte(bitstream)
                temporal_surfaces[planeIdx].tiles[tileIdx].
                      prefix_last_symbol_bit_offset = (data&0x1F)
                multibyte = read_multibyte(bitstream)
                temporal_surfaces[planeIdx].tiles[tileIdx].size = multibyte
                temporal_surfaces[planeIdx].tiles[tileIdx].data =
bytestream_current(bitstream)
                bytestream_seek(bitstream,
temporal_surfaces[planeIdx].tiles[tileIdx].size)
              }
            }
          }
        }
    }
} else {
    for (planeIdx = 0; planeIdx < nPlanes; ++planeIdx) {
        for (levelIdx = 1; levelIdx <= nLevels; ++levelIdx) {
          if (levelIdx == 1)
            nTiles = nTilesL1
          else
            nTiles = nTilesL2
          for (layerIdx = 0; layer < nLayers; ++layerIdx) {
            for (tileIdx = 0; tileIdx < nTiles; tileIdx ++) {
              if (surfaces
[planeIdx][levelIdx][layerIdx].tiles[tileIdx].entropy_enabled_flag) {
                if (surfaces[planeIdx][levelIdx][layerIdx].rle_only_flag) {
                  Prefix Coding decoding process as defined in other sections
                  to
fill surfaces[planeIdx][levelIdx][layerIdx].tiles[tileIdx].size
                  surfaces[planeIdx][levelIdx][layerIdx].tiles[tileIdx].data =
                        bytestream_current(bitstream)
                } else {
                  Prefix Coding decoding process as defined in other sections
                  to
fill surfaces[planeIdx][levelIdx][layerIdx].tiles[tileIdx].
prefix_last_symbol_bit_offset
                  Prefix Coding decoding process as defined in other sections
                  to
fill surfaces[planeIdx][levelIdx][layerIdx].tiles[tileIdx].size
                  surfaces[planeIdx][levelIdx][layerIdx].tiles[tileIdx].data =
```

-continued

```
                        bytestream_current(bitstream)
                    bytestream_seek(
                        bitstream, surfaces[planeIdx][levelIdx][layerIdx].
                            tiles[tileIdx].size)
                }
            }
        }
    }
}
if (temporal_signalling_present_flag == 1) {
    for (tileIdx = 0; tileIdx < nTilesL2; tileIdx++) {
        if (temporal surfaces [planeIdx].tiles[tileIdx].entropy_enabled_flag)
        {
            if (temporal_surfaces [planeIdx].rle_only_flag) {
                Prefix Coding decoding process as defined in other sections
                to fill
                        temporal_surfaces[planeIdx].tiles[tileIdx].size
                temporal_surfaces[planeIdx].tiles[tileIdx].data =
bytestream_current(bitstream)
            } else {
                Prefix Coding decoding process as defined in other sections
                to fill
temporal_surfaces[planeIdx].tiles[tileIdx].prefix_last_symbol_bit_offset
                Prefix Coding decoding process as defined in other sections
                to fill
temporal_surfaces[planeIdx].tiles[tileIdx].size
                temporal_surfaces[planeIdx].tiles[tileIdx].data =
bytestream_current(bitstream)
                bytestream_seek(bitstream,
temporal_surfaces[planeIdx].tiles[tileIdx].size)
            }
        }
    }
}
}
}
```

The coefficients contained in the block of bytes of length surfaces[planeIdx][levelIdx][layerIdx].tiles[tileIdx].size and starting from surfaces[planeIdx][levelIdx][layerIdx].tiles[tileIdx].data address may then be passed to for entropy decoding process as described elsewhere. If temporal_signalling_enabled_flag is set to 1, the temporal signal coefficient group contained in the block of bytes of length temporal_surfaces[planeIdx].tiles[tileIdx].size and starting from temporal_surfaces[planeIdx].tiles[tileIdx].data address are also passed for entropy decoding.

Decoding Process for Enhancement Sub-Layer 1 (L-1) Encoded Data

This section describes certain processes that may be performed as part of block 2714 in FIG. 27. The result of this process may be an enhancement residual surface (i.e. a first set of level 1 residuals) to be added to the preliminary intermediate picture.

As a first operation, the dimensions of a level 1 picture may be derived. The level 1 dimensions of the residuals surface are the same as the preliminary intermediate picture, e.g. as output by block 2712. If scaling_mode_level2 (as described above) is equal to 0, the level 1 dimensions may be taken as the same as the level 2 dimensions derived from resolution_type (e.g. as also referenced above). If scaling_mode_level2 is equal to 1, the level 1 length may be set as the same as the level 2 length as derived from resolution_type, whereas the level 1 width may be computed by halving the level 2 width as derived from resolution_type. If scaling_mode_level2 is equal to 2, the level 1 dimensions shall be computed by halving the level 2 dimensions as derived from resolution_type.

The general decoding process for a level 1 encoded data block, e.g. block 2714 in FIG. 27, may take as input: a sample location (xTb0, yTb0) specifying the top-left sample of the current transform block relative to the top-left sample of the current picture; a variable nTbS specifying the size of the current transform block, e.g. as derived from the value of variable transform_type as described above—nTbS=2 if transform_type is equal to 0 and nTbS=4 if transform_type is equal to 1; an array TransformCoeffQ of a size (nTbS)×(nTbS) specifying level 1 entropy decoded quantized transform coefficients; an array recL1BaseSamples of a size (nTbS)×(nTbS) specifying the preliminary intermediate picture reconstructed samples of the current block resulting from a base decoder or earlier up-scaling; a stepWidth value derived as set out above from the value of variable step_width_level1, e.g. this may be obtained by shifting step_width_level1 to the left by one bit (i.e., step_width_level1<<1); a variable IdxPlanes specifying to which plane the transform coefficients belong; and a variable userDataEnabled derived from the value of variable user_data_enabled.

Output of the process 2714 may be a (nTbS)×(nTbS) array of residuals resL1FilteredResiduals with elements resL1FilteredResiduals[x][y]. Arrays of residuals relating to different block locations with respect to a picture may be computed.

The sample location (xTbP, yTbP) specifying the top-left sample of the current transform block relative to the top-left sample of the current picture may be derived as follows: (xTbP, yTbP)=(IdxPlanes==0)? (xTb0, yTb0): (xTb0>>ShiftWidthC, yTb0>>ShiftHeightC), e.g. where P can be related to either luma or chroma planes depending on which plane the transform coefficients relate to. ShiftWidthC and ShiftHeightC are may be derived as set out above.

If no_enhancement_bit_flag is equal to 0, then enhancement data may be present the following ordered steps apply:

1) If nTbs is equal to 4, TransCoeffQ(1)(1) may be shifted to the right either by two bits (>>2) if the variable userDataEnabled is set to 1, or by six bits (>>6) if userDataEnabled is set to 2. And in addition, if the last bit of TransCoeffQ(1)(1) is set to 0, TransCoeffQ(1)(1) may be shifted to the right by one bit (>>1); otherwise (e.g. if the last bit of TransCoeffQ(1)(1) is set to 1), TransCoeffQ(1)(1) is shifted to the right by one bit (>>1) and TransCoeffQ(1)(1) is set to have a negative value.
2) If nTbs is equal to 2, TransCoeffQ(0)(1) is shifted to the right either by two bits (>>2) if the variable userDataEnabled is set to 1, or by six bits (>>6) if userDataEnabled is set to 2. And in addition, if the last bit of TransCoeffQ(0)(1) is set to 0, TransCoeffQ(0)(1) is shifted to the right by one bit (>>1); otherwise (e.g. if the last bit of TransCoeffQ(0)(1) is set to 1), TransCoeffQ(0)(1) is shifted to the right by one bit (>>1) and TransCoeffQ(0)(1) is set to have a negative value.
3) The dequantization process of sub-block 2716 as described below is invoked with the transform size set equal to nTbS, the array TransformCoeffQ of a size (nTbS)×(nTbS), and the variable stepWidth as inputs, and the output is an (nTbS)×(nTbS) array or dequantized coefficients dequantCoef.
4) The transformation process of sub-block 2718 is invoked with the luma location (xTbX, yTbX), the transform size set equal to nTbS, the array dequantCoeff of size (nTbS)×(nTbS) as inputs, and the output is an (nTbS)×(nTbS) array of reconstructed level 1 residuals—resL1Residuals.
5) The level 1 filter process of sub-block 2720 is invoked with the luma location (xTbX, yTbX), the array resL1Residuals of a size (nTbS)×(nTbS) as inputs, and the output is an (nTbS)×(nTbS) array of reconstructed filtered level 1 residuals—resL1FilteredResiduals.

The above steps may be repeated for all coding units that make up a plane or a frame. If no_enhancement_bit_flag is equal to 1, then enhancement is not applied. In this case, the array resL1FilteredResiduals of size (nTbS)×(nTbS) may be set to contain only zeros.

Following the operations discussed above, the picture reconstruction process for each plane, i.e. block 2730 of FIG. 27 and as described in more detail below, is invoked with the transform block location (xTb0, yTb0), the transform block size nTbS, the variable IdxPlanes, the (nTbS)×(nTbS) array resL1FilteredResiduals, and the (nTbS)×(nTbS) array recL1BaseSamples as inputs.

Decoding Process for Enhancement Sub-Layer 2 (L-2) Encoded Data

The decoding process for enhancement sub-layer 2 (level 2) encoded data at block 2746 may be similar to the decoding process for enhancement sub-layer 1 (level 1) encoded data described above. The result of this process is a level 2 enhancement residuals plane to be added to the upscaled level 1 enhanced reconstructed picture.

As a first operation, the dimensions of level 2 picture may be derived. These may be derived from the variable resolution_type described above. The dimensions of the level 2 residuals plane may be the same as the dimensions of the level 2 picture.

The general decoding process for a level 2 encoded data block may take as input: a sample location (xTb0, yTb0) specifying the top-left sample of the current transform block relative to the top-left sample of the current picture; a variable nTbS specifying the size of the current transform block derived from the value of variable transform_type (e.g. as described above—in other examples each level may have different transform sizes); a variable temporal_enabled_flag; a variable temporal_refresh_bit_flag; a variable temporal_signalling_present_flag; a variable temporal_step_width_modifier; an array recL2ModifiedUpsampledSamples of a size (nTbS)×(nTbS) specifying the up-sampled reconstructed samples resulting from the up-scaling process 2732 in FIG. 27; an array TransformCoeffQ of a size (nTbS)×(nTbS) specifying level 2 entropy decoded quantized transform coefficients; if the variable temporal_signalling_present_flag is equal to 1 and temporal_tile_intra_signalling_enabled_flag is equal to 1, a variable TransformTempSig corresponding to the value in TempSigSurface (e.g. see the temporal processing sections) at the position (xTb0>>nTbs, yTb0>>nTbs); if in addition temporal_tile_intra_signalling_enabled_flag is set to 1, a variable TileTempSig corresponding to the value in TempSigSurface at the position ((xTb0%32)*32, (yTb0%32)*32); a stepWidth value derived, as set out in the "Semantics" section above, from the value of variable step_width_level2; and a variable IdxPlanes specifying to which plane the transform coefficients belong to. Further details of these variables are set out in the "Syntax" and "Semantics" section above.

The block 2746 processes the inputs as described below and outputs an (nTbS)×(nTbS) array of level 2 residuals—resL2Residuals—with elements resL2Residuals[x][y].

The derivation of a sample location (xTbP, yTbP) may follow a process similar to that set out for the level 1 residuals in the section above.

If no_enhancement_bit_flag is set to 0, i.e. enhancement is to be applied, then the following ordered steps may be undertaken:

1) If variable temporal_enabled_flag is equal to 1 and temporal_refresh_bit_flag is equal to 0, the temporal prediction process (e.g. as specified in the examples above and below) is invoked with the luma location (xTbY, yTbY), the transform size set equal to nTbS, a variable TransformTempSig and a variable TileTempSig as inputs. The output is an array of temporally predicted level 2 residuals—tempPredL2Residuals—of a size (nTbS)×(nTbS).
2) If variable temporal_enabled_flag is equal to 1 and temporal_refresh_bit_flag is equal to 1, the of temporally predicted level 2 residuals as specified above is set to contain only zeros.
3) If variable temporal_enabled_flag is equal to 1, temporal_refresh_bit_flag is equal to 0, temporal_tile_intra_signalling_enabled_flag is equal to 1 and TransformTempSig is equal to 0, the variable stepWidth may be modified. It may be modified using the temporal_step_width_modifier, e.g. using the computation: Floor(stepWidth*(1−(Clip3(0, 0.5, temporal_step_width_modifier)/255))).
4) The dequantization process as specified in other sections and shown as sub-block 2752 is invoked with the transform size set equal to nTbS, the array TransformCoeffQ of a size (nTbS)×(nTbS), and the variable stepWidth as inputs. The output is an (nTbS)×(nTbS) array dequantCoeff of dequantized coefficients.
5) The transformation process as specified in other sections and shown as sub-block 2756 is invoked with the luma location (xTbY, yTbY), the transform size set equal to nTbS, the array dequantized coefficients dequantCoeff of a size (nTbS)×(nTbS) as inputs. The output is an (nTbS)×(nTbS) array of reconstructed level 2 residuals−resL2Residuals.
6) If variable temporal_enabled_flag is equal to 1, the array of temporally predicted level 2 residuals tempPredL2Residuals of a size (nTbS)×(nTbS) is added to the (nTbS)×(nTbS) array of reconstructed level 2 residuals resL2Residuals and the array of reconstructed level 2 residuals resL2Residuals is stored to the temporalBuffer at the luma location (xTbY, yTbY).

As per level 1 residual processing, the above operations may be performed on multiple coding units that make up the picture. As the coding units are not dependent on other coding units, as per level 1 residual processing, the above operations may be performed in parallel for the coding units of size (nTbS)×(nTbS).

If no_enhancement_bit_flag is set to 1, i.e. enhancement is disabled at least for level 2, the following ordered steps apply:

1) If variable temporal_enabled_flag is equal to 1, temporal_refresh_bit_flag is equal to 0 and variable temporal_signalling_present_flag is equal to 1, the temporal prediction process as specified in other sections and below is invoked with the luma location (xTbY, yTbY), the transform size set equal to nTbS, a variable TransformTempSig and a variable TileTempSig as inputs. The output is an array tempPredL2Residuals (e.g. as per operation 1 above) of a size (nTbS)×(nTbS).
2) If variable temporal_enabled_flag is equal to 1, temporal_refresh_bit_flag is equal to 0 and variable temporal_signalling_present_flag is equal to, the temporal prediction process is invoked with the luma location (xTbY, yTbY), the transform size set equal to nTbS, a variable TransformTempSig set equal to 0 and a variable TileTempSig set equal to 0 as inputs and the output is an array tempPredL2Residuals of a size (nTbS)×(nTbS).
3) If variable temporal_enabled_flag is equal to 1 and temporal_refresh_bit_flag is equal to 1, the array tempPredL2Residuals of a size (nTbS)×(nTbS) is set to contain only zeros.
4) If variable temporal_enabled_flag is equal to 1, the array of tempPredL2Residuals of a size (nTbS)×(nTbS) is stored in the (nTbS)×(nTbS) array resL2Residuals and resL2Residuals array is stored to the temporalBuffer at the luma location (xTbY, yTbY). Else, the array resL2Residuals of a size (nTbS)×(nTbS) is set to contain only zeros.

The picture reconstruction process for each plane as shown in block 2758 is invoked with the transform block location (xTb0, yTb0), the transform block size nTbS, the variable IdxPlanes, the (nTbS)×(nTbS) array resL2Residuals, and the (xTbY)×(yTbY) recL2ModifiedUpsampledSamples as inputs. The output is a reconstructed picture.

Decoding Process for the Temporal Prediction

A decoding process for temporal prediction such as sub-block 2752 may take as inputs: a location (xTbP, yTbP) specifying the top-left sample of the current luma or chroma transform block relative to the top-left luma or chroma sample of the current picture (where P can be related to either luma or chroma plane depending to which plane the transform coefficients belong); a variable nTbS specifying the size of the current transform block (e.g. as derived in the examples above); a variable TransformTempSig; and a variable TileTempSig. In this example, the output to this process is a (nTbS)×(nTbS) array of temporally predicted level 2 residuals tempPredL2Residuals with elements tempPredL2Residuals[x][y].

The process 2752 may apply the following ordered steps:

1) If variable temporal_tile_intra_signalling is equal to 1 and xTbP>>5 is equal to 0 and yTbP>>5 is equal to 0 and TileTempSig is equal to 1, the tiled temporal refresh process as described below and shown as sub-block 2750 is invoked with the location (xTbP, yTbP).
2) If variable TransformTempSig is equal to 0, then tempPredL2Residuals[x][y]=temporalBuffer[xTbP+x][yTbP+y] where x and y are in the range [0, (nTbS−1)]. Otherwise, tempPredL2Residuals[x][y] are all set to 0. This then conditionally loads values from a temporal buffer to apply to level 2 residuals (e.g., similar to the temporal prediction processes of other examples).

Tiled Temporal Refresh

The input to the tiled temporal refresh at sub-block 2750 may comprise a location (xTbP, yTbP) specifying the top-left sample of the current luma or chroma transform block relative to the top-left luma or chroma sample of the current picture (where P can be related to either luma or chroma plane depending to which plane the transform coefficients belong). The output of this process is that the samples of the area of the size 32×32 of temporalBuffer at the location (xTbP, yTbP) (i.e. relating to a defined tile) are set to zero. This process may thus be seen to reset or refresh the temporal buffer as described with reference to other examples.

Decoding Process for the Dequantization

The following process may be applied to both level 1 and level 2 data blocks. It may also be applied in the encoder as part of the level 1 decoding pipeline. It may implement the dequantize components of the examples. With reference to FIG. 27, it may be used to implement sub-blocks 2716 and 2752. Decoding process for the dequantization overview Every group of transform coefficients passed to this process belongs to a specific plane and enhancement sub-layer. They may have been scaled using a uniform quantizer with deadzone. The quantizer may use a non-centered dequantization offset (e.g. as described with reference to FIG. 20A to 20D).

The dequantization may be seen as a scaling process for transform coefficients. In one example a dequantization process may be configured as follows. The dequantization process may take as inputs: a variable nTbS specifying the size of the current transform block (e.g. as per other processes above); an array TransformCoeffQ of size (nTbS)×(nTbS) containing entropy-decoded quantized transform coefficients; a variable stepWidth specifying the step width value parameter; a variable levelIdx specifying the index of the enhancement sub-layer (with levelIdx=1 for enhancement sub-layer 1 and levelIdx=2 for enhancement sub-layer 2); a variable dQuantOffset specifying a dequantization offset (derived from variable dequant_offset as described above); if quant_matrix_mode is different from 0, an array QmCoeff0 of size $1\times nTbS^2$ (derived from variable qm_coefficient_0) and further, if quant_matrix_mode is equal to 4, an array QmCoeff1 of size $1\times nTbS^2$ (derived from variable qm_coefficient_1); if nTbS==2, an array QuantScalerDDBuffer of size (3*nTbS)×(nTbS) containing the scaling parameters array used in the previous picture; and, if nTbS==4, an array QuantScalerDDSBuffer of size (3*nTbS)×(nTbS) containing the scaling parameters array used in the previous picture.

An Output of the present dequantization process is a (nTbS)×(nTbS) array d of dequantized transform coefficients with elements d[x][y] and the updated array QuantMatrixBuffer.

For the derivation of the scaled transform coefficients d[x][y] with x=0 . . . nTbS−1, y=0 . . . nTbS−1, and a given quantization matrix qm[x][y], the following computation may be used: d[x][y]=(TransformCoeffQ[x][y]*((qm[x+(levelIdxSwap*nTbS)][y]+stepWidthModifier[x][y])+appliedOffset[x][y]

The dequantization process above uses a dequantization offset and step-width modifier. A process for deriving these variables, e.g. in the form of appliedOffset[x][y] and stepWidthModifier[x][y] is shown below:

```
if (dequant_offset_signalled_flag == 0) {
   stepWidthModifier [x][y] = ((((Floor(−Cconst * Ln (qm[x +
   (levelIdxSwap *
nTbS)][y]))) + Dconst) *
   (qm[x + (levelIdxSwap * nTbS)][y]^2))) / 32768) » 16
   if (TransformCoeffQ[x][y] < 0)
      appliedOffset = (−1 * (−deadZoneWidthOffset [x][y]))
   else if (TransformCoeffQ [x][y] > 0)
      appliedOffset [x][y] = −deadZoneWidthOffset [x][y]
   else
      appliedOffset [x][y] = 0
} else if (dequant_offset_signalled_flag == 1) && (dequant_offset_mode_
flag ==1)
{
   stepWidthModifier [x][y] = 0
   if (TransformCoeffQ [x][y] < 0)
      appliedOffset = (−1 * (dQuantOffsetActual [x][y] − deadZoneWidthOffset
[x][y])
   else if (TransformCoeffQ [x][y] > 0)
      appliedOffset [x][y] = dQuantOffsetActual [x][y] − deadZoneWidthOffset
[x][y]
   else
      appliedOffset [x][y] = 0}
} else if (dequant_offset_signalled_flag == 1) && (dequant_offset_mode_flag ==
0){
   stepWidthModifier [x][y] = (Floor((dQuantOffsetActual [x][y]) * (qm[x +
(levelIdxSwap * nTbS)][y]))
      /32768)
   if (TransformCoeffQ [x][y] < 0)
      appliedOffset = (−1 * (−deadZoneWidthOffset [x][y]))
   else if (TransformCoeffQ [x][y] > 0)
      appliedOffset [x][y] = −deadZoneWidthOffset [x][y]
   else
      appliedOffset [x][y] = 0
}
```

As described in other examples above, dequantization may use a deadzone with a variable width. A variable deadZoneWidthOffset may be derived according to the following process:

if stepWidth>16:

deadZoneWidthOffset [x][y]=((1<<16)−((Aconst*(qm[x+(levelIdxSwap*nTbs)][y]+stepWidthModifier [x][y]))+Bconst)>>1)*(qm[x+(levelIdxSwap*nTbs)][y]+stepWidthModifier [x][y])))>>16 if stepWidth<=16:

deadZoneWidthOffset [x][y]=stepWidth>>1

In the above computations, the following constants may be used: Aconst=39; Bconst=126484; Cconst=9175; and Dconst=79953.

The variable dQuantOffsetActual[x][y] may be computed as follows:

```
if (dequant_offset == 0)
   dQuantOffsetActual [x][y] = dQuantOffset
else {
   if (dequant_offset_mode_flag == 1)
      dQuantOffsetActual [x][y] = ((Floor(−Cconst * Ln(qm[x + (levelIdxSwap *
nTbs)][y]) + (dQuantOffset « 9) + Floor(Cconst * Ln(StepWidth)))) * (qm[x +
(levelIdxSwap * nTbs)][y])) » 16
   else if (dequant_offset_mode_flag == 0)
      dQuantOffsetActual [x][y] = ((Floor(−Cconst * Ln(qm[x + (levelIdxSwap *
nTbs)][y]) + (dQuantOffset « 11) + Floor(Cconst * Ln( Step Width)))) * (qm[x +
(levelIdxSwap * nTbs)][y])) »16
}
```

The variable levelIdxSwap may be derived as follows:

```
if (levelIdx == 2)
   levelIdxSwap = 0
else
   levelIdxSwap = 1
```

Derivation of Quantization Matrix

Various quantization and dequantization processes may use a quantization matrix. In the examples above this is referred to as qm[x][y]. The quantization matrix qm[x][y] contains the actual quantization step widths to be used to decode each coefficient group. In one example, the quantization matrix qm[x][y] may be derived as set out below, which builds the quantization matrix from a preliminary quantization matrix qm_p[x][y] depending on the scaling mode and the level of enhancement:

```
if (levelIdx == 2) {
   if (scaling_mode_level2 == 1) {
      for (x = 0; x < nTbS; x++) {
         for (y = 0; y < nTbs; y++)
            qm [x][y] = qm_p [x][y]
      }
   } else {
      for (x = 0; x < nTbS; x++) {
         for (y = 0; y < nTbS; y++)
            qm [x][y] = qm_p [x + nTbS][y]
      }
   }
} else {
   for (x = 0; x < nTbS; x++) {
      for (y = 0; y < nTbs; y++)
         qm [x][y] = qm_p [x + (2 * nTbS)][y]
   }
}
```

The preliminary quantization matrix qm_p[x][y] may be computed as follows:

```
if (nTbs == 2) {
   for (x = 0; x < 6; x++) {
      for (y = 0; y < nTbs; y++)
         qm_p[x][y] = (Clip3 (0, (3 « 16),[(QuantScalerDDBuffer [x][y]
* stepWidth) + (1 « 16)]) * stepWidth) » 16
   }
} else {
   for (y = 0; y < 12; y++) {
      for (x = 0; x < nTbs; x++)
         qm_p[x][y] = (Clip3 (0, (3 « 16),[(QuantScalerDDSBuffer
[x][y] * stepWidth) + (1 « 16)]) * stepWidth) » 16
   }
}
```

In this case, the preliminary quantization matrix qm_p[x][y] is built from the contents of a quantization matrix scaling buffer and a stepWidth variable, depending on the size of the transform used. A different quantization matrix scaling buffer may be used for each transform, e.g. a first quantization matrix scaling buffer QuantScalerDDBuffer may be used for a 2×2 directional decomposition transform and a second quantization matrix scaling buffer QuantScalerDDSBuffer may be used for a 4×4 directional decomposition transform. These buffers may be constructed as set out below.

Derivation of Quantization Matrix Scaling Buffers

The quantization matrix scaling buffer may be derived based on one or more of a set of default matrix parameters (which may be stored locally at the decoder), the contents of the buffer for a previous picture and a set of signalled quantization matrix coefficients (e.g. as received from an encoder). The derivation of the buffers for each of the transform sizes described in examples (e.g. 2×2 and 4×4) may be similar. The initialization of the quantization matrix scaling buffer may be dependent on (i.e. controlled by) a signalled or default (if a signal is omitted) quantization matrix mode (e.g., as referenced above).

The scaling parameters for a 2×2 transform, in the form of quantization matrix scaling buffer QuantScalerDDBuffer [x][y] may be derived as follows (i.e. when the variable nTbS is equal to 2). First, the default scaling parameters default_scaling_dd[x][y] may be set as follows:

```
default_scaling_dd[x][y] =
{
   { 0, 2 }
   { 0, 0 }
   { 32, 3 }
   { 0, 32 }
   { 0, 3 }
   { 0, 32 }
}
```

It should be noted that these values may change depending on implementation.

Then, the array QuantScalerDDBuffer may be initialized based on whether the current picture is an IDR picture. If the current picture is an IDR picture, QuantScalerDDBuffer may be initialized to be equal to default_scaling_dd as initialised above. If the current picture is not an IDR picture, the QuantScalerDDBuffer matrix may be left unchanged, e.g. from a previous picture.

Following initialization, the quantization matrix scaling buffer QuantScalerDDBuffer may be modified based on a quantization matrix mode, e.g. as indicated by the value of quant_matrix_mode.

If the quant_matrix_mode is equal to 0 and the current picture is not an IDR picture, the QuantScalerDDBuffer may be left unchanged.

If quant_matrix_mode is equal to 1, the QuantScalerDDBuffer may be equal to the default_scaling_dd.

If quant_matrix_mode is equal to 2, the QuantScalerDDBuffer may be modified based on a signalled set of quantization matrix coefficients QmCoeff0 as follows:

```
for (MIdx = 0; MIdx < 3; MIdx++)
   for (x = 0; x < 2; x++)
      for (y = 0; y < 2; y++)
         QuantScalerDDBuffer [x + (MIdx * 2)][y] = QmCoeff0[(x * 2) +
         y]
```

If quant_matrix_mode is equal to 3, the QuantScalerDDBuffer may be modified based on a signalled set of quantization matrix coefficients QmCoeff0 as follows:

```
for (MIdx = 0; MIdx < 2; MIdx++)
   for (x = 0; x < 2; x++)
      for (y = 0; y < 2; y++)
         QuantScalerDDBuffer [x + (MIdx * 2)][y] = QmCoeff [(x * 2) + y]
```

If quant_matrix_mode is equal to 4, the QuantScalerDDBuffer may be modified based on a signalled set of quantization matrix coefficients QmCoeff1 as follows:

```
for (x = 0; x < 2; x++)
  for (y = 0; y < 2; y++)
    QuantScalerDDBuffer [x + 4]y] = QmCoeff1 [(x * 2) + y]
```

If quant_matrix_mode is equal to 5, the QuantScalerDDBuffer may be modified based on two signalled sets of quantization matrix coefficients QmCoeff1 and QmCoeff1 as follows:

```
for (MIdx = 0; MIdx < 2; MIdx ++)
  for (x = 0; x < 2; x++)
    for (y = 0; y < 2; y++)
      QuantScalerDDBuffer [x + (MIdx * 2)][y] = QmCoeff0[(x *
      2) + y]
  for (x = 4, x< 6; x++)
    for (y = 0; y < 2; y++)
      QuantScalerDDBuffer [y][x] = QmCoeff1[(x * 2) + y]
```

The derivation of scaling parameters for 4×4 transform may be similar to the process described above. The scaling parameters for the 4×4 transform, in the form of quantization matrix scaling buffer QuantScalerDDSBuffer[x][y] may be derived as follows (i.e. when the variable nTbS is equal to 4). First, the default scaling parameters default_scaling_dds [x][y] may be set:

```
default_scaling_dds[x][y] =
{
  { 13, 26, 19, 32 }
  { 52, 1, 78, 9 }
  { 13, 26, 19, 32 }
  { 150, 91, 91, 19 }
  { 13, 26, 19, 32 }
  { 52, 1, 78, 9 }
  { 26, 72, 0, 3 }
  { 150, 91, 91, 19 }
  { 0, 0, 0, 2 }
  { 52, 1, 78, 9 }
  { 26, 72, 0, 3 }
  { 150, 91, 91, 19 }
}
```

Again, the values shown are an example only and may vary for different implementations.

Then, the array QuantScalerDDSBuffer may be initialized based on whether the current picture is an IDR picture. If the current picture is an IDR picture, QuantScalerDDSBuffer may be initialized to be equal to default_scaling_dds as initialised above. If the current picture is not an IDR picture, the QuantScalerDDSBuffer matrix may be left unchanged, e.g. from a previous picture.

Following initialization, the quantization matrix scaling buffer QuantScalerDDSBuffer may again be modified based on a quantization matrix mode, e.g. as indicated by the value of quant_matrix_mode.

If the quant_matrix_mode is equal to 0 and the current picture is not an IDR picture, the QuantScalerDDSBuffer may be left unchanged.

If quant_matrix_mode is equal to 1, the QuantScalerDDSBuffer may be equal to the default_scaling_dds.

If quant_matrix_mode is equal to 2, the QuantScalerDDSBuffer may be modified based on a signalled set of quantization matrix coefficients QmCoeff0 as follows:

```
for (MIdx = 0; MIdx < 3; MIdx++)
  for (x = 0; x < 4; x++)
    for (y = 0; y < 4; y++)
      QuantScalerDDSBuffer [x + (MIdx * 4)][y] = QmCoeff0[(x *
      4) + y]
```

If quant_matrix_mode is equal to 3, the QuantScalerDDSBuffer may be modified based on a signalled set of quantization matrix coefficients QmCoeff0 as follows:

```
for (MIdx = 0; MIdx < 2; MIdx++)
  for (x = 0; x < 4; x++)
    for (y = 0; y < 4; y++)
      QuantScalerDDSBuffer [x + (MIdx * 4)][y] = QmCoeff0[(x *
      4) + y]
```

If quant_matrix_mode is equal to 4, the QuantScalerDDSBuffer may be modified based on a signalled set of quantization matrix coefficients QmCoeff1 as follows:

```
for (x = 0; x < 4; x++)
  for (y = 0; y < 4; y++)
    QuantScalerDDSBuffer [x + 8][y] = QmCoeff1 [(x * 4) + y]
```

If quant_matrix_mode is equal to 5, the QuantScalerDDSBuffer may be modified based on two signalled sets of quantization matrix coefficients QmCoeff0 and QmCoeff1 as follows:

```
for (MIdx = 0; MIdx < 2; MIdx++)
  for (x = 0; x < 4; x++)
    for (y = 0; y < 4; y++)
      QuantScalerDDSBuffer [x + (MIdx * 4)][y] = QmCoeff0[(x * 4) +
y]
  for (x = 8, x < 12; x++)
    for (y = 0; y < 4; y++)
      QuantScalerDDSBuffer [x][y] = qm_coefficient_1[(x * 4) + y]
```

General Upscaling Process Description

Upscaling processes may be applied, at the decoder, to the decoded base picture at block 2712 in FIG. 27 and to the combined intermediate picture at block 2732. In the present examples, upscaling may be configured based on a signalled scaling mode. In the processes described below the upscaling is configured based on the indications of scaling_mode_level1 for the up-scaling to level 1 and based on scaling_mode_level2 for the up-scaling to level 2.

Upscaling from Decoded Base Picture to Preliminary Intermediate Picture

The up-scaling from a decoded base picture to a preliminary intermediate picture, e.g. as performed in block 2712, may take the following inputs: a location (xCurr, yCurr) specifying the top-left sample of the current block relative to the top-left sample of the current picture component; a variable IdxPlanes specifying the colour component of the current block; a variable nCurrS specifying the size of the residual blocks used in the general decoding process; an (nCurrS)×(nCurrS) array recDecodedBaseSamples specifying decoded base samples for the current block; variables srcWidth and srcHeight specifying the width and the height of the decoded base picture; variables dstWidth and dstHeight specifying the width and the height of the resulting upscaled picture; and a variable is8Bit used to select the kernel coefficients for the scaling to be applied, e.g. if the samples are 8-bit, then variable is8Bit shall be equal to 0, if the samples are 16-bit, then variable is8Bit shall be equal to 1. An output of block 2712 may comprise a (nCurrX)×(nCurrY) array recL1ModifiedUpsampledBaseSamples of picture elements.

In the array of elements recL1ModifiedUpsampledBaseSamples[x][y] the variables nCurrX and nCurrY may be derived based on the scaling mode. For example, if scaling_mode_level1 is equal to 0, no upscaling is performed, and recL1ModifiedUpsampledBaseSamples[x][y] are set to be equal to recDecodedBaseSamples[x][y]. If scaling_mode_level1 is equal to 1, then nCurrX=nCurrS<<1, and nCurrY=nCurrS. If scaling_mode_level1 is equal to 2, then nCurrX=nCurrS<<1, and nCurrY=nCurrS<<1.

The up-scaling applied at block 2712 may involve the use of a switchable up-scaling filter. The decoded base samples may be processed by an upscaling filter of a type signalled in the bitstream. The type of up-scaler may be derived from the process described in the section "Data Block Unit Global Configuration Semantics". Depending on the value of the variable upsample_type, a number of different kernel types may be applied. For example, each kernel types may be configured to receive a set of picture samples recDecodedBaseSamples as input and to produce a set of up-sampled picture samples recL1UpsampledBaseSamples as output. There may be four possible up-scaler kernels (although these may vary in number and type depending on implementation). These are also described in the section titled "Example Up-sampling Approaches". In the present example, if upsample type is equal to 0, the Nearest sample up-scaler described in the "Nearest up-sampling" section above may be selected. If upsample_type is equal to 1, the Bilinear up-scaler described in the "Bilinear up-sampling" section above may be selected. If upsample_type is equal to 2, a Bicubic up-scaler described in the "Cubic Up-sampling" section above may be selected. If upsample_type is equal to 3, a Modified Cubic up-scaler described in the "Cubic Up-sampling" section above may be selected.

A predicted residuals (e.g. predicted average) decoding computation may also be applied in certain cases as described below with respect to the level 1 to level 2 up-scaling.

A general up-scaler may divide the picture to upscale in 2 areas: center area and border areas as shown in FIGS. 9B and 9C. For the Bilinear and Bicubic kernel, the border area consists of four segments: Top, Left, Right and Bottom segments as shown in FIG. 9B, while for the Nearest kernel consists of 2 segments: Right and Bottom as shown in FIG. 9C. These segments are defined by the border-size parameter which may be set to 2 samples (1 sample for nearest method).

Level 1 Bit Depth Conversion

In certain examples, an up-scaling process may also involve a bit depth conversion, e.g. different levels (including levels 0, 1 and 2 described herein) may process data having different bit depths. The bit depths of each level may be configurable, e.g. based on configuration data that may be signalled from the encoder to the decoder. For example, the bit depths for each level, and any required conversion, may depending on the values of the bitstream fields in the global configuration as processed in the examples above. In one case, bit depth conversion is performed as part of the up-scaling process. Bit depth conversion may be applied using bit shifts and the difference between the bit depths of the lower and upper levels in the up-scaling.

When applying block 2712, the sample bit depth for level 1 may be based on level1_depth_flag. If level1_depth_flag is equal to 0, the preliminary intermediate picture samples are processed at the same bit depth as they are represented for the decoded base picture. If level1_depth_flag is equal to 1, the preliminary intermediate picture samples may be converted depending on the value of a variable base_depth and a variable enhancement_depth. The variable base_depth indicates a bit depth for the base layer. In certain examples, if base_depth is assigned a value between 8 and 14, e.g. depending on the value of field base_depth_type as specified in the "Data Block Unit Global Configuration Semantics" section above, then enhancement_depth is assigned a value between 8 and 14, depending on the value of field enhancement_depth_type as specified in the aforementioned semantics section.

If base_depth is equal to enhancement_depth, no further processing is required.

If enhancement_depth is greater than base_depth, the array of level 1 up-sampled base samples recL1ModifiedUpsampledBaseSamples may be modified as follows:

$$recL1ModifiedUpsampledBaseSamples[x][y]=recL1ModifiedUpsampledBaseSamples[x][y]<<(enhancement\_depth-base\_depth)$$

If base_depth is greater than enhancement_depth, the array recL1ModifiedUpsampledBaseSamples may be modified as follows:

$$recL1ModifiedUpsampledBaseSamples[x][y]=recL1ModifiedUpsampledBaseSamples[x][y]>>(base\_depth-enhancement\_depth)$$

Upscaling from Combined Intermediate Picture to Preliminary Output Picture

A similar set of processes may be performed at block 2732. Inputs to this process may comprise: a location (xCurr, yCurr) specifying the top-left sample of the current block relative to the top-left sample of the current picture component; a variable IdxPlanes specifying the colour component of the current block; a variable nCurrS specifying the size of the residual block; an (nCurrS)×(nCurrS) array recL1PictureSamples specifying the combined intermediate picture samples of the current block; variables srcWidth and srcHeight specifying the width and the height of the reconstructed base picture; variables dstWidth and dstHeight specifying the with and the height of the resulting upscaled picture; and a variable is8Bit used to select the kernel coefficients for the scaling to be applied. If the samples are 8-bit, then variable is8Bit may be equal to 0, if the samples are 16-bit, then variable is8Bit may be equal to 1. An output of process 2732 is the (nCurrX)×(nCurrY) array recL2ModifiedUpsampledSamples of preliminary output picture samples with elements recL2ModifiedUpsampledSamples[x][y].

The variables nCurrX and nCurrY may be derived based on a scaling mode in a similar manner to the process described above. If scaling_mode_level2 is equal to 0, no upscaling is performed, and recL2ModifiedUpsampledSamples[x][y] are set to be equal to recL1PictureSamples[x][y]. If scaling_mode_level2 is equal to 1, then nCurrX=nCurrS<<1, and nCurrY=nCurrS. If scaling_mode_level2 is equal to 2, then nCurrX=nCurrS<<1, and nCurrY=nCurrS<<1.

As described in the section above, the up-scaling performed at block 2732 may also involve the selective application of an upscaling filter, where an up-scaling type is signalled in the bitstream. Depending on the value of the variable upsample_type, each kernel type may be configured to recL1PictureSamples as input and producing recL2UpsampledSamples as output. There may be four possible up-scaler kernels (although these may vary in number and type depending on implementation). These are also described in the section titled "Example Up-sampling Approaches". In the present example, if upsample_type is equal to 0, the Nearest sample up-scaler described in the "Nearest up-sampling" section above may be selected. If upsample_type is equal to 1, the Bilinear up-scaler described in the "Bilinear up-sampling" section above may be selected. If upsample_type is equal to 2, a Bicubic up-scaler described in the "Cubic Up-sampling" section above may be selected. If upsample_type is equal to 3, a Modified Cubic up-scaler described in the "Cubic Up-sampling" section above may be selected.

The division of the picture into multiple areas may be performed as described in the section above with reference to FIGS. 9B and 9C.

Following the upscaling, if predicted_residual_mode_flag as described above is equal to 1 process, a predicted residual (i.e. modified up-sampling) mode as described above and below (see sub-block 2744 in FIG. 27) may be invoked with inputs as the (nCurrX)×(nCurrY) array recL2 Upsampled-Samples and the (nCurrS)×(nCurrS) array recL1PictureSamples specifying the combined intermediate picture samples of the current block. The output of this process may comprise a (nCurrX)×(nCurrY) array recL2ModifiedUpsampledSamples of picture elements. Otherwise, if predicted_residual_mode_flag is equal to 0, a predicted residual mode is not applied, and recL2ModifiedUpsampledSamples[x][y] are set to be equal to recL2UpsampledSamples [x][y] (i.e. set as the up-sampled values without modification).

Level 2 Bit Depth Conversion

Bit depth conversion as described above for level 1 may also (or alternatively) be applied when up-scaling from level 1 to level 2. Again, bit depth conversion may be performed depending on the values of the bitstream fields in the global configuration.

With respect to level 2, the sample bit depth may be derived from the level1_depth_flag. If level1_depth_flag is equal to 1, the preliminary output picture samples are processed at the same bit depth as they are represented for the preliminary intermediate picture. If level1_depth_flag is equal to 0, the output intermediate picture samples are converted depending on the value of the variables base_depth and enhancement_depth. These may be derived as discussed in the level 1 bit depth conversion section above. Again, if base_depth is equal to enhancement_depth, no further processing is required. If enhancement_depth is greater than base_depth, the array recL2ModifiedUpsampledSamples is modified as follows:

$$recL2ModifiedUpsampledSamples[x][y]=recL2ModifiedUpsampledSamples[x][y]<<(enhancement\_depth-base\_depth)$$

If base_depth is greater than enhancement_depth, the array recL2ModifiedUpsampledSamples is modified as follows:

$$recL2ModifiedUpsampledSamples[x][y]=recL2ModifiedUpsampledSamples[x][y]>>(base\_depth-enhancement\_depth)$$

Nearest Sample Upsampler Kernel Description

The sections below set out additional details on the example up-samplers described above.

A first up-sampler is a nearest sample up-sampler as shown in sub-block 2736 and discussed in the "Nearest Up-sampling" section above. The example of sub-block 2736 takes as inputs: variables srcX and srcY specifying the width and the height of the input array; variables dstX and dstY specifying the width and the height of the output array; and a (srcX)×(srcY) array recInputSamples[x][y] of input samples. Outputs to this process are a (dstX)×(dstY) array recUpsampledSamples[x][y] of output samples.

The Nearest kernel performs upscaling by copying the current source sample onto the destination 2×2 grid. This is shown in FIG. 9D and described in the accompanying description above. The destination sample positions are calculated by doubling the index of the source sample on both axes and adding +1 to extend the range to cover 4 samples as shown in FIG. 9D.

The nearest sample kernel up-scaler may be applied as specified by the following ordered steps whenever (xCurr, yCurr) block belongs to the picture or to the border area as specified in FIG. 9D.

If scaling_mode_levelX is equal to 1, the computation may be as follows:

```
for (ySrc = 0; ySrc < nCurrS; ++ySrc)
  yDst = ySrc
  for (xSrc = 0; xSrc < nCurrS; ++xSrc)
    xDst = xSrc << 1
    recUpsampledSamples[xDst][yDst] = recInputSamples[xSrc][ySrc]
    recUpsampledSamples[xDst + 1][yDst] = recInputSamples[xSrc]
[ySrc]
```

If scaling_mode_levelX is equal to 2, the computation may be as follows:

```
for (ySrc = 0; ySrc < nCurrS; ++ySrc)
  yDst = ySrc << 1
  for (xSrc = 0; xSrc < nCurrS; ++xSrc)
    xDst = xSrc << 1
    recUpsampledSamples[xDst][yDst] = recInputSamples[xSrc][ySrc]
    recUpsampledSamples[xDst][yDst + 1] = recInputSamples[xSrc]
[ySrc]
    recUpsampledSamples[xDst + 1][yDst] = recInputSamples[xSrc]
[ySrc]
    recUpsampledSamples[xDst + 1][yDst +1] =
recInputSamples[xSrc][ySrc]
```

Bilinear Upsampler Kernel Description

A bilinear upsampler kernel process is described in the section titles "Bilinear up-sampling above". Further examples are now described with reference to sub-block 2738 in FIG. 27. The inputs and outputs to sub-block 2738 may be the same as for sub-block 2736. The Bilinear up-sampling kernel consists of three main steps. The first step involves constructing a 2×2 grid of source samples with the base sample positioned at the bottom right corner. The second step involves performing the bilinear interpolation. The third step involves writing the interpolation result to the destination samples. The bilinear method performs the up-sampling by considering the values of the nearest 3 samples to the base sample. The base sample is the source sample from which the address of the destination sample is derived. FIG. 9E shows an example source grid used in the kernel.

The bilinear interpolation is a weighted summation of all the samples in the source grid. The weights employed are dependent on the destination sample being derived. The algorithm applies weights which are relative to the position of the source samples with respect to the position of the destination samples. If calculating the value for the top left destination sample, then the top left source sample will receive the largest weighting coefficient while the bottom right sample (diagonally opposite) will receive the smallest weighting coefficient, and the remaining two samples will receive an intermediate weighting coefficient. This is visualized in FIG. 9F and described in detail above.

An example bilinear kernel up-scaler is illustrated in FIG. 9G. It may be applied as specified by the following ordered steps below when (xCurr, yCurr) block does not belong to the border area as specified in FIGS. 9B and 9C.

If scaling_mode_levelX is equal to 1, the following up-scaling computation may be performed:

```
for (ySrc = 0; ySrc < nCurrS + 1; ++ySrc)
  for (xSrc = 0; xSrc < nCurrS + 1; ++xSrc)
    xDst = (xSrc << 1) − 1
    bilinear1D(recInputSamples[xSrc − l][ySrc],
recInputSamples[xSrc1][ySrc],
recUpsampledSamples [xDst][ySrc],
recUpsampledSamples [xDst + 1][ySrc])
```

If scaling_mode_levelX is equal to 2, the following up-scaling computation may be performed:

```
for (ySrc = 0; ySrc < nCurrS + 1; ++ySrc)
  yDst = (ySrc « 1) − 1
  for (xSrc = 0; xSrc < nCurrS + 1; ++xSrc)
    xDst = (xSrc « 1) − 1
    bilinear2D(recInputSamples[xSrc − l][ySrc − 1],
recInputSamples[xSrc][ySrc −
1], recInputSamples[xSrc − l][ySrc],
recInputSamples[xSrc][ySrc],
recUpsampledSamples[xDst][ySrc],
recUpsampledSamples [xDst + 1][ySrc],
recUpsampledSamples[xDst][ySrc + 1],
recUpsampledSamples[xDst + 1][ySrc + 1])
```

The bilinear kernel up-scaler is applied as specified by the following ordered steps below when (xCurr, yCurr) block belongs to the border area as specified in FIGS. 9B and 9C:

If scaling_mode_levelX is equal to 1:

```
for (ySrc = 0; ySrc < nCurrS + 1; ++ySrc)
  for (xSrc = 0; xSrc < nCurrS + 1; ++xSrc)
    xDst = (xSrc << 1) − 1
    xSrc0 = Max(xSrc -1, 0);
    xSrc1 = Min(xSrc, srcWidth − 1)
    bilinear1D(recInputSamples[xSrcO][ySrc], recInputSamples[xSrcl]
[ySrc], dst00, dst10)
    if (xDst >= 0)
      recUpsampledSamples[xDst][ySrc] = dst00
    if (xDst < (dstWidth−1))
      recUpsampledSamples[xDst + l][ySrc] = dst10
```

If scaling_mode_levelX is equal to 2:

```
for (ySrc = 0; ySrc < nCurrS + 1; ++ySrc)
  yDst = (ySrc << 1) − 1
  ySrc0 = Max(ySrc − 1, 0)));
  ySrcl = Min (ySrc, srcHeight − 1)))
  for (xSrc = 0; xSrc < nCurrS + 1; ++xSrc)
    xDst = (xSrc << 1) −1
    xSrc0 = Max(xSrc − 1,0);
    xSrc1 = Min(xSrc, srcWidth − 1)
    bilinear2D(recInputSamples[xSrc0][ySrc0],
recInputSamples[xSrc1] [xSrc0],
recInputSamples[xSrc0][ySrc1], recInputSamples[xSrc1][ySrc1],
dst00, dst10, dst01, dst11)
```

The function bilinear1D (in00, in10, out00, out10) as set out above may be applied as set out below:

```
in00x3 = in00 * 3
in10x3 = in10 * 3
out00 = ((in00x3 + in 10 + 2) >> 2)
out10 = ((in00 + in 10x3 + 2) >> 2)
```

The function bilinear2D (in00, in10, in01, in11, out00, out10, out01, out11) as set out above may be applied as set out below:

```
in00x3 = in00 * 3
in10x3 = in10 * 3
in01x3 = in01 * 3
in11x3 = in11 * 3
in00x9 = in00x3 * 3
in10x9 = in10x3 * 3
in01x9 = in01x3 * 3
in11x9 = in11x3 * 3
out00 = ((in00x9 + in 10x3 + in01x3 + in11 + 8) >> 4))
out10 = ((in00x3 + inlOx9 + in01 + in11x3 + 8) >> 4))
out01 = ((in00x3 + inlO + in01x9 + in11x3 + 8) >> 4))
out11 = ((in00 + inl0x3 + in01x3 + in11x9 + 8) >> 4))
```

Cubic Upsampler Kernel Description

The cubic up-sampler kernel process that is shown in sub-block 2740 may be applied as set out in this section. The inputs and outputs are the same as those described in the sections above. Further reference is made to FIGS. 9H, 9I and 9J and the section titled "Cubic Up-sampling".

The cubic up-sampling kernel of sub-block 2740 may be divided into three main steps. The first step involves constructing a 4×4 grid of source samples with the base sample positioned at the local index (2, 2). The second step involves performing a bicubic interpolation. The third step involves writing the interpolation result to the destination samples.

The cubic up-sampling kernel may be performed by using a 4×4 source grid which is subsequently multiplied by a 4×4 kernel. During the generation of the source grid, any samples which fall outside the frame limits of the source frame are replaced with the value of the source samples at the boundary of the frame. This is visualized in FIGS. 9H and 9I.

The kernels used for the cubic up-sampling process typically have a 4×4 coefficient grid. However, the relative position of the destination sample with regards to the source sample will yield a different coefficient set, and since the up-sampling is a factor of two, there will be 4 sets of 4×4 kernels used in the up-sampling process. These sets are represented by a 4-dimensional grid of coefficients (2×2×4×4). The bicubic coefficients are calculated from a fixed set of parameters; a core parameter (or bicubic parameter) of and four spline creation parameters. These may have values of, for example, −0.6 and [1.25, 0.25, −0.75, −1.75] respectively. The implementation of the filter uses fixed point computations.

The cubic kernel up-scaler is shown in FIG. 9J and described in more detail in the "Cubic up-sampling" section above. The up-scaler is applied on one direction (vertical and horizontal) at time and follows different steps if (xCurr, yCurr) block belongs to the border as specified in FIGS. 9B and 9C.

Given a set of example coefficients as follows:

```
kernel[y][x] =
    {
    { -1382, 14285, 3942, -461 }
    { -461, 3942, 14285, -1382 }
    { -1280, 14208, 3840, -384 }
    { -384, 3840, 14208, -1280 }
    }
```

where y=0 . . . 1 are coefficients to be used with 10-bit samples and y=2 . . . 3 to be used with 8-bits samples. The up-scaler may thus be applied according to the following pseudo-code.

```
kernelOffset is equal to 4.
kernelSize is equal to 4.
if (Horizontal) {
  for (y = 0; y < nCurrS; y++)
    for (xSrc = 0; xSrc < nCurrS + 1; xSrc++)
      ConvolveHorizontal(recInputSamples,
recUpsampledSamples, xSrc, y,
kernel[is8Bit * 2])
} else if (Vertical) {
  dstHeightM1 = dstHeight − 1
  for (ySrc = 0; ySrc < nCurrS + 1; ySrc++)
    yDst = (ySrc << 1) − 1
    if (border) {
      yDst0 = ((yDst > 0)&&(yDst < dstHeight)) ? yDst: −1
      yDst1 = ((yDst + 1) < dstHeightM1) ? yDst + 1 : −1
    } else {
      yDst0 = yDst
      yDst1 = (yDst + 1)
    }
    for (x = 0; x < nCurrS; x++)
      ConvolveVertical(recInputSamples,
recUpsampledSamples, yDst0, yDst1,
x, ySrc, kernel[is8Bit * 2])
}
```

The function ConvolveHorizontal(input, output, x, y, kernel, border) as referenced above may be applied as set out below:

```
xDst = (x << 1) − 1;
if (border)
  dstWidthM1 = dstWidth − 1
if (xDst >= 0 && xDst < dstWidth)
  output[xDst][y] = ConvolveHorizontal (kernel[0],
input[x + kernel Offset][y], 14);
if (xDst < dstWidthM1)
  output [xDst + 1][y] = ConvolveHorizontal(kernel[1],
  input[x + kernelOffset][y])
, 14)
else
  output [xDst][y] = ConvolveHorizontal (kernel[0],
  input[x + kernelOffset][y], 14)
  output [xDst + 1][y] = ConvolveHorizontal (kernel[1],
  input[x + kernelOffset][y]
,14)
```

The function Convolve Vertical (input, output, yDst0, yDst1, x, ySrc, kernel) as referenced above may be applied as set out below:

```
if (border)
  dstWidthM1 = dstWidth − 1
if (yDst0 >= 0)
  output[x][yDst0] = ConvolveHorizontal (kernel[0],
  input[x][y + kernelOffset], 14)
if (yDst0 >= 0)
```

-continued

```
  output [x][yDst] = ConvolveHorizontal(kernel[1],
  input[x][y + kernelOffset]) , 14)
else
  output [x][yDst0] = ConvolveHorizontal (kernel[0],
  input[x + kernelOffset][y], 14)
  output [x][yDst1] = ConvolveHorizontal (kernel[1],
  input[x + kernelOffset][y], 14)
```

The function ConvolveHorizontal (kernel, input, shift) as referenced above may be applied as set out below:

```
accumulator = 0
for (int32_t x = 0; x < kernelSize; x++)
accumulator += input[x] * kernel[x]
offset = 1 << (shift − 1)
output = ((accumulator + offset) >> shift)
```

Modified Cubic Upsampler Kernel Description

Lastly in this section, a short description of an example implementation of sub-block 2742 is presented. The inputs and outputs may be defined as for the other up-sampling processes above. The implementation of the modified cubic filter again uses fixed point computations. It may be seen as a variation of the cubic up-sampler kernel described above, but with the following kernel coefficients:

```
kernel [y][x] =
    {
    { −2360, 15855, 4165, −1276 }
    { −1276, 4165, 15855, −2360 }
    { −2360, 15855, 4165, −1276 }
    { −1276, 4165, 15855, −2360 }
    }
```

where y=0 . . . 1 are coefficients to be used with 10-bit samples and y=2 . . . 3 to be used with 8 bits samples, the kernelOffset is equal to 4, and the kernelSize is equal to 4.

It should be noted the kernels provided herein are for example only and other implementations may use different kernels.

Predicted Residual Process Description

The following section will briefly provide an example implementation for the predicted residual process shown in sub-block 2744 of FIG. 27. It may also be applied as part of the up-scaling of block 2712 in other examples. Inputs to this process are shown as: variables srcX and srcY specifying the width and the height of the lower resolution array; variables dstX and dstY specifying the width and the height of the upsampled arrays; a (srcX)×(srcY) array recLowerResSamples[x][y] of samples that were provided as input to the upscaling process; and a (dstX)×(dstY) array recUpsampledSamples [x][y] of samples that were output of the up-scaling process. The outputs to this process are a (dstX)×(dstY) array recUpsampledModifiedSamples[x][y] of output samples.

In the present example, the predicted residual process modifies recUpsampledSamples using a 2×2 grid if scaling_mode_levelX is equal to 2 (i.e. is two-dimensional) and using a 2×1 grid if scaling_mode_levelX is equal to 1 (i.e. is one-dimensional). The predicted residual process is not applied if scaling_mode_levelX is equal to 0 (e.g. as no up-scaling is performed).

The predicted residual process may be applied as specified by the following ordered steps whenever (xCurr, yCurr) block belongs to the picture or to the border area as specified in FIGS. 9B and 9C:

If scaling_mode_levelX is equal to 1 (i.e. scaling is one-dimensional), the following computation may be performed:

```
for (ySrc = 0; ySrc < srcY; ySrc++)
  yDst = ySrc
  for (xSrc = 0; xSrc < srcX; xSrc++)
    xDst = xSrc << 1
    modifier = recLowerResSamples[xSrc][ySrc] −
(recUp sampled Samples[xDst][yDst] + recUpsampledSamples[xDst +
l][yDst])
>> 1
  recModifiedUpsampledSamples[xDst][yDst] =
recUpsampledSamples[xDst][yDst] + modifier
  recModifiedUpsampledSamples[xD st + 1][yDst] =
recUpsampledSamples[xDst + 1][yDst] + modifier
```

If scaling_mode_levelX is equal to 2 (i.e. scaling is two-dimensional), the following computation may be performed:

```
for (ySrc = 0; ySrc < srcY; ySrc++)
  yDst = ySrc << 1
  for (xSrc = 0; xSrc < srcX; xSrc++)
    xDst = xSrc << 1
    modifier = recLowerResSamples[xSrc][ySrc] −
      (recUpsampledSamples[xDst][yDst] +
      recUpsampledSamples[xDst + 1][yDst] +
      recUpsampledSamples[xDst][yD st + 1] +
        recUpsampledSamples[xDst + 1][yDst + 1]) >> 2
    recModifiedUpsampledSamples [xDst][yDst] =
recUpsampledSamples[xDst][yDst] + modifier
    recModifiedUpsampledSamples [xDst][yDst + 1] =
recUpsampledSamples[xDst + l][yDst] + modifier
    recModifiedUpsampledSamples[xDst+ l][yDst] =
recUpsampledSamples[xDst][yDst + 1] + modifier
    recModifiedUpsampledSamples [xDst + l][yDst +1] =
recUpsampledSamples[xDst + l][yDst + 1] + modifier
```

Transform Inputs and Outputs, Transform Types, and Residual Samples Derivation

Decoding processes for the transform are shown as sub-blocks 2718 and 2756 in FIG. 27. These processes may perform an inverse transform at the decoder. Inputs to this these processes may be: a location (xTbP, yTbP) specifying the top-left sample of the current luma or chroma transform block relative to the top-left luma or chroma sample of the current picture (as before, P can be related to either luma or chroma plane depending to which plane the transform coefficients belong); a variable nTbS specifying the size of the current transform block (e.g. derived as above); and a (nTbS)×(nTbS) array d of dequantized transform coefficients with elements d[x][y]. An output of this process is the (nTbS)×(nTbS) array R of residuals with elements R[x][y].

In the examples described herein, there are two types of transforms that can be used in the encoding process. These need not be limiting, and other transforms may be used. The two transforms described herein both leverage small kernels which are applied directly to the residuals that remain after the stage of applying Predicted Residuals (e.g. as per the predicted average computations described above). Residuals may be similar to those shown in FIG. δA.

The (nTbS)×(nTbS) array R of residual samples may be derived in one of two ways. For the first transform (referred to herein as 2×2 or directional decomposition—DD), each (vertical) column of dequantized transform coefficients d[x][y] with x=0 . . . nTbS−1, y=0 . . . nTbS−1 may be transformed to R[x][y] with x=0 . . . nTbS−1, y=0 . . . nTbS−1 by invoking the two-dimensional transformation process for the first transform described herein if nTbS is equal to 2. For the second transform (referred to herein as 4×4 or directional decomposition squared—DDS), each (vertical) column of dequantized transform coefficients d[x][y] with x=0 . . . nTbS−1, y=0 . . . nTbS−1 is transformed to R[x][y] with x=0 . . . nTbS−1, y=0 . . . nTbS−1 by invoking the two-dimensional transformation process for the second transform if nTbS is equal to 4.

2×2 Directional Decomposition Transform

The first transform (2×2 or DD) will now be briefly described.

If nTbS is equal to 2, the transform has a 2×2 kernel which is applied to each 2×2 block of transform coefficients. The resulting residuals are derived as set out below.

If scaling_mode_levelX for the corresponding enhancement sub-layer is equal to 0 or 2, the inverse transformation is performed according to the following matrix multiplication:

$$\{R_{00}\}\ \{1, 1, 1, 1\}\ \{C_{00}\}$$
$$\{R_{01}\}=\{1, -1, 1, -1\}*\{C_{01}\}$$
$$\{R_{10}\}\ \{1, 1, -1, -1\}\ \{C_{10}\}$$
$$\{R_{11}\}\ \{1, -1, -1, 1\}\ \{C_{11}\}$$

If scaling_mode_levelX, for the corresponding enhancement sub-layer is equal to 1 (i.e. scaling is in one-direction), the inverse transformation is performed according to the following matrix multiplication:

$$\{R_{00}\}\ \{1, 1, 1, 0\}\ \{C_{00}\}$$
$$\{R_{01}\}=\{1, -1, -1, 0\}*\{C_{01}\}$$
$$\{R_{10}\}\ \{0, 1, -1, 1\}\ \{C_{10}\}$$
$$\{R_{11}\}\ \{0, -1, -1, 1\}\ \{C_{11}\}$$

4×4 Directional Decomposition Transform

The second transform (4×4 or DDS) will now be briefly described.

If nTbS is equal to 4 the transform has a 4×4 kernel which is applied to a 4×4 block of transform coefficients. The resulting residuals are derived as set out below.

If scaling_mode_levelX for the corresponding enhancement sub-layer is equal to 0 or 2, the inverse transformation is performed according to the following matrix multiplication:

| | | |
|---|---|---|
| {R00} | { 1, 1, 1, 1, 1, 1, 1, 1, 1, 1, 1, 1, 1, 1, 1, 1 } | {C00} |
| {R01} | { 1, 1, −1, −1, 1, 1, −1, −1, 1, 1, −1, −1, 1, 1, −1, −1 } | {C01} |
| {R02} | { 1, −1, 1, −1, 1, −1, 1, −1, 1, −1, 1, −1, 1, −1, 1, −1 } | {C02} |
| {R03} | { 1, −1, −1, 1, 1, −1, −1, 1, 1, −1, −1, 1, 1, −1, −1, 1 } | {C03} |
| {R10} | { 1, 1, 1, 1, 1, 1, 1, 1, −1, −1, −1, −1, −1, −1, −1, −1 } | {C10} |
| {R11} | { 1, 1, −1, −1, 1, 1, −1, −1, −1, −1, 1, 1, −1, −1, 1, 1 } | {C11} |
| {R12} | { 1, −1, 1, −1, 1, −1, 1, −1, −1, 1, −1, 1, −1, 1, −1, 1 } | {C12} |
| {R13} | = { 1, −1, −1, 1, 1, −1, −1, 1, −1, 1, 1, −1, −1, 1, 1, −1}* | {C13} |
| {R20} | { 1, 1, 1, 1, −1, −1, −1, −1, 1, 1, 1, 1, −1, −1, −1, −1 } | {C20} |
| {R21} | { 1, 1, −1, −1, −1, −1, 1, 1, 1, 1, −1, −1, −1, −1, 1, 1 } | {C21} |
| {R22} | { 1, −1, 1, −1, −1, 1, −1, 1, 1, −1, 1, −1, −1, 1, −1, 1 } | {C22} |
| {R23} | { 1, −1, −1, 1, −1, 1, 1, −1, 1, −1, −1, 1, −1, 1, 1, −1 } | {C23} |
| {R30} | { 1, 1, 1, 1, −1, −1, −1, −1, −1, −1, −1, −1, 1, 1, 1, 1 } | {C30} |
| {R31} | { 1, 1, −1, −1, −1, −1, 1, 1, −1, −1, 1, 1, 1, 1, −1, −1 } | {C31} |
| {R32} | { 1, −1, 1, −1, −1, 1, −1, 1, −1, 1, −1, 1, 1, −1, 1, −1 } | {C32} |
| {R33} | { 1, −1, −1, 1, −1, 1, 1, −1, −1, 1, 1, −1, 1, −1, −1, 1 } | {C33} |

If scaling_mode_levelX for the corresponding enhancement sub-layer is equal to 1, the inverse transformation is performed according to the following matrix multiplication:

| | | |
|---|---|---|
| {R00} | { 1, 1, 1, 1, 1, 1, 1, 1, 0, 0, 1, 1, 0, 1, 0, 1, 1 } | {C01} |
| {R01} | { 1, 1, −1, −1, 1, 1, −1, −1, 0, 0, −1, −1 , 0, 0, −1, −1 } | {C02} |
| {R02} | { 1, 1, 1, −1, 1, −1, 1, −1, 0, 0, 1, −1, 0, 0, 1, −1 } | {C03} |
| {R03} | { 1, −1, −1, 1, 1, −1, −1, 1, 0, 0, −1, 1, 0, 0, −1, 1 } | {C04} |
| {R10} | { 0, 0, 1, 1, 0, 0, 1, 1, 1, 1, −1, −1, 1, 1, −1, −1 } | {C10} |

-continued

| | | |
|---|---|---|
| {R11} | { 0, 0, −1, −1, 0, 0, −1, −1, 1, 1, 1, 1, 1, 1, 1, 1 } | {C11} |
| {R12} | { 0, 0, 1, −1, 0, 0, 1, −1, 1, −1, −1, 1, 1, −1, −1, 1 } | {C12} |
| {R13} | = { 0, 0, −1, 1, 0, 0, −1, 1, 1, −1, 1, −1, 1, −1, 1, −1 }* | {C13} |
| {R20} | { 1, 1, 1, 1, −1, −1, −1, −1, 0, 0, 1, 1, 0, 0, −1, −1 } | {C20} |
| {R21} | { 1, 1, −1, −1, −1, −1, 1, 1, 0, 0, −1, −1, 0, 0, 1, 1 } | {C21} |
| {R22} | { 1, −1, 1, −1, −1, 1, −1, 1, 0, 0, 1, −1, 0, 0, −1, 1 } | {C22} |
| {R23} | { 1, −1, −1, 1, −1, 1, 1, −1, 0, 0, −1, 1, 0, 0, 1, −1 } | {C23} |
| {R30} | { 0, 0, 1, 1, 0, 0, −1, −1, 1, 1, −1, −1, −1, −1, 1, 1 } | {C30} |
| {R31} | { 0, 0, −1, −1, 0, 0, 1, 1, 1, 1, 1, 1, −1, −1, −1, −1 } | {C31} |
| {R32} | { 0, 0, 1, −1, 0, 0, −1, 1, 1, −1, −1, 1, −1, 1, 1, −1 } | {C32} |
| {R33} | { 0, 0, −1, 1, 0, 0, 1, −1, 1, −1, 1, −1, −1, 1, −1, 1 } | {C33} |

Decoding Process for the Residual Reconstruction

Blocks 2730 and 2758 in FIG. 27, show a process for reconstructing residuals. This process involves applying residual data derived from the enhancement decoding to various pictures to enhance those pictures. This may be performed at multiple levels, which may reflect multiple levels of scaling in multiple dimensions (e.g. as configured via transmitted scaling factors). Blocks 2730 and 2758, as with other operations shown in FIG. 27, are shown as applied to blocks or coding units of data (e.g. 2×2 or 4×4 blocks of residuals and pixel elements). The operations may then be applied across all the blocks or coding units that make up a complete picture or frame. As the blocks or coding units do not depend on other blocks or coding units, these operations may be parallelised for the blocks or coding units, e.g. on Graphical Processing Units (GPUs) and/or multi-core processors, including those present in mobile devices such as tablets and smartphone.

Turning now to a process to implement one or more of blocks 2730 and 2758 in FIG. 27, the reconstructed residual of each block or coding unit may be derived as set out here. First, the variable nCbSL may be set equal to 2 if transform_type or 4 if transform_type is equal to 1 (e.g. reflecting the type of transform—2×2 or 4×4 in the described examples). The variable nCbSC is then set equal to nCbSL>>1.

If IdxPlanes is equal to 0, the residual reconstruction process for a colour component as specified below is invoked with the luma coding block location (xCb, yCb), the variable nCurrS set equal to nCbSL, and the variable IdxPlanes set equal to 0 as input. This corresponds to processing for a luma plane.

If IdxPlanes is equal to 1, the residual reconstruction process for a colour component as specified below is invoked with the chroma coding block location (xCb>>ShiftWidthC, yCb>>ShiftHeightC), the variable nCurrS set equal to nCbSC, and the variable IdxPlanes set equal to as inputs. This corresponds to processing for chroma planes, where the chroma samples may be arranged with respect to the luma samples as shown in FIGS. 7A to 7C (and described with reference to the parameters ShiftWidthC and ShiftHeightC above).

A residual reconstruction for a level 1 block, e.g. as shown as block 2730 in FIG. 27 (and relating to, say, the operation applied by summation component 220 in FIG. 2), will now be described. Inputs to this process may comprise: a location (xCurr, yCurr) specifying the top-left sample of the current block relative to the top-left sample of the current picture component; a variable IdxPlanes specifying the colour component of the current block; a variable nCurrS specifying the size of the residual block; an (nCurrS)×(nCurrS) array recL1BaseSamples specifying the preliminary intermediate picture reconstructed samples of the current block (e.g., relating to 2304 in FIG. 23); and an (nCurrS)×(nCurrS) array resL1FilteredResiduals specifying the level 1 filtered residuals of the current block (e.g., relating to 2308 in FIG. 23). The output of this process is the combined intermediate picture (nCurrS)×(nCurrS) array recL1Samples with elements recL1Samples[x][y] (e.g., relating to 2310 in FIG. 23).

The (nCurrS)×(nCurrS) block of the reconstructed sample array recL1Samples at location (xCurr, yCurr) may be derived as follows:

$$recL1Samples[xCurr+i][yCurr+j]=recL1BaseSamples[i][j]+resL1FilteredResiduals[i][j]$$

with i=0 . . . nCurrS−1, j=0 . . . nCurrS−1

As can be seen this may be performed block by block or for the complete plane (as the residuals and reconstructed base decoded picture are added elementwise). In the above, the location (xCurr, yCurr) simply provides the two-dimensional offset for a current block or coding unit with respect to an enhanced level 1 output picture.

Following reconstruction at block 2730, the upscaling process for a colour component as specified above (and shown as block 2732) may be invoked with inputs: the location (xCurr, yCurr); the transform block size nTbS, the (nCurrS)×(nCurrS) array recL1Samples; the variables srcWidth and srcHeight specifying the size of the reconstructed base picture; the variables dstWidth and dstHeight specifying the width and the height of the upscaled resulting picture; and the variable is8Bit (e.g. the latter equal to 1 if enhancement_depth_type is equal to 0).

A residual reconstruction for a level 2 block, e.g. as shown as block 2758 in FIG. 27 (and relating to, say, the operation applied by summation component 258 in FIG. 2) will now be described. Inputs to this process are similar to those set out above with relation to level 1 reconstruction. For example, inputs may comprise: a location (xCurr, yCurr) specifying the top-left sample of the current block relative to the top-left sample of the current picture component; a variable IdxPlanes specifying the colour component of the current block; an (nCurrS)×(nCurrS) array recL2ModifiedUpscaledSamples specifying the preliminary output picture samples of the current block (e.g. relating to 2312 in FIG. 23); and an (nCurrS)×(nCurrS) array resL2Residuals specifying the level 2 residuals of the current block (e.g. relating to 2316 in FIG. 23). An output of this process is the (nCurrS)×(nCurrS) array recL2PictureSamples of combined output picture samples with elements recL2PictureSamples[x][y] (e.g. relating to 2322 in FIG. 3).

The (nCurrS)×(nCurrS) block of the reconstructed sample array recL2PictureSamples at location (xCurr, yCurr) may be computed as follows:

$$recL2PictureSamples[xCurr+i][yCurr+j]=recL2ModifiedUpscaledSamples[i][j]+resL2Residuals[i][j]$$

with i=0 . . . nCurrS−1, j=0 . . . nCurrS−1

If dithering_type as described in at least the "Semantics" section above is not equal to 0, the a dithering process as shown by block 2760 is invoked with the location (xCurr, yCurr) and the (nCurrS)×(nCurrS) array recL2PictureSamples. This may then output a final array recL2DitheredPictureSamples that is used, together with the other coding units making up the picture, to output a reconstructed picture of the video at block 2762.

Decoding Process for the L-1 Filter

As set out in other examples, a filter may be applied to the decoded level 1 residuals. A similar filter may also be deployed at the encoder (e.g. the simulated level 1 decoding path). This filter may be described as an "in-loop" filter, as it is applied as the processing loops around different coding units. In FIG. 27, a level 1 residual filter is applied on the level 1 residual surface block at method block 2720 before the residuals are added to the base reconstructed picture (e.g. at method block 2730). In certain cases, the level 1 filter may be selectively applied based on the transform type. In certain cases, it may only be applied when a 4×4 transform is used, i.e. the filter may be configured to operate only if the variable transform_type is equal to 1. In other examples, block 2720 may also be applied when a 2×2 transform is used with a different kernel, or after reformatting of the samples into a different sized block.

The level 1 filter of block 2720 may operate on each 4×4 block of transformed residuals by applying a mask whose weights are structured as follows (and is also set out with reference to the description of processing components above):

$\{\alpha, \beta, \beta, \alpha\}$.
$\{\beta, 1, 1, \beta\}$
$\{\beta, 1, 1, \beta\}$
$\{\alpha, \beta, \beta, \alpha\}$ Turning to block 2720 of FIG. 27, the inputs to this process are: a sample location (xTb0, yTb0) specifying the top-left sample of the current transform block relative to the top-left sample of the current picture; and an array resL1Residuals of a size 4×4 specifying residuals for enhancement sub-layer 1. The output to this process is a 4×4 array of filtered residuals resL1FilteredResiduals with elements resL1FilteredResiduals[x][y]. An in-loop level 1 residual filter may be applied by first obtaining the variables deblockEnabled, α and β as follows:

```
deblockEnabled = level 1_filtering enabled_flag
if (level_1_filtering_signalled_flag)
  α = 16 − level_1_filtering_first_coefficient
  β = 16 − level_1_filtering_second_coefficient
else
  α = 16
  β = 16
```

If deblockEnabled is true, the following steps are applied given the residual representation in FIG. 6A:

```
resL1FilteredResiduals[0][0] = (resL1Residuals[0][0] * α) >> 4
resL1FilteredResiduals[0][3] = (resL1Residuals[0][3] * α) >> 4
resL1FilteredResiduals[3][0] = (resL1Residuals[3][0] * α) >> 4
resL1FilteredResiduals[3][3] = (resL1Residuals[3][3] * α) >> 4
resL1FilteredResiduals[0][1] = (resL1Residuals[0][1] * β) >> 4
resL1FilteredResiduals[0][2] = (resL1Residuals[0][2] * β) >> 4
resL1FilteredResiduals[1][0] = (resL1Residuals[1][0] * β) >> 4
resL1FilteredResiduals[2][0] = (resL1Residuals[2][0] * β) >> 4
resL1FilteredResiduals[1][3] = (resL1Residuals[1][3] * β) >> 4
resL1FilteredResiduals[2][3] = (resL1Residuals[2][3] * β) >> 4
resL1FilteredResiduals[3][1] = (resL1Residuals[3][1] * β) >> 4
resL1FilteredResiduals[3][2] = (resL1Residuals[3][2] * β) >> 4
resL1FilteredResiduals[1][1] = resL1Residuals[1][1]
resL1FilteredResiduals[1][2] = resL1Residuals[1][2]
resL1FilteredResiduals[2][1] = resL1Residuals[2][1]
resL1FilteredResiduals[2][2] = resL1Residuals[2][2]
```

If deblockEnabled is false, the resL1FilteredResiduals are simply set to equal the resL1Residuals (e.g. the filter is applied as a pass-through filter with no modification).

Decoding Process for Base Decoder Data Extraction

A brief overview of block 2710 will now be described. However, it should be noted that as per other examples, the base decoding may be considered a separate stand-alone process that may be performed by third-party components. In certain cases, one or more of hardware and software base decoders may be instructed to decode a received base stream under the control of the enhancement decoder (i.e. that implements the residual decoding processing shown in FIG. 27). In other cases, the enhancement decoder may be configured to receive base decoded pictures at a particular rate, that are then synchronised with the residual decoding of the enhancement sub-layers. The process described below may be considered as a wrapper for a base decoding process that does not actually implement the base decoding process, but that instead reads data output by a separate process, e.g. from a decoded base picture buffer.

In the example of FIG. 27, the decoding process for base decoder data extraction may receive the following inputs: a location (xCurr, yCurr) specifying the top-left sample of the current block relative to the top-left sample of the current picture component; a variable IdxBaseFrame specifying the base decoder picture buffer frame from which to read the samples; and a variable IdxPlanes specifying the colour component of the current block. An output of this process is shown as being a (nCurrX)×(nCurrY) array recDecodedBaseSamples of picture samples with elements recDecodedBaseSamples[x][y]. The process 2710 may read a block of samples of size (nCurrS)×(nCurrS) from the location (xCurr, yCurr) and the frame pointed by the variable IdxBaseFrame. The blocks may be read in raster order.

When luma and chroma planes are present, e.g. arranged as shown in FIGS. 7A to 7C, the sample block size variables nCurrX and nCurrY may derived as follows:

$$nCurrX=(IdxPlanes==0)?nCurrX: nCurrX>>ShiftWidthC$$

$$nCurrY=(IdxPlanes==0)?nCurrY: nCurrY>>ShiftHeightC$$

Decoding Process for Dither Filter

As mentioned above in the section on residual reconstruction, a dither filter may be applied to the output of the level 2 reconstruction. The dither filter may be applied to improve an image quality of the output picture, e.g. by hiding artefacts that are generated by the application of quantization. In FIG. 27, the dither process is shown as block 2760.

In the example of FIG. 27, the inputs to the dither process 2760 comprise: a location (xCurr, yCurr) specifying the top-left sample of the current block relative to the top-left sample of the current picture component; and an (nCurrS)×(nCurrS) array recL2PictureSamples specifying the reconstructed combined output picture samples (e.g. relating to 2322 in FIG. 23). The output of process 2760 is shown as a (nCurrS)×(nCurrS) array recL2DitheredPictureSamples of residuals with elements recL2DitheredPictureSamples[x][y].

Different forms and variations of known dithering approaches may be applied. The type of dithering may be signalled using the variable dithering_type (as described above). For example, if dithering_type is equal 1 (e.g. a uniform dither), the (nCurrS)×(nCurrS) block of the reconstructed sample array recL2DitheredPictureSamples at location (xCurr, yCurr) may be derived as follows:

$$recL2DitheredPictureSamples[xCurr+i][yCurr+j]= recL2PictureSamples[i][j]+rand(i,j)$$

with i=0 . . . nCurrS−1, j=0 . . . nCurrS−1. The function rand(i,j) is a pseudo-random number, e.g. as generated with a known pseudo or true random number generator. The function rand(i,j) may be configured to output a value within a predefined range. This predefined range may be signalled.

In the present example, the predefined range is set using the variable dithering_strength as described in the "Syntax" and "Semantics" sections above, where the defined range may be set as [−dithering_strength,+dithering_strength].

Parsing Process for Entropy Encoded Transform Coefficients

This section describes an entropy decoding process that may be applied to entropy-encoded transform coefficients. Inputs to this process may comprise the bits belonging to chunks of data containing the entropy encoded transform coefficients derived from the picture enhancement decoding process shown as block 2706. The process described herein may also be used to implement the entropy decoding components of the previous decoder examples.

As set out above, it should be noted that references to Huffman encoding and decoding as described herein shown be treated as also referring to prefix coding. Prefix codes are also known as prefix-free codes, comma-free codes, prefix condition codes and instantaneous codes. Although Huffman coding is just one of many algorithms for deriving prefix codes, prefix codes are widely referred to as "Huffman codes", even when the code was not produced by a Huffman algorithm. Hence, "Huffman code" is used herein as a synonym for the more general "prefix code".

In more detail, and with reference to block 2706 of FIG. 27, different processing operations may take place depending on whether the data is tiled. If the data is not tiled, e.g. as indicated by a tile_dimensions_type equal to 0, for each chunk the following information is provided: a variable surfaces[planeIdx][levelIdx][layerIdx].rle_only_flag specifying if a prefix coding decoder is needed (or if the data is to be decoded without prefix coding as only run-length encoded data); a variable surfaces[planeIdx][levelIdx][layerIdx].size specifying the size of the chunk of data (e.g. wherein chunks correspond to the data portions shown in FIG. 9A); and a variable surfaces[planeIdx][levelIdx][layerIdx].data specifying the beginning of the chunk. The variables planeIdx, levelIdx and layerIdx may be used as described above to indicate the plane, enhancement sub-layer and coefficient group to which the chunk belongs. Outputs of this process are entropy-decoded quantized transform coefficients to be used as input for the decoding processes shown as blocks 2714 and 2746 in FIG. 27, which are described above.

If tiled data is enabled (e.g. as shown in FIG. 21A), then tile_dimensions_type may be set to a non-zero value. In this case, the following information is provided for each chunk: a variable surfaces[planeIdx][levelIdx][layerIdx].tiles pointing to the tiles of the decoded picture; and a variable surfaces[planeIdx][levelIdx][layerIdx].rle_only_flag specifying if the prefix coding decoder is needed for all tiles. In this case, a chunk of data is further split to smaller chunks of data, which are termed as tiles. For each tile the following information are provided: a variable surfaces[planeIdx][levelIdx][layerIdx].tiles[tileIdx].size specifying the size of the chunk of tile data; and a variable surfaces[planeIdx][levelIdx][layerIdx].tiles[tileIdx].data specifying the beginning of the chunk. The indexes planeIdx, levelIdx, layerIdx and tileIdx indicate the plane, enhancement sub-layer, coefficient group and tile to which the chunk belongs. Outputs of this process are again entropy-decoded quantized transform coefficients to be used as input for the processes shown as blocks 2714 and 2746 in FIG. 27 (e.g. in the order shown in FIG. 21A).

An example entropy decoder may consist of two components: a prefix coding decoder and a run length decoder. This is described in the section "Example Entropy Encoding" above with reference to FIG. 10A.

Parsing Process for Entropy Encoded Temporal Signal Coefficient Group

Temporal signalling data may also be entropy encoded, e.g. as shown in the examples of FIGS. 24 to 26, and described with reference to FIG. 12A to 12E. The temporal signalling data in the example of FIG. 27 is organised in entropy-encoded temporal signal coefficient groups. These may also be parsed as part of the picture enhancement decoding process 2706 or as part of a separate process. They may be entropy decoded in a similar manner to the processes described above.

As set out above, the processing of a temporal signalling surface may depend on whether the data is tiled. This may be indicated using the variable tile_dimensions_type. Inputs to this parsing process for the temporal signalling data may comprise the bits belonging to chunks of data containing the entropy encoded temporal signal coefficient group derived from block 2706.

If tile_dimensions_type is equal to 0, for each chunk the following information are provided: a variable temporal_surfaces[planeIdx].rle_only_flag specifying if the prefix coding decoder is needed; a variable temporal_surfaces[planeIdx].size specifying the size of the chunk of data; and a variable temporal_surfaces[planeIdx].data specifying the beginning of the chunk. In this case, planeIdx is an index indicating the plane to which the chunk belongs. The output of this process is an entropy decoded temporal signal coefficient group to be stored in TempSigSurface, as described in more detail above and below.

If tiled data is enabled, e.g. tile_dimensions_type is not equal to 0, the following information may be provided for each chunk: a variable temporal_surfaces[planeIdx].tiles pointing to the tiles of the decoded picture; and a variable temporal_surfaces[planeIdx].rle_only_flag specifying if the prefix coding decoder is needed for all tiles. In this case, a chunk of data is further split to smaller chunks of data, which are termed as tiles (e.g. as shown in FIG. 21A but for the temporal signalling—the temporal signalling may be seen as an extra layer). For each tile the following information may be provided: a variable temporal_surfaces[planeIdx].tiles[tileIdx].size specifying the size of the chunk of tile data; and a variable temporal_surfaces[planeIdx].tiles[tileIdx].data specifying the beginning of the chunk. In this case, indexes planeIdx and tileIdx indicate the plane and tile to which the chunk belongs. The output of this process is an entropy decoded temporal signal coefficient group to be stored in TempSigSurface as described in more detail above and below.

Again, an example entropy decoder may consist of two components: a prefix coding decoder and a run length decoder. This may be applied as described with respect to the transform coefficients in the section "Example Entropy Encoding" above with reference to FIG. 10A.

Prefix Coding Decoder Description

Certain aspects of an example prefix coding decoder relate to the above section titled "Example Entropy Encoding" and FIGS. 10A to 10I.

In certain examples, if the variable rle_only_flag is equal to 1, the prefix coding decoder process is skipped, and the run length decoding process described herein is invoked. If variable rle_only_flag is equal to 0, the prefix coding decoder is applied.

The prefix coding decoder may be initialised by reading code lengths from the stream header size. If there are more than 31 non-zero values the stream header is as shown in FIG. 10B. Otherwise the stream header may be arranged as shown in FIG. 10C. In the special case for which the frequencies are all zero, the stream header may be arranged as shown in FIG. 10D. In the special case where there is only one code in the prefix coding tree the stream header may be arranged as shown in FIG. 10E. Further details of these data structures may be found in the "Example Entropy Encoding" section above.

After being initialised, the prefix coding decoder may undertake the following steps:

1) Set code lengths for each symbol;
2) Assign codes to symbols from the code lengths; and
3) Generate a table for searching the subsets of codes with identical lengths. In this step, each element of the table may be used to record the first index of a given length and the corresponding code (e.g. in the form firstIdx, firstCode).

Prefix Coding Decoder Table Generation

A short example of step 3) as set out above, e.g. prefix coding decoder table generation will now be described with reference to the symbol tables below and FIGS. 28A to 28E.

To find a prefix coding code for a given set of symbols a prefix coding tree may be created. The table below shows a hypothetical example with 6 symbols (A, B, C, D, E and F) that each occur at different frequencies. First the symbols are sorted by frequency. This is shown in the table below:

| Symbol | Frequency |
|---|---|
| A | 3 |
| B | 8 |
| C | 10 |
| D | 15 |
| E | 20 |
| F | 43 |

Figure 28A:
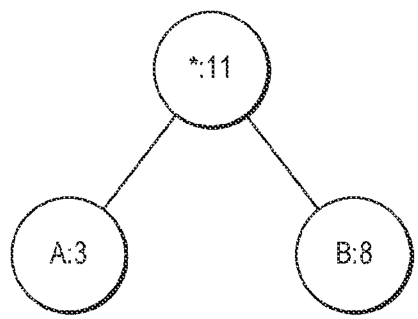
FIGS. 28A to 28E show parsing trees for a prefix coding example.

The two lowest elements are then removed from the list and made into leaves of a tree, with a parent node that has a frequency the sum of the two lower element's frequencies. A first partial tree is shown in FIG. 28A. A new sorted frequency list is then generated with the combined elements as shown in the table below:

| Symbol | Frequency |
|---|---|
| C | 10 |
| * | 11 |
| D | 15 |
| E | 20 |
| F | 43 |

Figure 28B:
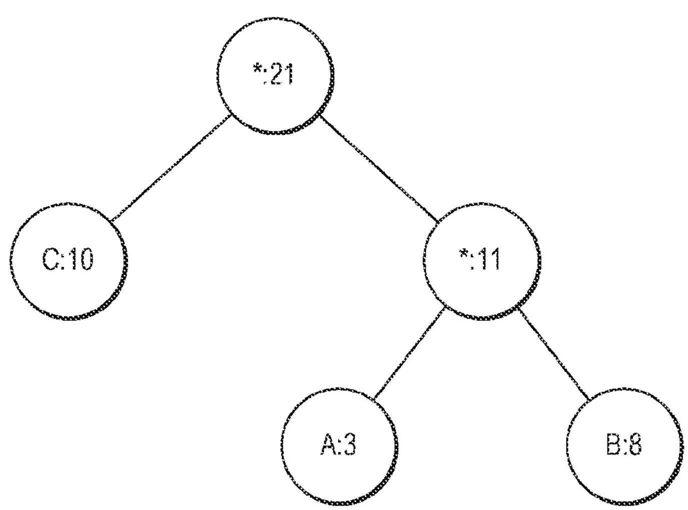

Then the loop is repeated, combining the two lowest elements, as shown in FIG. 28B. The new list with updated sorted frequencies is as shown below:

| Symbol | Frequency |
|---|---|
| D | 15 |
| E | 20 |
| * | 21 |
| F | 43 |

Figure 28C:
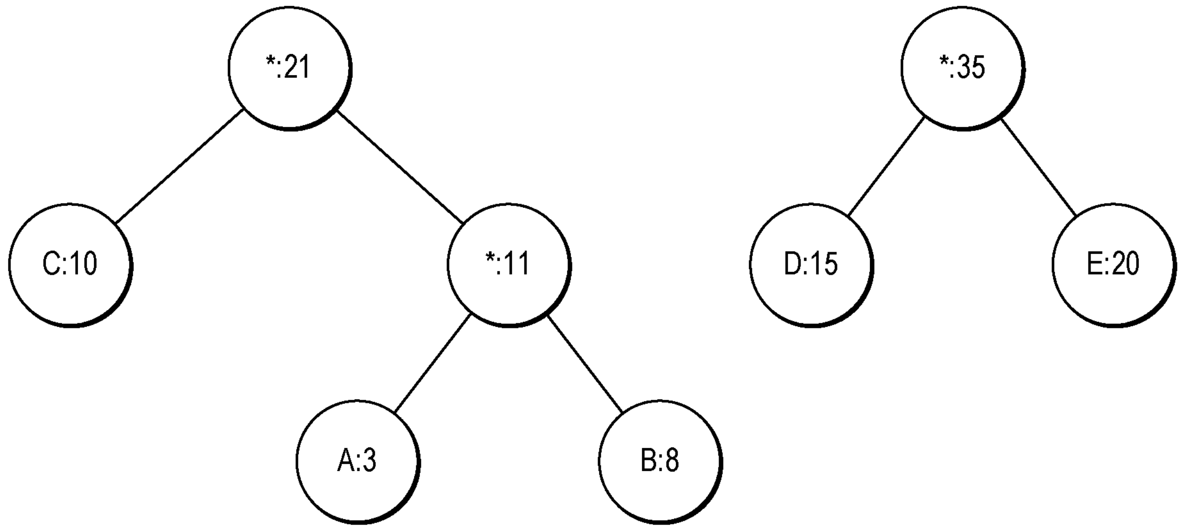
Figure 28D:
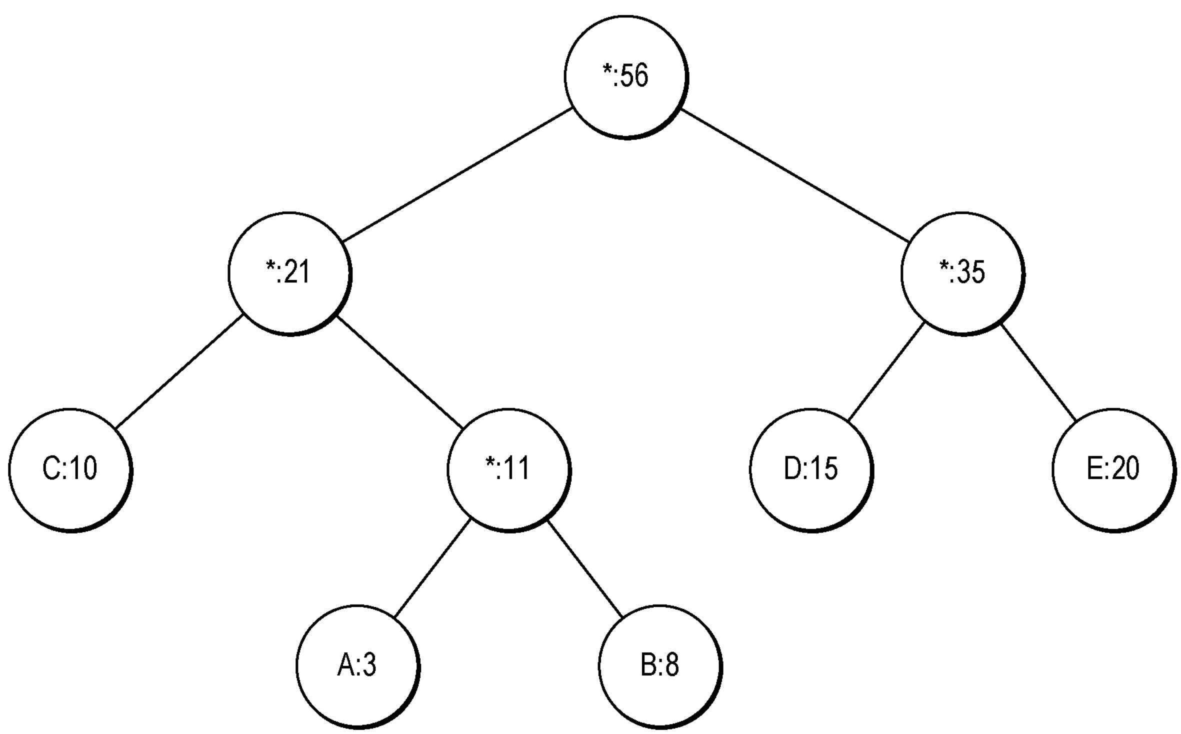

This process is repeated until only one element remains in the list. The iterations are shown in FIGS. 28C and 28D and in the three consecutive tables below:

| Symbol | Frequency |
|---|---|
| * | 21 |
| * | 35 |
| F | 43 |

| Symbol | Frequency |
|---|---|
| F | 43 |
| * | 56 |

| Symbol | Frequency |
|---|---|
| * | 99 |

Figure 28E:
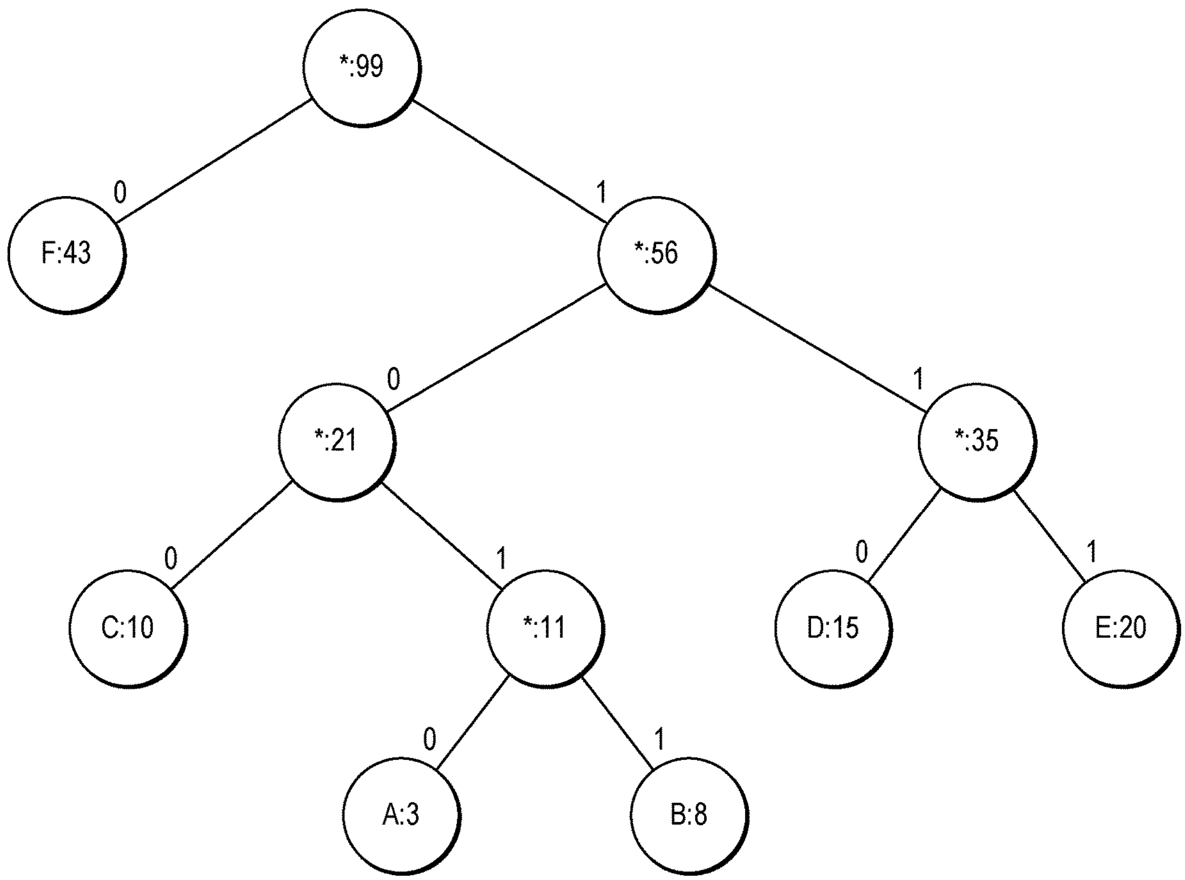

Once the tree is built, to generate the prefix coding code for a symbol the tree is traversed from the root to this symbol, appending a 0 each time a left branch is taken and a 1 each time a right branch is taken. This is shown in FIG. 28E. In the hypothetical example presented here, this gives the following code, as specified in the table below:

| Symbol | Code | Code length |
|---|---|---|
| A | 1010 | 4 |
| B | 1011 | 4 |
| C | 100 | 3 |
| D | 110 | 3 |
| E | 111 | 3 |
| F | 0 | 1 |

The code length of a symbol is the length of its corresponding code. To decode a prefix coding code, the tree is traversed beginning at the root, taking a left path if a 0 is read and a right path if a 1 is read. The symbol is found when reaching a leaf.

Prefix Coding Decoder for Tile Data Sizes

This section describes a prefix coding decoder that may be used for tiled data. In this case, the decoder reads the prefix coding encoded data size of each tile byte by byte. A state machine for this decoding has two states: a LSB Prefix Code state and a MSB Prefix Code state. By construction the state of the first byte of data is guaranteed to be LSB Prefix Code state. If an overflow flag is 0, the state machine remains in the LSB Prefix Code state. If the overflow flag is 1, the state machine transitions to the MSB Prefix Code state. The decoder this state machine to determine the state of the next byte of data. The state tells the decoder how to interpret the current byte of data. The two states may those illustrated in FIG. 10G.

The LSB Prefix Coding state may encode the 7 less significant bits of a non-zero value. In this state a byte is divided as shown in FIG. 10G. The overflow bit is set if the value does not fit within 7 bits of data. When the overflow bit is set, the state of the next byte will be MSB Prefix Coding state. The MSB Prefix Coding state encodes bits 8 to 15 of values that do not fit within 7 bits of data. All 8 bits of the byte may be data bits (e.g. similar to FIGS. 10H and 10I without the run bit). A frequency table is created for each state for use by the Prefix Coding encoder.

If this process is invoked with surfaces referring to entropy encoded transform coefficients, the decoded values are stored into a temporary buffer tmp_size_per_tile of size nTilesL1 or nTilesL2 (respectively, number of tiles for enhancement sub-layer 1 and sub-layer 2). These may get mapped to surfaces [planeIdx][levelIdx][layerIdx].tiles[tileIdx].size as follows, using the indexes planeIdx, levelIdx, layerIdx, and tileIdx:

```
if (levelIdx == 1)
  nTiles = nTilesL1
else
  nTiles = nTilesL2
if (compression_type_size_per_tile == 2) {
  for (tileIdx = 1; tileIdx < nTiles; tileIdx++) {
    tmp_size_per_tile[tileIdx] += tmp_size_per_tile[tileIdx − 1]
  }
}
for (tileIdx = 0; tileIdx < nTiles; tileIdx++) {
  temporal_surfaces[planeIdx].tiles[tileIdx].size =
tmp_size_per_tile[tileIdx]
}
```

If this process is invoked with temporal surfaces referring to an entropy encoded transform signal coefficient group, the decoded values may be stored into a temporary buffer tmp_size_per_tile of size nTilesL2 and get mapped to temporal_surfaces[planeIdx].files[tileIdx].size as follows:

```
if (compression_type_size_per_tile == 2) {
  for (tileIdx = 1; tileIdx < nTilesL2; tileIdx++) {
    tmp_size_per_tile[tileIdx] += tmp_size_per_tile[tileIdx − 1]
  }
}
for (tileIdx = 0; tileIdx < nTilesL2; tileIdx++) {
  temporal_surfaces[planeldx].tiles[tileIdx].size=
tmp_size_per_tile[tileIdx]
}
```

The last bit symbol offset per tile may use the same prefix coding decoding process as described above. If this process is invoked with surfaces referring to entropy encoded transform coefficients, the decoded values are stored into a temporary buffer tmp_decoded_tile_prefix_last_symbol_bit_offset of size nTilesL1 or nTilesL2 (respectively, number of tiles for enhancement sub-layer 1 and sub-layer 2) and get mapped to surfaces[planeIdx][levelIdx][layerIdx].files[tileIdx] The variable prefix_last_symbol_bit_offset is then derived as follows:

```
if (levelldx == 1)
nTiles = nTilesLI
else
nTiles = nTilesL2
for (tileldx = 0; tileldx < nTiles; tileldx++) {
surfaces[planeldx] [levelldx] [layerldx] .tiles[tileldx] .prefixlastsymbolbit-
offset
= tmp_decoded_tilej>refix_last_symbol_bit_offset[tileldx]
}
```

If this process is invoked with temporal surfaces referring to an entropy encoded transform signal coefficient group, the decoded values are stored into a temporary buffer tmp_decoded_tile_prefix_last_symbol_bit_offset of size nTilesL2. They may then be mapped to temporal_surfaces [planeIdx].tiles[tileIdx].prefix_last_symbol_bit_offset as follows:

```
for (tileIdx = 0; tileIdx < nTilesL2; tileIdx++) {
  temporal_surfaces[planeIdx].tiles[tileIdx].prefix_last_symbol_bit_offset =
    tmp_decoded_tile_prefix_last_symbol_bit_offset[tileIdx]
}
```

RLE Decoder

An example run length encoding (RLE) decoder will now be described. Further details of run length encoders and decoders are also found in the section "Example Entropy Encoding" set out above and FIGS. 10A to 10I.

The input of the RLE decoder may be a byte stream of prefix coding decoded data if rle_only_flag is equal to zero or just a byte stream of raw data if rle_only_flag is equal to 1. The output of this process is a stream of quantized transform coefficients belonging to the chunk pointed by the variables planeIdx, levelIdx and layerIdx or a stream of temporal signals belonging to a temporal chunk.

When decoding coefficient groups, the RLE decoder may use the state machine 1050 shown in FIG. 10F as described above. The run length state machine 1050 may be used by the prefix coding encoding and decoding processed to know which prefix coding code to use for the current symbol or code word. The RLE decoder decodes sequences of zeros. It may also decode the frequency tables used to build the prefix coding trees. The RLE decoder reads the run length encoded data byte by byte. By construction the state of the first byte of data is guaranteed to be the RLC Residual LSB state 1051. The RLE decoder uses the state machine 1050 to determine the state of the next byte of data. The state tells the RLE decoder how to interpret the current byte of data. Further details of the three states 1051, 1052 and 1053 are provided in the description of FIG. 10F above. Reference is also made to the byte encoding shown in FIGS. 10G to 10I. A frequency table may be created for each state for use by the prefix coding encoder. In order for the decoder to start on a known state, the first symbol in the encoded stream will always be a residual.

The RLE decoder for a temporal signal coefficient group may operate in a similar manner. An example RLE decoder for a temporal signal coefficient group was described in the section title "Temporal Prediction and Signalling" above. The RLE decoder for a temporal signal coefficient group may use a state machine similar to the state machine 1280 shown in FIG. 12E. The state machine 1280 may be used by the prefix coding encoding and decoding processed to know which prefix coding code to use for the current symbol or code word. The RLE decoder for the temporal signal coefficient group decodes sequences of zeros and sequences of ones. It may also decode the frequency tables used to build prefix coding trees. The RLE decoder for a temporal signal coefficient group may read received run length encoded data byte by byte. By construction the state of the first byte of data may be guaranteed to be true value of the first symbol in the stream (e.g. the state 1281 in FIG. 12E). The RLE decoder may use the state machine 1280 to determine the state of the next byte of data. The state tells the RLE decoder how to interpret the current byte of data. As described above with reference to FIG. 12E, a RLE decoder for a temporal signal coefficient group may have two states in addition to a first symbol state: an RLC zero run state as shown as state 1283 in FIG. 12E and a RLC one run state as shown as state 1282 in FIG. 12E. The zero run state 1283 encodes 7 bits of a zero run count. The run bit is high if more bits are needed to encode the count. Run length encoding of a byte for the zero run state may be similar to that shown in FIG. 10H or 10I. The one run state 1282 encodes 7 bits of a one run count. The run bit is high if more bits are needed to encode the count. Run length encoding of a byte for one run state may also be similar to that shown in FIG. 10H or 10I. A frequency table may be created for each state for use by the prefix coding encoder. In order for the RLE decoder to start on a known state (e.g. state 1281), the first symbol may contain the real value 0 or 1.

When decoding a temporal signal coefficient group, the RLE decoder writes the 0 and 1 values into the temporal signal surface TempSigSurface. This may have a size (PictureWidth/nTbS, PictureHeight/nTbS) where nTbS is transform size.

The encoding described with respect to FIGS. 12C and 12D, and the flow-chart of FIGS. 13A and 13B, may be used. In this case, decoding of the temporal signal may involve the following steps. If temporal_tile_intra_signalling_enabled_flag is equal to 1, and if the value to write at the writing position (x,y) in the TempSigSurface is equal to 1, and x %(32/nTbS)==0 and y %(32/nTbS)==0, a next writing position is moved to (x+32/nTbS, y) when (x+32/nTbS)<(PictureWidth/nTbs), otherwise it is moved to (0, y+32/nTbS). This may decode the temporal signalling as shown in FIG. 12D, where this Figure may represent a RLE decoder for a temporal signal coefficient group writing values to the temporal signal surface for a 4×4 transform with nTbs=4.

In certain examples, other signalling may be encoded and/or decoded as set out for the temporal signalling above and in other examples.

For example, in one case, an entropy_enabled_flag for a tile may be encoded and decoded in this manner. In this case, a run length state machine to be used to code the entropy_enabled_flag field of each of the tiles may be configured in a similar manner to the state machine 1280 shown in FIG. 12E and used for the temporal signalling above. The RLE decoder may again decodes sequence of zeros and sequences of ones as discussed for the temporal signalling above (with the same state arrangement).

When using an encoded tile entropy_enabled_flag, the RLE data may be organized in blocks. Each block may have an output capacity of 4096 bytes. In this case, the RLE decoder may switch to a new block in the following cases: 1) the current block is full; 2) the current RLE data is a run and there is less than 5 bytes left in the current block; and 3) the current RLE data is lead to an LSB/MSB pair and there is less than 2 bytes left in the current block. In this example, the RLE decoder may write the 0 and 1 values into temporary signal surface tmp_decoded_tile_entropy_enabled of size:

$$(nPlanes)\times(nLevels)\times(nLayers)\times(nTilesL1+nTilesL2)\times(no\_enhancement\_bit\_flag{=}{=}0)+(temporal\_signalling\_present\_flag{=}{=}1)\times(nPlanes)\times(nTilesL2)$$

In this case, the resulting temporary signal surface tmp_decoded_tile_entropy_enabled may get mapped to surfaces [planeIdx][levelIdx][layerIdx].tiles[tileIdx].entropy_enabled_flag and temporal_surfaces[planeIdx].tiles[tileIdx].entropy_enabled_flag as follows:

```
for (planeIdx = 0; planeIdx < nPlanes; ++planeIdx) {
  if (no_enhancement_bit_flag == 0) {
    for (levelIdx = 1; levelIdx <= nLevels; ++levelIdx) {
      if (levelIdx == 1)
        nTiles = nTilesL1
      else
        nTiles = nTilesL2
      for (layerIdx = 0; layer < nLayers; ++layerIdx) {
        for (tileIdx = 0; tileIdx < nTiles; tileIdx++) {
```

-continued

```
surfaces[planeIdx][levelIdx][layerIdx].tiles[tileIdx].entropy_enabled_flag
=
            tmp_decoded_tile_entropy_enabled[tileIdx]
          }
        }
      }
    } else {
      for (levelIdx = 1; levelIdx <= nLevels; ++levelIdx) {
        if (levelIdx == 1)
          nTiles = nTilesL1
        else
          nTiles = nTilesL2
        for (layerIdx = 0; layer < nLayers; ++layerIdx) {
          for (tileIdx = 0; tileIdx < nTiles; tileIdx++)
surfaces[planeIdx][levelIdx][layerIdx].tiles[tileIdx].entropy_enabled_flag
= 0
        }
      }
    }
    if (temporal_signalling_present_flag == 1) {
      for (tileIdx = 0; tileIdx < nTilesL2; tileIdx++) {
        temporal_surfaces[planeIdx].tiles[tileIdx].entropy_enabled_flag =
          tmp_decoded_tile_entropy_enabled[tileIdx]
      }
    }
}
```

Parsing Process for Exp-Golomb Codes

In certain examples described herein data may be encoded with Exp-Golomb codes. These may be 0-th order. This section sets out a parsing process that may be invoked when the descriptor of a syntax element in the syntax tables is equal to ue(v) (e.g. as set out in the "Bitstream Syntax" section above.

In the example, inputs to the Exp-Golomb code parsing process may comprise bits from the raw byte sequence payload (RBSP). Outputs of this process may comprise syntax element values.

Syntax elements coded as ue(v) may be Exp-Golomb-coded with order 0. The parsing process for these syntax elements begins with reading the bits starting at the current location in the bitstream up to and including the first non-zero bit and counting the number of leading bits that are equal to 0. This process may be specified as follows:

```
leadingZeroBits = −1
for( b = 0; !b; leadingZeroBits++ )
b = read_bits( 1 )
```

The variable codeNum may then assigned as follows:

$$codeNum=(2^{leadingzeroBits}-1)+read\_bits(leadingZeroBits)$$

where the value returned from read_bits(leadingZeroBits) is interpreted as a binary representation of an unsigned integer with most significant bit written first.

The table below illustrates an example structure of a 0-th order Exp-Golomb code by separating the bit string into "prefix" and "suffix" bits. The "prefix" bits are those bits that are parsed as specified above for the computation of leadingZeroBits, and are shown as either 0 or 1 in the bit string column of the table. The "suffix" bits are those bits that are parsed in the computation of codeNum and are shown as xi in the table, with i in the range of 0 to leadingZeroBits−1, inclusive. Each xi is equal to either 0 or 1.

| Bit string form | Range of codeNum |
|---|---|
| 1 | 0 |
| 0 1 x 0 | 1..2 |
| 0 0 1 x 1 x 0 | 3..6 |
| 0 0 0 1 x 2 x 1 x 0 | 7..14 |
| 0 0 0 0 1 x 3 x 2 x 1 x 0 | 15..30 |
| 0 0 0 0 0 1 x 4 x 3 x 2 x 1 x 0 | 31..62 |
| . . . | . . . |

The table below illustrates explicitly an assignment of bit strings to codeNum values.

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

The value of the syntax element is then equal to codeNum.

Summary of the Detailed Example Implementation of the Decoder

The example described above processes a bitstream where data is logically organized into chunks. First, each chunk is entropy decoded. That is, the method comprises retrieving each chunk and applying an entropy decoding operation to each chunk. An example of entropy decoding operations is described above and may comprise for example run length decoding, prefix coding decoding or both. The method may then output an array of entropy decoded quantized coefficients. A run-length coding operation may identify the next symbol in a set of symbols and extract either a data value or a run of zeros. The decoding operation may then combine these values and zeros to decode the data. The order may be in the order extracted or alternatively in some predetermined order.

An example implementation of the decoding process for a first level of enhancement chunk (e.g. level 1 following entropy decoding) is described. An example implementation of the decoding process for a further level of enhancement chunk (e.g. level 2 following entropy decoding) is also described.

The method may comprise retrieving an array of entropy decoded quantized coefficients representing a first level of enhancement and outputting an array of residuals. The method may further comprise retrieving an array of samples of output of a base decoder. The method may further comprise applying a de-quantization process to the array of entropy decoded quantized coefficients to derive a set of de-quantized coefficients, applying a transformation process to the set of de-quantized coefficients and applying a filter process to output the array of residuals representing a first level of enhancement. The method may then further comprise recreating a picture from arrays of residuals. The method may comprise applying a transform process from a set of predetermined transform processes according to a signalled parameter. For example, the transform process may be applied on a 2×2 coding unit or a 4×4 coding unit.

The method may also comprise retrieving an array of entropy decoded quantized coefficients representing a further level of enhancement and outputting an array of residuals. The method may further comprise retrieving the array of residuals of the first level of enhancement corresponding to the array of entropy decoded quantized coefficients representing a further level of enhancement. The method may further comprise applying an up-sampling process to the array of residuals of the first level of enhancement. The method may comprise applying a temporal prediction process to the array of entropy decoded quantized coefficients representing a further level of enhancement to derive an array of temporally predicted samples. The method may further comprise applying a de-quantization process to the array of entropy decoded quantized coefficients to derive a set of de-quantized coefficients, applying a transformation process to the set of de-quantized coefficients to derive a set of transformed coefficients. The array of temporally predicted samples may then be combined with the set of transformed coefficients to derive an array of residuals for the further later of enhancement. The method may then further comprise recreating a picture from the array of residuals. The method may comprise applying a transform process from a set of predetermined transform processes according to a signalled parameter. For example, the transform process may be applied on a 2×2 coding unit or a 4×4 coding unit.

The method may comprise predicting residuals. The step of predicting residuals may be performed as part of the transform process. The predicting residuals step may comprise modifying a residual. The modification may be performed based on a location of the residual in a frame. The modification may be a predetermined value. A filtering step may also be applied in the further level of enhancement. Similarly, temporal prediction may also be applied in the first level of enhancement process.

Although the method described above specifies examples of a de-quantization process, a transform process, an up-sampling process and a filter process (and other processes), it will be understood that the process described are not essential and may other contemporary process may be applied to perform the steps described.

Methods may be applied for operating on temporal signalling (e.g. signalling a temporal mode using metadata). For example, encoded data may be modified such that if temporal_enabled bit is 1 and temporal_refresh_bit is 0 and if layerIdx is 0, an additional temporal surface is processed. The decoding process for picture enhancement encoded data may in certain cases be modified such that if temporal_enabled bit is 1 and temporal_refresh_bit is 0 and if layerIdx is 0, an additional temporal surface is processed. A decoding process for temporal prediction may be modified such that variables TransTempSig and TileTempSig are read from a temporal surface (e.g. the temporal map). If a temporal_embedded bit is 1, TransTempSig and TileTempSig may be supplied as inputs to the temporal prediction processes and these processes may be configured to determine from tileTempSig array if a tile refresh process should be invoked. Additionally, in this case, decoding may be configured to invoke temporal processing for the transform if TransTempSig is set to 0.

Detailed Example of the Neural Network Up-Sampler

Overview

The present section provides a detailed implementation example of the neural network up-sampler described above. These details should not be taken as limiting.

The neural network up-sampler may be defined as a function min_conv that performing an up-sampling operation with intermediate values defined as three-dimensional (3D) tensors, that will ultimately be flattened out to a two-dimensional (2D) matrix of integer values of a known range. In may be configured to provide an identical interface to the other up-sampling functions described above, such as sub-blocks 2736 to 2742 shown in FIG. 27. In the paragraphs below, a bottom-to-top definition of types, operations and other functions is presented.

Data Types

This sub-section sets out some data types that may be defined in the neural network up-sampler implementation:

| | |
|---|---|
| Tensor3D_FP32 | A 3D dimensional tensor with size0, size1 and size2 as their size parameter. Should size2 be 1, the tensor is a 2D matrix, hence it is compatible with other 2D surfaces. Indexing of Tensor3D_FP32 follows the nomenclature used in the rest of the document as per tensor[idx0][idx1][idx2]. Elements of a Tensor3D_FP32 may comprise 32-bit floating point values as per IEEE-754. Every tensor has an equivalent representation in a so called “flattened” continuous 1D array, where the flattened index is defined as: tensor.flat idx(i0, i1, i2) = i2 * tensor.size1 * tensor.size0 + i1 * tensor. size0 + i0. |
| Tensor4D_FP32 | 4D version of Tensor3D_FP32 above, with the flattened index being defined as: tensor.flat idx(i0, i1, i2, i3) = i3 * tensor.size2 * tensor.size1 * tensor.size0 + i2 * tensor.size1 * tensor.size0 + i1 * tensor.size0 + i0. |
| Tensor1D_FP32 | 1D version of tensor types, which may be considered a regular vector with flattened index being defined as identity, i.e. tensor.flat_idx(i0) = i0. |

Operations

This sub-section sets out some functions that may be used in the neural network up-sampler implementation.

The function Convolve2D_Add_Bias may be defined to provide a two-dimensional convolution with a bias. It may be used to implement blocks 2232 and 2236 in FIG. 22C. It may receive an input of the form Tensor3D_FP32, apply a kernel of the form Tensor4D_FP32 and a bias of the form Tensor1D_FP32, and provide an output of the form Tensor3D_FP32(input.size0, input.size1, kernel.size3). It may be defined as the following function:

```
for (x = 0; x < output.size0; ++x)
  for (y = 0; y < output, size1; ++y)
    for (out_ch = 0; out_ch < output.size2; ++ out_ch)
      sum = 0.0
      for (dx = 0; dx < kernel.size0; ++dx)
        for (dy = 0; dy < kernel.size1; ++dy)
          for (in_ch = 0; in_ch < input.size2; ++in_ch):
            sx = x + dx − kernel.size0 / 2
            sy = y + + dy − kernel.size1 / 2
            if (0 <= sx < input.size0 and 0 <= sy < size1)
              sum = sum + input[sx][sy][in_ch] *
              kernel[dx][dy][in_ch][out_ch]
            output[x][y][out_ch] = sum
```

The function LeakyRelu may apply a non-linearity. It may be used to implement block 2234 in FIG. 22C. It may receive an input of the form Tensor3D_FP32 and generate an output of the form Tensor3D_FP32(input.size0, input.size2). It may be defined as follows:

```
for (x = 0; x < output.sizeO; ++x )
  for (y = 0; y < output, size 1; ++y)
    for (ch = 0; ch < output. size2; ++ch)
      if input[y][x][ch] < 0.0:
        output[x][y][ch] = input[x][y][ch] * 0.2
      else
        output[x][y][ch] = input[x][y][ch]
```

The function InverseDD_Flattening may apply the inverse (2×2) transform as part of the up-sampling. It may be used to implement block 2242 in FIG. 22C. It may receive input of the form Tensor3D_FP32 and ds of the form Tensor3D_FP32 (the latter representing the lower or down-sampled resolution elements for use in applying the predicted average computation). An output is provided in the form of a Tensor3D_FP32(input.size0*2, input.size1*2, 1). It may be defined as follows

```
for (i0 = 0; i0 < input.size0; ++i0)
  for (i1 = 0; i1 < input.size 1; ++i1)
    A = input[i0][i1][0] + ds[i0][i1][0]
    H = input[i0][i1][1]
    V = input[i0][i1][2]
    D = input[i0][i1][3]
    output[i0*2][i1 *2][0] = A + H + V + D
    output[i0*2][i1 * 2 + 1][0] = A − H + V − D
    output[i0 * 2 + 1][i1*2][0] = A + H − V − D
    output[i0 * 2 + 1][i1 * 2 + 1][0] = A − H − V + D
```

A function Integer_FP_Scaling may be used to provide a conversion between integer and floating-point domains. It may be used to implement block 2222 in FIG. 22B. It may receive as inputs the following variables: input, a 2D matrix of an integers of known domain; min_int_value, a minimum valid value of the integer domain; max_int_value, a maximum valid value of the integer domain; scaling_offset, a floating point scaling offset; and scaling divisor, a floating point scaling divisor. It may provide an output in the form of a Tensor3D_FP32(input.size0, input.size_1, 1). It may be defined as follows:

```
for (x = 0; x < output.size0; ++x )
  for (y = 0; y < output.size1; ++y)
    value = (input[x][y] − min_int_value) / (maxintvalue − min_in-
t_value)
    output[x][y][0] = value*scaling_divisor − scaling offset
```

A function FP Integer Scaling may be used to provide conversion between floating point and integer domains, e.g. the reverse of the function above. It may be used to implement block 2224 in FIG. 22B. It may receive as inputs the following variables: input, a Tensor3D_FP32; min_int_value, a minimum valid value of the integer domain; and max_int_value, the maximum valid value of the integer domain. It may provide an output in the form of a 2D matrix of integers of known domain. It may be defined as:

```
for (x = 0; x < output.size0; ++x )
  for (y = 0; y < output, size1; ++y)
    value = (input[x][y][0] * (max_int_value − min_int_value))
+ min_int_value
    output[x][y] = round(value)
```

Composition

This section indicates how the example neural network up-sampler may be composed from the components described above.

Kernels and biases may be defined with the assignment of flattened vertices to particularly shaped tensors.

A function Upsampler Core may be defined to implement the component shown as 2210 in FIGS. 22A to 22D. It may take an input in the form of a Tensor3D_FP32 and provide an output in the form of a Tensor3D_FP32(input.size0*2, input.size1*2, 1). It may be defined using the functions above as follows:

```
Us1cb = Convolve2D_Add_Bias(input, us_layer1_kernel, us_layer1_bias)
Us1 = Leaky _Relu(Us1cb)
Us2 = Convolve2D_Add_Bias(Us1, us_layer2_kernel, us_layer2_bias)
output = InverseDD_Flattening(Us2, input)
```

Similarly, a function may be defined to implement the complete examples 2200 and 2220 of FIGS. 22A and 22B. These examples may be implemented by a min_conv_upsampler main function. This may receive as inputs: input, a 2D matrix of integers of a known domain; in_min_int_value, a minimum valid value of the input integer domain; in_max_int_value, a maximum valid value of the input integer domain; out_min_int_value, a minimum valid value of the output integer domain; out_max_int_value, a maximum valid value of the output integer domain; scaling_offset, a floating point scaling offset; and scaling_divisor, a floating point scaling divisor. The output may comprise a 2D matrix of integers of known domain. In certain cases, the neural network up-sampler may be configured to provide input and output interfaces that match those of sub-blocks 2736 to 2742, where any additional configuration data may be read from a configuration file, from configuration signalling and/or hard-coded. The function min_conv_upsampler may be defined as:

```
Input_fp = Integer_FP_Scaling(input, in_min_int_value, in_max_int_value,
scaling_offset, scaling_divisor)
Output_fp = Upsampler_Core(Input_fp)
output = FP_Integer_Conversion(Output_fp, out_min_int_value,
out_max_int_value)
```

Example Combined Base and Enhancement Decoder

This section describes an example implementation of a combined base and enhancement decoder. This example demonstrates how base and enhancement decoders may be integrated (e.g. as compared to the previous examples that concentrate on the enhancement components). The present example may form the basis for a hypothetical reference decoder (HRD) that may be used to check bitstream and decoder conformance.

In the present example, the term bitstream is hereafter used to refer to a combined bitstream of both base and enhancement encoded data. For example, this combined bitstream may comprise multiplexed data. The NAL units that form the bitstream may be considered to be of a format described in the above "Syntax" and "Semantics" sections.

Figure 29A:
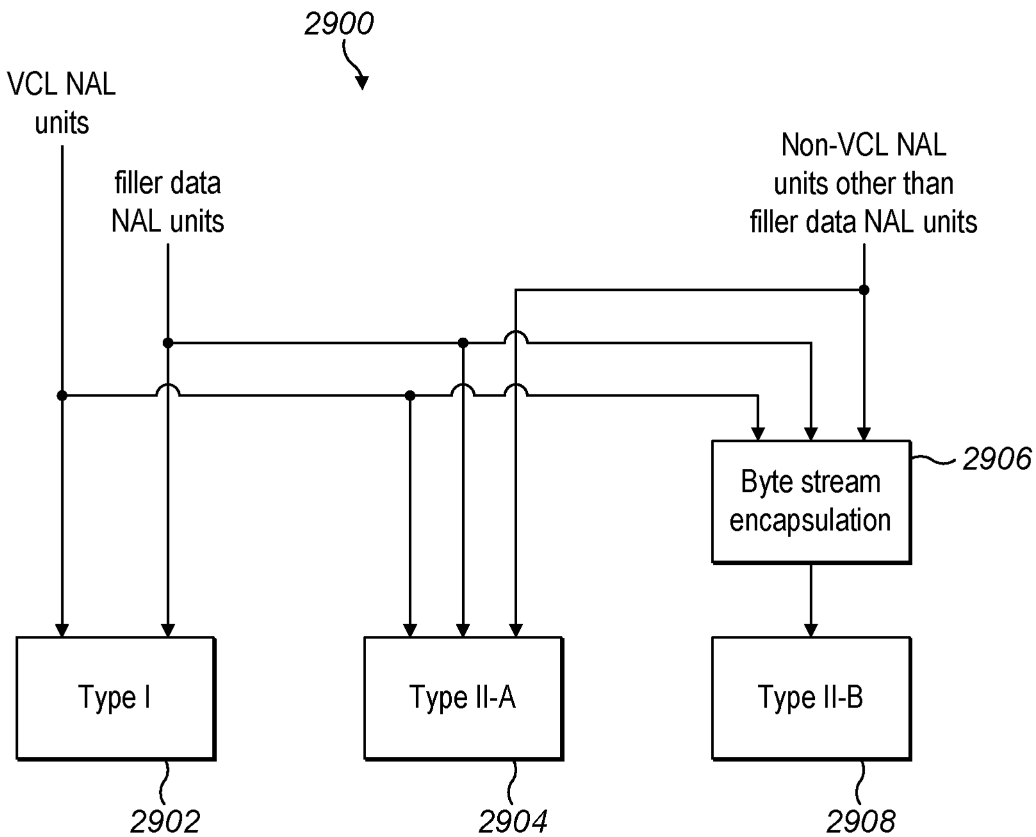
FIG. 29A shows two types of bitstreams that may be used to check conformance of decoders.

In operation, a bitstream of the present example may be assigned to one of two types. These are shown in the example 2900 of FIG. 29A. A first such combined type of bitstream, referred to in this section as a Type I bitstream 2902, comprises a NAL unit stream containing only the video coding layer (VCL) NAL units and filler data NAL units for all access units in the bitstream, for both base and enhancement; a second type of bitstream, referred to in this section as a Type II bitstream 2904 and 2906, contains, in addition to the VCL NAL units and filler data NAL units for all access units in the bitstream, at least one of the following: additional non-VCL NAL units other than filler data NAL units for either base and/or enhancement; and leading zero 8bits, zero byte, start_code_prefix_one_3bytes, and trailing_zero_8bits syntax elements that form a byte stream from the NAL unit stream. FIG. 29A also shows how NAL unit streams may provide byte stream encapsulation 2908 as described above in the section describing the NAL units.

The present combined example decoder may be defined as an enhancement of a base layer decoder, where the base layer decoder may have its own separate reference decoders. In this example, the syntax elements of non-VCL NAL units (or their default values for some of the syntax elements), e.g. as required for the base decoder, may be specified in the semantic definitions relative to the base codec. The non-VCL NAL units may be defined as Supplemental Enhancement Information (SEI) and/or Video Usability Information (VUI) (e.g. as discussed in the sections below). In certain examples, two types of decoder parameter sets may be used in the base encoding. The decoder parameter sets may be signalled at a sequence signalling level, such as global configuration parameter sets/VUI and those at Access Unit level, such as the ones in SEI.

In order to check conformance of a bitstream using a combined example decoder, global configuration parameter sets (or equivalent) and picture parameters sets referred to in the VCL NAL units, and corresponding buffering period and picture timing SEI messages (or equivalent) may be conveyed to combined decoder, in a timely manner, either in the bitstream (by non-VCL NAL units), or by other means. The "presence" of non-VCL NAL units may be satisfied when those NAL units (or just some of them) are conveyed to decoders by other means not described herein. For the purpose of counting bits, only the appropriate bits that are actually present in the bitstream may be counted. As an example, synchronization of a non-VCL NAL unit, conveyed by means other than presence in the bitstream, with the NAL units that are present in the bitstream, may be achieved by indicating two points in the bitstream, between which the non-VCL NAL unit would have been present in the bitstream, had the encoder decided to convey it in the bitstream. When the content of a non-VCL NAL unit is conveyed for the application by some means other than presence within the bitstream, the representation of the content of the non-VCL NAL unit may not be required to use the same syntax specified in this annex. When combined decoder information is contained within the bitstream, it is possible to verify the conformance of a bitstream based solely on information contained in the bitstream. When the decoder information is not present in the bitstream, as is the case for all "stand-alone" Type I bitstreams, conformance may be verified when the combined decoder data is supplied by some other means.

Figure 29B:
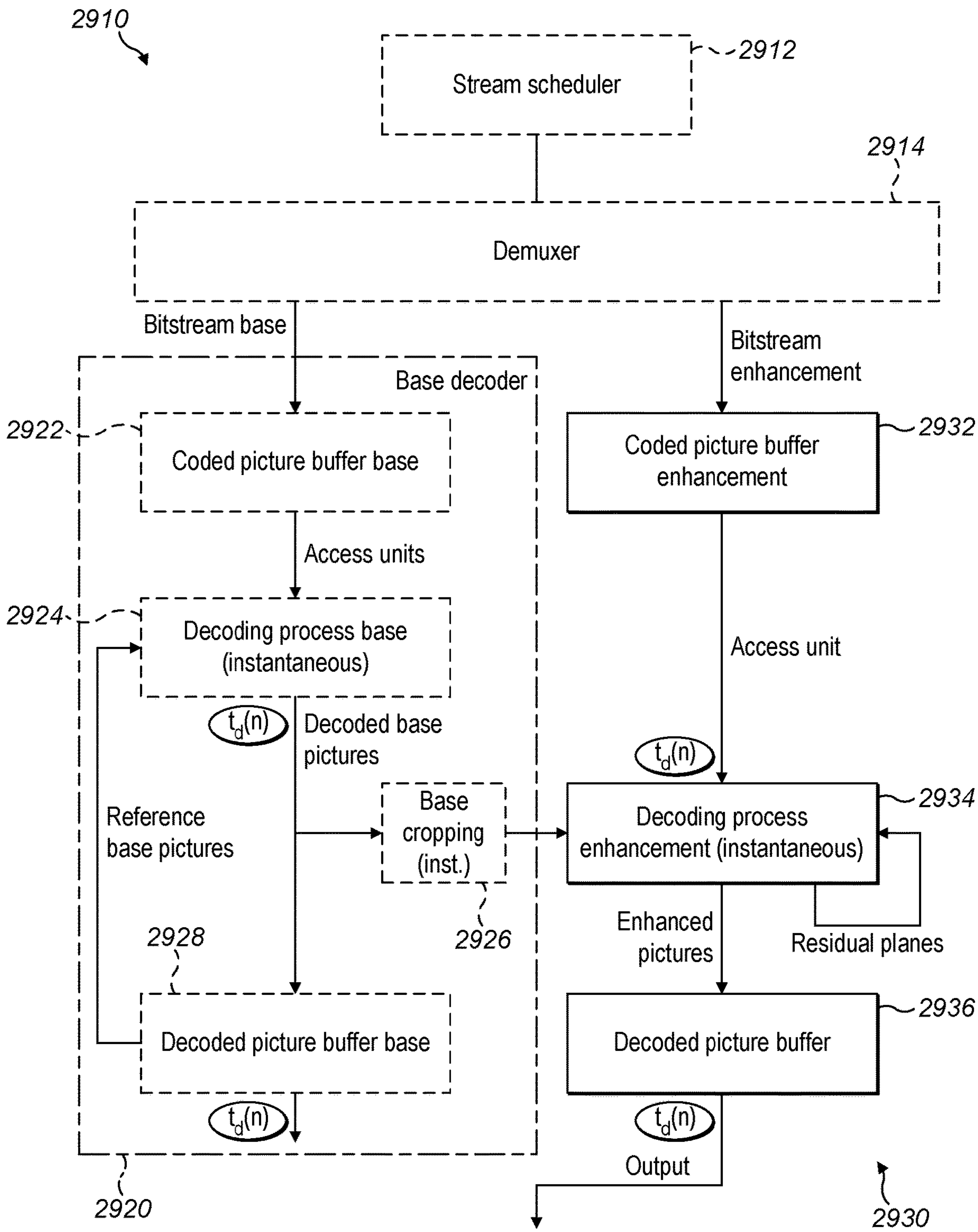
FIG. 29B shows an example combined decoder.

FIG. 29B shows an example combined decoder 2910, which may also be referred to as an enhanced base decoder (e.g. where the "enhanced" portion is the implementation of the enhancement layer described herein). In certain cases, the base decoder may comprise a hardware decoder, such as a legacy decoder, and the "enhanced" portion may comprise a software implementation of the enhancement layer (e.g. as executed by a local processor). The example combined decoder 2910 may be considered a logical combination of elements from both a base decoder and an enhancement decoder (e.g. the latter as described in other examples herein).

The example combined decoder 2910 comprises a stream scheduler 2912, a demuxer 2914, the base decoder 2920 and the enhancement decoder 2930. The base decoder 2920, in turn, comprises a base coded picture buffer 2922, a base decoding process 2924, a base cropping process 2926, and a base decoded picture buffer 2928. The enhancement decoder 2930 comprises an enhancement coded picture buffer 2932, an enhancement decoding process 2934 (which may comprise the decoding process illustrated in at least a portion of FIG. 27), and an enhancement decoded picture buffer 2936. The decoding processes 2924 and 2934 may be instantaneous decoding processes, e.g. that are implemented one picture at a time. Bitstream and decoder conformance requirements for example combined decoder 2910 may be defined with reference to the base decoder 2920, e.g. the buffering and timing of the enhancement decoder 2930 may be dependent on the operations of the base decoder 2920. Many different varieties of base codec may be used to implement the base decoder 2920.

Regardless of the particular base encoding type, the base decoder 2920 may be described as operating logically as follows. Data associated with access units that flow into the base coded picture buffer 2932, e.g. according to a specified arrival schedule, are delivered by the stream scheduler 2912 via the demuxer 2914. The stream scheduler 2912 controls the scheduling of the received bitstream and the demuxer 2914 splits the bitstream into base and enhancement portions. Both the stream scheduler 2912 and the demuxer 2914 may be instantaneous. The demuxer 2914 may be said to split the encoded data between a base bitstream and an enhancement bitstream. The data associated with each base access unit may be removed and decoded instantaneously by the instantaneous base decoding process 2924 at removal times dependent on the base coded picture buffer 2922. The instantaneous base decoding process 2924 may trigger the removal of enhancement access units from the enhancement coded picture buffer 2932. Both the base decoded pictures, after an instantaneous cropping via base cropping process 2926 if required, and the enhancement coded picture buffer 2932 access units feed the enhancement decoding process 2934. The enhancement decoding process 2934 produces, instantaneously, the enhanced decoded pictures that are placed in the enhancement decoded picture buffer 2936. The enhancement decoder picture buffer 2936 stores enhanced pictures (e.g. similar to the output of the example decoders above, and the process of FIG. 27) that may be provided as a decoded video. On the base decoder 2920 side, the base decoded picture buffer 2928 operates in the same way it would independently of the enhancement, e.g. complying with the conformance requirements of a reference base decoder. When a picture is placed in the enhancement decoded picture buffer 2936 it may be removed from the enhancement decoded picture buffer 2936 at the base decoded picture buffer 2928 output time. In such a way, the combined decoding may have the same output timing characteristics of the base decoding alone. It also means that a decoded base video may be read in parallel from the base decoded picture buffer 2928, e.g. to allow graceful back-off from the enhanced output to the base output if there are streaming issues such as network traffic or processing resource constraints.

The example combined decoder 2910 may be initialised as specified by the base decoder 2920 parameters, such as the buffering period for SEI messages. The removal timing of access units from the base coded picture buffer 2922 and output timing from the base decoded picture buffer 2928, which may also be output timing from enhancement decoded picture buffer 2936, may be specified in the picture timing or equivalent specification. All timing information relating to a specific access unit may be configured to arrive prior to the base coded picture buffer 2922 removal time of the access unit. While it is generally assumed that all frame-rates and clocks used to generate the bitstream match the values signalled in the bitstream, in a real system each of these may vary in practice from the signalled or specified value.

Further Detail on Example Combined Decoder

In these examples, it is assumed that arithmetic is performed with real values, so that no rounding errors can propagate. For example, the number of bits in the base coded picture buffer 2922 just prior to or after removal of an access unit may not necessarily be an integer. In these examples, the variable tc referred to as a clock tick and may be defined as: tc=num_units_in_tick/time_scale. Reference is made to an access unit n as the n-th access unit in decoding order with the first access unit being access unit 0. Likewise, picture n is said to be the coded picture or the decoded picture of access unit n. These example details may apply to both Type I and Type II bitstreams as described above.

The timing of bitstream arrival in the base coded picture buffer 2922 may be determined by the base decoder 2920 timing of bitstream arrival. The timing of bitstream arrival for the enhancement coded picture buffer 2932 may be constrained so that: $t_{baf}(n)<t_{laf}(n)$ for every n, where $t_{baf}(n)$ is the final arrival time of access unit n in the enhancement bitstream and $t_{laf}(n)$ is the final arrival time of access unit n in the base bitstream. This means that the enhancement data cannot arrive later than the base data referring to the same picture.

The timing of coded picture removal from base coded picture buffer 2922, indicated as $t_{br}(n)$, may be determined by the base decoder 2920 timing of coded picture removal. The timing of coded picture removal from enhancement coded picture buffer 2932, indicated as $t_{lr}(n)$, may be the time the base access unit n has been decoded in the base decoder 2920. However, since the decoding is instantaneous in the base decoder 2920, the two times may coincide, i.e. $t_{lr}(n)=t_{br}(n)$. In practical terms, the decoded picture from the base decoder 2920 may be used to trigger the removal from enhancement coded picture buffer 2932 and thus the decoding of the enhanced picture.

The enhancement decoded picture buffer 2936 contains picture storage buffers waiting to be output at the presentation time. The enhancement decoded picture buffer 2936 may be taken as the primary (e.g. only) decoded picture buffer for the example combined decoder 2910, i.e. the enhanced picture may be considered the primary (e.g. only) output of the example combined decoder 2910. The operation of the base decoded picture buffer 2928, e.g. holding reference base pictures, may be determined by a known specification for the base decoder (e.g. based on a video coding standard that is associated with the base decoder 2920). The removal of pictures from the enhancement decoded picture buffer 2936 may be based on the output time, e.g. the presentation time as specified for the base decoder 2920. Picture n may be output from the enhancement decoded picture buffer 2936 at an output time $t_o(n)$ determined by the base decoder 2920. This is typically based on a "decoded picture buffer output delay". The details of this delay or equivalent signalling may be defined by the specification for the base decoder (which is not the focus of the present document).

Example bitstreams for the example combined decoder 2910 may comply with the syntax, semantics, and constraints specified above. A coded picture buffer overflow may be specified as a condition in which the total number of bits in a coded picture buffer is larger than the coded picture buffer size. A coded picture buffer underflow may be specified as the condition in which a removal time is lower than a final arrival time for an access unit. The base and enhancement coded picture buffers 2922, 2932 may be configured to avoid one or more of coded picture buffer overflow and underflow. Immediately after any decoded picture is added to the enhancement decoded picture buffer 2936, the fullness of the enhancement decoded picture buffer 2936 may be constrained to be less than or equal to the enhancement decoded picture buffer 2936 size.

All reference pictures may be available at times in the (internal) base decoded picture buffer 2928 when needed for base decoding prediction. Each picture shall be present in the enhancement decoded picture buffer 2936 at its enhancement decoded picture buffer 2936 output time unless it is not stored in the enhancement decoded picture buffer 2936 at all, or is removed from the enhancement decoded picture buffer 2936 according to the example combined decoder 2910 specification. The difference between the output time of a picture and that of the picture immediately following it in output order, may be configured to satisfy a constraint of the example combined decoder 2910 for the operating point, such as profile and level, which may be signalled in the bitstream.

In certain cases, an example combined decoder may be able to decode successfully conforming bitstreams, provided that all base decoder related parameters sets referred to in the VCL NAL units, and appropriate buffering period and picture timing metadata are conveyed to the decoder, in a timely manner, either in the bitstream (by non-VCL NAL units), or by external means.

An example combined decoder may be configured to meet defined output timing and output order requirements. To check conformance of a combined decoder implementation, test bitstreams may be delivered by a stream scheduler 2912 both to the base decoder and to the enhancement decoder. In certain cases, if the base decoder is configured according to a known specification, the enhancement decoder may be tested.

Supplemental Enhancement Information

This section provides a general description of example syntax and semantics for Supplemental Enhancement Information (SEI) message payloads. In the examples described herein, SEI messages may be used to convey information relating to colour and light levels, e.g. for a reconstructed video to be displayed.

SEI messages may be used to assist in processes related to decoding, display or other purposes. However, SEI messages may not be required for constructing the luma or chroma samples by the decoding process. The use of SEI messages may thus be seen as an optional variation to allow for increased functionality. SEI message information may also be used to check bitstream processing and output timing. SEI messages may be conveyed to decoders (including the example combined decoder above) by other means not described herein. When present in the bitstream, SEI messages may obey the syntax and semantics set out in the section titled "Process Payload—Global Configuration" above and/or set out in this section below. When the content of an SEI message is conveyed by some means other than presence within the example bitstreams described herein, the representation of the content of the SEI message need not use the syntax specified in this section. For the purpose of counting bits, only the appropriate bits that are actually present in the bitstream may be counted.

SEI Payload Syntax

An example general SEI message syntax is specified in the table below. The syntax is described according to the same conventions described for the syntax presented in the sections above.

| Syntax | D |
|---|---|
| sei_payload(payloadType, payloadSize) { | |
| if (payloadType == 1) | |
| mastering_display_colour_volume(payloadSize) | |
| else if (payloadType == 2) | |
| content_light_level_info(payloadSize) | |
| else | |
| reserved_sei_message(payloadSize) | |
| if (more_data_in_payload( )) { | |
| if (payload_extension_present( )) | |
| reserved_payload_extension_data | u(v) |
| payload_bit_equal_to_one /* equal to 1 */ | f(1) |
| while (!byte_aligned( )) | |
| payload_bit_equal_to_zero /* equal to 0 */ | f(1) |
| } | |
| } | |

As shown above, the SEI message may carry information for a mastering display colour volume. The mastering display colour volume SEI message syntax may be as set out in the table below:

| Syntax | D |
|---|---|
| mastering_display_colour_volume(payloadSize) { | |
| for(c = 0; c < 3; c++) { | |
| display_primaries_x[c] | u(16) |
| display_primaries_y[c] | u(16) |
| } | |
| white_point_x | u(16) |
| white_point_y | u(16) |
| max_display_mastering_luminance | u(32) |
| min_display_mastering_luminance | u(32) |
| } | |

The SEI message may also carry information relation to a content light level. An example syntax for content light level information is specified in the table below:

| Syntax | D |
|---|---|
| content_light_level_info(payloadSize) { | |
| max_content_light_level | u(16) |
| max_pic_average_light_level | u(16) |
| } | |

The SEI message syntax may also have portions associated with reserved information. An example of a reserved SEI message syntax is set out below.

| Syntax | D |
|---|---|
| reserved_sei_message(payloadSize) { | |
| for(i = 0; i < payloadSize; i++) | |
| reserved_sei_message_payload_byte | b(8) |
| } | |

SEI Payload Semantics

This section sets out some general SEI payload semantics, following the conventions of the "Semantics" section set out earlier above. These "semantics" may be considered information relating to the meaning and function of certain variables mentioned in the syntax above. As before, it should be noted that variable names and specifics of meaning and function are non-limiting and are provided as examples of more general functionality.

In certain implementations that use SEI messages the reserved_payload_extension_data may not be present in the bitstream. Example decoders may be configured to ignore the presence and value of this variable. When present, the length, in bits, of reserved_payload_extension_data may be equal to 8*payloadSize−nEarlierBits−nPayloadZeroBits−1, where nEarlierBits is the number of bits in the sei_payload( ) syntax structure that precedes the reserved_payload_extension_data syntax element and nPayloadZeroBits is the number of payload_bit_equal_to_zero syntax elements at the end of the sei_payload( ) syntax structure.

In certain examples, the payload_bit_equal_to_one may be equal to 1 and the payload_bit_equal_to_zero may be equal to 0.

The semantics and persistence scope for each SEI message may be specified in the semantics specification for each particular SEI message. For mastering display colour volume and content light level information SEI messages, the persistence scope may be the coded video sequence (CVS) containing the SEI message.

Mastering Display Colour Volume SEI Message

The mastering display colour volume SEI message may be used to identify the colour volume or gamut (e.g., the colour primaries, white point, and luminance range) of a display considered to be the mastering display for the associated video content—e.g., a colour volume of a display that was used for viewing while authoring the video content. The described mastering display may be a three-colour additive display system that has been configured to use the indicated mastering colour volume. The mastering display colour volume SEI message may not identify the measurement methodologies and procedures used for determining the indicated values or provide any description of the mastering environment. It also may not provide information on colour transformations that would be appropriate to preserve creative intent on displays with colour volumes different from that of the described mastering display. The information conveyed in this SEI message may be adequate for purposes corresponding to the use of Society of Motion Picture and Television Engineers Standard SMPTE ST 2086 (2018), the contents of which are incorporated by reference herein.

When a mastering display colour volume SEI message is present for any picture of a coded video sequence of a particular layer, a mastering display colour volume SEI message may be present for the first picture of the coded video sequence. The mastering display colour volume SEI message may persist for the current layer in decoding order from the current picture until the end of the coded video sequence. All mastering display colour volume SEI messages that apply to the same coded video sequence may have the same content.

The variable display_primaries_x[c], when in the range of 5 to 37 000, inclusive, may be used to specify the normalized x chromaticity coordinate of the colour primary component c of the mastering display, according to the International Commission on Illumination (CIE) 1931 definition of x as specified in ISO 11664-1 (see also ISO 11664-3 and CIE 15), in increments of 0.00002. When display_primaries_x[c] is not in the range of 5 to 37 000, inclusive, the normalized x chromaticity coordinate of the colour primary component c of the mastering display may be unknown, unspecified or specified by other means.

Similarly, the variable display_primaries_y[c], when in the range of 5 to 42 000, inclusive, may be used to specify the normalized y chromaticity coordinate of the colour primary component c of the mastering display, according to the CIE 1931 definition of y as specified in ISO 11664-1 (see also ISO 11664-3 and CIE 15), in increments of 0.00002. When display_primaries_y[c] is not in the range of 5 to 42 000, inclusive, the normalized y chromaticity coordinate of the colour primary component c of the mastering display may be unknown, unspecified or specified by other means.

For describing mastering displays that use red, green, and blue colour primaries, it is suggested that index value c equal to 0 should correspond to the green primary, c equal to 1 should correspond to the blue primary and c equal to 2 should correspond to the red colour primary.

The variable white_point_x, when in the range of 5 to 37 000, inclusive, may be used to specify the normalized x chromaticity coordinate of the white point of the mastering display, according to the CIE 1931 definition of x as specified in ISO 11664-1 (see also ISO 11664-3 and CIE 15), in normalized increments of 0.00002. When white_point_x is not in the range of 5 to 37 000, inclusive, the normalized x chromaticity coordinate of the white point of the mastering display may be indicated as unknown, unspecified or specified by other means.

The variable white_point_y, when in the range of 5 to 42 000, inclusive, may be used to specify the normalized y chromaticity coordinate of the white point of the mastering display, according to the CIE 1931 definition of y as specified in ISO 11664-1 (see also ISO 11664-3 and CIE 15), in normalized increments of 0.00002. When white_point_y is not in the range of 5 to 42 000, inclusive, the normalized y chromaticity coordinate of the white point of the mastering display may be indicated as unknown, unspecified or specified by other means.

SMPTE ST 2086 (2018) specifies that the normalized x and y chromaticity coordinate values for the mastering display colour primaries and white point are to be represented with four decimal places. This is compatible with values of the syntax elements display_primaries_x[c], display_primaries_y[c], white_point_x, and white_point_y, that are multiples of 5. An example of the use of values outside the ranges discussed herein is the standard ANSI/

CTA 861-G (2016), which uses normalized (x,y) chromaticity coordinate values of (0,0) for the white point to indicate that the white point chromaticity is unknown.

The variable max_display_mastering_luminance, when in the range of 50 000 to 100 000 000, may specify the nominal maximum display luminance of the mastering display in units of 0.0001 candelas per square metre. When max_display_mastering_luminance is not in the range of 50 000 to 100 000 000, the nominal maximum display luminance of the mastering display may be indicated to be unknown, unspecified or specified by other means. SMPTE ST 2086 (2018) specifies that the nominal maximum display luminance of the mastering display is to be specified as a multiple of 1 candela per square meter. This is compatible with values of the syntax element max_display_mastering_luminance, that are multiples of 10 000. Again, an example of the use of values outside the ranges discussed herein are those specified in ANSI/CTA 861-G (2016), which uses the value 0 for the nominal maximum display luminance of the mastering display to indicate that the nominal maximum display luminance of the mastering display is unknown.

The variable min_display_mastering_luminance, when in the range of 1 to 50 000, may be used to specify the nominal minimum display luminance of the mastering display in units of 0.0001 candelas per square metre. When min_display_mastering_luminance is not in the range of 1 to 50 000, the nominal maximum display luminance of the mastering display may be indicated as unknown, unspecified or specified by other means. When max_display_mastering_luminance is equal to 50 000, min display mastering luminance may be constrained to not be equal to 50 000. SMPTE ST 2086 (2018) specifies that the nominal minimum display luminance of the mastering display is to be specified as a multiple of 0.0001 candelas per square metre, which is compatible with the ranges described here. One example of the use of values outside the ranges discussed herein are those described in ANSI/CTA 861-G (2016), which uses the value 0 for the nominal minimum display luminance of the mastering display to indicate that the nominal minimum display luminance of the mastering display is unknown. Another example of the potential use of values outside the range for which semantics are specified here is SMPTE ST 2086 (2018), which indicates that values outside the specified range could be used to indicate that the black level and contrast of the mastering display have been adjusted using picture line-up generation equipment (PLUGE). At the minimum luminance, the mastering display may be considered to have the same nominal chromaticity as the white point.

Content Light Level Information SEI Message Semantics

The content light level information SEI message may be used to identify upper bounds for the nominal target brightness light level of the pictures of the coded video sequence. The information conveyed in this SEI message may be used to configure an output video for display devices.

The semantics of the content light level information SEI message may be defined in relation to the values of samples in a 4:4:4 representation of red, green, and blue colour primary intensities in the linear light domain for the pictures of the coded video sequence, in units of candelas per square metre. However, this SEI message may not, by itself, identify a conversion process for converting the sample values of a decoded picture to the samples in a 4:4:4 representation of red, green, and blue colour primary intensities in the linear light domain for the picture. Other syntax elements, such as colour_primaries, transfer_characteristics, matrix_coeffs, and the chroma resampling filter hint SEI message, when present, may assist in the identification of such a conversion process.

Given the red, green, and blue colour primary intensities in the linear light domain for the location of a luma sample in a corresponding 4:4:4 representation, denoted as ER, EG, and EB, the maximum component intensity may be defined as EMax=Max(ER, Max(EG, EB)). The light level corresponding to the stimulus may then be defined as the CIE 1931 luminance corresponding to equal amplitudes of EMax for all three colour primary intensities for red, green, and blue (with appropriate scaling to reflect the nominal luminance level associated with peak white—e.g., ordinarily scaling to associate peak white with 10 000 candelas per square metre when transfer_characteristics is equal to 16). Since the maximum value EMax is used in this definition at each sample location, rather than a direct conversion from ER, EG, and EB to the corresponding CIE 1931 luminance, the CIE 1931 luminance at a location may in some cases be less than the indicated light level. This situation would occur, for example, when ER and EG are very small and EB is large, in which case the indicated light level would be much larger than the true CIE 1931 luminance associated with the (ER, EG, EB) triplet. All content light level information SEI messages that apply to the same coded video sequence may have the same content.

The variable varimax_content_light_level, when not equal to 0, may be used to indicate an upper bound on the maximum light level among all individual samples in a 4:4:4 representation of red, green, and blue colour primary intensities (in the linear light domain) for the pictures of the coded video sequence, in units of candelas per square metre. When equal to 0, no such upper bound may be indicated by max content light level.

The variable max_pic_average_light_level, when not equal to 0, may be used to indicate an upper bound on the maximum average light level among the samples in a 4:4:4 representation of red, green, and blue colour primary intensities (in the linear light domain) for any individual picture of the CLVS, in units of candelas per square metre. When equal to 0, no such upper bound may be indicated by max_pic_average_light_level. When the visually relevant region does not correspond to the entire cropped decoded picture, such as for "letterbox" encoding of video content with a wide picture aspect ratio within a taller cropped decoded picture, the indicated average may be performed only within the visually relevant region.

Reserved SEI Message Semantics

The reserved SEI message consists of data reserved for future backward-compatible use. Decoders may be configured to ignore reserved SEI messages, e.g., until decoders with functionality that may use the information contained in the reserved SEI messages are provided.

Video Usability Information

The present section provides a brief description of example syntax and semantics for a set of Video Usability Information (VUI) parameters. These parameters may be provided in optional variations of the described examples. For example, VUI parameters may not be required for constructing the luma or chroma samples by the decoding processes described herein and example decoders may not be required to process the VUI parameters to operate. Some VUI parameters may be used to check the bitstream and output timing. VUI parameters may be conveyed to decoders (including combined decoders) by other means not described in this document. When present in the bitstream, VUI parameters may follow the syntax and semantics described below. When the content of VUI parameters is conveyed for the application by some means other than presence within the bitstream, the representation of the content of the VUI parameters may use different syntax. For the purpose of counting bits, only the appropriate bits that are actually present in the bitstream may be counted.

VUI Parameters Syntax

An example syntax for the VUI parameters is set out in the table below. The conventions of the above examples are used.

| Syntax | D |
|---|---|
| vui_parameters (payload_size) { | |
| aspect_ratio_info_present_flag | u(l) |
| if (aspect_ratio_info_present_flag) { | |
| aspect_ratio_idc | u(8) |
| if (aspect_ratio_idc == Extended_SAR) { | |
| sar_width | u(16) |
| sar_height | u(16) |
| } | |
| } | |
| overscan_info_present_flag | u(1) |
| if (overscan_info_present_flag) | |
| overscan_appropriate_flag | u(1) |
| video_signal_type_present_flag | u(1) |
| if (video_signal_type_present_flag) { | |
| video_format | u(3) |
| video_full_range_flag | u(1) |
| colour description_present_flag | u(1) |
| if (colour_description_present_flag) { | |
| colour_primaries | u(8) |
| transfer_characteristics | u(8) |
| matrix_coefficients | u(8) |
| } | |
| } | |
| chroma_loc_info_present_flag | u(1) |
| if (chroma_loc_info_present_flag) { | |
| chroma_sample_loc_type_top_field | ue(v) |
| chroma_sample_loc_type_bottom_field | ue(v) |
| } | |
| timing_info_present_flag | u(1) |
| if (timing_info_present_flag) { | |
| num_units_in_tick | u(32) |
| time_scale | u(32) |
| fixed_pic_rate_flag | u(1) |
| } | |
| pic_struct_present_flag | u(1) |
| bitstream_restriction_flag | u(1) |
| if (bitstream_restriction_flag) { | |
| motion_vectors_over_pic_boundaries_flag | u(1) |
| max_bytes_per_pic_denom | ue(v) |
| max_bits_per_mb_denom | ue(v) |
| log2_max_mv_length_horizontal | ue(v) |
| log2_max_mv_length_vertical | ue(v) |
| num_reorder_pics | ue(v) |
| max_dec_pic_buffering | ue(v) |
| } | |
| } | |

VUI Parameters Semantics

A short description of some example VUI parameter semantics will now be presented.

The variable aspect_ratio_info_present_flag, if equal to 1, may be used to specify that aspect_ratio_idc is present. If aspect_ratio_info_present_flag is equal to 0 this may indicate that aspect_ratio_idc is not present.

The variables aspect_ratio_idc, sar_width and sar_height shall have the meaning of SampleAspectRatio, SarWidth and SarHeight, respectively, as specified in Section 8.6 of ITU-T H.273|ISO/IEC 23091-2, which is incorporated herein be reference.

The variable overscan_info_present_flag, if equal to 1, may be used to indicate that the overscan_appropriate_flag is present. When overscan_info_present_flag is equal to 0 or is not present, the preferred display method for the video signal may be considered unspecified.

The variable, overscan_appropriate_flag, if equal to 1, may be used to indicate that the cropped decoded pictures output are suitable for display using overscan. If overscan_appropriate_flag equal to 0, this may indicate that the cropped decoded pictures output contain visually important information in the entire region out to the edges of the cropping rectangle of the picture, such that the cropped decoded pictures output should not be displayed using overscan. Instead, they should be displayed using either an exact match between the display area and the cropping rectangle, or using underscan. For example, a value of 1 for the variable overscan_appropriate_flag might be used for entertainment television programming, or for a live view of people in a videoconference, and a value of 0 for the overscan_appropriate_flag might be used for computer screen capture or security camera content.

The variable video_signal_type_present_flag, if equal to 1, may be used to specify that video_format, video_full_range_flag and colour_description_present_flag variables are present. If video_signal_type_present_flag is equal to 0, this may specify that video_format, video_full_range_flag and colour_description_present_flag variables are not present.

The variable video_format may be used to indicate an original video format of pictures, e.g. before being coded in accordance with the examples described herein. Example video formats are set out in the table below. In certain cases, if video_format is not present, the video_format value may be inferred to be equal to 5.

| video_format | Meaning |
|---|---|
| 0 | Component |
| 1 | PAL |
| 2 | NTSC |
| 3 | SECAM |
| 4 | MAC |
| 5 | Unspecified video format |
| 6 | Reserved |
| 7 | Reserved |

The variable video_full_range_flag may be used to indicate the black level and range of the luma and chroma signals as derived from E'Y, E'PB, and E'PR or E'R, E'G, and E'B analogue component signals. When the video_full_range_flag syntax element is not present, the value of video_full_range_flag may be inferred to be equal to 0.

The variable colour_description_present_flag, if equal to 1, may specify that colour_primaries, transfer_characteristics and matrix coefficients variables are present. If colour_description_present_flag equal to 0, the variables colour_primaries, transfer_characteristics and matrix_coefficients may be assumed not to be present.

The variable colour_primaries may have the meaning of ColourPrimaries as specified in specified in Section 8.1 of ITU-T H.273|ISO/IEC 23091-2. The variable transfer_characteristics may have the meaning of TransferCharacteristics as specified in Section 8.2 of ITU-T H.273|ISO/IEC 23091-2. The variable matrix_coefficients may have the meaning of MatrixCoefficients as specified in as specified in Section 8.3 of ITU-T H.273|ISO/IEC 23091-2.

The variable chroma_loc_info_present_flag, if equal to 1, may specify that variables chroma_sample_loc_type_top_field and chroma_sample_loc_type_bottom_field are present. If chroma_loc_info_present_flag is equal to 0, this may specify that the variables chroma_sample_loc_type_top_field and chroma_sample_loc_type_bottom_field are not present. The variables chroma_sample_loc_type_top_field and chroma_sample_loc_type_bottom_field specify the location of chroma samples for the top field and the bottom field as shown in FIG. 30. The value of chroma_sample_loc_type_top_field and chroma_sample_loc_type_bottom_field may be in the range of 0 to 5, inclusive. When the chroma_sample_loc_type_top_field and chroma_sample_loc_type_bottom_field are not present, the values of chroma_sample_loc_type_top_field and chroma_sample_loc_type_bottom_field may be inferred to be equal to 0. When coding progressive source material, chroma_sample_loc_type_top_field and chroma_sample_loc_type_bottom_field may have the same value. The location of chroma samples for top and bottom fields as a function of chroma_sample_loc_type_top_field and chroma_sample_loc_type_bottom_field are shown in FIG. 30.

The variable timing_info_present_flag, if equal to 1, may specify that the variables num_units_in_tick, time_scale and fixed_pic_rate_flag are present in the bitstream. If timing_info_present_flag is equal to 0, this may specify that num_units_in_tick, time scale and fixed_pic_rate_flag are not present in the bitstream.

The variable num_units_in_tick may indicate the number of time units of a clock operating at the frequency time_scale Hz that corresponds to one increment (called a clock tick) of a clock tick counter. The variable num_units_in_tick is greater than 0. A clock tick is the minimum interval of time that can be represented in the coded data. For example, when the clock frequency of a video signal is 60 000÷1001 Hz, time scale may be equal to 60 000 and num_units_in_tick may be equal to 1001 (as indicated by the example in the combined decoder section). The variable time_scale may be used to indicate the number of time units that pass in one second. For example, a time coordinate system that measures time using a 27 MHz clock has a time_scale of 27 000 000. Again, time_scale may be constrained to be greater than 0.

The variable fixed_pic_rate_flag, if equal to 1, may be used to indicate that the temporal distance between the decoder output times of any two consecutive pictures in output order is constrained as set out below (including for the example combined decoder described above). If fixed_pic_rate_flag is equal to 0 this may indicate that no such constraints apply to the temporal distance between the decoder output times of any two consecutive pictures in output order. When looking at the temporal distance between pictures, for each picture n where n indicates the n-th picture (in output order) that is output and picture n is not the last picture in the bitstream (in output order) that is output, the value of $\Delta t_{fi,dpb}(n)$ may be specified by $\Delta t_{fi,dpb}(n)=\Delta t_{o,dpb}(n)\div\mathrm{DeltaTfiDivisor}$. When fixed_pic_rate_flag is equal to 1 for a coded video sequence containing picture n, the value computed for $\Delta t_{fi,dpb}(n)$ may be equal to tc as specified in the section on the example combined decoder above (using the value of tc for the coded video sequence containing picture n) when either or both of the following conditions are true for the following picture $n_n$: 1) a first case, where picture $n_n$ is in the same coded video sequence as picture n; and 2) a second case, where picture $n_n$ is in a different coded video sequence and fixed_pic_rate_flag is equal to 1 in the coded video sequence containing picture $n_n$ and the value of num_units_in_tick÷time_scale is the same for both coded video sequences.

The variable bitstream_restriction_flag, if equal to 1, may be used to specify that a set of coded video sequence bitstream restriction parameters are present. Examples of coded video sequence bitstream restriction parameters are set out below. If bitstream_restriction_flag is equal to 0, this may specify that the same set of coded video sequence bitstream restriction parameters are not present.

One example coded video sequence bitstream restriction parameter is max_bytes_per_pic_denom. This may indicate a number of bytes that should not be exceeded by the sum of the sizes of the VCL NAL units associated with any coded picture in the coded video sequence. The number of bytes that represent a picture in the NAL unit stream may be specified for this purpose as the total number of bytes of VCL NAL unit data (i.e., the total of the NumBytesInNALunit variables for the VCL NAL units) for the picture. The value of max_bytes_per_pic_denom may be in the range of 0 to 16, inclusive. A number of restrictions may be dependent on max_bytes_per_pic_denom. If max_bytes_per_pic_denom is equal to 0, no limits may be indicated. Otherwise (i.e. when max_bytes_per_pic_denom is not equal to 0), no coded picture shall be represented in the coded video sequence by more than the following number of bytes: (PicSizeInMbs*RawMbBits)÷(8*max_bytes_per_pic_denom). In certain examples, when the max_bytes_per_pic_denom syntax element is not present, the value of max_bytes_per_pic_denom my be inferred to be equal to 2.

Another example of a coded video sequence bitstream restriction parameter is max_bits_per_mb_denom. This may be used to indicate the maximum number of coded bits of macroblock_layer( ) data for any macroblock in any picture of the coded video sequence. The value of max_bits_per_mb_denom may be in the range of 0 to 16, inclusive. A number of restrictions may be dependent on max_bytes_per_ mb_denom. If max_bits_per_mb_denom is equal to 0, no limit may be specified. Otherwise (i.e. if max_bits_per_mb_denom is not equal to 0), no coded macroblock_layer ( ) may be represented in the bitstream by more than the following number of bits: (128+RawMbBits)÷max_bits_per_mb_denom. Depending on the entropy_coding_mode_flag, the bits of macroblock_layer( ) data may be counted as follows: if entropy_coding_mode_flag is equal to 0, the number of bits of macroblock_layer( ) data may be given by the number of bits in the macroblock_layer( ) syntax structure for a macroblock; otherwise (i.e. when entropy_coding_mode_flag is equal to 1), the number of bits of macroblock_layer( ) data for a macroblock may be given by the number of times read_bits(1) is called (e.g. as defined in the above entropy coding examples) when parsing the macroblock_layer( ) associated with the macroblock. When the max_bits_per_mb_denom is not present, it may be inferred to be equal to 1.

The example coded video sequence bitstream restriction parameters log 2_max_mv_length_horizontal and log 2_max_mv_length vertical may be used, respectively, to indicate the maximum absolute value of a decoded horizontal and vertical motion vector component, in ¼ luma sample units, for all pictures in the coded video sequence. A value of n may assert that no value of a motion vector component is to exceed the range from $-2^n$ to $2^n-1$, inclusive, in units of ¼ luma sample displacement. The value of log 2_max_mv_length horizontal may be in the range of 0 to 16, inclusive. The value of log 2_max_mv_length vertical may be in the range of 0 to 16, inclusive. When log 2_max_mv_length horizontal is not present, the values of log 2_max_mv_length horizontal and log 2_max_mv_length vertical may be inferred to be equal to 16. In certain example, the maximum absolute value of a decoded vertical or horizontal motion vector component may also be constrained by profile and level limits as described in examples above.

The variable num_reorder_pics may be used to indicate the maximum number of frames, complementary field pairs, or non-paired fields that precede any frame, complementary field pair, or non-paired field in the coded video sequence in decoding order and follow it in output order. The value of num_reorder_pics may be in the range of 0 to max_dec_pic_buffering, inclusive. When the num_reorder_pics syntax element is not present, the value of num_reorder_pics value may be inferred to be equal to max_dec_pic_buffering. The variable max_dec_pic_buffering may be used to specify that the required size of the decoded picture buffer (e.g. 2936 in FIG. 29B) in units of picture storage buffers. The coded video sequence may not require a decoded picture buffer with size of more than Max(1, max_dec_pic_buffering) picture storage buffers to enable the output of decoded pictures at the output times specified by dpb_output_delay of the picture timing SEI messages. The value of max_dec_pic_buffering may be in the range of num_ref_pics to MaxDpbSize (as specified in a profile and/or level as described above), inclusive. When the max_dec_pic_buffering syntax element is not present, the value of max_dec_pic_buffering may be inferred to be equal to MaxDpbSize.

Example Statements

The following statements describe preferred or exemplary aspects of the inventions described and illustrated herein.

A method of encoding an input video into a plurality of encoded streams, such that the encoded streams may be combined to reconstruct the input video, may comprise: receiving a full resolution input video; down-sampling the full resolution input video to create a down-sampled video; instructing the encoding of the down-sampled video using a first codec to create a base encoded stream; reconstructing a video from the encoded video to generate a reconstructed video; comparing the reconstructed video to the input video; and, creating one or more further encoded streams based on the comparison.

The input video compared to the reconstructed video may be the down-sampled video. According to an example method, comparing the reconstructed video to the input video comprises: comparing the reconstructed video to the down-sampled video to create a first set of residuals and wherein creating the one or more further encoded streams comprises encoding the first set of residuals to create a first level encoded stream. The input video compared to the reconstructed video may be the full resolution input video and the reconstructed video may be up-sampled. Up-sampling may comprise applying a neural network up-sampler. The neural network up-sampler may be applied as described in any of the examples herein. The neural network up-sampler may comprise a two-layer convolutional neural network. The up-sampler may comprise a non-linearity between the two convolutional neural network layers. The convolutional neural network may be trained to predict the full resolution input video given corresponding reconstructed video. The neural network up-sampler may be parameterised by a set of parameters representing kernel weights and a set of biases.

According to an example method, comparing the reconstructed video to the input video may comprise: up-sampling the reconstructed video to generate an up-sampled reconstructed video; and, comparing the up-sampled reconstructed video to the full resolution input video to create a second set of residuals and wherein creating the one or more further encoded streams comprises encoding the second difference to create a second level encoded stream.

In an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

According to an example method, the step of encoding the first set of residuals may comprise: applying a transform to the set of residuals to create a set of coefficients; applying a quantization operation to the coefficients to create a set of quantized coefficients; and, applying an encoding operation to the quantized coefficients. The transform may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadamard transform. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded. The selection may be based on an analysis of the data to be transformed.

The quantization may for example be a linear quantization. The linear quantizer may use a dead zone of variable size. The encoding operation may for example be an entropy encoder and may include run-length encoding and/or Huffman/Prefix encoding.

According to an example method, the step of encoding the second set of residuals may comprise: applying a transform to the second set of residuals to create a set of coefficients; applying a quantization operation to the coefficients to create a set of quantized coefficients; and, applying an encoding operation to the quantized coefficients. Again, the transform may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadamard transform. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded. The selection may be based on an analysis of the data to be transformed.

The first set of residuals and second set of residuals may have different transforms applied to them and the selection may be predetermined or selected during the process. The transform used may be signalled in a header. Again, the quantization may for example be a linear quantization. The linear quantizer may use a dead zone of variable size. The encoding operation may for example be an entropy encoder and may include run-length encoding and/or Huffman/Prefix encoding.

Residuals may be a difference between two videos or frames.

The step of encoding the first set of residuals may comprise: ranking the first set of residuals based on a pre-analysis of the first set of residuals; and, selecting a subset of residuals to be transformed and encoded. This may be seen as a form of residual filtering and other general filtering approaches may be applied to select a subset of residuals for further processing. In an example, the method comprises analysing the first set of residuals and, based on the analysis, either performing the following steps or not: ranking the first set of residuals; and, selecting a subset of residuals to be transformed and encoded. In an example, the method comprises analysing the first set of residuals and: ranking the first set of residuals; and, selecting a subset of residuals to be transformed and encoded, such that the steps of ranking and/or selecting are performed differentially based on the analysis. According to an example method, the step of applying a transform is performed on the selected subset of residuals.

The step of encoding the second set of residuals may also comprise: ranking the second set of residuals based on a pre-analysis of the second set of residuals; and, selecting a subset of residuals to be transformed and encoded. This, again, may be seen as a form of residual filtering and other general filtering approaches may be applied to select a subset of residuals for further processing. In an example, the method comprises analysing the second set of residuals and, based on the analysis, either performing the following steps or not: ranking the second set of residuals; and/or, selecting a subset of residuals to be transformed and encoded. In an example, the method comprises analysing the second set of residuals and: ranking the second set of residuals; and, selecting a subset of residuals to be transformed and encoded, such that the steps of ranking and/or selecting are performed differentially based on the analysis. According to an example method, the step of applying a transform is performed on the selected subset of residuals.

The encoded streams may be accompanied by one or more headers which include parameters indicating aspects of the encoding process to facilitate decoding. For example, the headers may include the codec used, the transform applied, the quantization applied, and/or other decoding parameters.

In certain examples the step of quantization may comprise adapting the quantization based on an analysis of the coefficients and/or data to be transformed, for example, the residuals data. In certain examples the distribution used in the quantization step may be adapted.

The step of encoding the first set of residuals may comprise: deriving a set of temporal coefficients from a temporal buffer; and, subtracting the set of temporal coefficients from the set of coefficients. The step of encoding the second set of residuals may comprise: deriving a set of temporal coefficients from a temporal buffer; and, subtracting the set of temporal coefficients from the set of coefficients It was described above how a step of ranking and selecting may be applied to the residuals data, a step of subtracting temporal coefficients may be performed and also that quantization may be adapted. Each of these steps may be predetermined and selectively applied or may be applied based on analysis of the input video, down-sampled video, reconstructed video, up-sampled video or any combination of the above to improve the overall performance of the encoder. The steps may be selectively applied based on a predetermined set of rules or determinatively applied based on the analysis or feedback of the performance.

According to an example method the first codec is a hardware-based codec, preferably the first codec is AVC, HEVC, AV1, VP8, or VP9.

In any of the above examples, a quantization operation may comprise applying quantization parameters from a quantization matrix, wherein a different quantization matrix is used for each set of residuals.

In any of the above examples, an encoding method may further comprise adding signalling information to one or more of the one or more further encoded streams, the signalling information indicating that a portion of said encoded stream relates to a particular tile of the input video.

In any of the above examples, up-sampling may comprise using a convolutional neural network to predict up-sampled values for at least a coding unit.

According to one aspect of the present disclosure, there is a method of encoding an input video into a plurality of encoded streams, such that the encoded streams may be combined to reconstruct the input video, the method comprising: receiving a full resolution input video; generating a base encoded stream at a resolution that is lower than the full resolution input video; determining a temporal mode for one or more further encoded streams for use in reconstructing the full resolution input video together with the base encoded stream; and generating the one or more further encoded streams by selectively applying a temporal buffer based on the temporal mode.

The method may comprise determining the temporal mode as one of a first temporal mode that does not use the temporal buffer (or e.g., uses temporal buffer values of 0) and a second temporal mode that does use the temporal buffer (e.g. uses at least one non-zero value within the temporal buffer). The temporal buffer may be used to apply temporal prediction. The method may comprise: obtaining, at the encoder, temporal mode metadata for a plurality of coding units; determining a temporal mode to use for encoding for the plurality of coding units based on the obtained temporal mode metadata; and generating temporal mode signalling data for the plurality of coding units based on the determined temporal mode and the obtained temporal mode metadata.

Temporal prediction may be applied at the encoder by subtracting a set of dequantized transformed coefficients stored within the temporal buffer from a current set of transformed coefficients. The current set of transformed coefficients may be associated with a current frame within the full resolution input video and the set of dequantized transformed coefficients may be associated with a previous frame within the full resolution input video.

In certain examples, determining a temporal mode may comprise estimating a cost function. The cost function may comprise a function of the full resolution input video and one or the one or more further encoded streams. The cost function may be evaluated by encoding the one or more further encoded streams using both temporal modes and comparing one or more metrics determined for each temporal mode. The cost function may be evaluated for one or more portions of a frame, e.g. one or more coding units.

In certain examples, determining a temporal mode may comprise setting a temporal refresh parameter for a frame. The temporal refresh parameter may be used to signal a refresh of the temporal buffer, e.g. a zeroing of one or more values within the buffer. In certain examples, a temporal refresh on a per tile basis may be instructed using temporal signalling at the encoder.

In certain examples, in a second temporal mode that uses the temporal buffer, a temporal refresh parameter may be configured to temporarily effect processing associated with the first temporal mode.

In certain examples, an encoder, e.g. as set out in any of the statements herein, may receive configuration parameters over a network, e.g. from a remote server device. In certain examples, the encoder may additionally, or alternatively, transmit configuration parameters to the remote server device. The configuration parameters may configure the operation of the encoder as described in any one of these statements.

An example method of encoding an input video may comprise: receiving an input video at a first resolution; generating one or more residuals based on a difference between the input video and one or more reconstructed videos at one or more respective resolutions; modifying the one or more residuals based on a selected residual mode; and creating one or more encoded streams from the one or more modified residuals.

The method may comprise: down-sampling the input video to create a down-sampled video at a second resolution; encoding the down-sampled video using a first codec to create a base encoded stream; reconstructing a video from the encoded video to generate a reconstructed video; comparing the reconstructed video to the input video; and, creating one or more further encoded streams based on the comparison.

In the method one set of residuals may be at the first resolution (e.g. level 1) and one set of residuals may be at a second resolution (e.g. level 2). In certain cases, a base layer may be at the first resolution (e.g. level 1) or a further third resolution (e.g. level 0) that is lower than the first resolution. Down-sampling and/or up-sampling may be selectively applied in one or more dimensions, or not applied at all, in dependence on signalled parameters.

In one example, modifying the one or more residuals comprises: receiving a set of residual weights; and applying the set of residual weights to a set of residuals to generate the modified residuals. This method may further comprise thresholding the modified residuals using a set of thresholds. In certain examples, one or more of the set of residual weights and the set of thresholds are determined based on a classification of the input video. In certain examples, the set of residual weights comprise a residual mask that is received from a remote location. In certain examples, one or more of the set of residual weights and the set of thresholds are applied to groups of residuals.

A further example method of encoding an input video may comprise: receiving an input video at a first resolution; obtaining a desired bit rate for one or more hybrid video streams; generating one or more residuals based on a difference between the input video and one or more reconstructed videos at one or more respective resolutions; determining quantization parameters for the one or more residuals based on the desired bit rate; quantizing the one or more residuals based on the quantization parameters; and creating one or more encoded streams from the one or more quantized residuals.

The method may further comprise: down-sampling the input video to create a down-sampled video at a second resolution; encoding the down-sampled video using a first codec to create a base encoded stream; reconstructing a video from the encoded video to generate a reconstructed video; comparing the reconstructed video to the input video; and, creating one or more further encoded streams based on the comparison.

Again, as set out above the sets of residuals may be at different spatial resolutions.

Determining quantization parameters may comprise receiving a status of a buffer that receives the one or more encoded streams and the base encoded stream and using the status to determine the quantization parameters. This step may also or alternatively comprise receiving a status of a base encoding layer the base encoded stream and using the status to determine the quantization parameters. The quantization parameters are determined for each frame, residual and/or group of residuals. In one case, the quantization parameters for a frame may be determined based on a target data size for the frame and a current data size for the frame using a previous set of quantization parameters. In one case, the quantization parameters are based on a previous set of quantization parameters. In one case, the method comprises: capping the determined quantization parameters based on a current state of the encoder. In one case, the quantization parameters are used to determine a step-width for quantization. In one case, the quantization parameters comprise a Q value, wherein a step-width for quantization is an inverse function of the Q value.

In one example, the method comprises one or more of: sending the base encoded stream; sending the first level encoded stream; and sending the second level encoded stream.

According to a further aspect of the present disclosure there is provided a decoding method.

An example method of decoding a plurality of encoded streams into a reconstructed output video comprises: receiving a first base encoded stream; decoding the first base encoded stream according to a first codec to generate a first output video; receiving one or more further encoded streams; decoding the one or more further encoded streams to generate a set of residuals; and, combining the set of residuals with the first video to generate a decoded video.

In an example, the method comprises retrieving a plurality of decoding parameters from a header. The decoding parameters may indicate which procedural steps were included in the encoding process (and/or are to be applied in the decoding process).

In an example the step of decoding the one or more further encoded streams to generate a set of residuals comprises: applying an entropy decoding operation; applying a de-quantization operation; and, applying an inverse transform operation to generate a set of residuals.

In an example, the step of decoding the one or more further encoded streams to generate a set of residuals comprises predicting a subset of residuals based on co-located residuals from a temporal buffer. This may comprise adding the contents of the temporal buffer.

In an example, the method may comprise receiving a first level encoded stream and receiving a second level encoded stream. In this example, the step of decoding the one or more further encoded streams to generate a set of residuals comprises: decoding the first level encoded stream to derive a first set of residuals; wherein the step of combining the set of residuals with the first video to generate a decoded video, comprises: combining the first set of residuals with the first output video to generate a second output video; up-sampling the second output video to generate an up-sampled second output video; decoding the second level encoded stream to derive a second set of residuals; and, combining the second set of residuals with the second output video to generate a reconstructed output video.

In an example, the step of up-sampling the second output video to generate an up-sampled second output video comprises adding a value derived from an element in the first set of residuals from which a block in the up-sampled second output video was derived to a corresponding block in the up-sampled second output video. The block may be a 2×2 block. This additional step may be selectively performed based on a predetermined value or a signal included in a header.

In an example, the step of decoding the first level encoded stream to derive a first set of residuals, comprises: applying an entropy decoding operation; applying a de-quantization operation; and, applying an inverse transform operation to generate the first set of residuals. In this example, the step of decoding the first level encoded stream to derive a first set of residuals, may comprise: applying a filter such as a de-blocking filter configured to apply a mask to a block of residuals. The mask may be weighted according to a set of predefined weights.

In an example, the step of decoding the second level encoded stream to derive a second set of residuals, comprises: applying an entropy decoding operation; applying a de-quantization operation; and, applying an inverse transform operation to generate the second set of residuals. The inverse transform operation may be an inverse operation of the operations defined above or may be a substantially mirrored operation. That is, a 2×2 block or 4×4 block transform may be selectively applied. The transform may be detected by the decoding method or signalled in a header. If a 2×2 transform is used, coefficients may be modified by adding a value of the residual which the transformed block of residuals is predicted from. If a 4×4 transform is used, coefficients will be modified by adding an average value of the four residuals.

The method may further comprise displaying or outputting the reconstructed output.

According to a further aspect there may be provided an apparatus for encoding a data set into an encoded data set comprising a header and a payload. The apparatus configured to encode an input video according to the above steps. The apparatus may comprise a processor configured to carry out the method of any of the above aspects.

According to a further aspect there may be provided an apparatus for decoding a data set into a reconstructed video from a data set comprising a header and a payload. The apparatus configured to decode an output video according to the above steps. The apparatus may comprise a processor configured to carry out the method of any of the above aspects.

An encoder and decoder may also be provided.

According to further aspects of the invention there may be provided computer readable media which when executed by a processor cause the processor to perform any of the methods of the above aspects.

In any one of the decoding examples above, a decoding method may comprise: parsing an encoded data stream at one or more of the first and second levels to extract header information identifying one or more tiles; and selectively decoding the encoded data stream based on the header information.

According to one aspect of the present disclosure, there is a method of decoding one or more encoded streams into a reconstructed output video, the method comprising: receiving a first base encoded stream; decoding the first base encoded stream according to a first codec to generate a first output video; receiving one or more further encoded streams; receiving data indicating a temporal mode for one or more portions of the one or more further encoded streams; decoding the data indicating a temporal mode and configuring one or more respective temporal buffers for the one or more further encoded streams; decoding the one or more further encoded streams to generate a set of residuals, including selectively applying data from the one or more temporal buffers to the decoded one or more further encoded streams; and, combining the set of residuals with the first video to generate a decoded video.

Variations as applied to the method of encoding may be applied in a corresponding manner to the method of decoding.

In one example, the method further comprises: receiving temporal signalling indicating a temporal refresh for a frame; and prior to selectively applying data from one of the one or more temporal buffers in relation to decoded data for the frame, zeroing values within the temporal buffer (e.g. a temporal "refresh").

In one example, selectively applying data from the one or more temporal buffers to the decoded one or more further encoded streams comprises subtracting data from one of the one or more temporal buffers responsive to a second temporal mode being indicated and not subtracting data from one of the one or more temporal buffers responsive to a first temporal mode being indicated. In one example, the data indicating a temporal mode for one or more portions of the one or more further encoded streams comprises a bit per coding unit.

Conventions Used in Certain Examples

Certain examples described herein use conventional notation for video coding technologies. For example, notation is used herein to refer to one or more of programming functions and mathematical operations. Certain mathematical operators used herein are presented in a manner that is similar to the conventions used in the C programming language. In certain examples, the results of integer division and arithmetic shift operations are defined as set out below, and additional operations are defined, such as exponentiation and real-valued division. Numbering and counting conventions generally begin from 0, e.g., "the first" is equivalent to the 0-th, "the second" is equivalent to the 1-th, etc.

In examples, arithmetic operators use conventional notation:

+ Addition

− Subtraction (as a two-argument operator) or negation (as a unary prefix operator)

* Multiplication, including matrix multiplication $x^y$ Exponentiation. Specifies x to the power of y.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f$$

The summation of f(i) with i taking all integer values from x up to and including y.

x % y Modulus. Remainder of x divided by y, defined only for integers x and y with x>=0 and y>0.

Conventional logical operators are also used. The following logical operators are defined as follows:

x&&y—Boolean logical "and" of x and y x||y—Boolean logical "or" of x and y

!—Boolean logical "not"

x?y:z—If x is TRUE or not equal to 0, evaluates to the value of y; otherwise, evaluates to the value of z.

Relational operators also have conventional meanings, e.g.: >—Greater than; >=—Greater than or equal to; <—Less than; <=—Less than or equal to; ==—Equal to; !=—Not equal to.

When a relational operator is applied to a syntax element or variable that has been assigned the value "na" (not applicable), the value "na" may be treated as a distinct value for the syntax element or variable. The value "na" is considered not to be equal to any other value.

The following bit-wise operators are also used in examples:

& Bit-wise "and". When operating on integer arguments, this operates on a two's complement representation of the integer value. When operating on a binary argument that contains fewer bits than another argument, the shorter argument is extended by adding more significant bits equal to 0.

| Bit-wise "or". When operating on integer arguments, this operates on a two's complement representation of the integer value. When operating on a binary argument that contains fewer bits than another argument, the shorter argument is extended by adding more significant bits equal to 0.

^ Bit-wise "exclusive or". When operating on integer arguments, this operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

The following arithmetic operators are also used: =–Assignment operator; ++—Increment, i.e., x++ is equivalent to x=x+1 (when used in an array index, this may evaluate to the value of the variable prior to the increment operation); ——Decrement, i.e., x— is equivalent to x=x–1 (when used in an array index, this may evaluate to the value of the variable prior to the decrement operation); +=–Increment by amount specified, i.e., x+=3 is equivalent to x=x+3, and x+=(–3) is equivalent to x=x+(–3); –=–Decrement by amount specified, i.e., x–=3 is equivalent to x=x–3, and x–=(–3) is equivalent to x=x–(–3).

A range of values may be specified using the notation: x=y . . . z or x=y to z, where x takes on integer values starting from y to z, inclusive, with x, y, and z being integer numbers and z being greater than y.

The following mathematical functions are also used in certain example computations:

$$\mathrm{Abs}(x) = \begin{cases} x; x >= 0 \\ -x; x < 0 \end{cases}$$

Ceil(x) the smallest integer greater than or equal to x.

$$\mathrm{Clip3}(x, y, z) = \begin{cases} x; z < x \\ y; z > y \\ z; \text{otherwise} \end{cases}$$

Floor(x) the largest integer less than or equal to x.

Ln(x) the natural logarithm of x (the base-e logarithm, where e is the natural logarithm base constant 2.718 281 828 . . . ).

Log 10(x) the base-10 logarithm of x.

$$\mathrm{Min}(x, y) = \begin{cases} x; & x <= y \\ y; & x > y \end{cases}$$

$$\mathrm{Max}(x, y) = \begin{cases} x; & x >= y \\ y; & x < y \end{cases}$$

$$\mathrm{Round}(x)=\mathrm{Sign}(x)*\mathrm{Floor}(\mathrm{Abs}(x)+0.5)$$

$$\mathrm{Sign}(x) = \begin{cases} 1; x > 0 \\ 0; x == 0 \\ -1; x < 0 \end{cases}$$

$$\mathrm{Sqrt}(x) = > \sqrt{x}$$

When an order of precedence in an expression is not indicated explicitly by use of parentheses, the following rules may apply: operations of a higher precedence are evaluated before any operation of a lower precedence; and operations of the same precedence are evaluated sequentially from left to right. The table below indicates a preferred precedence of certain example operations (e.g. from highest to lowest where a higher position in the table indicates a higher precedence—this may be the same as the order of precedence as used in the C programming language).

| operations (with operands x, y, and z) |
|---|
| "x++", "x– –" |
| "!x", "–x" (as a unary prefix operator) |
| $x^y$ |
| "x * y", "x / y", "x ÷ y", "$\frac{x}{y}$", "x % y" |
| "x + y", "x – y" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \| \| y" |
| "x ? y : z" |
| "x..y" |

In descriptions of bitstreams in examples herein, syntax elements in the bitstream may be represented in bold type. A syntax element may be described by its name (e.g. in all lower-case letters with underscore characters), and one descriptor for its method of coded representation. The decoding processes described herein may be configured to behave according to the value of the syntax element and to the values of previously decoded syntax elements. When a value of a syntax element is used in the syntax tables or the text, it may appear in regular (i.e., not bold) type.

In some cases, the syntax tables may use the values of other variables derived from syntax elements values. Such variables appear in syntax tables, or text, named by a mixture of lower case and uppercase letter and without any underscore characters. Variables starting with an upper-case letter are derived for the decoding of the current syntax structure and all depending syntax structures. Variables starting with an upper-case letter may be used in the decoding process for later syntax structures without mentioning the originating syntax structure of the variable. Variables starting with a lower-case letter may only used within the clause in which they are derived.

In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper-case letter and may contain more upper-case letters. It should be noted that names are provided as examples only and implementations may use different names.

Functions that specify properties of the current position in the bitstream may be referred to as syntax functions. These functions are specified in examples and may assume the existence of a bitstream pointer with an indication of the position of the next bit to be read by the decoding process from the bitstream. Syntax functions may be described by their names, which may be constructed as syntax element names and end with left and right round parentheses including zero or more variable names (for definition) or values (for usage), separated by commas (if more than one variable).

Functions that are not syntax functions (e.g. mathematical functions) may be described by their names, which start with an upper case letter, contain a mixture of lower and upper case letters without any underscore character, and end with left and right parentheses including zero or more variable names (for definition) or values (for usage) separated by commas (if more than one variable).

A one-dimensional array may be referred to as a list. A two-dimensional array may be referred to as a matrix. Arrays can either be syntax elements or variables. Subscripts or square parentheses are used in examples for the indexing of arrays. In reference to a visual depiction of a matrix, the first subscript is used as a row (vertical) index and the second subscript is used as a column (horizontal) index. The indexing order may be reversed when using square parentheses rather than subscripts for indexing. Thus, an element of a matrix S at horizontal position x and vertical position y may be denoted either as S[x][y] or as $S_{yx}$. A single column of a matrix may be referred to as a list and denoted by omission of the row index. Thus, the column of a matrix s at horizontal position x may be referred to as the list S[x].

A specification of values of the entries in rows and columns of an array may be denoted by {{ . . . } { . . . }}, where each inner pair of brackets specifies the values of the elements within a row in increasing column order and the rows are ordered in increasing row order. Thus, setting a matrix S equal to {{1 6} {4 9}} specifies that S[0][0] is set equal to 1, S[1][0] is set equal to 6, S[0][1] is set equal to 4, and S[1][1] is set equal to 9.

Binary notation is indicated in examples by enclosing the string of bit values by single quote marks. For example, '01000001' represents an eight-bit string having only its second and its last bits (counted from the most to the least significant bit) equal to 1. Hexadecimal notation is indicated by prefixing the hexadecimal number by "0×", it may be used instead of binary notation when the number of bits is an integer multiple of 4. For example, 0x41 represents an eight-bit string having only its second and its last bits (counted from the most to the least significant bit) equal to 1. Numerical values not enclosed in single quotes and not prefixed by "0×" may be considered as decimal values. A value equal to 0 may represent a FALSE condition in a test statement. The value TRUE may be represented by any value different from zero.

In pseudocode examples presented herein, a statement of logical operations as would be described mathematically in the following form:

```
if( condition 0 )
  statement 0
else if( condition 1 )
  statement 1
...
else /* informative remark on remaining condition */
statement n
may be described in the following manner:
.. as follows / ... the following applies:
If condition 0, statement 0
Otherwise, if condition 1, statement 1
...
Otherwise (informative remark on remaining condition), statement
n
```

Statements such "If . . . Otherwise, if . . . Otherwise, . . . " in the text may be introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In certain pseudo-code examples, a statement of logical operations as would be described mathematically in the following form:

```
  if( condition 0a && condition 0b )
    statement 0
  else if( condition 1a || condition 1b )
    statement 1
  ...
  else
    statement n
 may be described in the following manner:
... as follows / ... the following applies:
If all of the following conditions are true, statement 0:
 condition 0a
 condition 0b
Otherwise, if one or more of the following conditions are true, statement
1:
 condition 1a
 condition 1b
 ...
Otherwise, statement n
```

In certain pseudo-code examples, a statement of logical operations as would be described mathematically in the following form:

```
if( condition 0 )
  statement 0
if( condition 1 )
  statement 1
may be described in the following manner:
When condition 0, statement 0
When condition 1, statement 1
```

In examples, processes are used to describe the decoding of syntax elements. A process may have a separately described specification and invoking. Syntax elements and upper-case variables that pertain to a current syntax structure and depending syntax structures may be available in the process specification and invoking. A process specification may also have a lower-case variable explicitly specified as input. Each process specification may have an explicitly specified output. The output is a variable that may either be an upper-case variable or a lower-case variable. When invoking a process, the assignment of variables is specified as follows: if the variables at the invoking and the process specification do not have the same name, the variables are explicitly assigned to lower case input or output variables of the process specification; otherwise (the variables at the invoking and the process specification have the same name), assignment is implied. In the specification of a process, a specific coding block may be referred to by the variable name having a value equal to the address of the specific coding block.

At both the encoder and decoder, for example implemented in a streaming server or client device or client device decoding from a data store, methods, "components" and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

REFERENCES

The following references are herein incorporated by reference in their entirety: "Call for Proposals for Low Complexity Video Coding Enhancements" ISO/IEC JTC1/SC29/WG11 N17944, Macao, CN, October 2018; and "Requirements for Low Complexity Video Coding Enhancements" ISO/IEC JTC1/SC29/WG11 N18098, Macao, CN, October 2018.

The content of the following patents and patent applications are herein incorporated by reference in their entirety: U.S. Pat. Nos. 8,977,065; 8,948,248; 8,711,943; 9,129,411; 8,531,321; 9,510,018; U.S. Ser. No. 15/296,633; U.S. Ser. No. 13/188,237; U.S. Pat. Nos. 9,300,980; 9,628,817; U.S. Ser. No. 15/479,966; U.S. Pat. No. 9,626,772; U.S. Ser. No. 15/459,883; PCT/EP2013/059833; PCT/EP2013/059847; PCT/EP2013/059880; PCT/EP2013/059853; PCT/EP2013/059885; PCT/EP2013/059886; PCT/M2014/060716; PCT/GB2016/053736; PCT/GB2016/050632; PCT/GB2017/050405; PCT/GB2017/050584; PCT/GB2017/050673; PCT/GB2017/052141; PCT/GB2017/052142; PCT/GB2017/052348; PCT/GB2017/052349; PCT/GB2017/052631; PCT/GB2017/052632; PCT/GB2017/052633; PCT/GB2017/052631; GB 1615265.4; PCT/GB2017/052632; GB 1615266.2; PCT/GB2017/052633; GB 1615267.0; PCT/GB2017/053716; GB 1621117.9; GB 1707373.5; GB 1708447.6; GR 20170100431; PCT/EP2018/075603; EP 17386045.3; PCT/EP2018/082350; EP 17386046.1; PCT/GB2018/053551; EP 17386047.9; GB 1720365.4; GB 18000934.0; EP 18386002.2; PCT/GB2018/053552; GB 1806926.0; GB 1811594.9; GB 1811651.7; GB 1811933.9; GB 1812407.3; PCT/GB2018/053546; GB 1812708.4; GB 1812709.2; GB 1812710.0; GB 1815437.7; PCT/GB2018/053555; PCT/GB2018/053547; PCT/GB2018/053554; PCT/GB2018/053548; GB 1816172.9; GB 1816469.9; GB 1820473.5; GB 1900511.5; GB 1817783.2; GB 1817780.8; GB 1817781.6; GB 1817784; GB 1902008.0; PCT/GB2017/052141; GB 1612583.3; EP 17752417.0; PCT/GB2017/052142; GB 1612858.8; PCT/GB2017/052348; GB 1613689.7; PCT/GB2017/052349; GB 1613697.0.

The present disclosure also relates to the following UK patent applications, the contents of which are incorporated by reference in their entirety: GB1903844.7, GB1904014.6, GB1904492.4, GB1905325.5, GB1909701.3, GB1909724.5, GB1909997.7, GB1910674.9, GB1911467.7, GB1911546.8, GB1914215.7, GB1914414.6, GB1914634.9, GB1915553.0, GB1916090.2, GB1918099.1, GB2000430.5, GB2000483.4, GB2000600.3, GB2000668.0, GB2001408.0, and U.S. 62/984,261.

APPENDIX

The present appendix sets out example test values for the neural network up-sampler kernels:

us_layer1_kernel: Tensor4D_FP32(3, 3, 1, 16)={−1.41084030e-01f, 9.31098983e-02f, −1.34773910e-01f, −2.28807237e-02f, 6.85299039e-02f, −2.61796445e-01f, 4.50513251e-02f, −9.27503034e-02f, 3.51776704e-02f, −3.75421681e-02f, 3.48821692e-02f, −1.97652541e-02f, 5.42435385e-02f, 5.53956255e-02f, −6.69758171e-02f, 1.53271168e-01f, −3.73172164e-02f, 3.56322676e-02f, −2.16064841e-01f, −1.82147045e-02f, −1.44671440e-01f, 1.02563798e-01f, −1.91772074e-01f, 8.01544413e-02f, 4.77155223e-02f, −4.41845991e-02f, 3.30503732e-02f, 5.62866703e-02f, −7.71014858e-03f, −5.44822868e-03f, 8.70354474e-02f, 9.19423345e-03f, −1.16019882e-02f, 8.42235386e-02f, −9.52602625e-02f, 7.36623770e-03f, −3.09397113e-02f, 5.15783429e-02f, 1.29244000e-01f, −7.07662245e-03f, 2.48695776e-01f, 5.73697016e-02f, −5.06149009e-02f, 1.11225368e-02f, −3.72100696e-02f, −1.78759713e-02f, −3.08060925e-03f, 6.27207085e-02f, −3.85343991e-02f, 8.60163271e-02f, 1.07082412e-01f, 2.21030377e-02f, −9.23042446e-02f, 1.19127659e-02f, −2.95122224e-03f, 7.40718320e-02f, 3.72054316e-02f, −2.86619030e-02f, −6.61083236e-02f, −7.86441267e-02f, −4.92218025e-02f, −1.57362640e-01f, −5.06451167e-03f, 4.98885463e-04f, −9.27802455e-03f, 9.82660893e-03f, 5.41823693e-02f, 4.07200307e-02f, 2.75054220e-02f, −2.07493678e-01f, 2.15178132e-02f, −9.22169983e-02f, −1.15027346e-01f, −2.64864620e-02f, −5.67401797e-02f, −9.97813195e-02f, 1.03374301e-02f, 1.84954870e-02f, 7.86372870e-02f, −4.30381410e-02f, −6.68329298e-02f, −2.96362638e-02f, 1.10683285e-01f, 5.43097965e-02f, −1.94774847e-02f, −9.17459559e-03f, 1.44741684e-01f, 4.55530323e-02f, −1.22463793e-01f, 1.09305903e-01f, 1.26978466e-02f, −2.51851287e-02f, −4.69901972e-02f, 1.45491347e-01f, 1.06764054e-02f, −2.37240605e-02f, 3.65678407e-02f, 3.79142314e-02f, 7.28409737e-02f, 1.65885806e-01f, 1.60030782e-01f, 2.10506301e-02f, −5.24207354e-02f, −1.57678679e-01f, 5.13638146e-02f, 2.96306182e-02f, −1.49404295e-02f, 2.26740912e-03f, −2.00474024e-01f, −4.17368114e-02f, 6.52428120e-02f, 1.36250272e-01f, −9.53990966e-02f, −9.28792655e-02f, −1.54301003e-01f, 2.28194874e-02f, 6.45937026e-02f, −4.95569259e-02f, 1.39574781e-01f, −2.63163131e-02f, −9.63334218e-02f, −1.88225329e-01f, −6.68186843e-02f, 4.45094369e-02f, 1.86352968e-01f, −1.04716487e-01f, −1.31562442e-01f, −1.21508308e-01f, 3.38261202e-02f, 1.31264895e-01f, 4.67112437e-02f, 5.16150929e-02f, 3.52771990e-02f, −2.98504204e-01f, 2.31798831e-03f, 8.31564218e-02f, 6.71869377e-03f, −1.92980317e-03f, 3.54144014e-02f, 1.25442013e-01f, −5.69025893e-03f, −2.42539141e-02f, −3.59425023e-02f, −1.77264456e-02f} us_layer2_kernel: Tensor3D_FP32(3, 3, 16, 4)={6.33245381e-03f, −1.04955370e-02f, −7.64640868e-02f, 1.04394630e-01f, −1.12143323e-01f, 8.84293765e-02f, 4.21205387e-02f, 5.64377718e-02f, 5.26978858e-02f, −7.51010850e-02f, 4.34068143e-02f, −1.94638863e-01f, 2.15833232e-01f, −1.13282958e-03f, 1.32124677e-01f, 3.43414620e-02f, −9.80699062e-02f, −1.09704457e-01f, −4.03996333e-02f, −1.35718092e-01f, 2.95123621e-03f, −5.81902452e-02f, 5.18400222e-02f, −9.05640125e-02f, 1.50605440e-01f, −1.21687643e-01f, 2.08101258e-01f, −5.10746613e-02f, 1.46442071e-01f, −7.29629695e-02f, −1.39488146e-01f, 1.37462586e-01f, −8.10248703e-02f, −6.19493499e-02f, 2.21347332e-01f, −2.34334439e-01f, 4.30567451e-02f, 2.13719338e-01f, 7.92161897e-02f, 1.51598938e-02f, 3.00818868e-02f, −7.42932607e-04f, −1.31590351e-01f, 1.85781255e-01f, −4.65347711e-03f, −2.43773490e-01f, 2.63357293e-02f, −3.25426925e-03f, 6.67467117e-02f, 1.94742084e-01f, 2.88871527e-02f, 4.39467095e-02f, −4.63892408e-02f, −6.06723763e-02f, 2.23232135e-02f, −2.14727566e-01f, 9.72462539e-03f, −1.12323351e-01f, −1.25625610e-01f, 1.10242918e-01f, 7.58204609e-02f, 3.76487561e-02f, 7.56741092e-02f, 1.42208323e-01f, −8.56551304e-02f, 2.67496526e-01f, 2.43334547e-02f, −3.68960761e-02f, 6.51121214e-02f, −2.92595550e-02f, −1.19445384e-01f, −1.25117391e-01f, −7.94723704e-02f, −5.52651063e-02f, 1.09263748e-01f, 1.82550594e-01f, −1.60724610e-01f, −7.59197548e-02f, 7.49233365e-02f, 9.94861498e-02f, −1.82569046e-02f, 1.47254029e-02f, −4.44847643e-02f, −1.22822165e-01f, −1.12555832e-01f, 1.12247109e-01f, −2.84761079e-02f, −2.05388162e-02f, −3.50958928e-02f, 1.39616013e-01f, 1.06154449e-01f, −9.16776657e-02f, −1.43141896e-01f, 5.20549566e-02f, 9.52381566e-02f, −8.75469595e-02f, −1.01462469e-01f, 1.74522754e-02f, 6.82789385e-02f, 6.29173890e-02f, −1.14021309e-01f, −1.21160626e-01f, 4.30294387e-02f, 6.43974990e-02f, −1.54791161e-01f, −7.69131184e-02f, −2.84353886e-02f, −1.07519612e-01f, −6.58828169e-02f, −4.02578823e-02f, 1.59347877e-01f, −1.79592725e-02f, 4.52463748e-03f, −6.50652871e-02f, −2.73805093e-02f, −4.24853638e-02f, 1.44114226e-01f, 6.71110675e-03f, −2.06886873e-01f, 2.48743650e-02f, 1.20029775e-02f, 1.20832704e-01f, −1.36132706e-02f, 7.27911815e-02f, −1.91886991e-01f, 2.49870382e-02f, −1.22994900e-01f, 1.25552088e-01f, 7.47941881e-02f, −1.24070607e-01f, −1.49875551e-01f, −1.32682770e-01f, −5.30838082e-03f, 1.52762681e-01f, 9.25363675e-02f, −7.15189055e-02f, −1.01389468e-01f, 5.05505055e-02f, −1.03882123e-02f, 1.28126472e-01f, −7.02821603e-03f, −1.97356284e-01f, 1.68811291e-01f, 5.53274043e-02f, −2.48444341e-02f, 1.94187909e-02f, −4.13846411e-02f, −7.51732737e-02f, 2.85033844e-02f, 1.01955794e-03f, 4.56635170e-02f, 1.33634806e-02f, 4.91224751e-02f, −3.14815827e-02f, 9.61789337e-04f, −1.16922125e-01f, 2.18285043e-02f, 1.55752704e-01f, −4.31438908e-03f, −1.07203368e-02f, 8.30481574e-03f, −3.36630940e-02f, 2.73541231e-02f, −1.78011596e-01f, −4.73164655e-02f, 2.51824018e-02f, 2.30563991e-02f, 2.32195966e-02f, 1.17772520e-01f, −1.89441293e-02f, 6.15934245e-02f, −1.53331179e-02f, 1.30198702e-01f, 4.11545672e-02f, 2.47499924e-02f, 4.14127409e-02f, 6.30946383e-02f, −1.77980904e-02f, −1.13194898e-01f, −6.81287348e-02f, 9.88358445e-03f, 1.80843398e-01f, 1.69518907e-02f, −4.47042324e-02f, −1.41637605e-02f, −4.90729660e-02f, −4.22141738e-02f, −1.18456043e-01f, −3.59974802e-02f, 1.42708300e-02f, 7.37891272e-02f, −5.33544794e-02f, 1.51815116e-01f, −1.00672627e-02f, −4.77370955e-02f, −7.70068616e-02f, −1.41694620e-01f, 8.36707354e-02f, 1.37744760e-02f, 3.00155342e-01f, 8.57121795e-02f, −2.12971136e-01f, 1.16683885e-01f, 9.42589417e-02f, 5.13079911e-02f, 1.54281944e-01f, −1.14778113e-02f, −1.42881781e-01f, −1.06360398e-01f, −2.64805615e-01f, −1.30332038e-02f, −1.29198700e-01f, 1.57558769e-01f, 6.28474914e-03f, 3.20065171e-01f, 1.11988215e-02f, 2.52308279e-01f, −1.86741650e-01f, −4.85163517e-02f, −5.77348322e-02f, 1.73906848e-01f, 1.11191697e-01f, −1.61423609e-01f, −1.13434017e-01f, 1.26967236e-01f, −1.67516507e-02f, −8.22124407e-02f, −2.10107844e-02f, −4.70526442e-02f, 6.00312762e-02f, 7.18277246e-02f, 3.13637517e-02f, 8.93386975e-02f, −4.44040587e-03f, −9.51816216e-02f, −1.47718236e-01f, 1.65281538e-02f, 1.34988986e-02f, 4.80517782e-02f, −9.65404958e-02f, 1.40959471e-02f, −5.53384759e-02f, −2.72534061e-02f, 2.62833294e-02f, −1.63816914e-01f, −1.44624650e-01f, 1.20901503e-02f, 1.19794615e-01f, −1.90997720e-02f, 2.63831951e-02f, 2.54842728e-01f, 2.25048333e-01f, −1.80821672e-01f, −2.93815229e-02f, 4.37161446e-01f, −9.82301533e-02f, −2.29180112e-01f, −3.88183445e-02f, 2.15006188e-01f, 1.71044737e-01f, −2.52068818e-01f, −1.54835969e-01f, −3.57184321e-01f, 9.19836760e-02f, 1.14235722e-01f, −8.07379335e-02f, −1.67503044e-01f, 6.62510023e-02f, 2.49479741e-01f, 9.48333964e-02f, 2.80678682e-02f, 1.67486027e-01f, 4.44321126e-01f, 8.31490234e-02f, 6.48184270e-02f, −2.35687494e-01f, −2.02227533e-01f, −2.80010372e-01f, −1.42441705e-01f, 3.73379216e-02f, 1.37202099e-01f, 2.14403048e-01f, −1.90773681e-02f, −9.54359546e-02f, 1.38671203e-02f, −4.14732248e-02f, −1.44975752e-01f, 1.23142749e-01f, −1.20386019e-01f, 4.30736458e-03f, 5.40281534e-02f, 3.68678905e-02f, 1.17263041e-01f, −1.19504638e-01f, 1.65910080e-01f, −7.93663561e-02f, −1.59859478e-01f, 1.30104035e-01f, −5.12327775e-02f, −2.69437507e-02f, 1.61378413e-01f, −1.66682631e-01f, 1.42815737e-02f, 5.91942258e-02f, −1.15488388e-01f, 2.47667190e-02f, −9.60654020e-02f, 2.30389591e-02f, 1.45454630e-01f, −3.83892208e-01f, −3.48924100e-02f, 4.94621575e-01f, 1.31215930e-01f, −6.45582676e-02f, −1.89624280e-01f, −3.26677948e-01f, 2.26888824e-02f, 2.70347863e-01f, 1.80545300e-02f, −2.58584153e-02f, 7.51152560e-02f, 1.55662745e-02f, −7.55750090e-02f, 4.64267656e-02f, 1.06840938e-01f, 1.46118030e-01f, −4.89563830e-02f, 9.93431360e-02f, −8.55714828e-02f, −1.25848889e-01f, 9.04214382e-02f, −9.83981043e-02f, −4.19425853e-02f, −2.18845248e-01f, 1.04291327e-01f, 6.04276434e-02f, 8.47627819e-02f, −3.19354013e-02f, 8.96960199e-02f, −3.80666740e-02f, −1.27697840e-01f, 1.16602555e-01f, −4.86721471e-02f, −2.00404078e-02f, 4.33820358e-04f, −2.41963007e-02f, 9.44377333e-02f, −1.13402940e-01f, 1.54441983e-01f, −6.21834993e-02f, 4.79655601e-02f, 4.17957872e-01f, −1.27584010e-01f, −2.16431364e-01f, −1.97374937e-03f, −1.03103267e-02f, −1.05308145e-01f, −2.78487382e-03f, −8.74692127e-02f, 1.03021942e-01f, −1.22398764e-01f, 1.63182363e-01f, 2.23339215e-01f, 1.51619781e-02f, 7.75940064e-03f, 6.13315478e-02f, −4.63349745e-02f, −1.91256031e-01f, 3.04002315e-02f, −1.40351385e-01f, −2.58211717e-02f, 1.63556337e-01f, −2.15994790e-01f, −9.37260315e-02f, −1.20724082e-01f, −4.86935265e-02f, 1.69598863e-01f, −1.40344262e-01f, −1.56492554e-02f, −2.93590613e-02f, 1.77454203e-01f, 8.86754468e-02f, 1.39782295e-01f, 2.29205061e-02f, −8.31865966e-02f, 5.12111038e-02f, 6.50634468e-02f, −7.25559192e-03f, 1.56966560e-02f, −3.29366811e-02f, −9.51480940e-02f, −1.12466224e-01f, 1.34184808e-01f, −1.85190514e-02f, −3.44241038e-02f, 2.88441102e-03f, −5.22443093e-02f, 2.76800275e-01f, 1.55083425e-02f, −1.13139518e-01f, −7.82907307e-02f, 4.04207148e-02f, −1.59765586e-01f, 5.68327047e-02f, 4.52976860e-02f, 8.98251608e-02f, 5.77608645e-02f, −2.05498159e-01f, 1.92694310e-02f, 1.09445862e-01f, −1.07486919e-01f, 7.74176270e-02f, −2.34839320e-02f, −5.87587990e-02f, −1.99952766e-01f, 4.88866828e-02f, 1.57094464e-01f, −1.27639011e-01f, 1.18134432e-01f, 1.65418327e-01f, 1.58160459e-02f, −1.03516594e-01f, 1.08604118e-01f, 1.09552778e-01f, −3.01288702e-02f, 8.92308801e-02f, 8.78076479e-02f, 1.80325642e-01f, −9.63688716e-02f, −9.48763043e-02f, 1.11239254e-01f, −4.57538664e-02f, −4.64903936e-02f, 3.62795852e-02f, −5.44275902e-02f, 1.01453766e-01f, −9.68999565e-02f, −1.00147367e-01f, 5.05828746e-02f, 2.01076120e-02f, 5.09904325e-02f, 1.33387849e-01f, −5.86754940e-02f, −1.65975168e-02f, 4.78810892e-02f, 1.21149577e-01f, −7.68746883e-02f, −5.41327521e-02f, −4.08202820e-02f, 1.82107426e-02f, −5.09710722e-02f, −5.78883253e-02f, 1.38597578e-01f, 3.97315472e-02f, −2.34697051e-02f, −2.68342383e-02f, 2.48119142e-02f, −8.64342414e-03f, −4.07836251e-02f, 1.35181723e-02f, −7.78336450e-02f, −6.26475587e-02f, 2.00905893e-02f, −7.39092985e-03f, 8.39750767e-02f, −3.35541144e-02f, 9.86860469e-02f, −5.70620932e-02f, 1.22933879e-01f, 3.65988240e-02f, −7.83327147e-02f, −7.11319670e-02f, 2.32027974e-02f, −4.73497249e-02f, −5.38150817e-02f, −3.65512967e-02f, 7.89038390e-02f, −2.66834069e-02f, −5.64240888e-02f, 9.18125920e-03f, 9.88172740e-02f, 1.68722551e-02f, −3.53356823e-02f, 6.53948868e-03f, 2.15070993e-02f, −1.80628616e-02f, 5.74403107e-02f, 2.17355173e-02f, −1.06472000e-01f, −7.84658045e-02f, 1.07785119e-02f, 7.12645650e-02f, −1.06326915e-01f, 8.08671042e-02f, −1.16083669e-02f, −1.47858467e-02f, 4.62195612e-02f, −7.65818432e-02f, −1.30814165e-01f, 2.88332235e-02f, 1.27556264e-01f, 8.22251067e-02f, −6.34733262e-03f, −7.01304227e-02f, 3.80594051e-03f, −1.34418413e-01f, 5.87879531e-02f, 5.80505729e-02f, 1.25298798e-02f, 1.09685898e-01f, 9.59879681e-02f, 6.36788923e-03f, −4.68046330e-02f, −8.04987028e-02f, −4.46980670e-02f, 8.05985257e-02f, −4.70111426e-03f, 5.59057631e-02f, −2.30870675e-02f, 8.69351998e-02f, −8.31296518e-02f, 2.41797008e-02f, −7.99082890e-02f, 7.62604401e-02f, −6.23388402e-02f, −9.75745544e-03f, −8.23382512e-02f, −1.53752863e-02f, 2.88945399e-02f, −5.37200831e-02f, 7.93552771e-02f, 1.27886273e-02f, −6.05425425e-02f, 4.45702150e-02f, −2.06603259e-02f, 6.89669549e-02f, −5.95158935e-02f, 1.64563283e-02f, 8.36538225e-02f, −1.00081436e-01f, −5.99694774e-02f, 1.94207013e-01f, −1.56761464e-02f, 5.23252152e-02f, −9.26710591e-02f, 3.59066613e-02f, 8.66876543e-02f, −2.03602433e-01f, −1.17385782e-01f, −1.16631761e-01f, 1.08733520e-01f, 4.69735153e-02f, 2.89963130e-02f, −8.44228715e-02f, 9.93011221e-02f, 6.87584355e-02f, 1.75104663e-02f, −6.64295256e-02f, −1.04675546e-01f, 1.42710879e-01f, −6.27391338e-02f, 1.29736781e-01f, −1.96640640e-01f, 1.07235387e-02f, −4.66577187e-02f, 1.23463459e-02f, 5.20261303e-02f, −9.65078082e-03f, −3.33436802e-02f, 5.92316538e-02f, 8.82986933e-02f, −1.29388183e-01f, 1.37113631e-01f, −1.02152310e-01f, 8.08595307e-03f, 9.42398533e-02f} us_layer1_bias: Tensor1D_FP32( )={−2.71837250e-03f, 1.00593327e-03f, −2.91983772e-04f, 1.41876517e-05f, −6.10931893e-04f, −4.02250531e-04f, −9.47722219e-05f, −3.40876228e-04f, −5.34553546e-03f, 3.56744719e-03f, −2.54383660e-04f, −2.86490074e-04f, −6.41522696e-03f, −4.42847200e-02f, −3.19198221e-02f, 2.24299170e-03f} us_layer2_bias: Tensor1D_FP32( )={−1.33045786e-03f, −2.39597703e-03f, 1.86161429e-03f, 3.07592891e-05f}

The invention claimed is:

1. A method of decoding a plurality of encoded streams into a reconstructed output video, the method comprising:

receiving a first base encoded stream;

instructing the decoding of the first base encoded stream using a base codec to generate a first output video;

receiving a first level encoded stream;

using a level one (L-1) decoding component to decode the first level encoded stream using an enhancement codec to generate a first set of residuals, wherein the enhancement codec differs from the base codec, and wherein the L-1 decoding component decodes the first level encoded stream by:

first, applying a first entropy decoding operation to the first level encoded stream, resulting in generation of first entropy decoded data;

second, applying a first de-quantization operation to the first entropy decoded data, resulting in generation of first de-quantized data; and third, applying a first inverse transform operation to the first de-quantized data, resulting in generation of the first set of residuals;

combining the first set of residuals with the first output video to generate a first reconstructed video;

receiving a second level encoded stream;

using a level two (L-2) decoding component to decode the second level encoded stream using the enhancement codec to generate a second set of residuals, including applying a temporal buffer to data derived from the second level encoded stream to reconstruct the second set of residuals, and wherein the L-2 decoding component decodes the second level encoded stream by:

first, applying a second entropy decoding operation to the second level encoded stream, resulting in generation of second entropy decoded data;

second, applying a second de-quantization operation to the second entropy decoded data, resulting in generation of second de-quantized data; and third, applying a second inverse transform operation to the second de-quantized data, resulting in generation of the second set of residuals;

up-sampling the first reconstructed video to generate an up-sampled reconstructed video; and combining the second set of residuals with the up-sampled reconstructed video to generate a second reconstructed video that comprises a reconstructed version of an originally-encoded full resolution input video.

2. The method of claim 1, said method further comprising:

retrieving a plurality of decoding parameters from one or more headers associated with one or more of the first and second level encoded streams, wherein the decoding parameters are used to configure the decoding operations.

3. The method of claim 1, wherein up-sampling the first reconstructed video comprises: adding a value of an element in the first set of residuals from which a block in the up-sampled reconstructed video was derived to a corresponding block in the up-sampled reconstructed video.

4. The method of claim 1, wherein the input video is decomposed into a plurality of consecutive frames, a frame of input video having one or more associated color planes, wherein the method is performed for each of the plurality of associated color planes on a frame-by-frame basis, and wherein decoding each set of residuals comprises, for a given color plane of a given frame: arranging the set of residuals as a 2 by 2 or 4 by 4 coding unit associated with 2 by 2 or 4 by 4 set of picture elements at the resolution of the set of residuals; and decoding each coding unit independently of the other coding units in the given frame.

5. The method of claim 1, wherein applying the temporal buffer comprises: adding data from the temporal buffer to data decoded from the second level encoded stream responsive to a second temporal mode being indicated.

6. A decoder comprising:

a base level interface to receive a decoded version of a base encoded stream, the base encoded stream being decoded using a base codec;

an enhancement level interface to receive a first level encoded stream and a second level encoded stream;

a first level decoder to decode the first level encoded stream to obtain a first set of residuals, wherein the first level decoder comprises:

a first entropy decoding component that applies a first entropy decoding operation to the first level encoded stream, resulting in generation of first entropy decoded data;

a first de-quantization component that applies a first de-quantization operation to the first entropy decoded data, resulting in generation of first de-quantized data; and a first inverse transform component that applies a first inverse transform operation to the first de-quantized data, resulting in generation of the first set of residuals;

a first summation component to add the first set of residuals to the decoded version of a base encoded stream to generate a first reconstructed video;

an up-sampler to up-sample the first reconstructed video to generate an up-sampled reconstructed video;

a second level decoder to decode the second level encoded stream to obtain a second set of residuals, wherein the second level decoder comprises:

a second entropy decoding component that applies a second entropy decoding operation to the second level encoded stream, resulting in generation of second entropy decoded data;

a second de-quantization component that applies a second de-quantization operation to the second entropy decoded data, resulting in generation of second de-quantized data; and a second inverse transform component that applies a second inverse transform operation to the second de-quantized data, resulting in generation of the second set of residuals;

a temporal selection component to determine whether temporal prediction is to be applied to the second set of residuals using header information that accompanies one or more of the first and second level encoded streams;

a temporal buffer to apply temporal prediction to the second set of residuals when decoding the second level encoded stream; and a second summation component to add the second set of residuals to the up-sampled reconstructed video to generate a second reconstructed video that comprises a reconstructed version of an originally-encoded full resolution input video.

7. The decoder of claim 6, wherein the first level decoder and the second level decoder each comprise:

an entropy decoding component to apply one or more of run-length encoding and Huffman encoding;

a de-quantization component; and an inverse transform component to apply an inverse transform.

8. The decoder of claim 7, wherein the inverse transform component is configured to apply a 2 by 2 or 4 by 4 Hadamard inverse transform.

* * * * *